United States Patent
Nagai

(10) Patent No.: US 7,872,716 B2
(45) Date of Patent: Jan. 18, 2011

(54) OPTICAL COMPENSATION FILM, POLARIZING PLATE AND LIQUID CRYSTAL DISPLAY

(75) Inventor: Michio Nagai, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 578 days.

(21) Appl. No.: 11/885,932

(22) PCT Filed: Mar. 10, 2006

(86) PCT No.: PCT/JP2006/305308

§ 371 (c)(1), (2), (4) Date: Sep. 7, 2007

(87) PCT Pub. No.: WO2006/095928

PCT Pub. Date: Sep. 14, 2006

(65) Prior Publication Data

US 2008/0192191 A1 Aug. 14, 2008

(30) Foreign Application Priority Data

Mar. 10, 2005 (JP) ............................. 2005-066747
Mar. 11, 2005 (JP) ............................. 2005-070005
Mar. 15, 2005 (JP) ............................. 2005-073051
Mar. 17, 2005 (JP) ............................. 2005-076993

(51) Int. Cl.
G02F 1/1335 (2006.01)
(52) U.S. Cl. ....................... 349/119; 349/117
(58) Field of Classification Search ............. 349/117, 349/119
See application file for complete search history.

(56) References Cited

U.S. PATENT DOCUMENTS

| 4,583,825 A | 4/1986 | Buzak |
| 5,410,422 A | 4/1995 | Bos |
| 5,583,679 A | 12/1996 | Ito et al. |
| 2003/0043325 A1* | 3/2003 | Lyu et al. ................. 349/117 |
| 2003/0218709 A1 | 11/2003 | Ito et al. |
| 2004/0207787 A1* | 10/2004 | Nakamura et al. .......... 349/119 |
| 2005/0179004 A1* | 8/2005 | Morishima et al. ...... 252/299.01 |

FOREIGN PATENT DOCUMENTS

| DE | 39 11 620 A1 | 10/1999 |
| JP | 6-214116 A | 8/1994 |
| JP | 7-306317 A | 12/1995 |
| JP | 9-104866 A | 4/1997 |
| JP | 9-197397 A | 7/1997 |

(Continued)

OTHER PUBLICATIONS

PCT/ISA/210 and PCT/ISA/237 for PCT/JP2006/305308 dated Jul. 4, 2006.

*Primary Examiner*—Michael H Caley
(74) *Attorney, Agent, or Firm*—Buchanan Ingersoll & Rooney PC

(57) ABSTRACT

A liquid crystal display, which allows proper optical compensation for bend-aligned mode liquid crystal cell and exhibits high contrast, excellent viewing angle properties and a high black display fidelity, is provided. A bend-aligned mode liquid crystal cell is properly optically compensated for by properly controlling the optical properties, including wavelength dispersion, of a first optical anisotropic layer and a second optical anisotropic layer.

5 Claims, 10 Drawing Sheets

FOREIGN PATENT DOCUMENTS

| | | |
|---|---|---|
| JP | 9-211444 A | 8/1997 |
| JP | 3056997 B2 | 9/1997 |
| JP | 9-511682 A | 11/1997 |
| JP | 11-316378 A | 11/1999 |
| JP | 2001-166147 A | 6/2001 |
| JP | 2002-40429 A | 2/2002 |
| JP | 2002-40487 A | 2/2002 |
| JP | 2004-184864 A | 7/2004 |
| JP | 2005-62671 A | 3/2005 |
| JP | 2005-62673 A | 3/2005 |
| JP | 2005-301206 A | 10/2005 |
| WO | WO 96/37804 A1 | 11/1996 |
| WO | WO 2005/040903 A1 | 5/2005 |

* cited by examiner

OPTICAL COMPENSATION FILM, POLARIZING PLATE AND LIQUID CRYSTAL DISPLAY

TECHNICAL FIELD

The present invention relates to a optical compensation film, a polarizing plate, and a liquid crystal display.

BACKGROUND ART

As compared with CRT (cathode ray tube), a liquid crystal display (LCD) is advantageous in that it has a small size and a light weight and consumes a low electric power. The liquid crystal display comprises a liquid crystal cell and a pair of polarizing plates disposed on the respective side of the liquid crystal cell. The liquid crystal cell comprises rod-shaped liquid crystal molecules, two sheets of substrates for enclosing the rod-shaped liquid crystal molecules therein and an electrode layer for applying a voltage to the rod-shaped liquid crystal molecules. In order to align the rod-shaped liquid crystal molecules thus enclosed in the liquid crystal cell, the two sheets of substrates each have an alignment film provided thereon. In order to decolor the image displayed on the liquid crystal cell, it is often practiced to provide an optical compensation film (retarder plate) interposed between the liquid crystal cell and the polarizing plate. The layered product of the polarizing plate (polarizing film) and the optical compensation film acts as an elliptical polarizing plate. The optical compensation film may be rendered capable of expanding the viewing angle of the liquid crystal cell. A stretched birefringence film has heretofore been used as an optical compensation film.

It has also been proposed that an optical compensation film having an optical anisotropic layer containing a discotic compound be used instead of stretched birefringence film (see, e.g., JP-A-6-214116, U.S. Pat. No. 5,583,679, German Patent Application Disclosure 3,911,620 and U.S. Pat. No. 4,583,825). The optical anisotropic layer is formed by aligning a discotic compound, and then fixing the discotic compound thus aligned. A discotic compound normally has a high birefringence. A discotic compound can be aligned in various forms. Accordingly, a discotic compound can be used to produce an optical compensation film having optical properties that have never been obtained with the prior art stretched birefringence films.

The liquid crystal cell performs ON/OFF display depending on the difference in orientation of liquid crystal compound. Display modes such as TN (Twisted Nematic), IPS (In-Plane Switching), OCB (Optically Compensatory Bend), VA (Vertically Aligned), ECB (Electrically Controlled Birefringence) and HAN (Hybrid Alignment Nematic), which can be applied to both transmission and reflection type display devices, have been proposed.

As those requiring a high fidelity display among these LCD's there are mainly used 90° twisted nematic liquid crystal displays (hereinafter referred to as "TN mode") comprising a nematic liquid crystal compound having a positive dielectric anisotropy which are driven by a thin-film transistor. These TN mode liquid crystal displays exhibit excellent display properties as viewed on the front but are disadvantageous from the standpoint of display properties in that they exhibit a lowered contrast as viewed obliquely or gradation inversion during gradation display. It has been keenly desired to provide improvements in these display properties. These TN mode liquid crystal displays are also disadvantageous in that they have limited response. It has thus been desired to develop LCD comprising a liquid crystal mode having a higher response.

Optical compensation films have been heretofore developed for TN mode liquid crystal displays. With the recent increasing demand for liquid crystal television, it has been pointed out that the liquid crystal displays leave something to be desired in response, e.g., trailing animation, afterimage. Therefore, OCB mode (or bend mode) liquid crystal displays characterized by high response have been noticed. For example, U.S. Pat. No. 4,583,825 and U.S. Pat. No. 5,410,422 disclose a liquid crystal display comprising a bend-aligned liquid crystal cell having rod-shaped liquid crystal molecules aligned in directions which are opposite from upper to lower side of the liquid crystal cell (symmetrically). Since the rod-shaped liquid crystal molecules are symmetrically aligned in directions which are opposite from upper to lower side of the liquid crystal cell, the bend-aligned liquid crystal cell has a self optical compensating function. Therefore, this liquid crystal mode is also called OCB (optically compensatory bend) liquid crystal mode. The bend-aligned liquid crystal display is advantageous in that it exhibits a high response.

As compared with ordinary liquid crystal modes (TN mode, STN mode), the bend alignment mode is characterized by a great viewing angle and a high response. However, the bend alignment mode needs to be further improved as compared with CRT. In order to further improve the bend-aligned liquid crystal displays, it can be proposed that an optical compensation film be used as in the ordinary liquid crystal modes. However, the prior art optical compensation film comprising a stretched birefringence film leaves something to be desired when used in the bend-aligned liquid crystal display. As previously mentioned, it has been proposed that an optical compensation film having an optical anisotropic layer containing a discotic compound be used instead of stretched birefringence film. For example, the inventions disclosed in JP-A-9-211444 and JP-A-11-316378 concern an OCB mode liquid crystal display comprising an optical compensation film having a liquid crystal compound layer. However, it is difficult to obtain good viewing angle properties merely by controlling known optical parameters as disclosed in these patent references.

Further, a bend-aligned liquid crystal display comprising an optical compensation film containing a discotic compound has been also proposed (see, e.g., JP-A-9-197397 and International Patent Disclosure 96/37804 pamphlet). Moreover, various methods have been proposed to eliminate tin change and prevent gradation inversion of a bend-aligned liquid crystal device comprising an optical compensation film containing a discotic compound (see, e.g., Japanese Patent 3056997 and JP-A-2002-40429).

The use of an optical compensation film containing a discotic compound makes it possible to remarkably improve the viewing angle of a bend-aligned mode liquid crystal display.

The liquid crystal display of bend alignment mode comprising an optical compensation film containing a discotic compound has been claimed disadvantageous in that light having a specific wavelength leaks, causing the coloration of the displayed image (see, e.g., JP-A-11-316378). It is disclosed that this coloration is attributed to the wavelength dependence of the transmission of the elliptical polarizing plate (laminate of polarizing film and optical compensation film). Since the wavelength dependence of the anisotropy of the liquid crystal molecules incorporated in the liquid crystal cell and the wavelength dependence of the anisotropy of the optical compensation film (e.g., discotic liquid crystal) differ from each other, a liquid crystal display of bend alignment normally shows the leakage of short wavelength light (blue). However, the tint during black display can be improved by making the wavelength dispersion of the liquid crystal molecules and the optical compensation film (discotic liquid crystal) coincident with each other.

It has been reported that when the optical anisotropic layer and the polarizing film are disposed in such an arrangement that the angle of the average of direction of line normal to the disc surface of the discotic compounds regularly projected on the optical anisotropic layer and the in-plane transmission axis of the polarizing film with respect to each other is substantially 45°, the maximum optical compensation effect on the liquid crystal cell of bend alignment mode. In order to eliminate tint change and prevent gradation inversion on bend-aligned liquid crystal display comprising an optical compensation film containing a discotic compound, various methods have been proposed (see, e.g., Japanese Patent 3056997 and JP-A-2002-40429).

In recent years, a liquid crystal display has been used in large-sized TV more and more. Therefore, liquid crystal displays having a higher display fidelity have been required. Referring to black display fidelity in particular, it has been difficult to attain a high black display fidelity while satisfying desired contrast properties and viewing angle properties for bend-aligned liquid crystal displays even if the prior art optical compensation film containing a discotic compound is used.

In each publication of JP-A-7-306317 and JP-A-9-104866, there is disclosed 2,3,6,7,10,11-hexa{4-(6-acryloyloxyhexyloxy)benzoyloxy}triphenylene is disclosed as a discotic liquid crystalline molecule suitable for the formation of the optical anisotropic layer of the phase plate (Patent Documents 1 and 2). Incidentally, the retardation value (Δnd) of the phase plate is determined according to the optical properties of the liquid crystal cell to be compensated. The retardation value (Δnd) is the product of the refractive index anisotropy (Δn) of the optical anisotropic layer and the thickness (d) of the optical anisotropic layer. When the refractive index anisotropy (Δn) of the optical anisotropic layer is large, the liquid crystal cell can be compensated even if the thickness (d) of the layer is small. However, with the discotic liquid crystalline compound described in each of Patent Document 3 and Patent Document 4, it is very difficult to form an optical anisotropic layer having a sufficiently large refractive index anisotropy (Δn) (JP-A-7-306317 and JP-A-9-104866). Whereas, JP-A-2001-166147 discloses a discotic liquid crystal having a large refractive index anisotropy. However, the wavelength dispersion characteristic is degraded, (namely, the wavelength dispersibility increases), so that the performance improvement is insufficient (JP-A-2001-166147). In general, the wavelength dispersion characteristic and the refractive index anisotropy are in a relationship of tradeoff. An increase in the refractive index anisotropy results in the degradation of the wavelength dispersion characteristic. The degradation of the wavelength dispersion characteristic degrades the color taste change in color display which is one of the performances of a phase plate, and hence it is undesirable. This has created a demand for the development of the technology for escaping from the tradeoff such that an increase in the refractive index anisotropy results in the degradation of the wavelength dispersion characteristic.

Whereas, with a conventional technology, optical compensation films have been developed assuming that they are used mainly for 15- or less inch, small-sized, or medium-sized Liquid crystal displays. However, in recent years, it has been necessary to assume that they are used for 17- or more inch, large-sized, and high luminance Liquid crystal displays. When a conventional optical compensation film was mounted on the polarizing plate of a large-sized Liquid crystal display as a protective film, it was found that nonuniformity was created on the panel. This defect was not conspicuous very much with a small-sized or medium-sized Liquid crystal display. However, in order to cope with the trend toward a larger size and a higher luminance, there has arisen a necessity of further developing an optical compensation film capable of coping with nonuniform light leakage.

Further, with a conventional technology, the optical compensation film as described above is manufactured by coating a coating solution on a web by a coater using a slot die for lamination. In recent years, in order to develop a desirable function in manufacturing of an optical compensation film, there has been a growing demand for the coating method of a 20- or less μm area which is smaller in wet film thickness than ever. Such an optical compensation film is required to have strict coating film thickness precision and coating film properties, so that a high precision thin layer coating technique is required. Thus, a technology of forming the tip lip of a slot die into a sharp edge has been proposed (JP-T-9-511682).

On the other hand, with the method using a wire bar as the coating system of an optical compensation film, stepped nonuniformity tends to be created by coating solution vibration in the solution reservoir, and misalignment or deflection of a roll in association with coating. Further, these coating systems are post measurement systems, and hence make ensuring of the stable film thickness relatively difficult. For this reason, with these coating systems, it is difficult to increase the speed of coating to a given speed or higher. Thus, the high level of the productivity inherent in coating cannot be made full use of.

DISCLOSURE OF THE INVENTION

An object of the invention is to provide a liquid crystal display, which allows proper optical compensation for a liquid crystal cell, particularly of bend alignment mode, to reduce remarkably the transmission in the forward direction and horizontal and vertical extreme angle directions, thereby making it possible to display a good image having a high contrast, excellent viewing angle properties and causing no tint problems during black display and no gradation inversion.

An object of the invention is to provide a liquid crystal display comprising an accurately optically-compensated liquid crystal cell, particularly of OCB mode, which exhibits a raised contrast and less coloration dependent on the viewing direction during black display. Further, an object of the invention is to provide an optical compensation film, which comprises an optically compensated liquid crystal cell, particularly of OCB mode, to contribute to the enhancement of contrast and the elimination of coloration dependent on the viewing direction during black display.

An object of the invention is to provide an optical compensation film, which causes less change in color taste of a displayed image, and contributes to enlargement of the viewing angle, and a polarizing plate having the optical compensation film. Particularly, an object of the invention is to provide an optical compensation film, which does not create nonuniformity, causes less change in color taste of a displayed image, and contributes to enlargement of the viewing angle even when it is applied to a large-sized Liquid crystal display, and a polarizing plate having the optical compensation film. Further, another object of the invention is to provide a liquid crystal display, which causes less change in color taste of a displayed image, and has been improved in viewing angle.

The above objects are accomplished with the following constitutions.

<First Aspect>

(1-1) An optical compensation film comprising: a first optical anisotropic layer; and a second optical anisotropic layer, wherein the first optical anisotropic layer has an optical property satisfying the following expression (1), and the second optical anisotropic layer has an optical property satisfying the following expressions (2) and (3):

$$Re_1(450)/Re_1(650) \leq 1.25 \quad (1)$$

$$Re_2(450)/Re_2(650) < 0.8 \quad (2)$$

$$Rth_2(450)/Rth_2(650) > 1.1 \quad (3)$$

wherein $Re_n(\lambda)$ is an in-plane retardation of the nth optical anisotropic layer at the wavelength $\lambda$ nm; and $Rth_n(\lambda)$ is an thickness-direction retardation of the nth optical anisotropic layer at the wavelength $\lambda$ nm.

(1-2) The optical compensation film as defined in Clause (1-1), wherein the first optical anisotropic layer has an optical property satisfying the following expression (4), and the second optical anisotropic layer has an optical property satisfying the following expressions (5) and (6):

$$0 \leq Re_1(550) \leq 40 \quad (4)$$

$$30 \leq Re_2(550) \leq 60 \quad (5)$$

$$100 \leq Rth_2(550) \leq 300 \quad (6)$$

(1-3) The optical compensation film as defined in Clause (1-1) or (1-2), wherein the first optical anisotropic layer comprises a discotic compound, and the second optical anisotropic layer comprises a cellulose acylate film.

(1-4) The optical compensation film as defined in Clause (1-3), wherein the cellulose acylate film is a transparent film which is stretched at least in one direction, the cellulose acylate film has a thickness-direction change of 0.05 or more in degree of substitution of cellulose acylate within a range of from 2.00 to 3.00, and the cellulose acylate film comprises a retardation raising agent incorporated therein.

(1-5) A liquid crystal display comprising a liquid crystal cell in a bend alignment mode, having an optical compensation film defined in any one of Clauses (1-1) to (1-4).

<Second Aspect>

(2-1) A liquid crystal display comprising: a pair of polarizing films; a liquid crystal cell provided interposed between the pair of polarizing films; and an optical film provided interposed between at least one of the polarizing films and the liquid crystal cell, the optical film having an optical anisotropic layer 1 (a first optical anisotropic layer) and an optical anisotropic layer 2 (a second optical anisotropic layer), wherein the optical anisotropic layer 1 has an optical property satisfying the following expression (7) and the optical anisotropic layer 2 has an optical property satisfying the following expression (8):

$$Re_1(450)/Re_1(650) < 1.25 \quad (7)$$

$$2 \leq (\Delta n(550) \times d)/Rth_2(550) \leq 5 \quad (8)$$

wherein $\Delta n(550)$ represents the birefringence of a liquid crystal molecule in the liquid crystal cell at a wavelength of 550 nm; d represents the thickness (nm) of the liquid crystal cell; and $Rth_2(550)$ represents an thickness-direction retardation value of the optical anisotropic layer 2 at a wavelength of 550 nm.

(2-2) The liquid crystal display as defined in Clause (2-1), wherein the in-plane retardation value $Re_1(550)$ of the optical anisotropic layer 1 at a wavelength of 550 nm is from 0 nm to 40 nm.

(2-3) The liquid crystal display as defined in Clause (2-1) or (2-2), wherein the in-plane retardation value $Re_2(550)$ of the optical anisotropic layer 2 at a wavelength of 550 nm is from 30 nm to 60 nm, and the thickness-direction retardation value $Rth_2(550)$ of the optical anisotropic layer 2 at a wavelength of 550 nm is from 100 nm to 300 mm.

(2-4) The liquid crystal display as defined in any one of Clauses (2-1) to (2-3), wherein the optical anisotropic layer 1 has a ratio ($Re_1(40°)/Re_1(-40°)$ ratio) of retardation $Re_1(40°)$ to $Re_1(-40°)$ of from 3 to 20 or 1/20 to 1/3 as measured at a wavelength of 550 nm and a swing angle of +40° with the slow axis of the optical anisotropic layer 1 as a swing axis.

(2-5) The liquid crystal display as defined in any one of Clauses (2-1) to (2-4), wherein the optical anisotropic layer 1 is formed by a liquid crystal compound.

(2-6) The liquid crystal display as defined in Clause (2-5), wherein the liquid crystal compound is a discotic compound.

(2-7) The liquid crystal display as defined in any one of Clauses (2-1) to (2-6), wherein the optical anisotropic layer 2 is a cellulose acylate film.

(2-8) The liquid crystal display as defined in any one of Clauses (2-1) to (2-7), wherein the liquid crystal cell is of bend alignment mode.

In accordance with the first or second aspect of the invention, the wavelength dispersibility of the discotic compound to be incorporated in the optical compensation film is controlled to provide a liquid crystal display which allows proper optical compensation for a liquid crystal cell, particularly of bend alignment mode, to reduce remarkably the transmission in the forward direction and horizontal and vertical extreme angle directions, thereby making it possible to display a good image having a high contrast, excellent viewing angle properties and causing no tint problems during black display and no gradation inversion.

<Third Aspect>

(3-1) An optical compensation film comprising: at least a first optical anisotropic layer containing a hybrid-aligned discotic compound; a second optical anisotropic layer satisfying the following expression (I):

$$Re_2(450) < Re_2(550) < Re_2(650) \quad (I)$$

and a third optical anisotropic layer satisfying the following expressions (II) and (III):

$$Rth_3(450) > Rth_3(550) > Rth_3(650) \quad (II)$$

$$Re_3(550) < 5 \quad (III)$$

wherein $Re_n(\lambda)$ represents an in-plane retardation value (nm) of the nth optical anisotropic layer at the wavelength $\lambda$ (nm); and $Rth_n(\lambda)$ represents an thick-direction retardation value (nm) of the nth optical anisotropic layer at the wavelength $\lambda$ (nm).

(3-2) A polarizing plate comprising an optical compensation film as defined in Clause (3-1).

(3-3) A liquid crystal display having a polarizing plate comprising an optical compensation film as defined in Clause (3-1).

(3-4) The liquid crystal display as defined in Clause (3-3), comprising an OCB mode liquid crystal cell.

(3-5) A liquid crystal display comprising: at least a first optical compensation film; a liquid crystal cell; and a second optical compensation film in this order, wherein the first optical compensation film has at least a first optical anisotropic layer containing a hybrid-aligned discotic compound and a second optical anisotropic layer satisfying the following expression (I):

$$Re_2(450) < Re_2(550) < Re_2(650) \quad (I)$$

and the second optical compensation film has a first (1'st) optical anisotropic layer containing a hybrid-aligned discotic compound and a third optical anisotropic layer satisfying the following expressions (II) and (III):

$$Rth_3(450) > Rth_3(550) > Rth_3(650) \quad (II)$$

$$Re_3(550) < 5 \quad (III)$$

wherein $Re_n(\lambda)$ represents an in-plane retardation value (nm) of the nth optical anisotropic layer at the wavelength $\lambda$ (nm); and $Rth_n(\lambda)$ represents an thick-direction retardation value (nm) of the nth optical anisotropic layer at the wavelength $\lambda$ (nm). (The term "first (1'st) optical anisotropic layer" as used hereinafter is as defined in the first optical anisotropic layer, including preferred ranges thereof. The first optical anisotropic layer and the first (1'st) optical anisotropic layer may be the same or different.)

A liquid crystal display of the third aspect of the invention exhibits less light leakage in oblique direction during black display and an enhanced viewing angle contrast. Further, the liquid crystal display can exhibit suppressed light leakage in oblique direction during black display within all the visible light wavelength ranges, making it possible to drastically eliminate color shift during black display dependent on the viewing angle, which color shift is one of the problems with the related art.

<Fourth Aspect>

(4-1) An optical compensation film comprising an optical anisotropic layer containing at least one of fluoroaliphatic group-containing polymers containing a repeating unit derived from a monomer of (i), and at least one of discotic compounds having a cyclopropylcarbonyl group:

(i) a fluoroaliphatic group-containing monomer represented by the following formula (1) or (2):

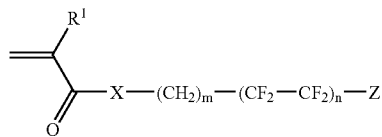

Formula (1)

(where in the formula (1), $R^1$ represents a hydrogen atom or a methyl group, X represents an oxygen atom, a sulfur atom, or $-N(R^2)-$, Z represents a hydrogen atom or a fluorine atom, m represents an integer of 1 or more to 6 or less, and n represents an integer of 2 to 4, and $R^2$ represents a hydrogen atom or an alkyl group having 1 to 4 carbon atoms.)

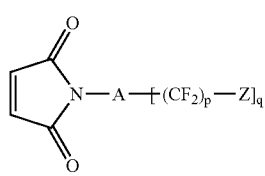

Formula (2)

(in the formula (2), A represents a divalent (q=1) or trivalent (q=2) linking group selected from the following group A of linking groups, or a divalent (q=1) or trivalent (q=2) linking group formed from a combination of two or more selected from the following group A of linking groups, and the linking groups may combine with each other through an oxygen atom, (group A of linking groups)

$-CH_2-$, $-CH_2CH_2-$, $-CH_2CH_2CH_2-$, $-C_6H_4-$, and $-C_6H_3<$: provided that the substitution site on a benzene ring may be any given site;

Z represents a hydrogen atom or a fluorine atom, p represents an integer of 3 to 8, and q represents 1 or 2.)

(4-2) The optical compensation film as defined in Clause (4-1), wherein the discotic compound having a cyclopropylcarbonyl group is a compound represented by the following formula (I):

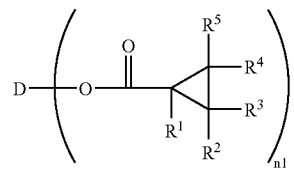

(where in the formula (1), D represents a discotic core, n1 represents an integer of 3 to 20; $R^1$, $R^2$, $R^3$, $R^4$, and $R^5$ each represent a hydrogen atom or a substituent, and may combine with each other to form a ring.)

(4-3) The optical compensation film as defined in Clause (4-2), wherein the compound represented by the formula (I) is a compound represented by the following formula (II):

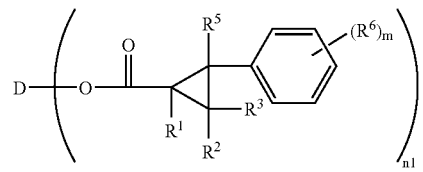

(where in the formula (II), D represents a discotic core, and n1 represents an integer of 3 to 20; $R^1$, $R^2$, $R^3$, and $R^5$ each represent a hydrogen atom or a substituent, and may combine with each other to form a ring; m represents an integer of 1 to 5; $R^6$ represents a substituent, and when a plurality of $R^6$'s are present, they each may be the same or different, and they may combine with each other to form a ring.)

(4-4) The optical compensation film as defined in Clause (4-3), wherein $R^6$ is a halogen atom, a substituted or unsubstituted alkyl group, a substituted or unsubstituted alkoxy group, a substituted or unsubstituted alkoxycarbonyl group, a substituted or unsubstituted aryl group, a substituted or unsubstituted aryloxy group, a substituted or unsubstituted acyloxy group, a substituted or unsubstituted alkoxycarbonyloxy group, or a substituted or unsubstituted aryloxycarbonyloxy group.

(4-5) The optical compensation film as defined in any one of Clauses (4-2) to (4-4), wherein $R^1$, $R^2$, $R^3$, and $R^5$ are each a hydrogen atom, a substituted or unsubstituted alkyl group, a cyano group, an alkoxycarbonyl group, or a halogen atom.

(4-6) The optical compensation film as defined in any one of Clauses (4-1) to (4-5), wherein the discotic compound having a cyclopropylcarbonyl group is a discotic liquid crystal (a discotic liquid crystal compound).

(4-7) The optical compensation film as defined in Clause (4-6), wherein the discotic compound having a cyclopropylcarbonyl group is a discotic compound having a polymerizable group represented by the following formula (III), and the polymerizable group has been polymerized with the discotic plane of the discotic compound oriented, and the orientation has been fixed by the polymerization.

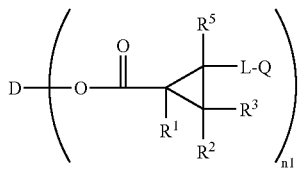

(where in the formula (III), D represents a discotic core, n1 represents an integer of 3 to 20; $R^1$, $R^2$, $R^3$, and $R^5$ each represent a hydrogen atom or a substituent, and may combine with each other to form a ring; L represents an oxygen atom, a sulfur atom, a carbonyl group, a substituted or unsubstituted alkylene group, or a substituted or unsubstituted arylene group, or a divalent linking group selected from combinations thereof; and Q represents a polymerizable group.)

(4-8) The optical compensation film as defined in Clause (4-7), wherein the Q is an epoxy group or an ethylenically unsaturated group.

(4-9) The optical compensation film as defined in any one of Clauses (4-1) to (4-8), wherein the discotic core of the discotic compound is triphenylene.

(4-10) The optical compensation film as defined in any one of Clauses (4-1) to (4-9), wherein the orientation of the discotic compound having a cyclopropylcarbonyl group forms a discotic nematic phase.

(4-11) The optical compensation film as defined in any one of Clauses (4-1) to (4-10), wherein Z in the formula (1) is a hydrogen atom.

(4-12) The optical compensation film as defined in any one of Clauses (4-1) to (4-11), wherein the fluoroaliphatic group-containing polymer is a copolymer further containing a repeating unit derived from the following monomer of (ii)

(ii) a monomer represented by the following formula (3):

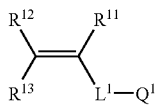

(where in the formula, $R^{11}$, $R^{12}$, and $R^{13}$ each independently represent a hydrogen atom or a substituent; $L^1$ represents a divalent linking group selected from the following group $L^1$ of linking groups or a divalent linking group formed from a combination of two or more selected from the following group $L^1$ of linking groups:

(group $L^1$ of linking groups)

a single bond, —O—, —CO—, —$NR^4$— (where $R^4$ represents a hydrogen atom, an allyl group, an aryl group, or an aralkyl group), —S—, —$SO_2$—, —P(=O)($OR^5$)— (where $R^5$ represents an alkyl group, an aryl group, or an aralkyl group), an alkylene group, and an arylene group; and $Q^1$ represents a carboxyl group (—COOH) or a salt thereof, a sulfo group (—$SO_3H$) or a salt thereof, or phosphonoxy {—OP(=O)(OH)$_2$} or a salt thereof, an alkyl group, or, a poly(alkylenoxy) group the end of which is a hydrogen atom or an alkyl group.)

(4-13) The optical compensation film as defined in any one of Clauses (4-1) to (4-12), wherein the optical anisotropic layer contains at least two fluoroaliphatic group-containing polymers containing a repeating unit derived from a monomer represented by the formula (1) or (2).

(4-14) The optical compensation film as defined in any one of Clauses (4-1) to (4-13), wherein the optical anisotropic layer is provided on an alignment film, and the alignment film and/or the optical anisotropic layer is formed by coating with a slot die method.

(4-15) An elliptical polarizing plate having at least a polarizing film and a protective film provided on one side of the polarizing film, the protective film being an optical compensation film as defined in any one of Clauses (4-1) to (4-14).

(4-16) A liquid crystal display having an elliptical polarizing plate as defined in Clause (4-15).

In the fourth aspect of the invention, it is possible to provide an optical compensation film which causes less changes in color taste of a displayed image, and has a performance of enlarging the viewing angle when it is applied to a large-sized Liquid crystal display by an optical anisotropic layer containing a fluoroaliphatic group-containing polymer represented by the formula (1) or the formula (2), and a discotic compound having a cyclopropylcarbonyl group, and an optical compensation film which does not create nonuniformity, and is excellent in display quality. The optical compensation film of the invention contributes to the improvement of the viewing angle characteristics of Liquid crystal displays of various modes. Particularly, it can display an image which undergoes less change in color taste, and is high in display quality without causing nonuniformity even when applied to a large-sized Liquid crystal display. Further, by using a slot coater, particularly, a slot coater having a slot die of a specific structure, it is possible to obtain a more preferable optical compensation film.

Figure 1:
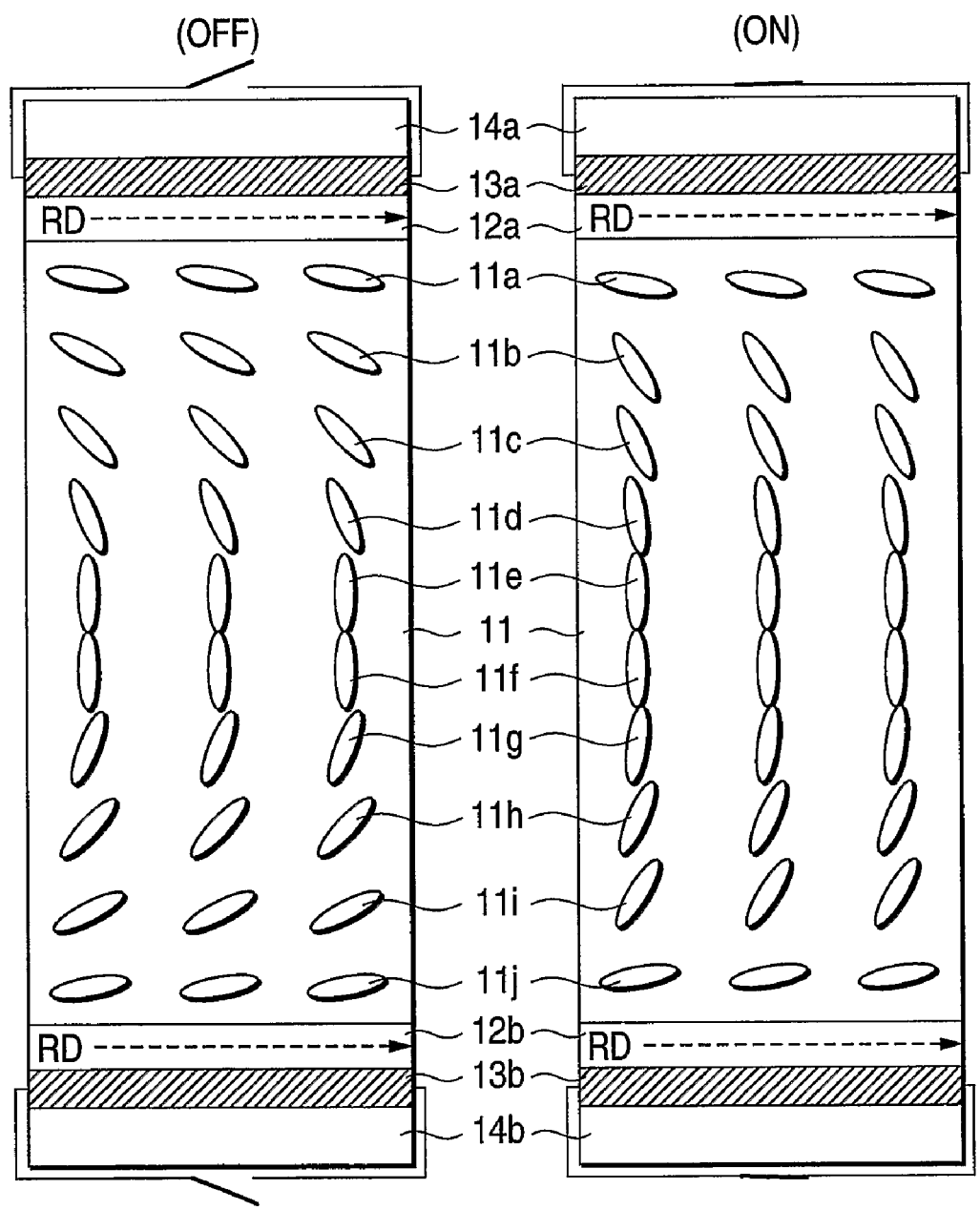
FIG. 1 is a sectional view diagrammatically illustrating the alignment of a liquid crystal compound in a bend-aligned liquid crystal cell.

Reference numerals and signs are set forth below.
10 Bend-aligned liquid crystal cell
11 Liquid crystal compound
11a-11j Rod-shaped liquid crystal molecule
12a, 12b Alignment film
13a, 13b Electrode layer
14a Upper substrate 14b Lower substrate
31, 31A, 31B First optical anisotropic layer
31a-31e Discotic compound
32 Alignment film
33, 33A, 33B Second optical anisotropic layer
34, 34A, 34B Polarizing film
NL Normal line of disc surface of discotic compound
PL Direction of normal line of disc surface regularly projected on surface of second optical anisotropic layer
RD, RD1, RD2, RD3, RD4 Rubbing direction
SA, SA1, SA2 In-plane slow axis
TA, TA1, TA2 In-plane transmission axis
BL Back light
1 Light-diffusion film
2 Transparent substrate film
3 Light-diffusion layer
40 Light-transmitting resin
41 First light-transmitting particulate material
42 Second light-transmitting particulate material
51 Upper polarizing film
51a Upper polarizing film transmission axis
52 Third upper optical anisotropic layer
53 Second upper optical anisotropic layer
53a Second upper optical anisotropic layer slow axis
54 First upper optical anisotropic layer
54a First upper optical anisotropic layer alignment control axis
55 Upper liquid crystal cell electrode substrate
55a Upper substrate alignment control direction
56 Liquid crystal layer.
57 Lower liquid crystal cell electrode substrate
57a Lower substrate alignment control direction
58 First lower optical anisotropic layer
58a First lower optical anisotropic layer alignment control axis
59 Second lower optical anisotropic layer
59a Second lower optical anisotropic layer slow axis
60 Third lower optical anisotropic layer
61 Lower polarizing film
61a Lower polarizing film slow axis
63 Lower polarizing film
63a Lower polarizing film slow axis
64 Upper optical anisotropic layer support
64a Upper optical anisotropic layer support slow axis
65 Lower optical anisotropic layer support
65a Lower optical anisotropic layer support slow axis
80 Coater
81 Backup roll
82 Web
83 Slot die
84 Coating solution
85 Pocket
86 Slot
87 Tip lip
88 Upstream lip land
89 Downstream lip land
90 Slot die
91 Downstream lip land
92 Sign
93 Slot

DETAILED DESCRIPTION OF THE INVENTION

The terms "45°", "parallel" and "perpendicular" as used herein are meant to indicate that they fall within the range of (precise angle)±less than 5°. The error from the precise angle is preferably less than 4°, more preferably less than 3°. The sign "+" attached to the angle means clockwise and the sign "−" attached to the angle means counterclockwise. The term "slow axis" as used herein is meant to indicate the direction in which the refractive index reaches maximum. In addition, the term "visible light wavelength range" as used herein is meant to indicate a wavelength range of from 380 n to 780 mm. The wavelength λ at which the refractive index is measured is 550 nm in the visible light wavelength range unless otherwise specially defined.

The term "polarizing plate" as used herein is meant to include a polarizing plate of continuous length and a slit polarizing plate having a size that can be incorporated in a liquid crystal display (The term "slit" as used herein is meant to include "punch" and "cut"). Further, the term "polarizing film" and the term "polarizing plate" are distinguished herein. The term "polarizing plate" as used herein is meant to indicate a laminate comprising a "polarizing film" having a protective film for protecting the polarizing film provided on at least one side thereof.

The terms "Re(λ)" and "Rth(λ)" as used herein are meant to indicate an in-plane retardation (i.e., a retardation in a plane of the film or layer) and a thickness-direction retardation (i.e., a retardation in a direction perpendicular to the plane of the film or layer) at the wavelength λ, respectively. In the invention, Re(λ) is a value measured when light having a wavelength λ nm is incident in the direction normal to the film using "KOBRA 21ADH" (produced by Ouji Scientific Instruments Co. Ltd.). Rth(λ) is calculated by "KOBRA 21ADH" on the basis of retardation values measured in the total three directions, i.e., Re(λ), retardation value measured by the incidence of light having a wavelength λ nm in the direction inclined at an angle of +40° from the direction normal to the film with the in-plane slow axis (judged by "KOBRA 21ADH") as an inclined axis (rotary axis), retardation value measured by the incidence of light having a wavelength λ mm in the direction inclined at an angle of −40° from the direction normal to the film. As a hypothetical average refractive index there may be used one disclosed in "Polymer Handbook", John Wiley & Sons, Inc. and various catalogues of optical films. For the cellulose acylate films having an unknown average refractive index, an Abbe refractometer may be used. The average refractive index of main optical films are exemplified below. Cellulose acylate (1.48), cycloolefin polymer (1.52), polycarbonate (1.59), polymethylene methacrylate (1.49), polystyrene (1.59).

By inputting the hypothetic average refractive indexes and film thicknesses, KOBRA 21ADH calculates nx, ny and nz.

<First Aspect, Second Aspect>
Exemplary embodiments of the first and second aspects of the invention will be further described hereinafter.

(Liquid Crystal Display)
A liquid crystal display will be described hereinafter in connection with the attached drawings. However, the liquid crystal display of the invention is not limited to this configuration.

FIG. 1 is a sectional view diagrammatically illustrating the alignment of a liquid crystal compound in the bend-aligned liquid crystal cell. As shown in FIG. 1, the bend-aligned liquid crystal cell has a liquid crystal compound (II) enclosed in the gap between an upper substrate (14a) and a lower substrate (14b). The liquid crystal compound (II) to be used in the bend-aligned liquid crystal cell normally has a positive dielectric anisotropy. The upper substrate (14a) and the lower substrate (14b) of the liquid crystal cell have alignment films (12a, 12b) and electrode layers (13a, 13b), respectively. The alignment film is normally capable of aligning rod-shaped liquid crystal molecules (11a to 11j). RD represents the rubbing direction of the alignment film. The electrode layer is capable of applying a voltage to the rod-shaped liquid crystal molecules (11a to 11j).

When the voltage applied to the bend-aligned liquid crystal cell is low, the rod-shaped liquid crystal molecules (11a to 11e) on the upper substrate (14a) side of the liquid crystal cell and the rod-shaped liquid crystal molecules (11f to 11j) on the lower substrate (14b) side of the liquid crystal cell are aligned in opposing directions (symmetrically about the central horizontal line) as shown in OFF state in FIG. 1. Further, the rod-shaped liquid crystal molecules (11a, 11b, 11i, 11j) disposed in the vicinity of the substrates (14a, 14b) are aligned substantially horizontally while the rod-shaped liquid crystal molecules (1id to 11g) disposed at the central part of the liquid crystal cell are aligned substantially vertically.

As shown in ON state in FIG. 1, when the voltage applied to the liquid crystal cell is high, the rod-shaped liquid crystal molecules (11a to 11j) disposed in the vicinity of the substrates (14a, 14b) are still aligned substantially horizontally. The rod-shaped liquid crystal molecules (11e, 11f) disposed at the central part of the liquid crystal are still aligned substantially vertically. The rod-shaped liquid crystal molecules (11b, 11c, 11d, 11g, 11h, 11i) disposed in between the substrate and the central part of the liquid crystal cell change in alignment with the rise of the applied voltage. These rod-shaped liquid crystal molecules are aligned more vertically than in OFF state. However, the rod-shaped liquid crystal molecules (11a to 11e) disposed on the upper substrate (14a) side of the liquid crystal cell and the rod-shaped liquid crystal molecules (11f to 11j) disposed on the lower substrate (14b) side of the liquid crystal cell are aligned in opposing directions (symmetrically about the central horizontal line) as in OFF state.

Figure 2:
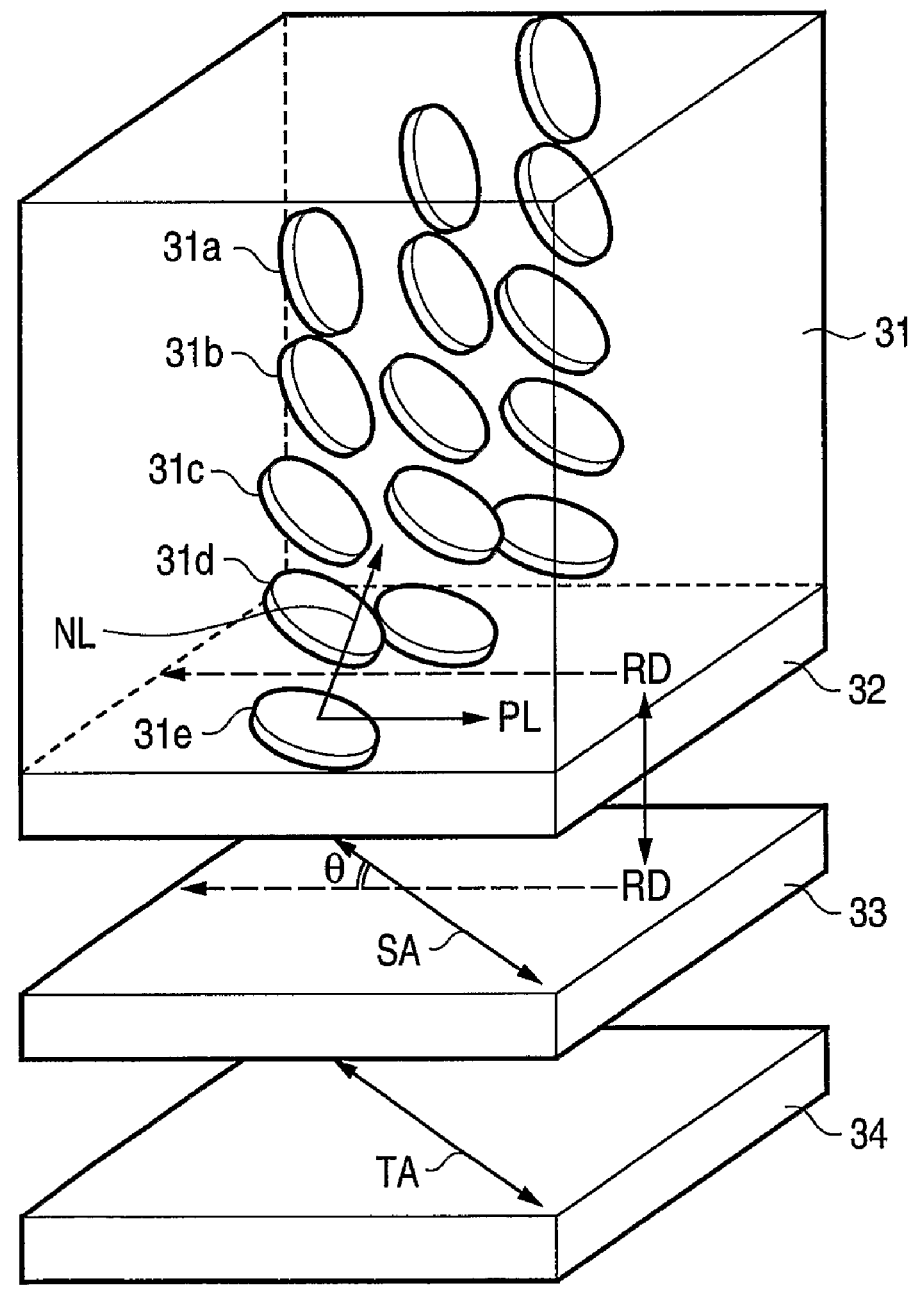
FIG. 2 is a diagrammatic view illustrating a polarizing plate.

FIG. 2 is a diagrammatic view illustrating a polarizing plate. The polarizing plate shown in FIG. 2 comprises at least a first optical anisotropic layer (31), a second optical anisotropic layer (33) and a polarizing film (34). The first optical anisotropic layer (31) is preferably composed of discotic compounds (31a to 31e) and the second optical anisotropic layer (33) is preferably composed of a cellulose acylate film. The polarizing plate shown in FIG. 2 has an alignment film (32) provided interposed between the first optical anisotropic layer (31) and the second optical anisotropic layer (33). The discotic compounds (31a to 31e) in the first optical anisotropic layer (31) are planar molecules. The discotic compounds (31a to 31e) have only one plane, i.e., disc surface in molecule. The disc surface is tilted with respect to the surface of the second optical anisotropic layer (33). The angle of the disc surface with respect to the surface of the second optical anisotropic layer (tilt angle) increases with the increase of the distance between the discotic compound and the alignment film. The average tilt angle is preferably from 15° to 50°. As shown in FIG. 2, as the tilt angle changes, the capability of expanding the viewing angle of the polarizing plate can be remarkably enhanced. Further, the polarizing plate having varying tilt angles is also capable of preventing the occurrence of inversion of displayed image, gradation change or coloration. The average of direction (PL) of line (NL) normal to the disc surface of the discotic compounds (31a to 31e) regularly projected on the second optical anisotropic layer (33) is not parallel to the rubbing direction (RD) of the alignment film (32).

A preferred function of the invention is to predetermine the angle of the average of direction of the line normal to the disc surface of discotic compounds regularly projected on the second optical anisotropic layer with respect to the in-plane slow axis (SA) of the second optical anisotropic layer (33) to substantially 45°. Therefore, if suffices if the angle (θ) of the rubbing direction (RD) of the alignment film (32) with respect to the in-plane slow (SA) of the second optical anisotropic layer is adjusted to substantially 45° at the step of producing the polarizing plate. In the invention, the second optical anisotropic layer and the polarizing film are disposed in such an arrangement that the in-plane slow axis (SA) of the second optical anisotropic layer and the in-plane transmission axis (TA) of the polarizing film (34) are disposed parallel or perpendicular to each other. The polarizing plate shown in FIG. 2 has two sheets of second optical anisotropic layers disposed parallel to each other. Principally speaking, the in-plane slow axis (SA) of the second optical anisotropic layer (33) corresponds to the stretching direction of the second optical anisotropic layer. Principally speaking, the in-plane transmission axis (TA) of the polarizing film (34) corresponds to the direction perpendicular to the stretching direction of the polarizing film.

Figure 3:
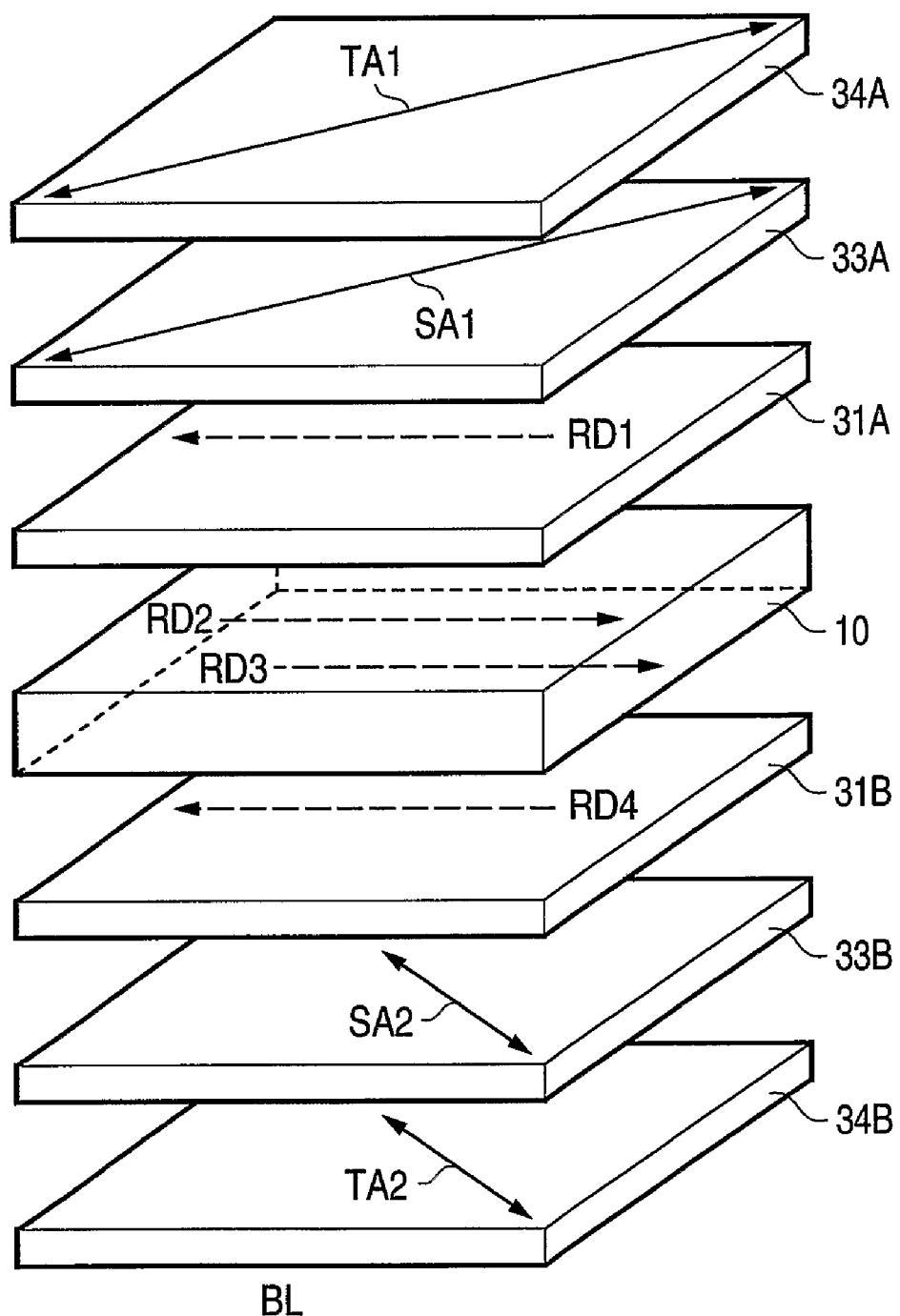
FIG. 3 is a diagrammatic view illustrating a bend-aligned liquid crystal display according to an exemplary embodiment of the invention.

FIG. 3 is a diagrammatic view illustrating a bend-aligned liquid crystal display according to an exemplary embodiment of the invention. The liquid crystal display shown in FIG. 3 comprises a bend-aligned liquid crystal cell (10), a pair of polarizing plates (31A to 34A, 31B to 34B) disposed on the respective side of the liquid crystal cell and a back light (BL). The bend-aligned liquid crystal cell (10) corresponds to the liquid crystal cell shown in FIG. 1. The upper and lower rubbing directions (RD2, RD3) of the liquid crystal cell (10) extend in the same direction (parallel). The polarizing plate has first optical anisotropic layers (31A, 31B), second optical anisotropic layers (33A, 33B) and polarizing films (34A, 34B) stacked in this order as viewed from the liquid crystal cell (10) side thereof. The rubbing directions (RD1, RD4) of the discotic compound of the first optical anisotropic layers (31A, 31B) are not parallel to the rubbing directions (RD2, RD3) of the opposing liquid crystal cell. As described above, the rubbing directions (RD1, RD4) of the discotic compound are not parallel to the average of direction of the line normal to the disc surface regularly projected on the second optical anisotropic layer. The in-plane slow axes (SA1, SA2) of the second optical anisotropic layers (33A, 33B) and the in-plane transmission axes (TA1, TA2) of the polarizing films (34A, 34B) are disposed at substantially 45° with respect to the rubbing directions (RD1, RD4) of the discotic compound on the same plane. The two sheets of polarizing films (34A, 34B) are disposed in crossed Nicols such that the in-plane transmission axes (TA1, TA2) are perpendicular to each other.

(First Optical Anisotropic Layer)

A wavelength dispersion of in-plane retardation of the first optical anisotropic layer in the first aspect ($Re_1$ (450)/$Re_1$ (650)) is 1.25 or less, preferably 1.2 or less, more preferably 1.18 or less.

The wavelength dispersion of in-plane retardation of the first optical anisotropic layer in the first aspect is most preferably predetermined properly depending on the wavelength dispersion of retardation of liquid crystal in the cell.

An in-plane retardation value of the first optical anisotropic layer in the first aspect ($Re_1$ (550)) is preferably from not smaller than 0 to not greater than 50, more preferably from not smaller than 20 to not greater than 40.

As the liquid crystal compound to be used in the formation of the first optical anisotropic layer in the second aspect there may be used a discotic compound. The retardation value of the first optical anisotropic layer of the first aspect as measured in the direction of line normal to the surface of the film is preferably from 20 nm to 40 nm, more preferably from 25 nm to 40 nm.

The first optical anisotropic layer is preferably designed so as to compensate for the liquid crystal compound in the liquid crystal cell during black display of the liquid crystal display.

For the details of alignment of liquid crystal compounds in liquid crystal cell, reference can be made to IDW'00, FMC7-2, pp. 411-414.

The thickness of the first optical anisotropic layer is preferably from 0.1 µm to 20 µm, more preferably from 0.3 µm to 10 µm, most preferably from 0.5 µm to 5 µm.

The first optical anisotropic layer is not specifically limited in its material but is preferably formed by a liquid crystal compound, more preferably a discotic liquid crystal compound. The aforementioned first optical anisotropic layer may be formed directly on the surface of the second optical anisotropic layer or on an alignment film formed on the second optical anisotropic layer.

The discotic liquid crystal compound may be a polymer liquid crystal or low molecular liquid crystal. A low molecular liquid crystal which has been crosslinked and no longer exhibits liquid crystal properties may be used.

(Discotic Liquid Crystal Compound)

Examples of the discotic liquid crystal compound employable herein include benzene derivatives disclosed in C. Destrade et al's study report, "Mol. Cryst.", vol. 71, page 111 (1981), truxene derivatives disclosed in C. Destrade et al's study report, "Mol. Cryst.", vol. 122, page 141 (1985) and "Physics lett, A", vol. 78, page 82 (1990), cyclohexane derivatives disclosed in B. Kohne et al's study report, "Angew. Chem.", vol. 96, page 70 (1984), and azacrown-based and phenyl acetylene-based macrocycles disclosed in J. M. Lehn et al's study report, "J. Chem. Commun.", page 1,794 (1985) and J. Zhang et al's study report, "J. Am. Chem. Soc.", vol. 116, page 2,655 (1994).

The aforementioned discotic liquid crystal compound may be also a liquid crystal compound arranged such that the straight-chain alkyl group, alkoxy group or substituted benzoyloxy group substitutes on the central nucleus of molecule radially as straight-chain of nucleus. The discotic liquid crystal compound preferably comprises molecules or molecule aggregates having rotational symmetry that can be aligned specifically.

As mentioned above, when a liquid crystal compound is used to form a first optical anisotropic layer, the compound which is eventually incorporated in the first optical anisotropic layer doesn't need to exhibit liquid crystal properties any longer. For example, in the case where the low molecular discotic liquid crystal compound has a group that reacts when heated or irradiated with light to cause polymerization or crosslinking of the molecules to a polymer as an optical anisotropic layer, the compound incorporated in the optical anisotropic layer may lose its liquid crystal properties. Preferred examples of the discotic liquid crystal compound employable herein include those disclosed in JP-A-8-50206. For the details of the polymerization of discotic liquid crystal compound, reference can be made to JP-A-8-27284.

In order to fix the discotic liquid crystal compound by polymerization, it is necessary that a polymerizable group be connected to the discotic core of the discotic liquid crystal compound as a substituent. However, when a polymerizable group is directly connected to the discotic core, it is difficult to keep the liquid crystal compound aligned during the polymerization reaction. In order to solve this problem, a connecting group is incorporated in between the discotic core and the polymerizable group. Accordingly, the discotic liquid crystal compound having a polymerizable group is preferably a compound represented by the following formula (DI):

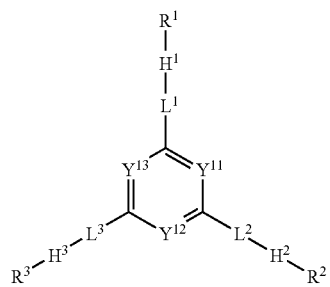

In the formula (DI), $Y^{11}$, $Y^{12}$ and $Y^{13}$ each independently represent a methine or nitrogen atom.

In the case where $Y^{11}$, $Y^{12}$ and $Y^{13}$ each are a methine, the hydrogen atoms in the methine may be substituted by substituents. The term "methine" as used herein is meant to indicate an atomic group obtained by removing three hydrogen atoms from methane.

Preferred examples of the substituents which may be possessed by the carbon atoms in the methine include alkyl groups, alkoxy groups, aryloxy groups, acyl groups, alkoxycarbonyl groups, acyloxy groups, acylamino groups, alkoxycarbonylamino groups, alkylthio groups, arylthio groups, halogen atoms, and cyano groups. More desirable among these substituents are alkyl groups, alkoxy groups, alkoxycarbonyl groups, acyloxy groups, acyloxy groups, halogen atoms, and cyano groups. Most desirable among these substituents are $C_1$-$C_{12}$ alkyl groups, $C_1$-$C_{12}$ alkoxy groups, $C_2$-$C_{12}$ alkoxycarbonyl groups, $C_2$-$C_{12}$ acyloxy groups, halogen atoms, and cyano groups.

$Y^{11}$, $Y^{12}$ and $Y^{13}$ each are more preferably a methine. Most preferably, the methine is unsubstituted.

In the formula (DI), $L^1$, $L^2$ and $L^3$ each independently represent a single bond or divalent connecting group. In the case where $L^1$, $L^2$ and $L^3$ each are a divalent connecting group, it is preferably a divalent connecting group selected from the group consisting of —O—, —S—, —C(=O)—, —NR$^7$—, —CH=CH—, —C≡C—, divalent cyclic group and combination thereof. $R^7$ is a $C_1$-$C_7$ alkyl group or hydrogen atom, preferably $C_1$-$C_4$ alkyl group or hydrogen atom, more preferably methyl group, ethyl group or hydrogen atom, most preferably hydrogen atom.

The divalent connecting group represented by $L^1$, $L^2$ and $L^3$ is a divalent connecting group having at least one cyclic structure (hereinafter occasionally referred to as "cyclic group"). The cyclic group is preferably a 5-, 6- or 7-membered ring, more preferably a 5- or 6-membered ring, most preferably a 6-membered ring. The ring contained in the cyclic ring may be a condensed ring. However, monocycle is preferred to condensed ring. The ring contained in the cyclic group may be any of aromatic ring, aliphatic ring and heterocycle. Preferred examples of the aromatic ring include benzene ring and naphthalene ring. The aliphatic ring is preferably a cyclohexane ring. Preferred examples of the heterocycle include pyridine ring and pyrimidine ring. The cyclic group is more preferably an aromatic ring or heterocycle. The divalent cyclic group in the invention is more preferably a divalent connecting group composed of only cyclic structure (including substituents) hereinafter.

Among the divalent cyclic groups represented by $L^1$, $L^2$ and $L^3$, the cyclic group having benzene ring is preferably 1,4-phenylene group. The cyclic group having naphthalene ring is preferably naphthalene-1,5-diil group or naphthalene-2,6-diil group. The cyclic group having a cyclohexane ring is preferably 1,4-cyclohexylene group. The cyclic group having a pyridine ring is preferably pyridine-2,5-diil group. The cyclic group having a pyrimidine ring is preferably pyrimidine-2,5-diil.

The divalent connecting group represented by $L^1$, $L^2$ and $L^3$ may have substituents. Examples of the substituents employable herein include halogen atoms, cyano groups, nitro groups, $C_1$-$C_{16}$ alkyl groups, $C_2$-$C_{16}$ alkenyl groups, $C_2$-$C_{16}$ alkynyl groups, $C_1$-$C_{16}$ halogen-substituted alkyl groups, $C_1$-$C_{16}$ alkoxy groups, $C_2$-$C_{16}$ acyl groups, $C_1$-$C_{16}$ alkylthio groups, $C_2$-$C_{16}$ acyloxy groups, $C_2$-$C_{16}$ alkoxycarbonyl groups, carbamoyl groups, carbamoyl groups substituted by $C_2$-$C_{16}$ alkyl group, and $C_2$-$C_{16}$ acylamino groups.

Preferred examples of $L^1$, $L^2$ and $L^3$ include single bond, *—O—CO—, *—CO—O—, *—CH═CH—, *—C≡C—, *-divalent cyclic group-, *—O—CO-divalent cyclic group-, *—CO—O-divalent cyclic group-, *—CH═CH-divalent cyclic group-, *—C≡C-divalent cyclic group-, *-divalent cyclic group-O—CO—, *-divalent cyclic group-CO—O—, *-divalent cyclic group-CH═CH—, and *-divalent cyclic group-C≡C—. Particularly preferred among these groups are single bond, *—CH═CH—, *—C≡C—, *-divalent cyclic group-O—CO—, *—CH═CH-divalent cyclic group-, and *—C≡C-divalent cyclic group-. Most desirable among these groups is single bond. The symbol * indicates the site at which the group is connected to the 6-membered ring side containing $Y^{11}$, $Y^{12}$ and $Y^{13}$ in the formula (DI).

$H^1$, $H^2$ and $H^3$ each independently represent the formula (DI-A) or (DI-B). Formula (DI-A):

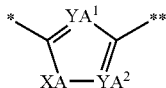

In the formula (DI-A), $YA^1$ and $YA^2$ each independently represent a methine or nitrogen atom. Preferably, at least one of $YA^1$ and $YA^2$ is a nitrogen atom. More preferably, both $YA^1$ and $YA^2$ are a nitrogen atom. XA represents an oxygen atom, sulfur atom, methylene or imino, preferably oxygen atom. The symbol * represents the site at which the moiety is connected to $L^1$ to $L^3$ side in the formula (DI). The symbol ** represents the site at which the moiety is connected to $R^1$ to $R^3$ side in the formula (DI). The imino indicates one represented by —NH—.

Formula (DI-B):

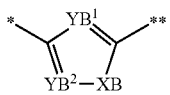

In the formula (DI-B), $YB^1$ and $YB^2$ each independently represent a methine or nitrogen atom. Preferably, at least one of $YB^1$ and $YB^2$ is preferably a nitrogen atom. More preferably, both $YB^1$ and $YB^2$ are a nitrogen atom. XB represents an oxygen atom, sulfur atom, methylene or imino, preferably oxygen atom. The symbol * indicates the site at which the moiety is connected to $L^1$ to $L^3$ side in the formula (DI). The symbol ** indicates the site at which the moiety is connected to $R^1$ to $R^3$ side in the formula (DI).

$R^1$, $R^2$ and $R^3$ each independently represent the following formula (DI-R).

(DI-R)

In the formula (DI-R), the symbol * indicates the site at which the moiety is connected to $H^1$ to $H^3$ side in the formula (DI).

$L^{21}$ represents a single bond or divalent connecting group. $L^{21}$, if it is a divalent connecting group, is preferably a divalent connecting group selected from the group consisting of —O—, —S—, —C(═O)—, —$NR^7$—, —CH═CH—, —C≡C— and combination thereof $R^7$ is a $C_1$-$C_7$ alkyl group or hydrogen atom, preferably $C_1$-$C_4$ alkyl group or hydrogen atom, more preferably methyl group, ethyl group or hydrogen atom, most preferably hydrogen atom.

$L^{21}$ is preferably any of single bond, *—O—CO—, *—CO—O—, *—CH═CH— and *—C≡C— (in which the symbol *** indicates * side in the formula (DI-R)), more preferably single bond.

$Q^2$ represents a divalent group (cyclic group) having at least one cyclic structure. The cyclic group is preferably a 5-, 6- or 7-membered ring, more preferably a 5- or 6-membered ring, most preferably a 6-membered ring. The cyclic structure contained in the cyclic group may be a condensed ring. However, monocycle is preferred to condensed ring. The ring contained in the cyclic group may be any of aromatic ring, aliphatic ring and heterocycle. Preferred examples of the aromatic ring include benzene ring and naphthalene ring. The aliphatic ring is preferably a cyclohexane ring. Preferred examples of the heterocycle include pyridine ring and pyrimidine ring.

Among the divalent cyclic groups represented by $Q^2$, the cyclic group having benzene ring is preferably 1,4-phenylene group. The cyclic group having naphthalene ring is preferably naphthalene-1,5-diil group or naphthalene-2,6-diil group. The cyclic group having a cyclohexane ring is preferably 1,4-cyclohexylene group. The cyclic group having a pyridine ring is preferably pyridine-2,5-diil group. The cyclic group having a pyrimidine ring is preferably pyrimidine-2,5-diil. Particularly preferred among these cyclic groups are 1,4-phenylene group and 1,4-cyclohexylene group.

$Q^2$ may have substituents. Examples of the substituents employable herein include halogen atoms (fluorine, chlorine, bromine, iodine), cyano groups, nitro groups, $C_1$-$C_{16}$ alkyl groups, $C_2$-$C_{16}$ alkenyl groups, $C_2$-$C_{16}$ alkynyl groups, $C_1$-$C_{16}$ halogen-substituted alkyl groups, $C_1$-$C_{16}$ alkoxy groups, $C_2$-$C_{16}$ acyl groups, $C_1$-$C_{16}$ alkylthio groups, $C_2$-$C_{16}$ acyloxy groups, $C_2$-$C_{16}$ alkoxycarbonyl groups, carbamoyl groups, $C_2$-$C_{16}$ alkyl group-substituted carbamoyl groups, and $C_2$-$C_{16}$ acylamino groups. Preferred among these substituents are halogen atoms, cyano groups, $C_1$-$C_6$ alkyl groups, and $C_1$-$C_6$ halogen-substituted alkyl groups. More desirable among these substituents are halogen atoms, $C_1$-$C_4$ alkyl groups, and $C_1$-$C_4$ halogen-substituted alkyl groups. Even more desirable among these substituents are halogen atoms, $C_1$-$C_3$ alkyl groups, and trifluoromethyl group.

The suffix n1 represents an integer of from 0 to 4. The suffix n1 is preferably from 1 to 3, more preferably from 1 or 2.

$L^{22}$ represents —O—, —O—CO—, —CO—O—, —O—CO—O—, **—S—, *—N(R)—, —$CH_2$—, —CH═CH— or —C≡C— in which the symbol  indicates the site at which the moiety is connected to $Q^2$ side.

$L^{22}$ preferably is —O—, —O—CO—, —CO—O—, —O—CO—, —$CH_2$—, —CH═CH— or —C_C—, more preferably —O—, —O—CO—, —O—CO—O— or **—$CH_2$—.

$L^{23}$ represents a divalent connecting group selected from the group consisting of —O—, —S—, —C(═O)—, —NH—, —$CH_2$—, —CH═CH—, —C≡C— and combination thereof. The hydrogen atoms in —NH—, —$CH_2$— and —CH═CH— may be substituted by substituents. Preferred examples of the substituents employable herein include halogen atoms, cyano groups, nitro groups, $C_1$-$C_6$ alkyl groups, $C_1$-$C_6$ halogen-substituted alkyl groups, $C_1$-$C_6$ alkoxy groups, $C_2$-$C_6$ acyl groups, $C_1$-$C_6$ alkylthio groups, $C_2$-$C_6$ acyloxy groups, $C_2$-$C_6$ alkoxycarbonyl groups, carbamoyl groups, carbamoyl groups substituted by $C_2$-$C_6$ alkyl group, and $C_2$-$C_6$ acylamino groups. More desirable among these substituents are halogen atoms and $C_1$-$C_6$ alkyl groups.

$L^{23}$ is preferably selected from the group consisting of —O—, —C(=O)—, —CH$_2$—, CH=CH—, —C≡C— and combination thereof. $L^{23}$ preferably contains from 1 to 20 carbon atoms, more preferably from 2 to 14 carbon atoms. Further, $L^{23}$ preferably contains from 1 to 16-CH$_2$— groups, more preferably from 2 to 12-CH$_2$— groups.

$Q^1$ represents a polymerizable group or hydrogen atom. In the case where the liquid crystal compound to be used in the invention is used in an optical compensation film the phase difference of which is not preferably changed by heat, $Q^1$ is preferably a polymerizable group.

The polymerization reaction is preferably addition polymerization (including ring-opening polymerization) or condensation polymerization. In other words, the polymerizable group is preferably a functional group which can undergo addition polymerization reaction or condensation polymerization reaction. Examples of the polymerizable group will be given below.

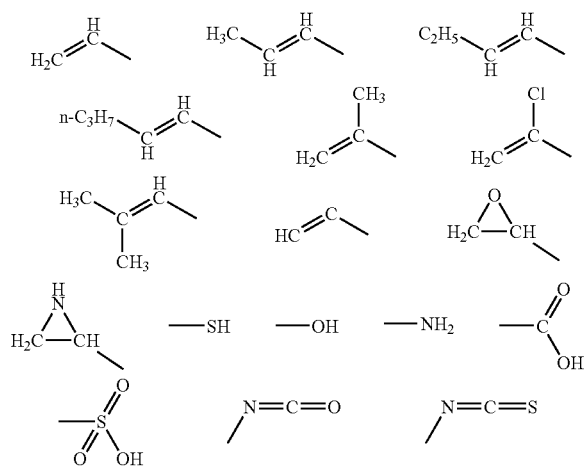

The polymerizable group is particularly preferably a functional group which can undergo addition polymerization reaction. As such a polymerizable group there is preferably used a polymerizable ethylenically unsaturated group or ring-opening polymerizable group.

Examples of the polymerizable ethylenically unsaturated group include the following formulae (M-1) to (M-6).

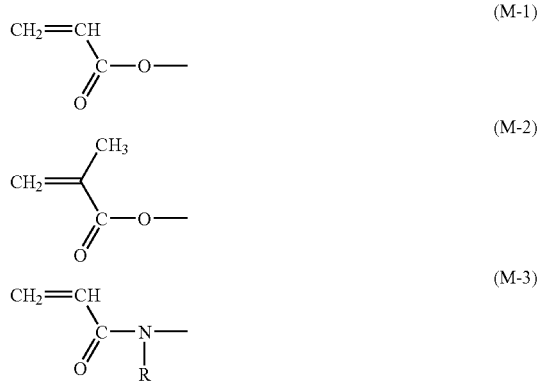

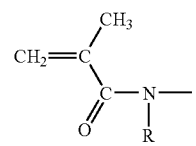

(M-4)

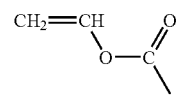

(M-5)

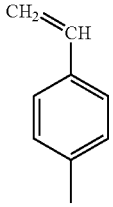

(M-6)

In the formulae (M-3) and (M-4), R represents a hydrogen atom or alkyl group, preferably hydrogen atom or methyl group.

Preferred among the formulae (M-1) to (M-6) are the formulae (M-1) and (M-2), more preferably (M-1).

The ring-opening polymerizable group is preferably a cyclic ether group, more preferably epoxy group or oxetanyl group, most preferably epoxy group.

The liquid crystal compound to be used in the invention is preferably a liquid crystal compound represented by the following formula (DII):

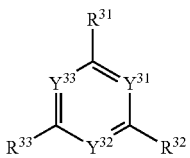

In the formula (DII), $Y^{31}$, $Y^{32}$ and $Y^{33}$ each independently represent a methylene group or nitrogen atom and have the same meaning as $Y^{11}$, $Y^{12}$ and $Y^{13}$ in the formula (DI), including preferred range.

In the formula (DII), $R^{31}$, $R^{32}$ and $R^{33}$ each independently represent the following formula (DII-R):

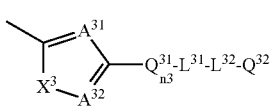

In the formula (DII-R), $A^{31}$ and $A^{32}$ each independently represent a methylene group or nitrogen atom. Preferably, one of $A^{31}$ and $A^{32}$ is a nitrogen atom. More preferably, both $A^{31}$ and $A^{32}$ are a nitrogen atom. $X^3$ represents an oxygen atom, sulfur atom, methylene or imino, preferably oxygen atom.

$Q^{31}$ represents a divalent connecting group having a 6-membered cyclic structure (hereinafter occasionally referred to as "6-membered cyclic group"). The 6-membered ring may be a condensed ring. However, monocycle is preferred to condensed ring. The ring contained in the 6-membered cyclic group may be any of aromatic ring, aliphatic ring and heterocycle. Preferred examples of the aromatic ring include benzene ring and naphthalene ring. The aliphatic ring is preferably a cyclohexane ring. Preferred examples of the heterocycle include pyridine ring and pyrimidine ring.

Among the divalent cyclic groups represented by $Q^{31}$, the 6-membered cyclic group having benzene ring is preferably 1,4-phenylene group. The cyclic group having naphthalene ring is preferably naphthalene-1,5-diil group or naphthalene-2,6-diil group. The cyclic structure having a cyclohexane ring is preferably 1,4-cyclohexylene group. The cyclic structure having a pyridine ring is preferably pyridine-2,5-diil group. The cyclic structure having a pyrimidine ring is preferably pyrimidine-2,5-diil. Particularly preferred among these cyclic structures are 1,4-phenylene group and 1,4-cyclohexylene group.

The cyclic structure $Q^{31}$ may have substituents. Examples of the substituents employable herein include halogen atoms (fluorine, chlorine, bromine, iodine), cyano groups, nitro groups, $C_1$-$C_{16}$ alkyl groups, $C_2$-$C_{16}$ alkynyl groups, $C_2$-$C_{16}$ alkynyl groups, $C_1$-$C_{16}$ halogen-substituted alkyl groups, $C_1$-$C_{16}$ alkoxy groups, $C_2$-$C_{16}$ acyl groups, $C_1$-$C_{16}$ alkylthio groups, $C_2$-$C_{16}$ acyloxy groups, $C_2$-$C_{16}$ alkoxycarbonyl groups, carbamoyl groups, $C_2$-$C_{16}$ alkyl group-substituted carbamoyl groups, and $C_2$-$C_{16}$ acylamino groups. Preferred examples of the substituents of the 6-membered cyclic groups include halogen atoms, cyano groups, $C_1$-$C_6$ alkyl groups, and $C_1$-$C_6$ halogen-substituted alkyl groups. More desirable among these substituents are halogen atoms, $C_1$-$C_4$ alkyl groups, and $C_1$-$C_4$ halogen-substituted alkyl groups. Even more desirable among these substituents are halogen atoms, $C_1$-$C_3$ alkyl groups, and trifluoromethyl group.

The suffix n3 represents an integer of from 1 to 3, preferably from 1 or 2.

$L^{31}$ represents *—O—, *—O—CO—, *—CO—O—, *—O—CO—C—, *—S—, *—N(R)—, *—CH$_2$—, *—CH=CH— or *—C≡C— in which the symbol * indicates the site at which the moiety is connected to $Q^3$ side. More specifically, $L^{31}$ has the same meaning as $L^{22}$ in the formula (DI-R), including their preferred range.

$L^{32}$ represents a divalent connecting group selected from the group consisting of —O—, —S—, —C(=O)—, —NH—, —CH$_2$—, —CH=CH—, —C≡C— and combination thereof. More specifically, $L^{32}$ has the same meaning as $L^{23}$ in the formula (DI-R), including their preferred range.

$Q^{32}$ in the formula (DII-R) represents a polymerizable group or hydrogen atom.

Specific examples of the liquid crystal compound represented by the formula (DI) will be given below, but the invention is not limited thereto.

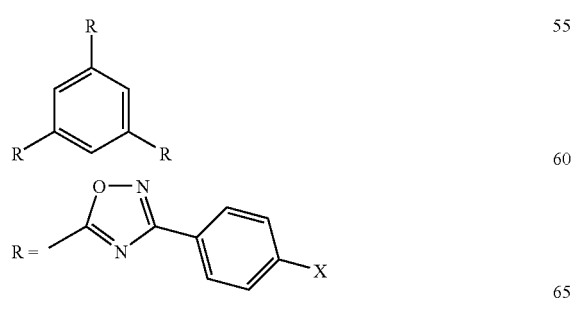

X = —OC$_4$H$_9$ D-1
—OC$_5$H$_{11}$ D-2
—OC$_6$H$_{13}$ D-3
—OC$_7$H$_{15}$ D-4
—OC$_8$H$_{17}$ D-5
—OCH$_2$CH(CH$_3$)C$_4$H$_9$ D-6
—O(CH$_2$)$_2$OCOCH=CH$_2$ D-7
—O(CH$_2$)$_3$OCOCH=CH$_2$ D-8
—O(CH$_2$)$_4$OCOCH=CH$_2$ D-9
—O(CH$_2$)$_5$OCOCH=CH$_2$ D-10
—O(CH$_2$)$_6$OCOCH=CH$_2$ D-11
—O(CH$_2$)$_7$OCOCH=CH$_2$ D-12
—O(CH$_2$)$_8$OCOCH=CH$_2$ D-13
—O(CH$_2$)$_2$C(CH$_3$)OCOCH=CH$_2$ D-14
—O(CH$_2$)$_3$C(CH$_3$)OCOCH=CH$_2$ D-15
—O(CH$_2$CH$_2$O)$_2$COCH=CH$_2$ D-16
—O(CH$_2$)$_4$OCOC(CH$_3$)=CH$_2$ D-17
—O(CH$_2$)$_4$OCOCH=CHCH$_3$ D-18
OCH=CH$_2$ D-19
—O(CH$_2$)$_4$—CH—CH$_2$ D-20
              \O/

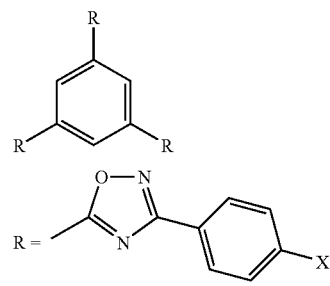

X = —OCOC$_4$H$_9$ D-21
—OCOC$_5$H$_{11}$ D-22
—OCOC$_6$H$_{13}$ D-23
—OCO(CH$_2$)$_2$OCOCH=CH$_2$ D-24
—OCO(CH$_2$)$_3$OCOCH=CH$_2$ D-25
—OCO(CH$_2$)$_4$OCOCH=CH$_2$ D-26
—OCO(CH$_2$)$_5$OCOCH=CH$_2$ D-27
—OCO(CH$_2$)$_6$OCOCH=CH$_2$ D-28
—OCO(CH$_2$)$_7$OCOCH=CH$_2$ D-29
—OCO(CH$_2$)$_2$C(CH$_3$)OCOCH=CH$_2$ D-30
—OCO(CH$_2$)$_2$OCOC(CH$_3$)=CH$_2$ D-31
—OCO(CH$_2$)$_2$OCOCH=CHCH$_3$ D-32
—OCO(CH$_2$)$_4$OCH=CH$_2$ D-33
—OCO(CH$_2$)$_4$—CH—CH$_2$ D-34
              \O/

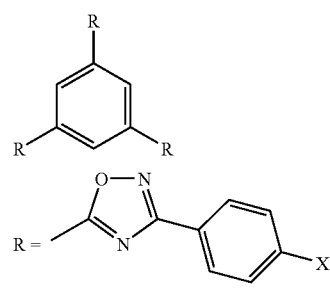

-continued

X = —OCOOC₄H₉ D-35
—OCOOC₅H₁₁ D-36
—OCOOC₆H₁₃ D-37
—OCOO(CH₂)₂OCOCH=CH₂ D-38
—OCOO(CH₂)₃OCOCH=CH₂ D-39
—OCOO(CH₂)₄OCOCH=CH₂ D-40
—OCOO(CH₂)₅OCOCH=CH₂ D-41
—OCOO(CH₂)₆OCOCH=CH₂ D-42
—OCOO(CH₂)₇OCOCH=CH₂ D-43
—OCOOC(CH₃)CH₂CH₂OCOCH=CH₂ D-44
—OCOO(CH₂CH₂O)₂COCH=CH₂ D-45
—OCOO(CH₂)₂OCOC=CH₂ D-46
            |
            CH₃
—OCOO(CH₂)₂OCOCH=CHCH₃ D-47
—OCOO(CH₂)₄OCH=CH₂ D-48
—OCOO(CH₂)₄—CH—CH₂ D-49
              \ /
               O

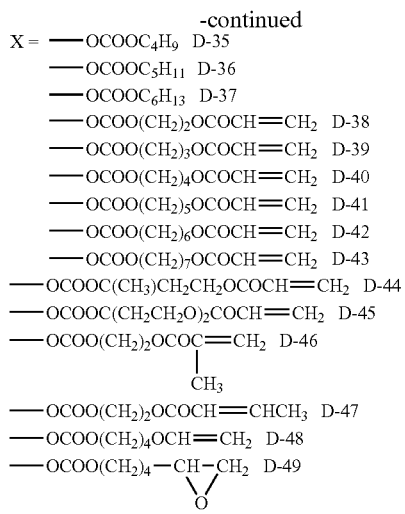

X = —OC₄H₉ D-50
—OC₅H₁₁ D-51
—OC₆H₁₃ D-52
—OC₇H₁₅ D-53
—OC₈H₁₇ D-54
—OCH₂CH(CH₃)C₄H₉ D-55
—O(CH₂)₂OCOCH=CH₂ D-56
—O(CH₂)₃OCOCH=CH₂ D-57
—O(CH₂)₄OCOCH=CH₂ D-58
—O(CH₂)₅OCOCH=CH₂ D-59
—O(CH₂)₆OCOCH=CH₂ D-60
—O(CH₂)₇OCOCH=CH₂ D-61
—O(CH₂)₈OCOCH=CH₂ D-62
—O(CH₂)₂C(CH₃)OCOCH=CH₂ D-63
—O(CH₂)₃C(CH₃)OCOCH=CH₂ D-64
—O(CH₂CH₂O)₂COCH=CH₂ D-65
—O(CH₂)₄OCOC=CH₂ D-66
         |
         CH₃
—O(CH₂)₄OCOCH=CHCH₃ D-67
—O(CH₂)₄OCH=CH₂ D-68
—O(CH₂)₄—CH—CH₂ D-69
           \ /
            O

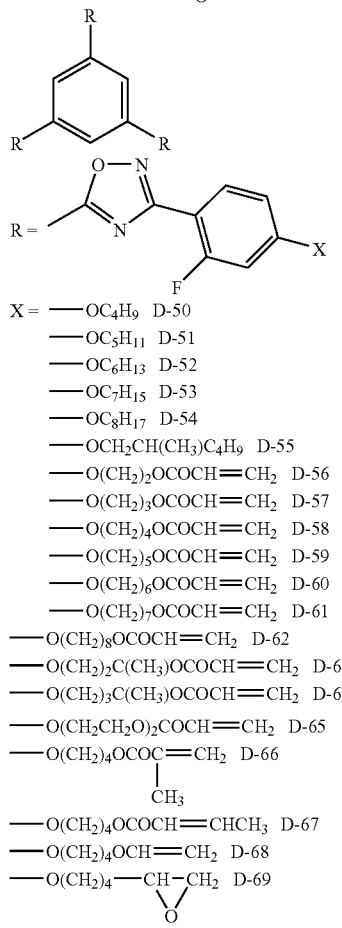

-continued

X = —OCOC₄H₉ D-70
—OCOC₅H₁₁ D-71
—OCOC₆H₁₃ D-72
—OCO(CH₂)₂OCOCH=CH₂ D-73
—OCO(CH₂)₃OCOCH=CH₂ D-74
—OCO(CH₂)₄OCOCH=CH₂ D-75
—OCO(CH₂)₅OCOCH=CH₂ D-76
—OCO(CH₂)₆OCOCH=CH₂ D-77
—OCO(CH₂)₇OCOCH=CH₂ D-78
—OCO(CH₂)₂C(CH₃)OCOCH=CH₂ D-79
—OCO(CH₂)₂OCOC=CH₂ D-80
            |
            CH₃
—OCO(CH₂)₂OCOCH=CHCH₃ D-81
—OCO(CH₂)₄OCH=CH₂ D-82
—OCO(CH₂)₄—CH—CH₂ D-83
              \ /
               O

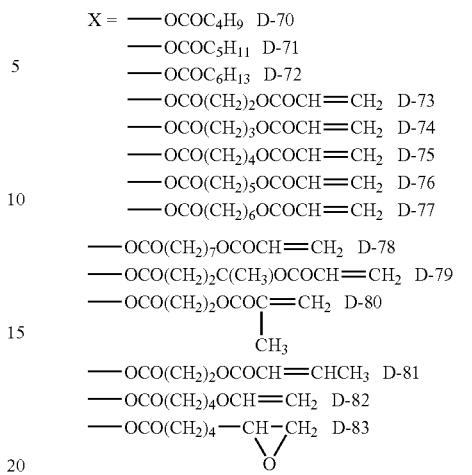

X = —OCOOC₄H₉ D-84
—OCOOC₅H₁₁ D-85
—OCOOC₆H₁₃ D-86
—OCOO(CH₂)₂OCOCH=CH₂ D-87
—OCOO(CH₂)₃OCOCH=CH₂ D-88
—OCOO(CH₂)₄OCOCH=CH₂ D-89
—OCOO(CH₂)₅OCOCH=CH₂ D-90
—OCOO(CH₂)₆OCOCH=CH₂ D-91
—OCOO(CH₂)₇OCOCH=CH₂ D-92
—OCOOC(CH₃)CH₂CH₂OCOCH=CH₂ D-93
—OCOO(CH₂CH₂O)₂COCH=CH₂ D-94
—OCOO(CH₂)₂OCOC=CH₂ D-95
            |
            CH₃
—OCOO(CH₂)₂OCOCH=CHCH₃ D-96
—OCOO(CH₂)₄OCH=CH₂ D-97
—OCOO(CH₂)₄—CH—CH₂ D-98
              \ /
               O

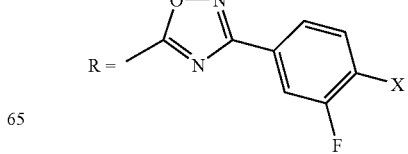

-continued

X= —OC₄H₉ D-99
—OC₅H₁₁ D-100
—OC₆H₁₃ D-101
—OC₇H₁₅ D-102
—OC₈H₁₇ D-103
—OCH₂CH(CH₃)C₄H₉ D-104
—O(CH₂)₂OCOCH=CH₂ D-105
—O(CH₂)₃OCOCH=CH₂ D-106
—O(CH₂)₄OCOCH=CH₂ D-107
—O(CH₂)₅OCOCH=CH₂ D-108
—O(CH₂)₆OCOCH=CH₂ D-109
—O(CH₂)₇OCOCH=CH₂ D-110
—O(CH₂)₈OCOCH=CH₂ D-111
—O(CH₂)₂C(CH₃)OCOCH=CH₂ D-112
—O(CH₂)₃C(CH₃)OCOCH=CH₂ D-113
—O(CH₂CH₂O)₂COCH=CH₂ D-114
—O(CH₂)₄OCOC=CH₂ D-115
                  |
                  CH₃
—O(CH₂)₄OCOCH=CHCH₃ D-116
—O(CH₂)₄OCH=CH₂ D-117
—O(CH₂)₄—CH—CH₂ D-118
              \ /
               O

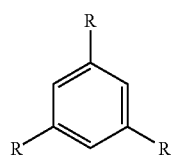

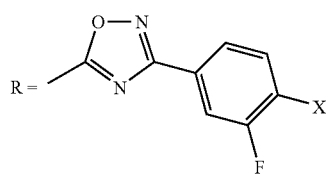

X= —OCOC₄H₉ D-119
—OCOC₅H₁₁ D-120
—OCOC₆H₁₃ D-121
—OCO(CH₂)₂OCOCH=CH₂ D-122
—OCO(CH₂)₃OCOCH=CH₂ D-123
—OCO(CH₂)₄OCOCH=CH₂ D-124
—OCO(CH₂)₅OCOCH=CH₂ D-125
—OCO(CH₂)₆OCOCH=CH₂ D-126
—OCO(CH₂)₇OCOCH=CH₂ D-127
—OCO(CH₂)₂C(CH₃)OCOCH=CH₂ D-128
—OCO(CH₂)₂OCOC=CH₂ D-129
                    |
                    CH₃
—OCO(CH₂)₂OCOCH=CHCH₃ D-130
—OCO(CH₂)₄OCH=CH₂ D-131
—OCO(CH₂)₄—CH—CH₂ D-132
                \ /
                 O

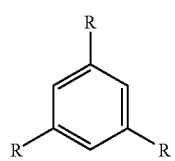

-continued

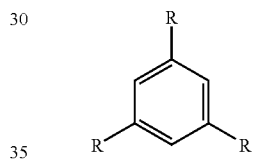

X= —OCOOC₄H₉ D-133
—OCOOC₅H₁₁ D-134
—OCOOC₆H₁₃ D-135
—OCOO(CH₂)₂OCOCH=CH₂ D-136
—OCOO(CH₂)₃OCOCH=CH₂ D-137
—OCOO(CH₂)₄OCOCH=CH₂ D-138
—OCOO(CH₂)₅OCOCH=CH₂ D-139
—OCOO(CH₂)₆OCOCH=CH₂ D-140
—OCOO(CH₂)₇OCOCH=CH₂ D-141
—OCOOC(CH₃)CH₂CH₂OCOCH=CH₂ D-142
—OCOO(CH₂CH₂O)₂COCH=CH₂ D-143
—OCOO(CH₂)₂OCOC=CH₂ D-144
                    |
                    CH₃
—OCOO(CH₂)₂OCOCH=CHCH₃ D-145
—OCOO(CH₂)₄OCH=CH₂ D-146
—OCOO(CH₂)₄—CH—CH₂ D-147
                 \ /
                  O

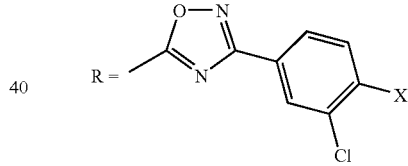

X= —OC₆H₁₃ D-148
—OCOC₅H₁₁ D-149
—OCOOC₄H₉ D-150
—O(CH₂)₄OCOCH=CH₂ D-151
—O(CH₂)₆OCOCH=CH₂ D-152
—OCO(CH₂)₃OCOCH=CH₂ D-153
—OCO(CH₂)₄OCOCH=CH₂ D-154
—OCOO(CH₂)₂OCOCH=CH₂ D-155
—OCOO(CH₂)₄OCOCH=CH₂ D-156

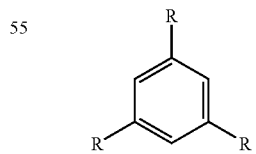

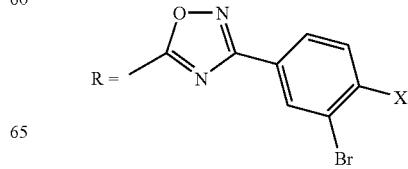

-continued

X = —OC$_6$H$_{13}$ D-157
—OCOC$_5$H$_{11}$ D-158
—OCOOC$_4$H$_9$ D-159
—O(CH$_2$)$_4$OCOCH═CH$_2$ D-160
—O(CH$_2$)$_6$OCOCH═CH$_2$ D-161
—OCO(CH$_2$)$_3$OCOCH═CH$_2$ D-162
—OCO(CH$_2$)$_4$OCOCH═CH$_2$ D-163
—OCOO(CH$_2$)$_2$OCOCH═CH$_2$ D-164
—OCOO(CH$_2$)$_4$OCOCH═CH$_2$ D-165

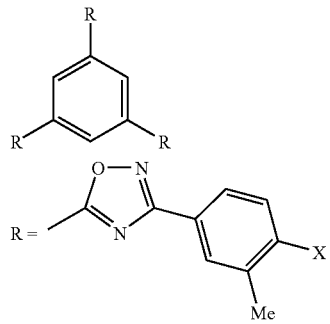

X = —OC$_6$H$_{13}$ D-166
—OCOC$_5$H$_{11}$ D-167
—OCOOC$_4$H$_9$ D-168
—O(CH$_2$)$_4$OCOCH═CH$_2$ D-169
—O(CH$_2$)$_6$OCOCH═CH$_2$ D-170
—OCO(CH$_2$)$_3$OCOCH═CH$_2$ D-171
—OCO(CH$_2$)$_4$OCOCH═CH$_2$ D-172
—OCOO(CH$_2$)$_2$OCOCH═CH$_2$ D-173
—OCOO(CH$_2$)$_4$OCOCH═CH$_2$ D-174

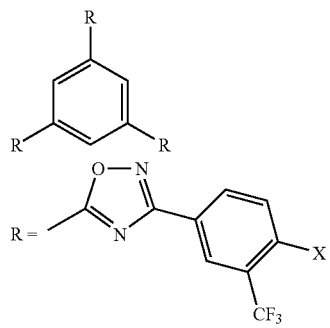

X = —OC$_6$H$_{13}$ D-175
—OCOC$_5$H$_{11}$ D-176
—OCOOC$_4$H$_9$ D-178
—O(CH$_2$)$_4$OCOCH═CH$_2$ D-179
—O(CH$_2$)$_6$OCOCH═CH$_2$ D-180
—OCO(CH$_2$)$_3$OCOCH═CH$_2$ D-181
—OCO(CH$_2$)$_4$OCOCH═CH$_2$ D-182
—OCOO(CH$_2$)$_2$OCOCH═CH$_2$ D-183
—OCOO(CH$_2$)$_4$OCOCH═CH$_2$ D-184

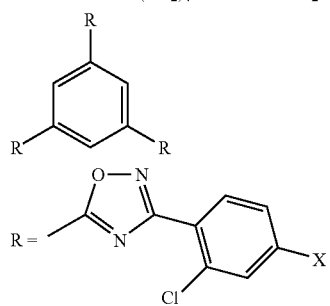

-continued

X = —OC$_6$H$_{13}$ D-185
—OCOC$_5$H$_{11}$ D-186
—OCOOC$_4$H$_9$ D-187
—O(CH$_2$)$_4$OCOCH═CH$_2$ D-188
—O(CH$_2$)$_6$OCOCH═CH$_2$ D-189
—OCO(CH$_2$)$_3$OCOCH═CH$_2$ D-190
—OCO(CH$_2$)$_4$OCOCH═CH$_2$ D-191
—OCOO(CH$_2$)$_2$OCOCH═CH$_2$ D-192
—OCOO(CH$_2$)$_4$OCOCH═CH$_2$ D-193

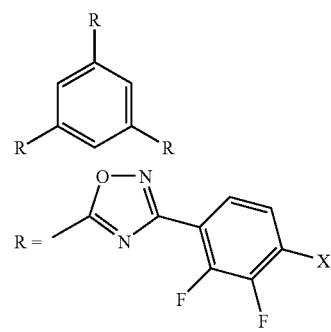

X = —OC$_6$H$_{13}$ D-194
—OCOC$_5$H$_{11}$ D-195
—OCOOC$_4$H$_9$ D-196
—O(CH$_2$)$_4$OCOCH═CH$_2$ D-197
—O(CH$_2$)$_6$OCOCH═CH$_2$ D-198
—OCO(CH$_2$)$_3$OCOCH═CH$_2$ D-199
—OCO(CH$_2$)$_4$OCOCH═CH$_2$ D-200
—OCOO(CH$_2$)$_2$OCOCH═CH$_2$ D-201
—OCOO(CH$_2$)$_4$OCOCH═CH$_2$ D-202

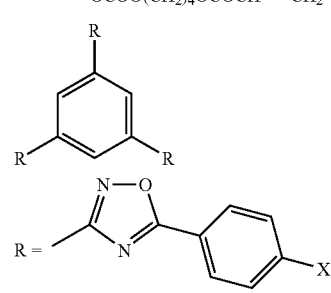

X = —OC$_6$H$_{13}$ D-203
—OCOC$_5$H$_{11}$ D-204
—OCOOC$_4$H$_9$ D-205
—O(CH$_2$)$_4$OCOCH═CH$_2$ D-206
—O(CH$_2$)$_6$OCOCH═CH$_2$ D-207
—OCO(CH$_2$)$_3$OCOCH═CH$_2$ D-208
—OCO(CH$_2$)$_4$OCOCH═CH$_2$ D-209
—OCOO(CH$_2$)$_2$OCOCH═CH$_2$ D-210
—OCOO(CH$_2$)$_4$OCOCH═CH$_2$ D-211

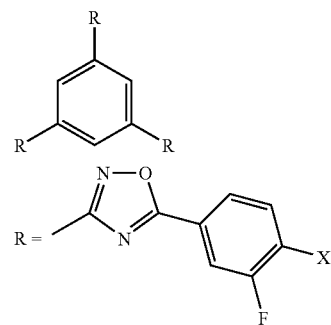

-continued

X = —OC₆H₁₃ D-212
—OCOC₅H₁₁ D-213
—OCOOC₄H₉ D-214
—O(CH₂)₄OCOCH=CH₂ D-215
—O(CH₂)₆OCOCH=CH₂ D-216
—OCO(CH₂)₃OCOCH=CH₂ D-217
—OCO(CH₂)₄OCOCH=CH₂ D-218
—OCOO(CH₂)₂OCOCH=CH₂ D-219
—OCOO(CH₂)₄OCOCH=CH₂ D-220

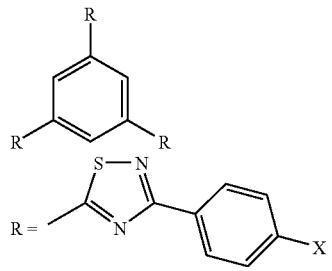

X = —OC₆H₁₃ D-221
—OCOC₅H₁₁ D-222
—OCOOC₄H₉ D-223
—O(CH₂)₆OCOCH=CH₂ D-224
—OCO(CH₂)₃OCOCH=CH₂ D-225
—OCOO(CH₂)₄OCOCH=CH₂ D-226

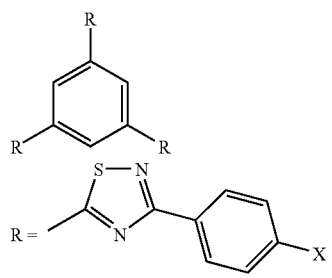

X = —OC₆H₁₃ D-227
—OCOC₅H₁₁ D-228
—OCOOC₄H₉ D-229
—O(CH₂)₆OCOCH=CH₂ D-230
—OCO(CH₂)₃OCOCH=CH₂ D-231
—OCOO(CH₂)₄OCOCH=CH₂ D-232

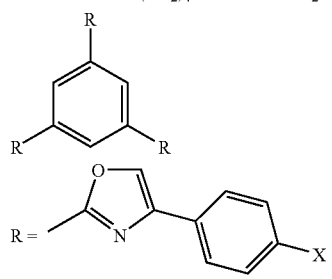

X = —OC₆H₁₃ D-233
—OCOC₅H₁₁ D-234
—OCOOC₄H₉ D-235
—O(CH₂)₆OCOCH=CH₂ D-236
—OCO(CH₂)₃OCOCH=CH₂ D-237
—OCOO(CH₂)₄OCOCH=CH₂ D-238

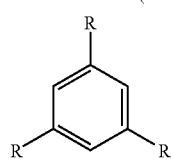

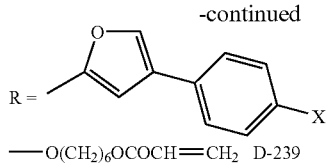

—O(CH₂)₆OCOCH=CH₂ D-239

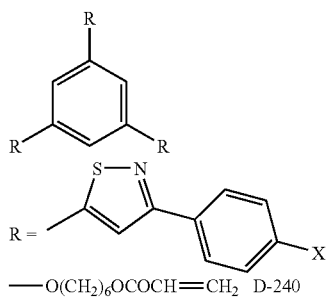

—O(CH₂)₆OCOCH=CH₂ D-240

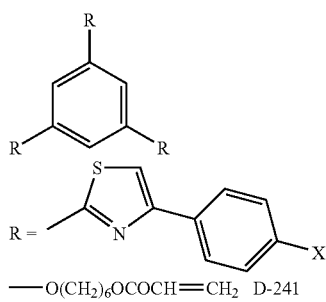

—O(CH₂)₆OCOCH=CH₂ D-241

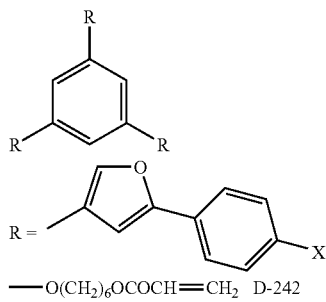

—O(CH₂)₆OCOCH=CH₂ D-242

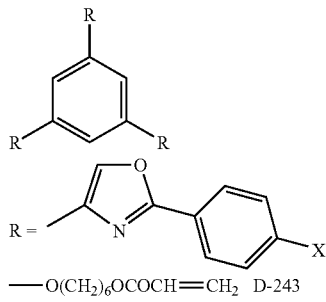

—O(CH₂)₆OCOCH=CH₂ D-243

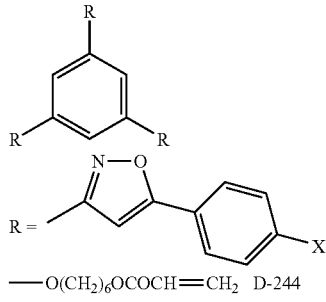

—O(CH₂)₆OCOCH=CH₂ D-244

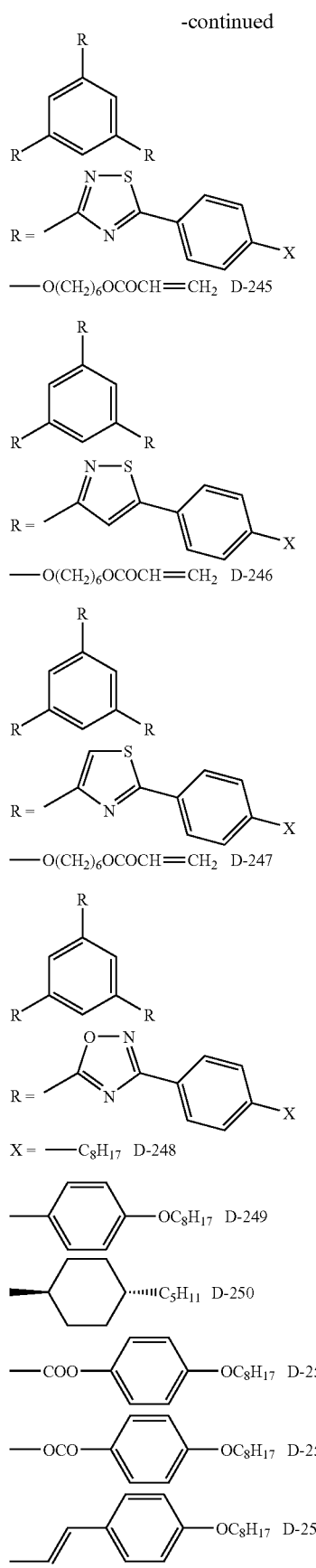
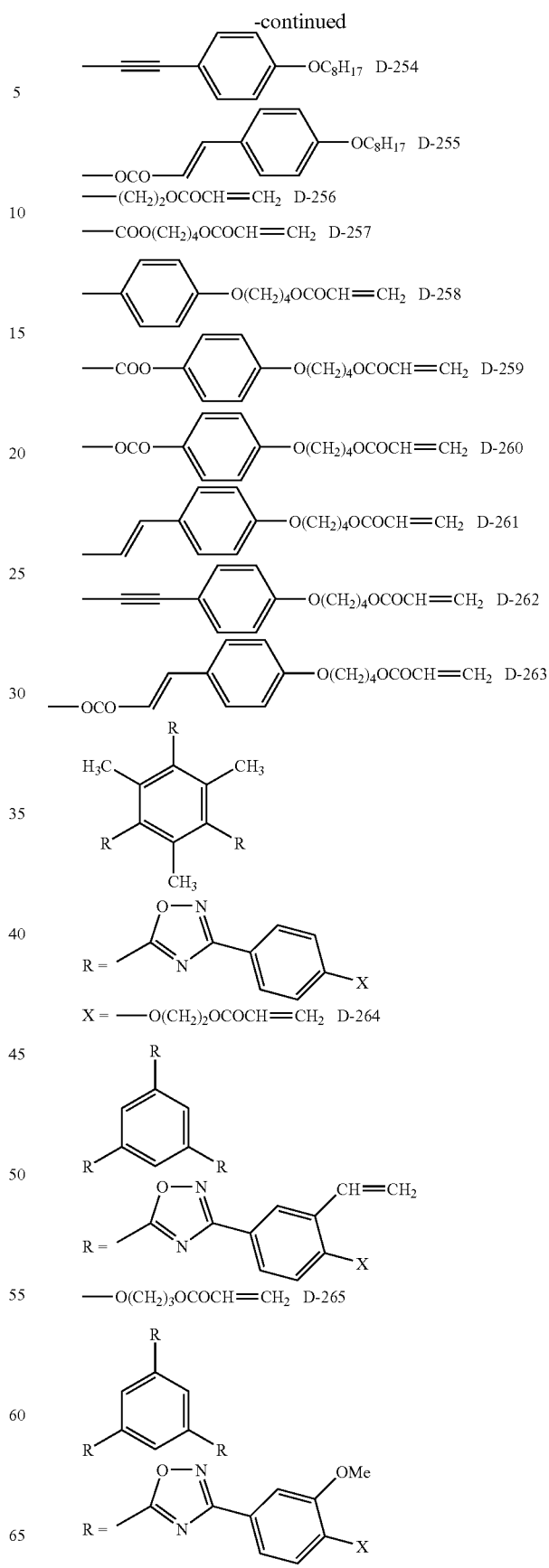

-continued
—O(CH$_2$)$_4$OCOCH=CH$_2$ D-266
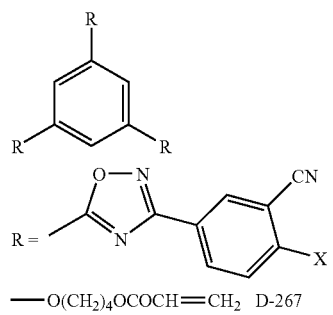
—O(CH$_2$)$_4$OCOCH=CH$_2$ D-267
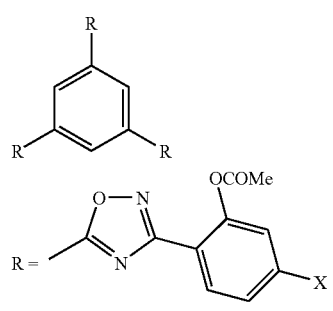
—O(CH$_2$)$_3$OCOCH=CH$_2$ D-268
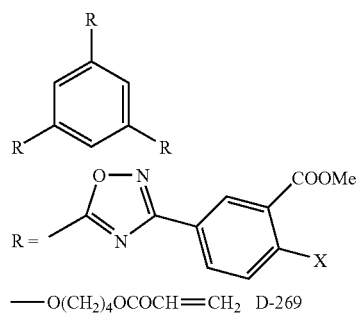
—O(CH$_2$)$_4$OCOCH=CH$_2$ D-269
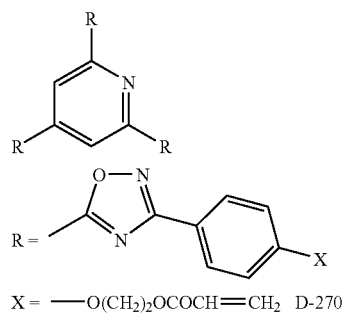
X= —O(CH$_2$)$_2$OCOCH=CH$_2$ D-270
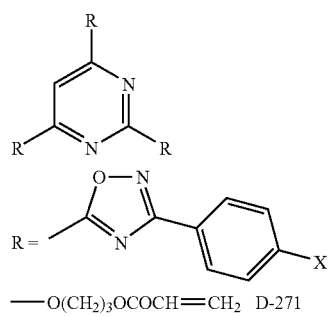
—O(CH$_2$)$_3$OCOCH=CH$_2$ D-271
-continued
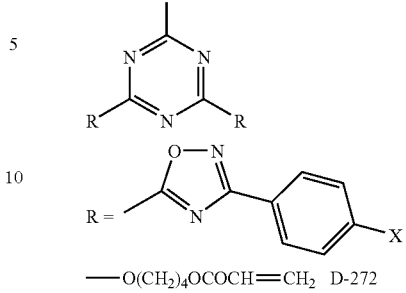
—O(CH$_2$)$_4$OCOCH=CH$_2$ D-272
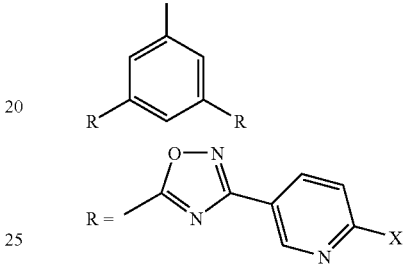
—O(CH$_2$)$_2$OCOCH=CH$_2$ D-273
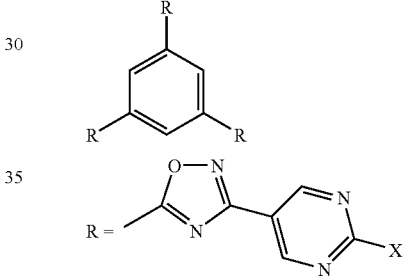
—O(CH$_2$)$_3$OCOCH=CH$_2$ D-274
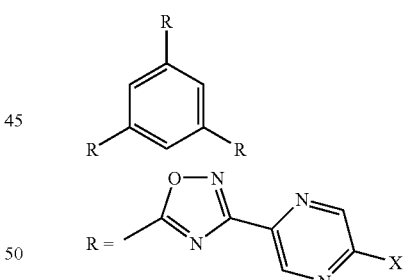
—O(CH$_2$)$_3$OCOCH=CH$_2$ D-275
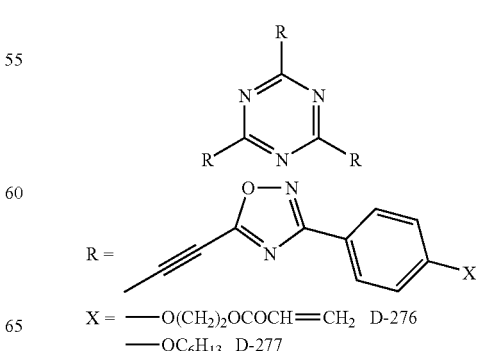
X= —O(CH$_2$)$_2$OCOCH=CH$_2$ D-276
—OC$_6$H$_{13}$ D-277

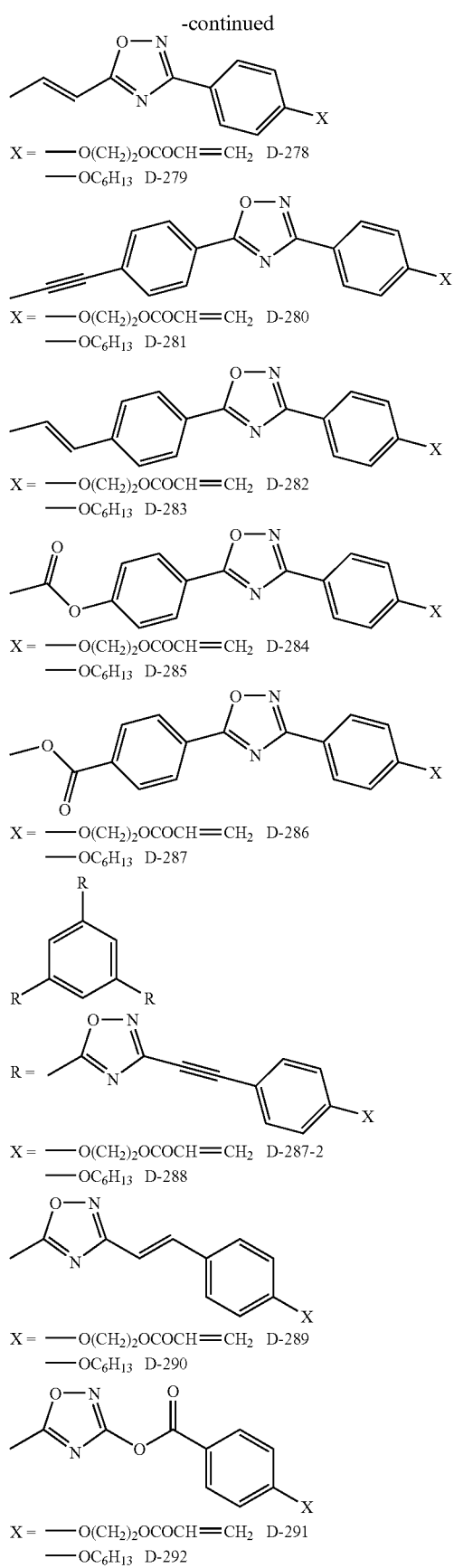
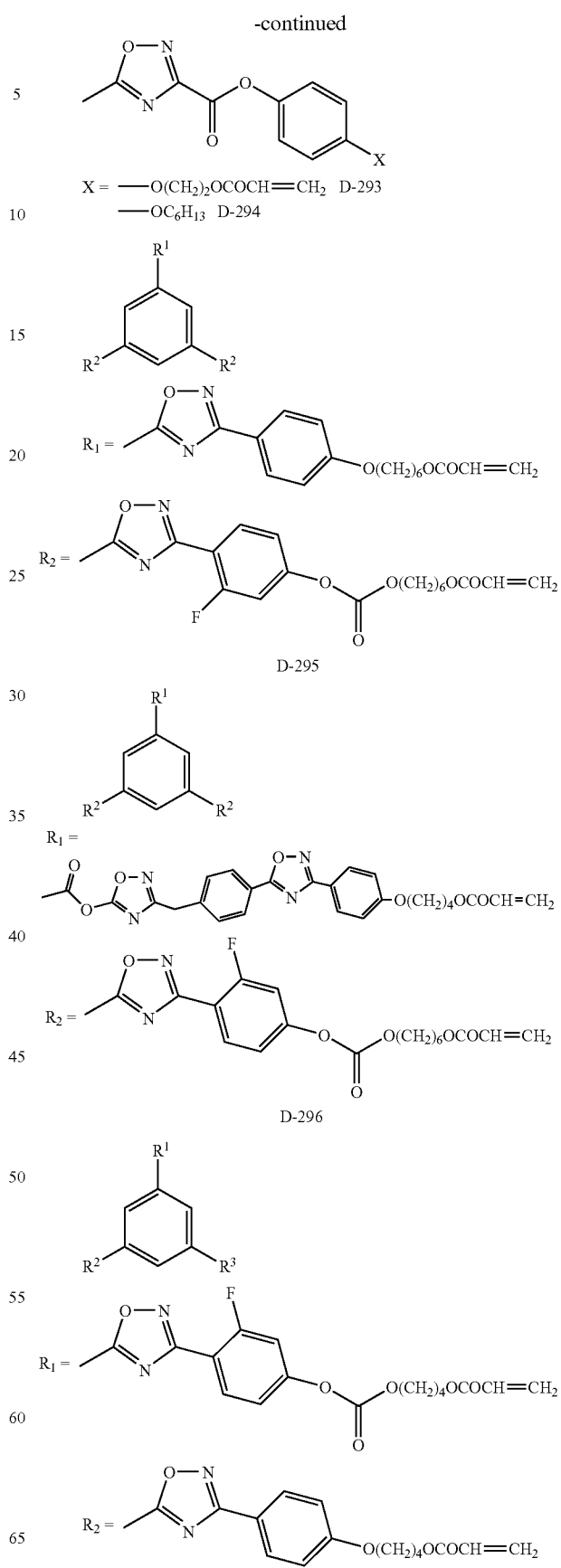

-continued

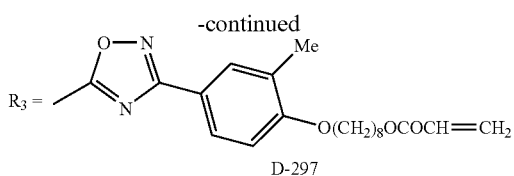

D-297

The liquid crystal compound to be used in the invention preferably develops a liquid crystal phase that shows good mono-domain properties. By providing good mono-domain properties, a polydomain structure can be obtained to effectively prevent the occurrence of alignment defects on the border of domains that cause light scattering. Further, when good mono-domain properties are provided, the retarder plate has a higher light transmission to advantage.

Examples of the liquid crystal phase developed in the liquid crystal compound to be used include columnar phase and discotic nematic phase (ND phase). Most desirable among these liquid crystal phases is discotic nematic phase (ND phase), which exhibits good mono-domain properties and can be hybrid-aligned.

The liquid crystal compound to be used in the invention preferably has as small a wavelength dispersion of anisotropy as possible. In some detail, supposing that the phase difference at which a liquid crystal compound is developed is Re (λ), Re (450)/Re (650) is preferably 1.25 or less, more preferably 1.20 or less, even more preferably 1.15 or less. This value is preferably optimized properly depending on the wavelength dispersion of phase difference of liquid crystal in the liquid crystal cell.

In hybrid alignment, the angle of the physically symmetrical axis of the liquid crystal compound of the invention with respect to the surface of the support, i.e., tilt angle increases or decreases with the rise of the distance from the surface of the polarizing film in the thickness direction of the optical anisotropic layer (i.e., perpendicular to the (transparent) support). The tilt angle preferably increases with the rise of the distance. The change of tilt angle may include continuous increase, continuous decrease, intermittent increase, intermittent decrease, change involving continuous increase and continuous decrease, and intermittent change involving increase and decrease. The intermittent change contains a region in the course in the thickness direction where the tilt angle shows no change. Even when a region having no change of tilt angle is included, it suffices if the tilt angle changes as a whole. However, the tilt angle preferably shows a continuous change.

In general, the average of physically symmetrical axis of discotic liquid crystal compound can be adjusted by properly selecting the material of discotic liquid crystal compound or alignment film or by properly selecting the rubbing method. Further, the physically symmetrical axis of the discotic liquid crystal compound on the surface side (air side) can be adjusted by properly selecting the kind of the discotic liquid crystal compound or the additives to be used therewith.

Examples of the additives to be used with the discotic liquid crystal compound include plasticizers, surface active agents, polymerizable monomers, polymers, and low molecular compounds. The degree of change of alignment direction of major axis can be adjusted by selecting the liquid crystal compound and the additives as mentioned above.

As the plasticizer and polymerizable monomer to be used with the liquid crystal compound of the invention there are used materials which are compatible with the liquid crystal compound of the invention and can provide the discotic liquid crystal compound with a change of tilt angle or doesn't impair the alignment of the discotic liquid crystal compound.

The liquid crystal compound to be used in the invention preferably develops a liquid crystal phase at a temperature of from 20° C. to 300° C., more preferably from 40° C. to 280° C., most preferably from 60° C. to 250° C. The term "to develop a liquid crystal phase at a temperature of from 20° C. to 300° C." as used herein is meant to indicate that the liquid crystal temperature extends across 20° C. (specifically, 10° C. to 22° C.) or across 300° C. (specifically, 298° C. to 310° C.). This applies also to the temperature range of from 40° C. to 280° C. and from 60° C. to 250° C.

The surface active agent is preferably a fluorine-based compound. For the details of surface active agents, reference can be made to JP-A-2001-330725. The polymer and low molecular compound preferably provide the tilt angle of the discotic compound with a change. The polymer is preferably a cellulose ester. For the details of cellulose esters, reference can be made to JP-A-2000-155216, paragraph [0178]. In order that the alignment of the discotic compound might not be impaired, the added amount of the polymer is preferably from 0.1 to 10% by mass, more preferably from 0.1 to 8% by mass based on the discotic compound.

The first optical anisotropic layer can be formed by spreading a coating solution containing a discotic compound and optionally a polymerization initiator described later and arbitrary components over the alignment film.

As the solvent to be used in the preparation of the coating solution there is preferably used an organic solvent. Examples of the organic solvent employable herein include amides (e.g., N,N-dimethylformamide), sulfoxides (e.g., dimethyl sulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone), and ethers (e.g., tetrahydrofuran, 1,2-dimethoxyethane). Preferred among these solvents are alkyl halides and ketones. Two or more organic solvents may be used in combination.

The spreading of the coating solution is accomplished by any known method (e.g., wire bar coating method, extrusion coating method, direct gravure coating method, reverse gravure coating method, die coating method).

The thickness of the first optical anisotropic layer is preferably from 0.1 μm to 20 μm, more preferably from 0.3 μm to 10 μm, most preferably from 0.5 μm to 5 μm.

The discotic compound thus aligned can then be fixed aligned. The fixing of alignment is preferably accomplished by polymerization reaction. As the polymerization reaction there may be used heat polymerization reaction involving the use of a heat polymerization initiator or photopolymerization reaction involving the use of a photopolymerization initiator. The photopolymerization reaction is preferred. Examples of the photopolymerization initiator employable herein include α-carbonyl compounds (as disclosed in U.S. Pat. Nos. 2,367,661 and 2,367,670), acyloin ethers (as disclosed in U.S. Pat. No. 2,448,828), α-hydrocarbon-substituted aromatic acyloin compounds (as disclosed in U.S. Pat. No. 2,722,512), polynucleus quinone compounds (as disclosed in U.S. Pat. Nos. 3,046,127 and 2,951,758), combination of triaryl imidazole dimer and p-aminophenyl ketone (as disclosed in U.S. Pat. No. 3,549,367), acrydine and phenazine compounds (as disclosed in JP-A-60-105667 and U.S. Pat. No. 4,239,850), and oxadiazole compounds (as disclosed in U.S. Pat. No. 4,212,970).

The amount of the photopolymerization initiator to be used is preferably from 0.01 to 20% by mass, more preferably from 0.5 to 5% by mass based on the solid content in the coating solution. As the light with which the liquid crystal molecules are irradiated to undergo polymerization there is preferably used ultraviolet ray. The radiation energy is preferably from 20 mJ/cm$^2$ to 50 J/cm$^2$, more preferably from 20 mJ/cm$^2$ to 5,000 mJ/cm$^2$, most preferably from 100 mJ/cm$^2$ to 800 mJ/cm$^2$. In order to accelerate photopolymerization reaction, the irradiation with light may be effected under heating. A protective layer may be provided on the first optical anisotropic layer.

(Second Optical Anisotropic Layer)

First Aspect

The wavelength dispersion of in-plane retardation of the second optical anisotropic layer (Re$_2$ (450)/Re$_2$ (650)) is 0.8 or less, preferably 0.75 or less, more preferably 0.70 or less. The wavelength dispersion of thickness-direction retardation of the second optical anisotropic layer (Rth$_2$ (450)/Rth$_2$ (650)) is 1 or more, preferably 1.05 or more, more preferably 1.1 or more. The in-plane retardation value of the second optical anisotropic layer (Re$_2$ (550)) is preferably from not smaller than 30 to not greater than 60, more preferably from not smaller than 30 to not greater than 55. The thickness-direction retardation value of the second optical anisotropic layer (Rth$_2$ (550)) is preferably from not smaller than 100 to not greater than 300, more preferably from not smaller than 120 to not greater than 250. The in-plane retardation and thickness-direction retardation of the second optical anisotropic layer are most preferably optimized by Δn of liquid crystal of liquid crystal cell or cell gap d. It is preferred that as at least any of Δn of liquid crystal of liquid crystal cell and cell gap d increases, the in-plane retardation and thickness-direction retardation of the second optical anisotropic layer decreases and increases, respectively.

The second optical anisotropic layer is not specifically limited in its material but is preferably formed by a polymer film. Specific examples of the polymer include those which can be formed into film by solution casting method or extrusion forming method, such as norbornene-based polymer, polycarbonate-based polymer, polyarylate-based polymer, polyester-based polymer and polysulfone. Preferred among these polymer films is cellulose acylate film.

Second Aspect

The second optical anisotropic layer is formed by at least one sheet of a polymer film. A plurality of sheets of polymer film may be used to form a second optical anisotropic layer, making it possible to attain the optical anisotropy defined herein. However, the optical anisotropy defined herein can be realized by one sheet of a polymer film. Accordingly, the second optical anisotropic layer is particularly preferably formed by one sheet of a polymer film.

In some detail, the second optical anisotropic layer preferably exhibits an Rth retardation value of from 100 nm to 300 nm, more preferably from 150 nm to 200 nm as measured at a wavelength of 550 mm. Further, the second optical anisotropic layer preferably exhibits an Re retardation value of from 30 nm to 60 nm, more preferably from 35 nm to 50 nm.

The second optical anisotropic layer is preferably formed by a cellulose-based polymer, more preferably cellulose ester, even more preferably lower aliphatic acid ester of cellulose. The term "lower aliphatic acid" as used herein is meant to indicate an aliphatic acid having 6 or less carbon atoms. A C$_2$-C$_4$ cellulose acylate is preferably used. A cellulose acetate is particularly preferred. A mixed aliphatic acid ester such as cellulose acetate propionate and cellulose acetate butyrate may be used.

(Cellulose Acylate Film)

The cellulose acylate film will be further described hereinafter.

The cellulose acylate film is known to have different wavelength dependences of Re or Rth by its substitution degree (proportional to acylate proportion). When the substitution degree is raised, Re (Rth) decreases on the short wavelength side or increases on the longer wavelength side.

In the invention, the substitution degree of cellulose acylate is allowed to fluctuate by 0.05 or more within a range of 2.00 to 3.00 in a thickness-direction. The range of fluctuation is preferably 0.07 or more, more preferably 0.08 or more, even more preferably 0.09 or more, most preferably 0.10 or more.

The cellulose acylate film is normally prepared preferably by solution casting method. Stretching is preferably effected while the residual solvent content is from 2 to 100% by mass. For details, reference will be made later. The inventors analyzed the film thus stretched and found that the stretching degree of cellulose acylate molecules differs in the thickness direction. In some detail, the stretching degree increases from the interior of the film toward the exterior of the film. This is presumably because the residual solvent remains inside the film, causing the interior of the film to be relaxed in alignment even if stretched and hence resulting in the rise of the stretching degree of the outer side of the film.

In other words, when the cellulose acylate film having a layer having a high substitution degree (percent acylation) provided on the outer side thereof and a layer having a low substitution degree (percent acylation) provided on the inner side thereof is stretched with a residual solvent left therein, Re value developed by stretching is greatly affected by the layer having a high substitution degree (percent acylation) which is an outer layer and Rth value is affected by the planar orientation of the entire film developed by the reduction of the thickness of the entire film with the progress of drying. Accordingly, a film different wavelength dependences of Re and Rth values can be prepared. The substitution degree of the outer side of the cellulose acylate film is preferably from 2.71 to 3.00 (percent acetation of the film, if it is cellulose acetate, is from 59.0 to 62.5%) and the substitution degree of the inner side of the cellulose acylate film is preferably from 2.56 to 2.87 (percent acetation of the film, if it is cellulose acetate, is from 57.0 to 61.0%). More preferably, the substitution degree of the outer side of the cellulose acylate film is from 2.75 to 2.92 (59.5 to 61.5%) and the substitution degree of the inner side of the cellulose acylate film is from 2.64 to 2.83 (58.0 to 60.5%). Referring to the thickness ratio of the outer side to the inner side, if the entire thickness is 1, the proportion of the outer side is preferably from 0.01 to 0.5, more preferably from 0.05 to 0.4. The absolute value and wavelength dependence of Re and Rth can be properly controlled by the additives described later.

The ratio Re/Rth (450 nm) of Re to Rth of the cellulose acylate film of the invention at a wavelength of 450 nm in the visible light range is from 0.4 to 0.95 times, preferably from 0.4 to 0.9 times, more preferably from 0.6 to 0.8 times that at a wavelength of 550 nm. Re/Rth (650 nm) at a wavelength of 650 nm is from 1.05 to 1.93 times, preferably from 1.1 to 1.9 times, more preferably from 1.2 to 1.7 times Re/Rth (550 nm). Re/Rth in R, G and B are all preferably from 0.1 to 0.8.

The thickness-direction retardation (Rth) of the entire cellulose acylate film acts to cancel the thickness-direction retardation of the liquid crystal layer during black display and thus has different preferred ranges depending on the embodiment of the liquid crystal layer. For example, if the cellulose acylate film of the invention is used to optically compensate for OCB mode liquid crystal cell (e.g., OCB mode liquid crystal cell having a liquid crystal layer the product Δn-d of thickness d (μm) and refractive index anisotropy Δn of which is from 0.2 to 1.5 μm), Rth is preferably from 70 nm to 400 nm, more preferably from 100 nm to 400 nm, even more preferably from 160 nm to 300 nm. Further, retardation Re is normally from 20 nm to 110 nm, preferably from 20 nm to 70 nm, more preferably from 35 nm to 70 nm. The invention will be further described hereinafter.

(Cellulose Acylate)

As the raw cotton from which the cellulose acylate is produced there may be used any raw material known as such (see, e.g., Japan Institute of Invention and Innovation's Kokai Giho 2001-1745). The synthesis of cellulose acylate can be accomplished by any known method (see, e.g., Migita et al, "Mokuzai Kagaku (Chemistry of Wood)", Kyoritsu Shuppan, pp. 180-190, 1968.). The viscosity-average polymerization degree of the cellulose acylate is preferably from 200 to 700, more preferably from 250 to 500, even more preferably from 250 to 350. The cellulose ester to be used in the invention preferably has a sharp distribution of molecular weight Mw/Mn (Mw represents weight-average molecular weight and Mn represents number-average molecular weight) as determined by gel permeation chromatography. In some detail, Mw/Mn is preferably from 1.5 to 5.0, more preferably from 2.0 to 4.5, even more preferably from 3.0 to 4.0.

The acyl group in the cellulose acylate film is not specifically limited but is preferably an acetyl group or propionyl group, more preferably acetyl group. The total substitution degree of acyl groups is preferably from 2.7 to 3.0, more preferably from 2.8 to 2.95. The term "substitution degree of acyl groups" as used herein is meant to indicate a value calculated according to ASTM D817. The acyl group is most preferably an acetyl group. In the case where a cellulose acetate having an acetyl group as acyl group is used, the percent acetylation of the cellulose acetate is preferably from 57.0% to 62.5%, more preferably from 58.0% to 61.5%. When the percent acetylation of the cellulose acetate falls within the above defined range, the resulting cellulose acylate film can be prevented from having an Re value exceeding the desired range due to conveyance tension during casting and has little in-plane dispersion of Re and little retardation change with temperature and humidity. The substitution degree of acyl group in the 6-position is preferably 0.9 or more from the standpoint of suppression of dispersion of Re and Rth.

(Cocasting)

The cellulose acylate film having different percent acylations in the thickness direction is preferably prepared by a cocasting method.

The cocasting method which is preferably used in the invention will be further described hereinafter.

In the cocasting method, the cellulose acylate solution obtained is preferably casted over a smooth band or drum as a metallic support in a plurality of layers.

In the case where a solution film-forming method is used to produce a multi-layer casted film or multi-layer film, a feed block casting dye is often used. This feed block casting die is a casting device having a unit for combining two or more dopes attached upstream of a casting die. A representative structure of the feed block casting die has a channel provided at the center thereof for allowing the flow of a dope as a core layer. In this arrangement, dopes for forming a surface layer and a back surface layer are allowed to flow on the respective side of the channel. Arrangement is also made such that the two latter solution flows join the former solution flow on the respective side thereof. As an example of preparation of a multi-layer film using the aforementioned feed block casting die there is proposed a method which comprises forming a multi-layer casted film with a relatively high viscosity dope for core resin layer and a relatively low viscosity dope for surface layers, followed by drying and peeling, in JP-B-62-43846.

In order to cast a plurality of cellulose acylate solutions, a solution containing a cellulose acylate may be discharged and casted from a plurality of casting nozzles provided at an interval along the movement of the metallic support so that they are stacked to prepare a film. For example, methods as disclosed in JP-A-61-158414, JP-A-1-122419 and JP-A-11-198285 can be applied. Alternatively, a cellulose acylate solution may be casted from two casting nozzles to form a film. For example, methods as disclosed in JP-B-60-27562, JP-A-61-94724, JP-A-61-947245, JP-A-61-104813, JP-A-61-158413 and JP-A-6-134933 can be applied. Further, a cellulose acylate film casting method which comprises wrapping a high viscosity cellulose acylate solution flow with a low viscosity cellulose acylate, and then extruding the high and low viscosity cellulose acylate solutions at the same time as disclosed in JP-A-56-162617 may be used. In a further preferred embodiment, the outer side solution comprises an alcohol component as a poor solvent in a larger amount that the inner side solution as disclosed in JP-A-61-94724 and JP-A-61-94725.

Alternatively, two casting nozzles may be used such that a film formed on a metallic support from a first casting nozzle is peeled off the metallic support and a cellulose acylate solution is then casted over the film on the side thereof in contact with the surface of the metallic support to form a film as disclosed in JP-B-44-20235. The cellulose acylate solutions to be casted may be the same or different and are not specifically limited. In order to functionalize the plurality of cellulose acylate layers, cellulose acylate solutions corresponding to respective functions may be extruded from respective casting nozzles.

The cellulose acylate solution of the invention may be casted at the same time with other functional layers (e.g., adhesive layer, dye layer, antistatic layer, antihalation layer, UV absorption layer, polarizing layer).

In order to form a film having a desired thickness from the related art single layer solution, it is necessary that a cellulose acylate solution having a high concentration and a high viscosity be extruded. In this case, a problem often arises that the cellulose acylate solution exhibits a poor stability and thus forms a solid material that causes the generation of granular structure or poor planarity. In order to solve these problems, a plurality of cellulose acylate solutions can be casted through casting ports, making it possible to extrude high viscosity solutions onto the metallic support at the same time. In this manner, a film having an improved planarity and hence excellent surface conditions can be prepared. Further, the use of a highly concentrated cellulose acylate solution makes it possible to attain the reduction of the drying load that can enhance the production speed of film.

In the case of co-casting, cellulose acylate solutions having different concentrations of the additives such as plasticizer, ultraviolet absorber and matting agent described later in addition to percent acylation can be co-casted to a cellulose acylate film having a stacked structure. For example, a cellulose acylate film having a skin layer/core layer/skin layer structure can be prepared. For example, the matting agent can be incorporated much or only in the skin layer. The plasticizer and ultraviolet absorber may be incorporated more in the core layer than in the skin layer or only in the core layer. The kind of the plasticizer and the ultraviolet absorber may differ from the core layer to the skin layer. For example, at least either of low volatility plasticizer and ultraviolet absorber may be incorporated in the skin layer while a plasticizer having an excellent plasticity or an ultraviolet absorber having excellent ultraviolet absorbing properties may be incorporated in the core layer. In another preferred embodiment, a peel accelerator may be incorporated in only the skin layer on the metallic support side. It is also preferred that the skin layer contain an alcohol as a poor solvent more than the core layer in order that the solution might be gelled by cooling the metallic support by a cooled drum method. The skin layer and the core layer may have different Tg values. It is preferred that Tg of the core layer be lower than that of the skin layer. Further, the viscosity of the solution containing cellulose acylate may differ from the skin layer to the core layer during casting. It is preferred that the viscosity of the skin layer be lower than that of the core layer. However, the viscosity of the core layer may be lower than that of the skin layer.

Referring further to the casting method according to the invention, examples of the solution casting method include a method which comprises uniformly extruding a dope prepared onto a metallic support through a pressure die, a doctor blade method which comprises adjusting the thickness of a dope casted over a metallic support using a blade, and a reverse roll coater method which comprises adjusting the thickness of the dope casted using a roll that rotates in the reverse direction. Preferred among these casting methods is the pressure die method. Examples of the pressure die include coat hunger type pressure die, and T-die type pressure die. Any of these pressure dies may be preferably used. Besides the aforementioned methods, various conventional methods for casting/filming a cellulose triacetate solution may be effected (as disclosed in JP-A-61-94724, JP-A-61-148013, JP-A-4-85011, JP-A-4-286611, JP-A-5-185443, JP-A-5-185445, JP-A-6-278149, and JP-A-8-207210). By predetermining the various conditions taking into account the difference in boiling point between solvents used, the same effects as the contents disclosed in the above cited references can be exerted.

As other invention concerning cocasting method, JP-A-53-134869 discloses an invention which comprises casting a cellulose acetate solution from a first casting nozzle to a thickness of from 10% to 90% of the total thickness, and then casting the rest of the cellulose acetate solution from a second casting nozzle disposed at a distance of from 30% to 60% of that between the first casting nozzle and the peeling site, thereby raising the casting speed.

Further, JP-A-61-018943 discloses an invention which comprises cocasting a dope (A) comprising TAC, dichloromethane, methanol and other poor solvents and a dope (B) having the same formulation as that of the dope (A) except that the proportion of the poor solvents is higher than that of the dope (A) such that the dope (A) is casted over a support to an undried thickness of 5 µm or more to form a film, thereby attaining stable rise of casting. It is also disclosed that a composite slit die is preferably used to allow the dopes A and B to join each other during slitting. The above cited invention can exert similar effects also when dichloromethane is replaced by a nonchlorine solvent and thus can be applied to the invention.

Further, JP-A-4-124645 discloses an invention which comprises using a striped cocasting die having a slit with a comb-shaped section extending from one manifold to the merging portion for the purpose of obtaining a magnetic recording layer having a good planarity.

Moreover, JP-A-8-207210 discloses an invention which comprises providing a core portion of a cellulose acetate having a substitution degree of 2.7 or less and a surface layer having a thickness of from 0.5 µm to 15 µm made of a cellulose acetate having a substitution degree of 2.8 or more disposed on at least one side of the core portion to provide excellent transparency, dimensional stability and heat and moisture resistance and reduce the content of solvents in the film shortly after production.

Further, JP-A-10-058514 discloses an invention which comprises extruding a dope for base layer covered by a dope for surface layer (except the both edges) at the same from a die to prevent a film having a good smoothness from being left unpeeled.

Moreover, JP-A-5-040321 discloses an invention concerning a photosensitive material obtained by the cocasting of a magnetic dope and a non-magnetic dope.

Further, JP-A-2000-317960 discloses an invention which comprises feeding a low viscosity solution and a high viscosity solution having a viscosity as high as twice to ten times that of the low viscosity solution through the respective channel until they join at a feed block type merging device where they form parallel flows which come in contact with each other at the interface, and then ejecting the parallel flows through a casting die lip in 5 to 25 seconds from the merging point to form a multi-layer casted film, thereby obtaining a multi-layer resin film having a higher thickness precision.

Moreover, JP-A-2002-221620 proposes that when a polarizing plate film is prepared by cocasting such that the concentration of the outer layer is low, the inclination: of unevenness in striped roughness having a pitch of from 3 to 15 mm is less than 0.04.

Further, JP-A-2003-080541 proposes that the ratio A/B of the shearing viscosity A of the dope for surface layer or back surface layer to the shearing viscosity B of the dope for intermediate layer during the casting of a plurality of dopes from die be predetermined to be 0.9 or less to inhibit the occurrence of skinning.

Moreover, JP-A-2003-014933 discloses an invention concerning a retarder film having little bleed-out of additives, no interlayer exfoliation, good slipperiness and excellent transparency.

Further, JP-A-2003-014933 discloses that the surface layer preferably comprises a particulate material incorporated therein to render the film slippery and the core layer doesn't need to but may have a particulate material incorporated therein. However, when the amount of a particulate material to be incorporated in the core layer is too great, the resulting film exhibits deteriorated transparency. Therefore, the amount of a particulate material to be incorporated in the core layer is preferably 1/10 or less of that in the surface layer, more preferably substantially none. (The term "substantially none" as used herein is meant to indicate that the added amount of a particulate material is from 0 to 0.01% by mass based on solid content.) It is also disclosed that when a particulate material is incorporated in at least one of the surface and back surface layers, a slipping effect can be exerted. It is further disclosed that the primary average particle diameter of the particulate material is preferably 20 nm or less, more preferably from 5 nm to 16 nm, particularly preferably from 5 nm to 12 nm in order to keep haze low. It is further disclosed that the apparent specific gravity of the particulate material is preferably 70 g/l or more, more preferably from 90 to 200 g/l, particularly from 100 to 200 g/l. It is further disclosed that when the apparent specific gravity increases, a high concentration dispersion can be prepared more likely to improve haze and agglomeration to advantage. A particulate silicon dioxide having a primary average particle diameter of 20 nm or less and an apparent specific gravity of 70 g/l or more can be obtained, e.g., by combusting a mixture of vaporized silicon tetrachloride and hydrogen at a temperature of from 1,000° C. to 1,200° C. in air. It is further disclosed that a particulate silicon dioxide is commercially available in the name of Aerosil 200V and Aerosil R972V (produced by NIPPON AEROSIL CO., LTD.).

(Stretching)

The cellulose acylate film of the invention performs its function when stretched.

A preferred stretching method of the invention will be described in detail below.

The cellulose acylate film of the invention is preferably stretched crosswise so that it can be used as a polarizing plate. For details, reference can be made to JP-A-62-115035, JP-A-4-152125, JP-A-4-284211, JP-A-4-298310 and JP-A-11-48271. The stretching of the film is effected at ordinary temperature or under heating. The heating temperature is preferably not higher than the glass transition temperature of the film. The film may be subjected to monoaxial stretching or biaxial stretching. The film can be stretched by some treatment during drying. This treatment is effective particularly when the solvent remains in the film. For example, by adjusting the speed of the film conveying rollers such that the film winding speed is higher than the film peeling speed, the film can be stretched. The film can be stretched also by conveying the film with the width thereof being kept by a tenter while gradually expanding the width of the tenter. The film dried may be stretched also by means of a stretching machine (preferably monoaxial stretching using a longitudinal stretching machine). The draw ratio of the film (percent increase from original length due to stretching) is preferably from 0.5% to 300%, more preferably from 1% to 200%, particularly preferably from 1% to 100%. The cellulose acylate film of the invention is preferably produced by successively or continuously effecting a film-forming step involving solvent casting method and a step of stretching the film thus prepared. The draw ratio is preferably from not smaller than 1.2 to not greater than 1.8. Stretching may be effected by a single stage or by multiple stages. In the case where stretching is effected by multiple stages, it suffices if the product of the various draw ratios falls within the above defined range.

The stretching speed is preferably from 5%/min to 1,000%/min, more preferably from 10%/min to 500%/min. The stretching temperature is preferably from 30° C. to 160° C., more preferably from 70° C. to 150° C., particularly preferably from 85° C. to 150° C. Stretching is preferably effected over a heated roller and/or by a heat from a radiation heat source (e.g., IR heater) or with hot air. Further, in order to enhance the temperature uniformity, a constant temperature tank may be provided. In the case where monoaxial stretching involves roll stretching, the ratio L/W of distance (L) between rollers to width (W) of retarder plate is preferably from 2.0 to 5.0.

A preheating step is preferably provided prior to the stretching step. The stretching step may be followed by a heat treatment step. The heat treatment is preferably effected at a temperature of from 20° C. lower than the glass transition temperature of cellulose acylate film to 10° C. higher than the glass transition temperature of cellulose acylate film. The heat treatment is preferably effected for 1 second to 3 minutes. The heating method may involve zone heating or partial heating using an infrared heater. The film may be slit at the both edges thereof during or at the end of the heat treatment step. Slit tailing is preferably recovered for recycling. Referring to tenter, JP-A-11-077718 proposes that the drying of the web with its width retained by a tenter be effected by properly controlling the drying gas blowing method, the blowing angle, the wind velocity distribution, the wind velocity, the air flow rate, the temperature difference, the upper to lower air flow rate ratio, the use of high specific heat drying gas, etc. so that the speed of solution casting method can be raised or the prevention of deterioration of quality such as planarity during the expansion of web width can be assured.

Further, JP-A-11-077822 discloses an invention involving heat treatment with heat gradient in the crosswise direction of film at a step of heat relaxation of a thermoplastic resin stretched at a stretching step for the purpose of preventing the occurrence of unevenness.

Moreover, JP-A-4-204503 discloses an invention involving the stretching of a film with its solvent content kept at a range of from 2% to 10% as calculated in terms of solid content for the purpose of preventing the occurrence of unevenness.

Further, JP-A-2002-248680 discloses an invention which comprises stretching a film at a tenter clipping width D kept below (33/(log(draw ratio)×log(volatile content)) so that curling due to limitation of clipping width can be suppressed to facilitate the conveyance of the film after stretching step.

Moreover, JP-A-2002-337224 discloses an invention involving tenter conveyance with pin in the former half stage and with clip in the latter half stage for the purpose of attaining both high speed soft film conveyance and stretching.

Further, JP-A-2002-187960 discloses an invention which comprises casting a cellulose ester dope solution over a casting support, and then stretching the web (film) peeled off the casting support at a draw ratio of from 1.0 to 4.0 in at least one direction while the residual solvent content in the web is 100% by mass or less, particularly from 10 to 100% by mass so that the resulting film has an optical biaxiality for the purpose of simply improving the viewing angle properties and the viewing angle. In a preferred embodiment disclosed, the web is stretched at a draw ratio of from 1.0 to 4.0 in at least one direction while the residual solvent content in the web is 100% by mass or less, particularly from 10 to 100% by mass. Other examples of stretching method include a method which comprises making the peripheral speed of a plurality of rollers different so that the film is longitudinally stretched by the use of difference in peripheral speed between rollers, a method which comprises stretching the web fixed at both edges with clips or pins the interval of which expands in the moving direction so that the web is longitudinally stretched, a method which comprises stretching the web fixed at both edges which move outward crosswise so that the web is crosswise stretched, a method which comprises stretching the web fixed at both edges which move outward crosswise and longitudinally so that the web is crosswise and longitudinally stretched, and combination thereof. It is also disclosed that in the case of tenter method, when the clipping portion is driven by a linear driving process, smooth stretching can be effected, making it possible to eliminate risk such as break to advantage.

Moreover, JP-A-2003-014933 discloses an invention which comprises preparing a dope A containing a resin, additives and an organic solvent and a dope B free of additives or containing a resin, additives in an amount less than that of the dope A, and an organic solvent, cocasting the dope A and the dope B over a support in such a manner that the dope A forms a core layer and the dope B forms a surface layer, vaporizing the organic solvent until the web can be peeled off the support, peeling the web off the support, and then stretching the web at a draw ratio of from 1.1 to 1.3 in at least one direction while the residual solvent content in the resin film during stretching is from 3 to 50% by mass to prepare a retarder film having little additive bleed-out, no interlayer exfoliation, good slipperiness and excellent transparency. In a preferred embodiment, the web is peeled off the support, and then stretched at a draw ratio of from 1.1 to 3.0 and a temperature of from 140° C. to 200° C. in at least one axial direction. In a further preferred embodiment, a dope A containing a resin and an organic solvent and a dope B containing a resin, a particulate material and an organic solvent are prepared. The dope A and the dope B are then cocasted over a support in such a manner that the dope A forms a core layer and the dope B forms a surface layer. The organic solvent is then vaporized until the web can be peeled off the support. The web is peeled off the support, and then stretched at a draw ratio of from 1.1 to 3.0 in at least one axial direction while the residual solvent content in the resin film during stretching is from 3 to 50% by mass. In a further preferred embodiment, the web is stretched at a draw ratio of from 1.1 to 3.0 and a temperature of from 140° C. to 200° C. in at least one axial direction. In a further preferred embodiment, a dope A containing a resin, an organic solvent and additives, a dope B free of additives or containing a resin, additives in an amount less than that of the dope A, and an organic solvent free of or having less amount of additives and a dope C containing a resin, a particulate material and an organic solvent are prepared. The dope A, the dope B and the dope C are then cocasted over a support in such a manner that the dope A forms a core layer, the dope B forms a surface layer and the dope C forms the other side surface layer. The organic solvent is then vaporized until the web can be peeled off the support. The web is then peeled of the support, and then stretched at a draw ratio of from 1.1 to 3.0 in at least one axial direction while the residual solvent content in the resin film during stretching is from 3 to 50% by mass. In a further preferred embodiment, the web is stretched at a draw ratio of from 1.1 to 3.0 and a temperature of from 140° C. to 200° C. in at least one axial direction. In a further preferred embodiment, the content of the additives to be incorporated in the dope A and the dope B are from 1 to 30% by mass and from 0 to 5% by mass based on the weight of the resin, respectively, the additives are plasticizers, ultraviolet absorbers or retardation controllers and methylene chloride or methyl acetate is incorporated as an organic solvent in the dope A and the dope B in an amount of 50% by or more.

Moreover, JP-A-2003-014933 discloses that as the stretching method there is preferably used a method involving the use of a crosswise stretching machine called tenter adapted to crosswise stretch the web fixed at both edges thereof with a clip or pin the distance of which expands crosswise. It is also disclosed that the longitudinal stretching or shrinkage is carried out by using a simultaneous biaxial stretching machine comprising pins or clips the interval of which increases or decreases in the conveying direction (longitudinal direction). It is further disclosed that when the clipping portion is driven by a linear driving process, stretching can be smoothly effected, making it possible to eliminate risk such as break to advantage. It is further disclosed that as the longitudinal stretching method there may be also used a method which makes the peripheral speed of a plurality of rollers different so that the film is longitudinally stretched by the use of difference in peripheral speed between rollers. It is further disclosed that these stretching methods may be used in composite. It is further disclosed that the stretching step may be effected batchwise in two or more stages as in longitudinal stretching-crosswise stretching-longitudinal stretching or longitudinal stretching-longitudinal stretching.

Moreover, JP-A-2003-004374 discloses an invention involving the use of a drying apparatus comprising a dryer the width of which is shorter than that of the web so that the hot air from the dryer doesn't hit the both edges of the web to prevent the foaming of the web during tenter drying, improve the releasability of the web and prevent the production of dust.

Further, JP-A-2003-019757 discloses an invention involving the provision of a windshield inside the both edges of the web such that drying air doesn't hit the tenter retaining portion to prevent the foaming of the web during tenter drying, improve the releasability of the web and prevent the production of dust.

Moreover, JP-A-2003-053749 discloses an invention that satisfies the relationships (1) $40 \leq X \leq 200$ when T is 60 or less, (2) $40+(T-60)\times 0.2 \leq X \leq 300$ when T is from more than 60 to not more than 120 and (3) $52+(T-120)\times 0.2 \leq X \leq 400$ when T is less than T supposing that the dried thickness of the both edges of the film retained by the pin tenter is X μm and the average dried thickness of the product portion of the film is T μm to perform stable conveyance and drying.

Further, JP-A-2-182654 discloses an invention involving the provision of a heating chamber and a cooling chamber in the dryer of a multi-stage tenter in the tenter device such that the right and left clip chains are separately cooled to prevent the multi-stage tenter from causing wrinkle.

Moreover, JP-A-9-077315 discloses an invention involving the use of a pin tenter having inner pins having a great density and outer pins having a small density such that break, wrinkle and malconveyance of the web can be prevented.

Further, JP-A-9-085846 discloses an invention involving the use of a tenter drying apparatus arranged such that the pin for retaining the both edges of the web is cooled to a temperature of less than the foaming temperature of the web by a blowing cooler and the pin is cooled to a temperature of the gelation temperature of the dope in the duct type cooler plus 15° C. shortly before engaging the web to prevent the web from foaming or attaching to the retaining unit in the tenter.

Moreover, JP-A-2003-103542 discloses an invention concerning a solution film-forming method which comprises cooling an insert structure in a pin tenter so that the surface temperature of the web doesn't exceed the gelation temperature of the web to prevent pin tenter slip and eliminate foreign matters.

Further, JP-A-11-077718 discloses an invention involving the use of a tenter web drying method performing at a wind velocity of from 0.5 to 20 (40) m/s, a crosswise temperature distribution of 10% or less, an upper to lower web air flow ratio of from 0.2 to 1 and a drying gas ratio of from 30 to 250 J/Kmol to raise the speed of solution casting method and prevent the deterioration of quality such as planarity during the expansion of web width by tenter. Preferred tenter drying conditions are disclosed depending on the residual solvent content. In some detail, the angle of blowing from the blowing nozzle is predetermined to be from 30° to 150° between the time at which the web is peeled off the support and the time at which the residual solvent content in the web reaches 4% by mass. When the wind velocity distribution on the surface of the film positioned in the extending direction of blowing of drying gas is based on the upper limit of wind velocity, the difference between the upper limit and the lower limit is predetermined to be 20% or less during the blowing of drying gas. When the residual solvent content in the web is from not smaller than 130% by mass to not greater than 70% by mass, the wind velocity of drying gas blown from the blowing drying machine on the surface of the web is predetermined to be not smaller than 0.5 m/sec to not greater than 20 m/sec. When the residual solvent content is from not smaller than 4% by mass to less than 70%, the web is dried with a drying gas wind blown at a rate of from not smaller than 0.5 m/sec to not greater than 40 m/sec. When the temperature distribution of drying gas in the crosswise direction of web is based on the upper limit of the gas temperature, the difference between the upper limit and the lower limit is predetermined to be 10% or less. When the residual solvent content in the web is not smaller than 4% by mass to not greater than 200% by mass, the flow rate ratio q of drying gas blown from the blowing nozzle of the blowing drying machines positioned above and under the web which is being conveyed is predetermined to be from not smaller than 0.2 to not greater than 1. In a further embodiment, as a drying gas there is used at least one gas the average specific heat of which is from not smaller than 31.0 J/K·mol to not greater than 250 J/K·mol. A drying gas containing an organic compound which normally stays liquid in a concentration of 50% or less may be used at saturated vapor pressure.

Moreover, JP-A-11-077719 discloses an invention involving the use of a TAC producing apparatus comprising a tenter clip having a heating portion incorporated therein such that the planarity or spreadability cannot be impaired by the production of contaminants. In a preferred embodiment, a device for removing foreign matters generated on the portion of contact of clip with web is provided between the site at which the clip of the tenter releases the web and the site at which the clip carries the web again. The foreign matters are removed by the use of spraying gas or liquid or a brush. The residual amount of the web during the contact of the clip or pin with the web is from not smaller than 12% by mass to not greater than 50% by mass. The surface temperature of the portion of contact of the clip or pin with the web is preferably not smaller than 60° to not greater than 200° (more preferably not smaller than 80° to not greater than 120°).

Further, JP-A-11-090943 discloses an invention involving the use of a tenter clip having Lr of from not smaller than 1.0 to not greater than 1.99 supposing that Lr is the ratio Ltt/Lt of the arbitrary length Lt (m) of the tenter to the sum Ltt (m) of the conveying length of the portions at which the tenter clip having the same length as Lt retains the web to improve planarity, eliminate quality deterioration due to tear in the tenter and raise the productivity. In a preferred embodiment, the portions at which the web is retained are disposed without any gap as viewed crosswise.

Moreover, JP-A-11-090944 discloses an invention a plastic film producing apparatus comprising a web crosswise slack inhibiting device provided before the inlet of tenter to eliminate the deterioration of planarity and the instability of introduction due to slacking of web during the introduction of web into the tenter. In a preferred embodiment, the slack inhibiting device is a rotary roller which rotates at a crosswise expanding angle of from 2° to 60°. An air sucking device is provided above the web. There is also provided an air blower capable of blowing from the web.

JP-A-11-090945 discloses an invention concerning a TAC producing method which comprises introducing a web which has been peeled off the support at an angle with respect to the horizontal direction for the purpose of preventing the occurrence of slacking that deteriorates quality and impairs productivity.

Further, JP-A-2000-289903 discloses an invention concerning a conveying apparatus arranged to convey the web while tensing the web in the crosswise direction at the time when the web is peeled off and has a solvent content of from 12% to 50% by mass wherein there are provided a web width detecting unit, a web retaining unit and two or more variable flexing points and a web width is calculated from signal produced by the web width detecting unit to change the position of the flexing points, thereby preparing a film having stabilized physical properties.

JP-A-2003-033933 proposes that a guide plate for preventing the occurrence of curling of web at the edge thereof is provided at least above and under the right and left edges of the web at both right and left sides of the portion close to the inlet of the tenter and the surface of the guide plate opposed to the web is composed of a resin portion in contact with web and a metallic portion in contact with web arranged in the web conveying direction to enhance clipping properties and prevent web break over an extended period of time. In a preferred embodiment, the resin portion in contact with web on the guide plate opposed to the web is disposed upstream in the web conveying and the metallic portion in contact with web is disposed downstream in the web conveying direction. The step between the resin portion in contact with web and the metallic portion in contact with web of the guide plate (including slope) is 500 μm or less. The distances of the resin portion and the metallic portion of the guide plate in contact with web in the direction of the width in contact with the web are each from 5 mm to 120 mm. The resin portion in contact with web of the guide plate is provided by working the surface of a metallic guide substrate with a resin or spreading a resin over the metallic guide substrate. The resin portion in contact with web of the guide plate is composed of simple resin body. The distance between the surfaces of the guide plates opposed to the web arranged above and below the web in the left and right side portions of the web. The distance between the opposing upper and lower guide plates at the right and left edges of the web increases crosswise and inward at a rate of 2 mm or more per 100 mm of width. Both the upper and lower guide plates at the right and left edges of the web each have a length of from 10 mm to 300 mm. The upper and lower guide plates are disposed shifted in the conveying direction. The shift between the upper and lower guide plates is from −200 to +200 mm. The surface of the upper guide plate opposed to the web is composed of resin or metal alone. The surface of the resin portion of the upper guide plate opposed to the web is made of Teflon®. The metallic portion in contact with web is made of stainless steel. The surface roughness of the guide plate opposed to the web or the resin portion and/or metallic portion in contact with web is 3 μm or less. It is preferred that the upper and lower guide plates for preventing the occurrence of curling of the web on the edges thereof be disposed in between the end of the support at which the web is peeled off and the site at which the web is introduced into the tenter, more preferably close to the inlet of the tenter.

JP-A-11-048271 discloses an invention which comprises stretching the web which has been peeled off using a stretching device at the time when the solvent content in the web is from 12% to 50% by mass, drying the web, and then pressing the web at a pressure of from 0.2 to 10 KPa on the both sides thereof using a press at the time when the solvent content in the web is 10% by mass or less to prevent the web from undergoing break or unevenness during drying in the tenter. In a preferred embodiment, the tensing of the web is terminated at the time when the solvent content in the web is 4% by mass or more. In the case where a nip roll is used to press the web (film) on the both sides thereof, one to eight pairs of nip rolls are preferably used. The temperature at which pressing is effected is preferably from 100° C. to 200° C.

Moreover, JP-A-2002-036266, which invention relates to the provision of a high quality thin tack having a thickness of from 20 μm to 85 μm, discloses that the tension difference which acts on the web along the conveying direction is predetermined to be 8 N/mm² or less. It is also disclosed that the peeling step is followed by a preheating step for preheating the web which is followed by a stretching step for stretching the web using a tenter which is followed by a relaxing step for relaxing the web by the amount less than the stretching at the stretching step. It is further disclosed that the temperature T1 at the preheating step and the stretching step is predetermined to be not lower than (glass transition temperature Tg of film— 60° C.), the temperature T2 at the relaxing step is predetermined to be not higher than (T1 −10° C.), the draw ratio of the web at the stretching step is predetermined to be from 0% to 30% as calculated in terms of ratio to the width of the web shortly before the stretching step and the draw ratio of the web at the relaxing step is predetermined to be from −10 to 10%.

Moreover, JP-A-2002-225054, which is intended to reduce the dried thickness of the web to a range of from 10 μm to 60

µm, reduce the weight of the web and attain excellence in durability such as moisture permeability, discloses that the web which has been peeled off the support is gripped by a clip at the edges thereof by the time at which the residual solvent content in the web reaches 10% by mass so that the width of the web can be kept constant to suppress the drying shrinkage and/or crosswise stretched to form a film having a planar alignment (S) of from 0.0008 to 0.0020 as represented by the equation $S=\{(Nx+Ny)/2\}-Nz$ (in which Nx represents the refractive index of the film in the in-plane direction along which the highest refractive index is exhibited, Ny represents the refractive index in the in-plane direction perpendicular to Nx and Nz represents the refractive index of the film in the thickness direction). It is also disclosed that the time between casting and peeling is predetermined to be from 30 seconds to 90 seconds. It is further disclosed that the web which has been peeled off the support is stretched crosswise and/or longitudinally.

Moreover, JP-A-2002-341144 discloses a solution film-forming method involving a stretching step wherein the weight concentration of the retardation raising agent has a higher optical distribution toward the center of the width of the film to suppress optical unevenness.

Further, JP-A-2003-071863, which invention is indented to obtain a film which undergoes no clouding, discloses that the crosswise draw ratio is preferably from 0% to 100%, and more preferably from 5% to 20%, most preferably from 8% to 15% if the web is used as a polarizing plate protective film. It is also disclosed that if the web is used as a retarder film, the crosswise draw ratio is more preferably from 10% to 40%, most preferably from 20% to 30%. It is further disclosed that Ro can be controlled by draw ratio and the higher the draw ratio is, the more excellent is the planarity of the resulting film. It is further disclosed that the residual solvent content in the film to be processed by a tenter is preferably from 20% to 100% by mass at the beginning of tenter process. It is further disclosed that the film is preferably dried while being tensed until the residual solvent content in the film reaches 10% by mass or less, more preferably 5% by mass or less. It is further disclosed that the drying temperature, if tenter process is effected, is preferably from 30° C. to 150° C., more preferably from 50° C. to 120° C., most preferably from 70° C. to 100° C. It is also disclosed that the lower the drying temperature is, the less is evaporation of plasticizer or the like and process contamination while the higher the drying temperature is, the better is the planarity of the film.

JP-A-2002-248639, which invention is intended to reduce the longitudinal and crosswise dimensional change during storage under high temperature and humidity conditions, discloses a film producing method which comprises casting a cellulose ester solution over a support, and then continuously peeling and drying the film wherein drying is effected such that the percent drying shrinkage satisfies the relationship $0 \leq \%$ drying shrinkage $\leq 0.1 \times \%$ residual solvent content during peeling. In a preferred embodiment, while the residual solvent content in the cellulose ester film peeled is from 40% to 100% by mass, the cellulose ester film is tenter-conveyed with the both edges thereof gripped to reduce the residual solvent content by 30% by mass or more. The residual solvent content in the cellulose ester film peeled is from 40% to 100% by mass and from 4% to 20% by mass at the inlet and outlet of the tenter conveyor, respectively. The tension with which the cellulose ester film is tenter-conveyed increases from the inlet of the tenter conveyor to the outlet of the tenter conveyor. The tension with which the cellulose ester film is tenter-conveyed is substantially the same as the crosswise tension of the cellulose ester film.

Further, JP-A-2000-239403 proposes that film forming is effected such that the relationship between the residual solvent content X during peeling and the residual solvent content Y during introduction into tenter satisfies the expression $0.3X \leq Y \leq 0.9X$ to obtain a film having a small thickness excellent in optical isotropy and planarity.

JP-A-2002-286933 exemplifies a method involving stretching under heating conditions and a method involving stretching with a solvent incorporated in the film as a method for stretching a film formed by casting. It is also disclosed that the stretching under heating conditions is preferably effected at a temperature of not higher than the value in the vicinity of the glass transition point of the resin while the stretching with the cast-formed film impregnated with a solvent may be effected by drying the film, bringing the film into contact with a solvent so that the film is impregnated with the solvent, and then stretching the film.

(Retardation Raising Agent)

In order to realize a desired retardation value, a retardation raising agent is preferably used.

The term "retardation raising agent" as used herein is meant to indicate an "additive" which provides an unstretched cellulose acylate film with an Re retardation rise of 20 nm or more as measured at a wavelength of 550 nm from that of an unstretched cellulose acylate film prepared in the same manner except that the additive is not added. The rise of retardation value is preferably 30 nm or more, more preferably 40 nm or more, most preferably 60 nm or more.

The retardation raising agent is preferably a compound having at least two aromatic rings. The retardation raising agent is preferably used in an amount of from 0.01 to 20 parts by mass, more preferably from 0.1 to 10 parts by mass, even more preferably from 0.2 to 5 parts by mass, most preferably from 0.5 to 2 parts by mass based on 100 parts by mass of polymer.

The retardation raising agent preferably has an absorption maxima in the wavelength range of from 250 nm to 400 nm and substantially no absorption in the visible light range.

The term "aromatic ring" as used herein is meant to include aromatic heterocycles in addition to aromatic hydrocarbon rings.

The aromatic hydrocarbon ring is particularly preferably a 6-membered ring (i.e., benzene ring).

The aromatic heterocycle is normally an unsaturated heterocycle. The aromatic heterocycle is preferably a 5-, 6- or 7-membered ring, more preferably 5- or 6-membered ring. The aromatic heterocycle normally has the most numerous double bonds. Preferred examples of the hetero atom include nitrogen atom, oxygen atom, and sulfur atom. Particularly preferred among these hetero atoms is nitrogen atom. Examples of the aromatic heterocycle include furan ring, thiophene ring, pyrrole ring, oxazole ring, isooxazole ring, thiazole ring, isothiazole ring, imidazole ring, pyrazole ring, furazane ring, triazole ring, pyran ring, pyridine ring, pyridazine ring, pyrimidine ring, pyrazine ring, and 1,3,5-triazine ring.

Preferred examples of the aromatic ring include benzene ring, furan ring, thiophene ring, pyrrole ring, oxazole ring, thiazole ring, imidazole ring, triazole ring, pyridine ring, pyrimidine ring, pyrazine ring, and 1,3,5-triazine ring. Particularly preferred among these aromatic rings is 1,3,5-triazine ring. More specifically, compounds disclosed in JP-A-2001-166144 are preferably used.

The number of carbon atoms in the retardation raising agent is preferably from 2 to 20, more preferably from 2 to 12, even more preferably from 2 to 8, most preferably from 2 to 6.

The relationship in connection between the two aromatic rings can be classified as (a) formation of condensed ring, (b) direct connection via single bond and (c) connection via connecting group (no spiro bond is formed because of aromatic ring). Any of the relationships (a) to (c) may be used.

Examples of the condensed ring (a) (condensed ring formed by two or more aromatic rings) include indene ring, naphthalene ring, azlene ring, fluorene ring, phenanthrene ring, anthracene ring, acenaphthylene ring, biphenylene ring, naphthacene ring, pyrene ring, indole ring, isoindole ring, benzofuran ring, benzothiophene, indolidine ring, benzooxazole ring, benzothiazole ring, benzoimidazole ring, benzotriazole ring, purine ring, indazole ring, chromen ring, quinoline ring, isoquinoline ring, quinolidine ring, quinazoline ring, cinnoline ring, quinoxaline ring, phthaladine ring, pteridine ring, carbazole ring, acridine ring, phenanthridine ring, xanthene ring, phenazine ring, phenothiazine ring, phenoxathiine ring, phenoxazine ring, and thianthrene ring. Preferred among these condensed rings are naphthalene ring, azlene ring, indole ring, benzooxazole ring, benzothiazole ring, benzoimidazole ring, benzotriazole ring, and quinoline ring.

The single bond (b) is preferably between carbon atom of the two aromatic rings. Two or more single bonds may be formed to connect two aromatic rings between which an aliphatic ring or non-aromatic heterocycle is formed.

The connecting group (c), too, is preferably between carbon atom of the two aromatic rings. The connecting group is preferably an alkylene group, alkenylene group, alkynylene group, —CO—, —O—, —NH—, —S— or combination thereof. Examples of the connecting group having these groups in combination will be given below. The order of the moieties in the following exemplified connecting groups may be inverted.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
C13: —O—CO-alkylene-CO—O—
c14: —NH—CO-alkenylene-
c15: —O—CO-alkenylene- The aromatic ring and the connecting group may have substituents.

Examples of the substituents include halogen atoms (F, Cl, Br, I), hydroxyl, carboxyl, cyano, amino, nitro, sulfo, carbamoyl, sulfamoyl, ureido, alkyl group, alkenyl group, alkynyl group, aliphatic acyl group, aliphatic acyloxy group, alkoxy group, alkoxycarbonyl group, alkoxycarbonylamino group, alkylthio group, alkylsulfonyl group, aliphatic amide group, aliphatic sulfonamide group, aliphatic substituted amino group, aliphatic substituted carbamoyl group, aliphatic substituted sulfamoyl group, aliphatic substituted ureido group, and non-aromatic heterocyclic group.

The number of carbon atoms in the alkyl group is preferably from 1 to 8. Chainlike alkyl group is preferred to cyclic alkyl group. Straight-chain alkyl group is particularly preferred. The alkyl group may further have substituents (e.g., hydroxy, carboxy, alkoxy, alkyl-substituted amino). Examples of the alkyl group (including substituted alkyl group) include methyl, ethyl, n-butyl, n-hexyl, 2-hydroxyethyl, 4-carboxybutyl, 2-methoxyethyl, and 2-diethylaminoethyl.

The number of carbon atoms in the alkynyl group is preferably from 2 to 8. Chainlike alkynyl group is preferred to cyclic alkynyl group. Straight-chain alkynyl group is particularly preferred. The alkynyl group may further have substituents. Examples of the alkynyl group include vinyl, allyl, and 1-hexenyl.

The number of carbon atoms in the alkynyl group is preferably from 2 to 8. Chainlike alkynyl group is preferred to cyclic alkynyl group. Straight-chain alkynyl group is particularly preferred. The alkynyl group may further have substituents. Examples of the alkynyl group include ethynyl, 1-butynyl, and 1-hexynyl.

The number of carbon atoms in the aliphatic acyl group is preferably from 1 to 10. Examples of the aliphatic acyl group include acetyl, propanoyl, and butanoyl.

The number of carbon atoms in the aliphatic acyloxy group is preferably from 1 to 10. Examples of the aliphatic acyloxy group include acetoxy.

The number of carbon atoms in the alkoxy group is preferably from 1 to 8. The alkoxy group may further have substituents (e.g., alkoxy group). Examples of the alkoxy group (including substituted alkoxy group) include methoxy, ethoxy, butoxy, and methoxyethoxy.

The number of carbon atoms in the alkoxycarbonyl group is preferably from 2 to 10. Examples of the alkoxycarbonyl group include methoxycarbonyl and ethoxycarbonyl.

The number of carbon atoms in the alkoxycarbonylamino group is preferably from 2 to 10. Examples of the alkoxycarbonylamino group include methoxycarbonylamino and ethoxycarbonylamino.

The number of carbon atoms in the alkylthio group is preferably from 1 to 12. Examples of the alkylthio group include methylthio, ethylthio, and octylthio.

The number of carbon atoms in the alkylsulfonyl group is preferably from 1 to 8. Examples of the alkylsulfonyl group include methanesulfonyl and ethanesulfonyl.

The number of carbon atoms in the aliphatic amide group is preferably from 1 to 10. Examples of the aliphatic amide group include acetamide.

The number of carbon atoms in the aliphatic sulfonamide group is preferably from 1 to 8. Examples of the aliphatic sulfonamide group include methanesulfonamide, butanesulfonamide, and n-octanesulfonamide.

The number of carbon atoms in the aliphatic substituted amino group is preferably from 1 to 10. Examples of the aliphatic substituted amino group include dimethylamino, diethylamino, and 2-carboxyethylamino.

The number of carbon atoms in the aliphatic substituted carbamoyl group is preferably 2 to 10. Examples of the aliphatic substituted carbamoyl group include methyl carbamoyl and diethyl carbamoyl.

The number of carbon atoms in the aliphatic substituted sulfamoyl group is preferably from 1 to 8. Examples of the aliphatic substituted sulfamoyl group include methyl sulfamoyl and diethyl sulfamoyl.

The number of carbon atoms in the aliphatic substituted ureido group is preferably from 2 to 10. Examples of the aliphatic substituted ureido group include methyl ureido.

Examples of the non-aromatic heterocyclic group include piperidino and morpholino.

The molecular weight of the retardation raising agent is preferably from 300 to 800.

In the invention, a rod-shaped compound having a linear molecular structure is preferably used besides compounds having 1,3,5-triazine ring. The term "linear molecular structure" as used herein is meant to indicate that the molecular structure of the rod-shaped compound is linear in the thermodynamically most stable structure. The thermodynamically most stable structure can be determined by crystallographic analysis or molecular orbital calculation. For example, a molecular orbital calculation software (e.g., WinMO-PAC2000, produced by FUJITSU LIMITED) may be used to effect molecular orbital calculation by which the molecular structure allowing the smallest heat of formation of compound can be determined. The term "linear molecular structure" as used herein is meant to indicate that the angle formed by the main chains in the thermodynamically most stable molecular structure thus determined is 1400 or more.

The rod-shaped compound having at least two aromatic rings is preferably a compound represented by the following formula (1).

$$Ar^1\text{-}L\text{-}Ar^2 \qquad (1)$$

wherein $Ar^1$ and $Ar^2$ each independently represent an aromatic group.

Examples of the aromatic ring in the invention include aryl groups (aromatic hydrocarbon group), substituted aryl groups, aromatic heterocyclic groups, and substituted aromatic heterocyclic groups.

Aryl group and substituted aryl group are preferred to aromatic heterocyclic group and substituted aromatic heterocyclic group. The heterocycle in the aromatic heterocyclic group is normally unsaturated. The aromatic heterocycle is preferably a 5-, 6- or 7-membered ring, more preferably 5- or 6-membered ring. The aromatic heterocycle normally has the most numerous double bonds. Preferred examples of the hetero atom include nitrogen atom, oxygen atom, and sulfur atom. More desirable among these hetero atoms are nitrogen atom and sulfur atom. Examples of the aromatic ring in the aromatic group include benzene ring, furan ring, thiophene ring, pyrrole ring, oxazole ring, thiazole ring, imidazole ring, triazole ring, pyridine ring, pyrimidine ring, and pyrazine ring. Particularly preferred among these aromatic rings is benzene ring.

Examples of the substituents on the substituted aryl group and substituted aromatic heterocyclic group include halogen atoms (F, Cl, Br, I), hydroxyl, carboxyl, cyano, amino, alkylamino groups (e.g., methylamino, ethylamino, butylamino, dimethylamino), nitro, sulfo, carbamoyl, alkylcarbamoyl groups (e.g., N-methylcarbamoyl, N-ethylcarbamoyl, N,N-dimethyl carbamoyl), sulfamoyl, alkylsulfamoyl groups (e.g., N-methylsulfamoyl, N-ethylsulfamoyl, N,N-dimethyl sulfamoyl), ureido, alkylureido groups (e.g., N-methylureido, N,N-dimethylureido, N,N,N-trimethylureido), alkyl groups (e.g., methyl, ethyl, propyl, butyl, pentyl, heptyl, octyl, isopropyl, s-butyl, t-amyl, cyclohexyl, cyclopentyl), alkenyl groups (e.g., vinyl, allyl, hexenyl), alkynyl groups (e.g., ethynyl, butynyl), acyl groups (e.g., formyl, acetyl, butyryl, hexanoyl, lauryl), acyloxy groups (e.g., acetoxy, butyryloxy, hexanoyloxy, lauryloxy), alkoxy groups (e.g., methoxy, ethoxy, propoxy, butoxy, pentyloxy, heptyloxy, octyloxy), aryloxy groups (e.g., phenoxy), alkoxycarbonyl groups (e.g., methoxycarbonyl, ethoxycarbonyl, propoxycarbonyl, butoxycarbonyl, pentyloxycarbonyl, heptyloxycarbonyl), aryloxycarbonyl groups (e.g., phenoxycarbonyl), alkoxycarbonylamino groups (e.g., butoxycarbonylamino, hexyloxycarbonylamino), alkylthio groups (e.g., methylthio, ethylthio, propylthio, butylthio, pentylthio, heptylthio, octylthio), arylthio groups (e.g., phenylthio), alkylsulfonyl groups (e.g., methylsulfonyl, ethylsulfonyl, propylsulfonyl, butylsulfonyl, pentylsulfonyl, heptylsulfonyl, octylsulfonyl), amide groups (e.g., acetamide, butylamide, hexylamide, laurylamide), and non-aromatic heterocyclic groups (e.g., morphoryl, pyradinyl).

Examples of the substituents on the substituted aryl group and the substituted aromatic heterocyclic group include halogen atoms, cyano, carboxyl, hydroxyl, amino, alkyl-substituted amino, acyl, acyloxy, amide, alkoxycarbonyl, alkoxy, alkylthio, and alkyl.

The alkyl moiety of the alkylamino group, alkoxycarbonyl group, alkoxy group and alkylthio group and the alkyl group may further have substituents. Examples of the substituents on the alkyl moiety and the alkyl group include halogen atoms, hydroxyl, carboxyl, cyano, amino, alkylamino, nitro, sulfo, carbamoyl, alkylcarbamoyl, sulfamoyl, alkylsulfamoyl, ureido, alkylureido, alkenyl,), alkynyl, acyl, acyloxy, alkoxy, aryloxy, alkoxycarbonyl, aryloxycarbonyl, alkoxy carbonylamino, alkylthio, arylthio, alkylsulfonyl, amide, and non-aromatic heterocyclic group. Preferred among these substituents on the alkyl moiety and the alkyl group are halogen atoms, hydroxyl, amino, alkylamino, acyl, acyloxy, acylamino, alkoxycarbonyl, and alkoxy.

In the formula (1), $L^1$ is a divalent connecting group selected from the group consisting of alkylene group, alkenylene group, alkynylene group, —O—, —CO— and combination thereof.

The alkylene group may have a cyclic structure. The cyclic alkylene group is preferably cyclohexylene, particularly preferably 1,4-cyclohexylene. As chainlike alkylene group, straight-chain alkylene group is preferred to branched alkylene group.

The number of carbon atoms in the alkylene group is preferably from 1 to 20, more preferably from 1 to 15, even more preferably from 1 to 10, still even more preferably from 1 to 8, most preferably from 1 to 6.

The alkenylene group and alkynylene preferably has a chainlike structure rather than cyclic structure, more preferably straight-chain structure rather than branched chainlike structure.

The number of carbon atoms in the alkenylene group and the alkynylene group is preferably from 2 to 10, more preferably from 2 to 8, even more preferably from 2 to 6, still even more preferably from 2 to 4, most preferably 2 (vinylene or ethynylene).

The number of carbon atoms in the arylene group is preferably from 6 to 20, more preferably from 6 to 16 and even more preferably from 6 to 12.

In the molecular structure of the formula (1), the angle formed by $Ar^1$ and $Ar^2$ with $L^1$ interposed therebetween is preferably 140° or more.

As the rod-shaped compound there is more preferably used a compound represented by the following formula (2).

$$Ar^1\text{-}L^2\text{-}X\text{-}L^3\text{-}Ar^2 \qquad (2)$$

In the formula (2), $Ar^1$ and $Ar^2$ each independently represent an aromatic group. The aromatic group can be defined and exemplified as $Ar^1$ and $Ar^2$ in the formula (1).

In the formula (2), $L^2$ and $L^3$ each independently represent a divalent connecting group selected from the group consisting of alkylene group, —O—, —CO— and combination thereof.

The alkylene group preferably has a chanilike structure rather than cyclic structure, more preferably straight-chain structure rather than branched chainlike structure.

The number of carbon atoms in the alkylene group is preferably from 1 to 10, more preferably from 1 to 8, even more preferably from 1 to 6, still even more preferably from 1 to 4, most preferably from 1 or 2 (methylene or ethylene).

$L^2$ and $L^3$ each are particularly preferably —O—CO— or —CO—O—.

In the formula (2), X represents 1,4-cyclohexylene, vinylene or ethynylene.

Specific examples of the compound represented by the formula (1) will be given below.

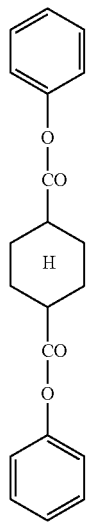

(1)

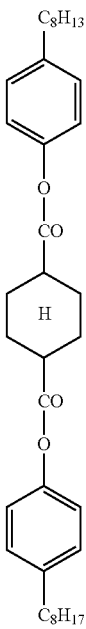

(2)

(3)

(4)

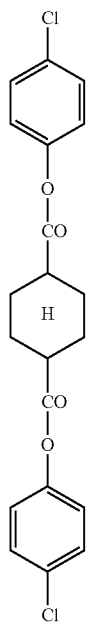
(5)
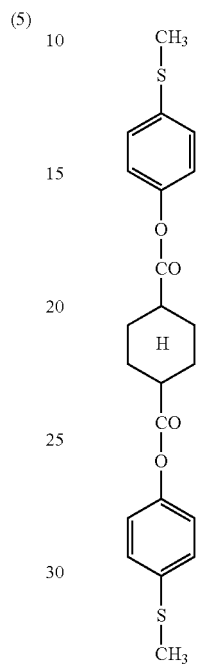
(7)
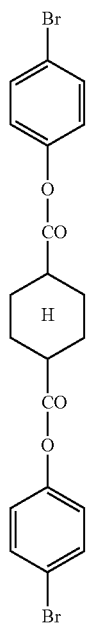
(6)
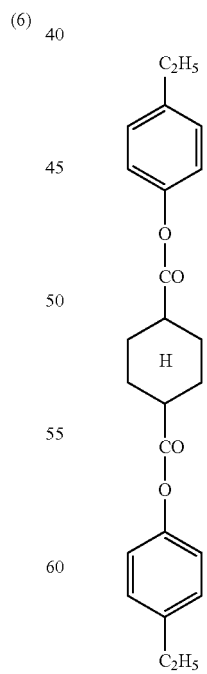
(8)

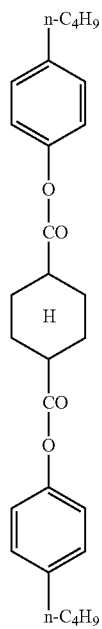
(9)
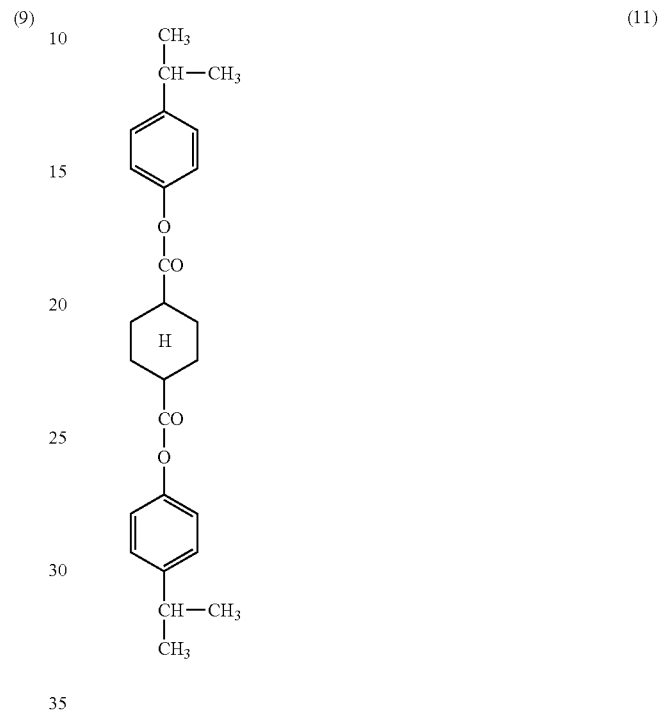
(10)
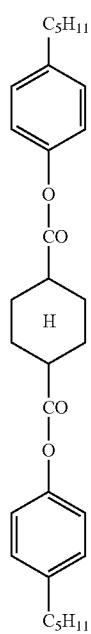
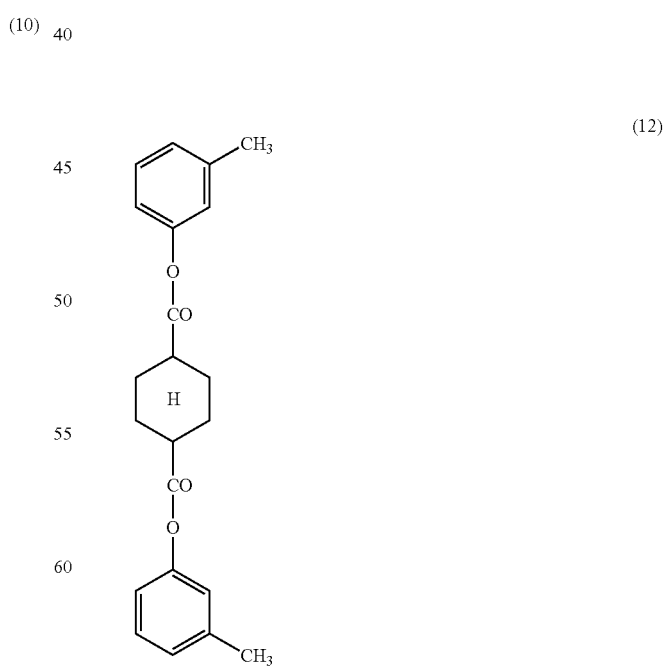

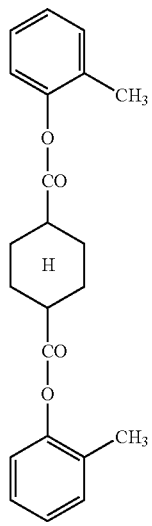
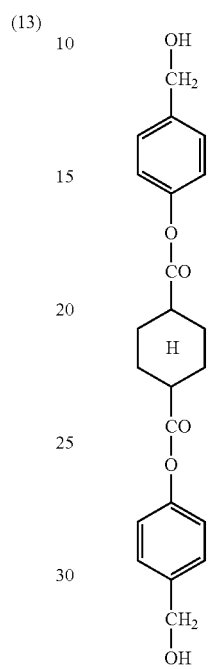
(13)
(15)
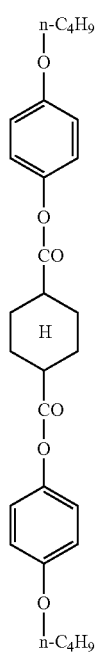
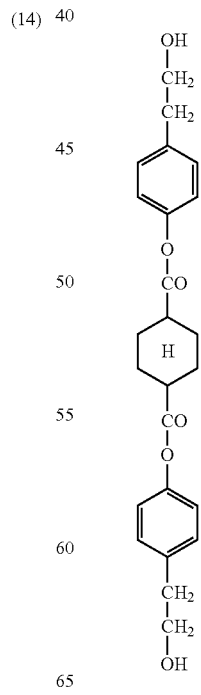
(14)
(16)

(17)
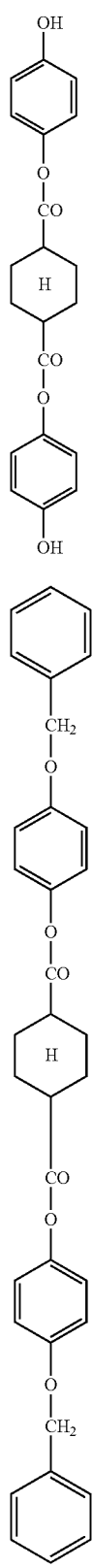
(18)
(19)
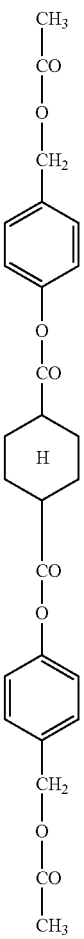

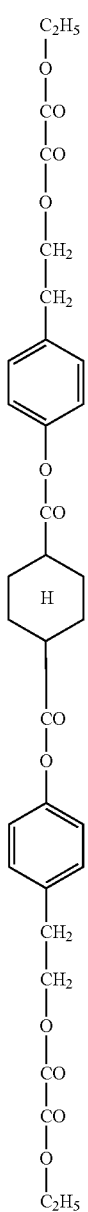 (20)
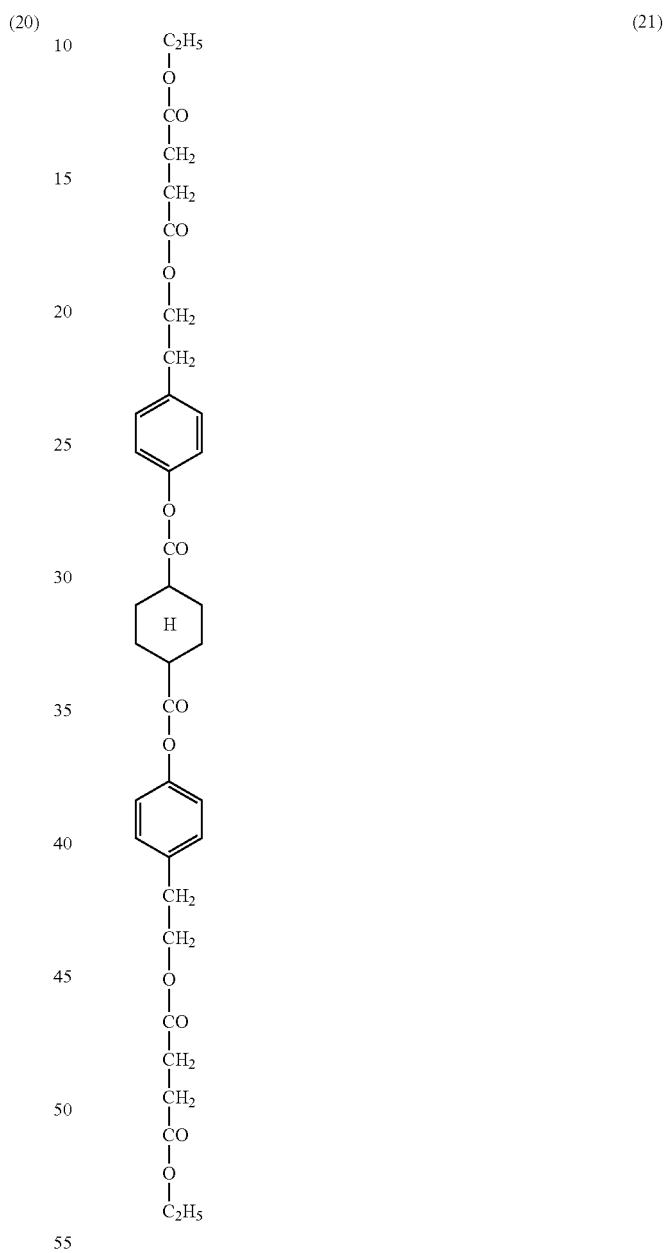 (21)

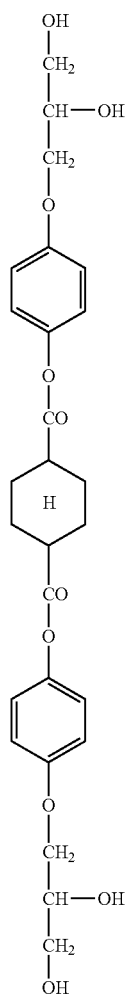
(22)
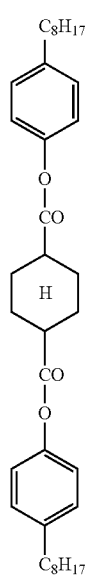
(23)
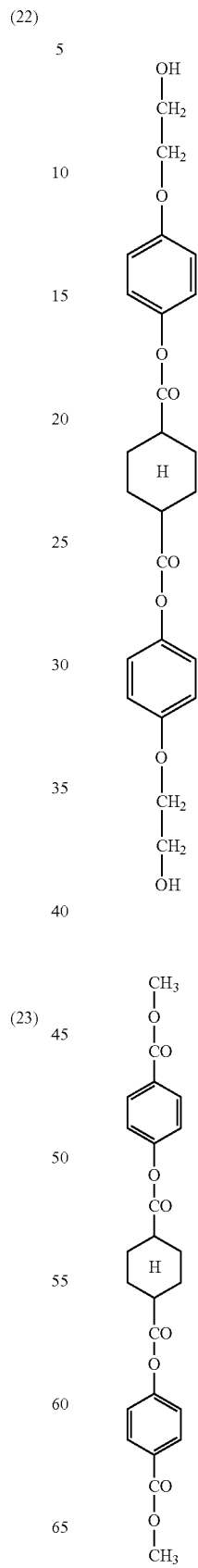
(24)
(25)

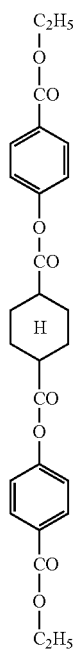 (26)
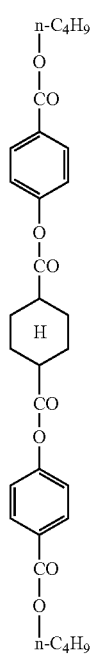 (27)
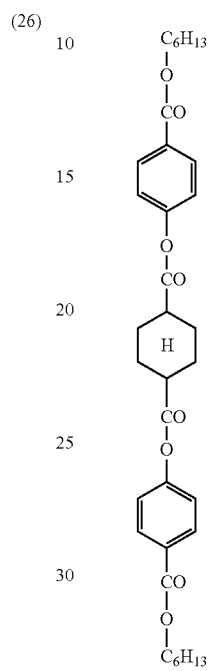 (28)
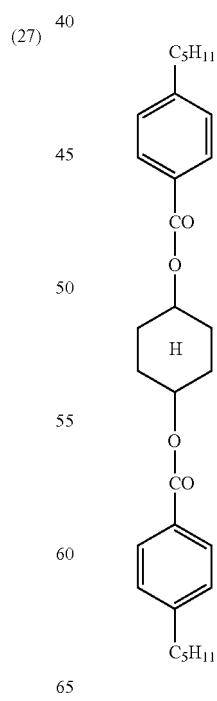 (29)

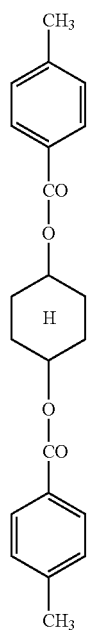
(30)
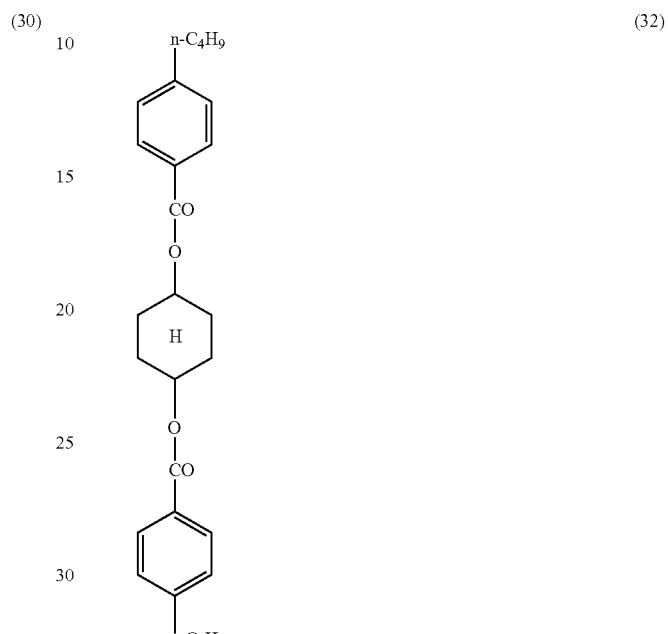
(32)
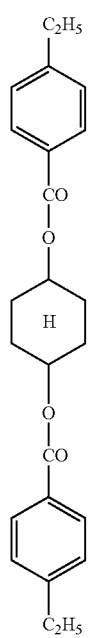
(31)
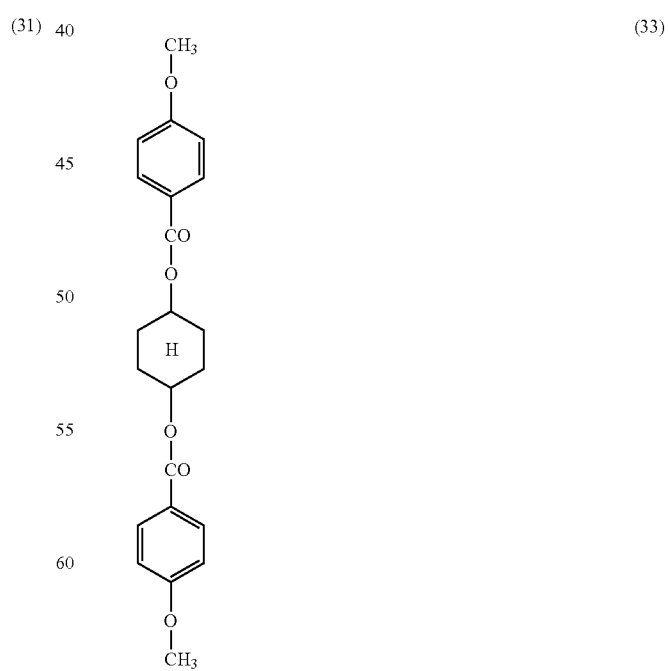
(33)

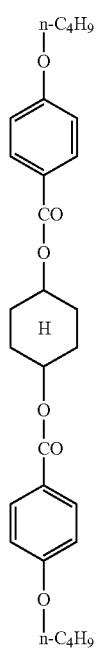
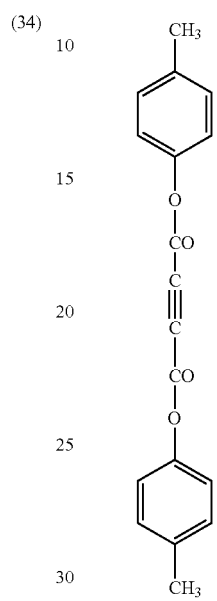
(34)
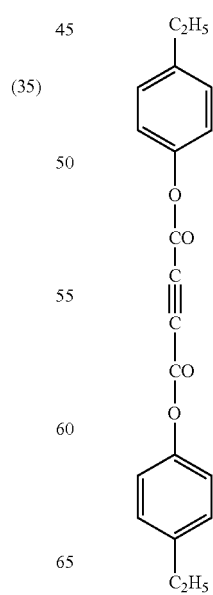
(36)
(35)
(37)

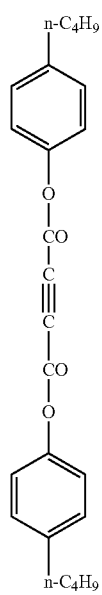 (38)
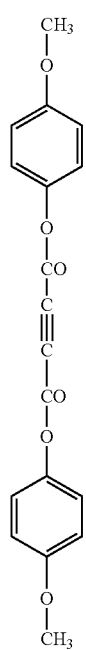 (39)
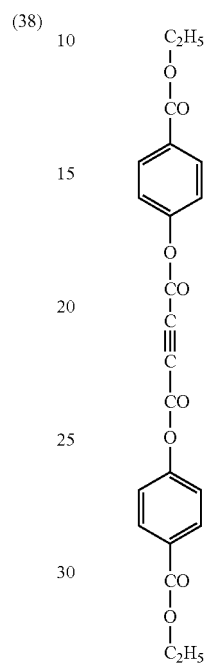 (40)
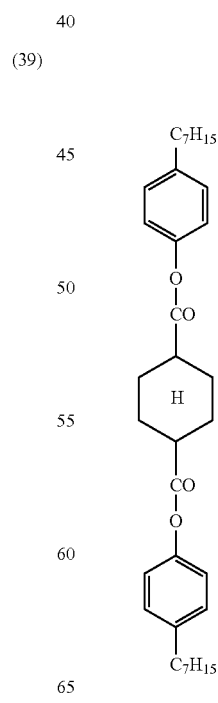 (41)

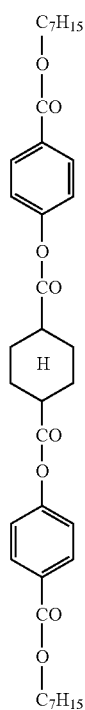
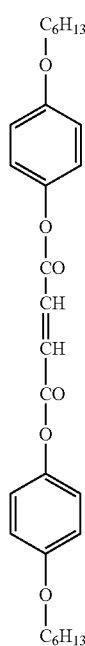
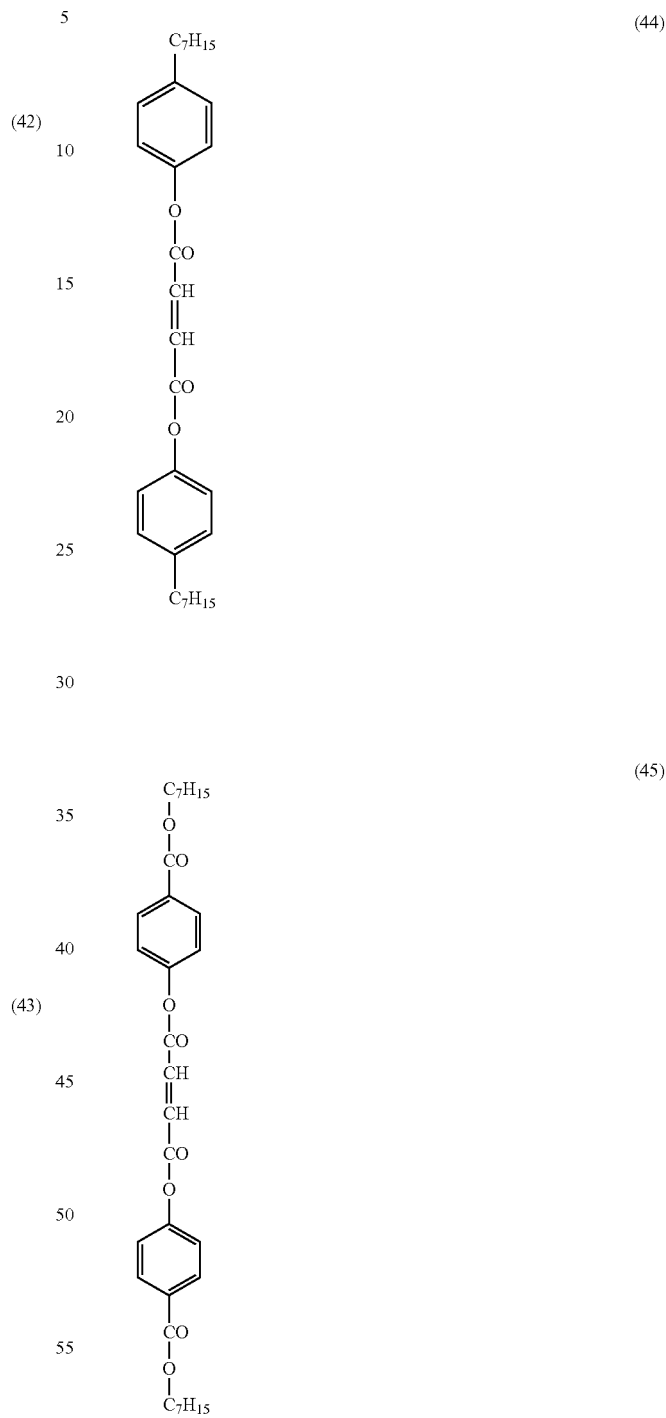

The specific examples (1) to (34), (41) and (42) each have two asymmetrical carbon atoms in the 1-position and 4-position of cyclohexane ring. However, the specific examples (1), (4) to (34), (41) and (42) each have a symmetrical meso type molecular structure and thus have no optical isomers (optically active) but only geometrical isomers (trans form and cis form). A trans form (1-trans) and a cis form (1-cis) of specific example (1) will be shown below.

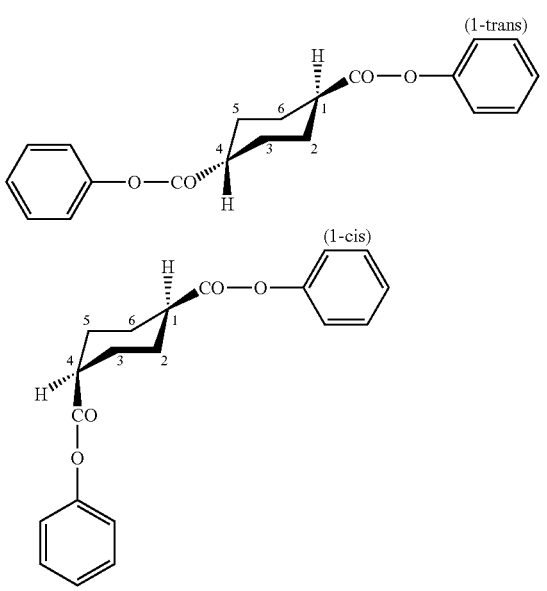

As previously mentioned, the rod-shaped compound preferably has a linear molecular structure. Therefore, trans form is preferred to cis form.

The specific examples (2) and (3) each have optical isomers (four isomers in total) besides geometrical isomers. As the geometrical isomer, too, there is preferably used trans form rather than cis form. As the optical isomer there may be used any of D, L and racemate, which compare favorably with each other.

The specific examples (43) to (45) each have central vinylene bond in both trans and cis forms. For the same reasons as mentioned above, trans form is preferred to cis form.

Other preferred compounds will be given below.

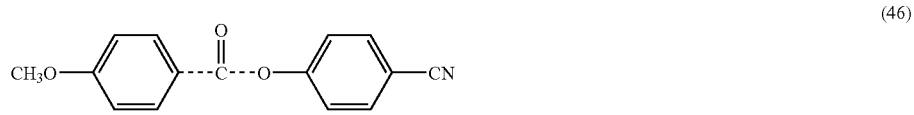

(46)

(47)

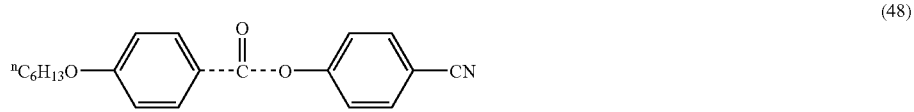

(48)

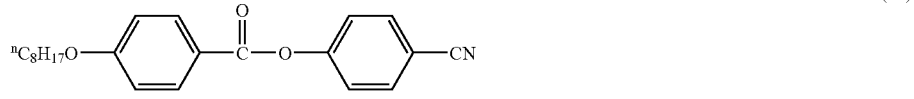

(49)

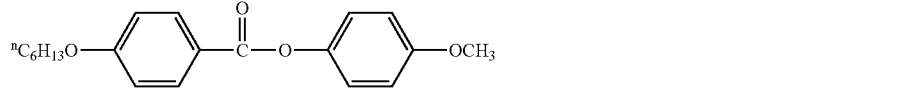

(50)

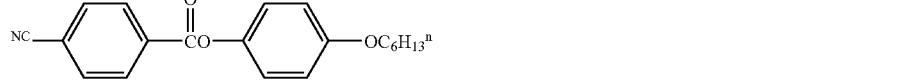

(51)

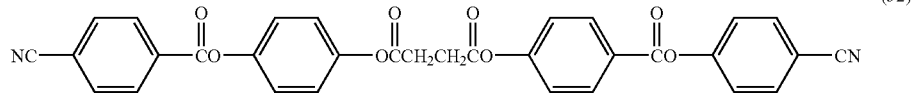

(52)

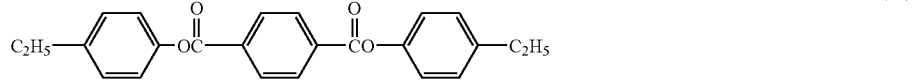

(53)

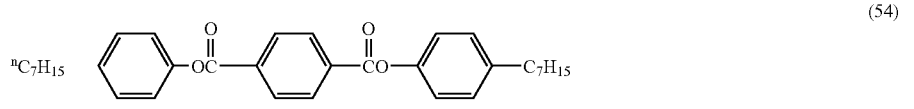

(54)

-continued

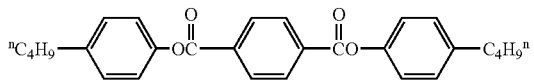
(55)

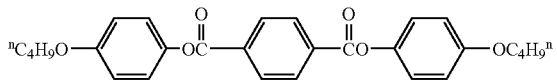
(56)

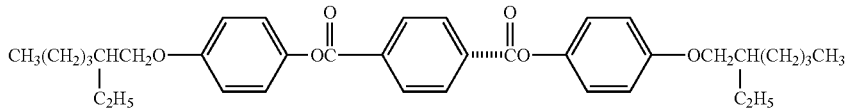
(57)

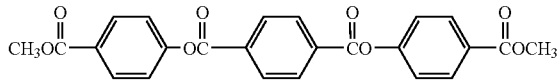
(58)

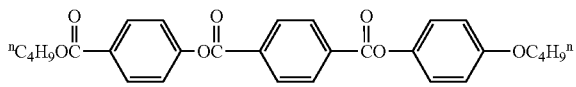
(59)

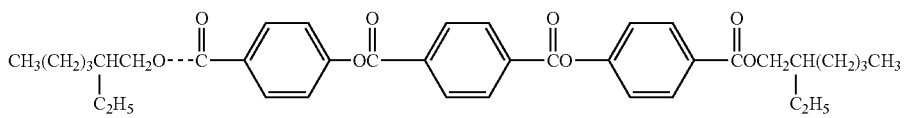
(60)

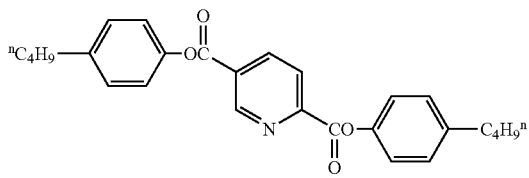
(61)

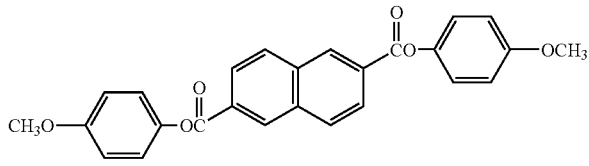
(62)

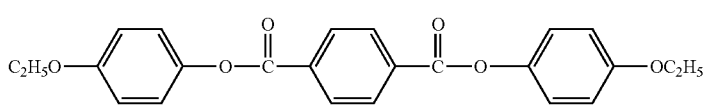
(63)

Two or more rod-shaped compounds having a maximum absorption wavelength (λmax) of shorter than 250 nm on ultraviolet absorption spectrum in solution may be used in combination.

The rod-shaped compound can be synthesized according to a method disclosed in references. Examples of these references include "Mol. Cryst. Liq. Cryst.", vol. 53, page 229 (1979), vol. 89, page 93 (1982), vol. 145, page 111 (1987), vol. 170, page 43 (1989), "J. Am. Chem. Soc.", vol. 113, page 1,349 (1991), vol. 118, page 5,346 (1996), vol. 92, page 1,582 (1970), "J. Org. Chem.", vol. 40, page 420 (1975), and "Tetrahedron", vol. 48, No. 16, page 3,437 (1992).

The added amount of the retardation raising agent is preferably from 0.1 to 30% by mass, more preferably from 0.5 to 20% by mass based on the amount of the polymer.

The aromatic compound is used in an amount of from 0.01 to 20 parts by mass, preferably from 0.05 to 15 parts by mass, more preferably from 0.1 to 10 parts by mass based on 100 parts by mass of cellulose acylate. Two or more aromatic compounds may be used in combination.

The cellulose acylate film is preferably subjected to surface treatment. Examples of the surface treatment include corona discharge treatment, glow discharge treatment, flame treatment, acid treatment, alkaline saponification, and ultraviolet irradiation. For the details of surface treatment, reference can be made to Japan Institute of Invention and Innovation's Kokai Giho 2001-1745, pp. 30-32.

The alkaline saponification is carried out by dipping the cellulose acylate film in a saponifying solution or spreading the saponifying solution over the cellulose acylate film. The spreading method is preferably used. Examples of the spreading method include dip coating method, curtain coating method, extrusion coating method, bar coating method, and E type coating method. The alkali to be used herein is preferably a hydroxide of alkaline metal (e.g., potassium, sodium). In other words, the alkaline treatment solution is preferably a solution of a hydroxide of an alkaline metal. The concentration of hydroxide ions in the solution is preferably from 0.1 to 3.0 mol/l. A solvent having good wetting properties with respect to film, a surface active agent and a wetting agent (e.g., diol, glycerin) may be incorporated in the alkaline treatment solution to improve the wetting properties of the alkaline treatment solution with respect to the second optical anisotropic layer and the stability of the alkaline treatment solution. Preferred examples of the solvent having good wetting properties with respect to film include alcohols (e.g., isopropyl alcohol, n-butanol, methanol, ethanol). For the details of additives for alkaline treatment solution, reference can be made to JP-A-2002-82226 and International Patent Application 02/46809 (pamphlet).

An undercoat layer (as disclosed in JP-A-7-333433) may be provided in place of or in addition to surface treatment. A plurality of undercoat layers may be provided. For example, a polymer layer containing both hydrophobic and hydrophilic groups may be provided as a first undercoat layer. A hydrophilic polymer layer which can be fairly adhered to the alignment film may be provided on the first undercoat layer as a second undercoat layer (as disclosed in JP-A-11-248940).

(Alignment Film)

The alignment film can be provided by any method such as method involving rubbing of an organic compound (preferably polymer), method involving oblique vacuum deposition of an inorganic compound, method involving formation of a layer having microgrooves and method involving accumulation of an organic compound (e.g., ω-tricosanic acid, dioctadecylmethyl ammonium chloride, methyl stearate) by Langmure-Blodgett method (LB film). Also known is an alignment capable of aligning when given an electric field or magnetic field or irradiated with light.

The alignment film is preferably formed by rubbing a polymer. Principally speaking, the polymer to be used in the alignment film has a molecular structure capable of aligning liquid crystal molecules. The polymer to be used in the alignment film preferably is also capable of fixing the alignment of the liquid crystal molecules in addition to capability of aligning the liquid crystal molecules. For example, side chains having a crosslinkable functional group (e.g., double bond) are preferably bonded to the main chain of the polymer. Alternatively, a crosslinkable functional group capable of aligning the liquid crystal molecules is preferably incorporated in the side chains of the polymer. The polymer to be used in the alignment film is preferably crosslinkable itself or is preferably rendered crosslinkable in the presence of a crosslinking agent. For the details of the crosslinkable polymer, reference can be made to JP-A-8-338913, paragraph [0022]. Examples of the crosslinkable polymer include polymethacrylates, polystyrenes, polyolefins, polyvinyl alcohols, modified polyvinyl alcohols, poly(N-methylolacrylamide), polyesters, polyimides, polyvinyl acetates, carboxymethyl celluloses, polycarbonates, and copolymers thereof. Silane coupling agents may be used as the polymer. Water-soluble polymers (e.g., poly(N-methylolacrylamide), carboxymethyl cellulose, gelatin, polyvinyl alcohol, modified polyvinyl alcohol) are preferably used. More desirable among these water-soluble polymers are gelatin, polyvinyl alcohol, and modified polyvinyl alcohol. Most desirable among these water-soluble polymers are polyvinyl alcohol and modified polyvinyl alcohol. It is particularly preferred that two or more polyvinyl alcohols or modified polyvinyl alcohols having different polymerization degrees be used in combination.

The percent saponification of the polyvinyl alcohol is preferably from 70% to 100%, more preferably from 80% to 100%. The polymerization degree of the polyvinyl alcohol is preferably from 100 to 5,000. The side chains capable of aligning the liquid crystal molecules normally have a hydrophobic group as a functional group. The kind of specific functional groups to be used herein is determined depending on the kind of the liquid crystal molecules and the required alignment. The modifying group in the modified polyvinyl alcohol can be introduced by copolymerization modification, chain transfer modification or block polymerization modification. Examples of the modifying group include hydrophilic groups (e.g., carboxylic acid group, sulfonic acid group, phosphonic acid group, amino, ammonio, amide, thiol), $C_{10}$-$C_{100}$ hydrocarbons, fluorine-substituted hydrocarbon groups, alkylthio groups, polymerizable groups (e.g., unsaturated polymerizable group, epoxy group, azirinidyl group), and alkoxysilyl groups (trialkoxysilyl, dialkoxysilyl, monoalkoxysilyl). For the details of modified polyvinyl alcohols, reference can be made to JP-A-2000-155216 and JP-A-2002-62426.

By bonding side chains having a crosslinkable functional group to the main chain of the polymer of the alignment film or introducing a crosslinkable functional group into the side chains capable of aligning the liquid crystal molecules, the polymer of the alignment film and the polyfunctional monomers contained in the first optical anisotropic layer can be copolymerized with each other. As a result, not only the polyfunctional monomers but also the alignment film polymers and the polyfunctional monomer and the alignment film polymer can be firmly bonded to each other. Accordingly, by introducing a crosslinkable functional group into the polymer of the alignment film, the strength of the optical compensation film can be remarkably enhanced. For the details of crosslinkable functional group having preferred polymerizable group to be used in the alignment film, reference can be made to JP-A-2000-155216, paragraphs [0080]-[0100] as in the polyfunctional monomer.

The polymer of the alignment film can be crosslinked with a crosslinking agent separately of the crosslinkable functional group. Examples of the crosslinking agent employable herein include aldehydes, N-methylol compounds, dioxane derivatives, compounds which activate carboxyl group to act, active vinyl compounds, active halogen compounds, isooxazole, and dialdehyde starch. Two or more crosslinking agents may be used in combination. For the details of crosslinking agent, reference can be made to JP-A-2002-62426. Aldehydes having a high reaction activity, particularly glutaraldehyde, are preferably used. The added amount of crosslinking agent is preferably from 0.1 to 20% by mass, more preferably from 0.5 to 15% by mass based on the weight of polymer. The amount of unreacted crosslinking agent left in the alignment film is preferably 1.0% by mass or less, more preferably 0.5% by mass or less. By reducing the residual amount of crosslinking agent, a sufficient durability free from reticulation can be obtained against prolonged use of liquid crystal display even in high temperature and humidity atmosphere.

The alignment film can be formed by spreading a coating solution containing the aforementioned polymer and crosslinking agent over the second optical anisotropic layer, heating and drying (crosslinking) the coated material, and then subjecting the coated material to rubbing. The crosslinking reaction is effected after the spreading of the coating solution over the second optical anisotropic layer. In the case where a water-soluble polymer such as polyvinyl alcohol is used as an alignment film-forming material, the coating solution is preferably composed of a mixture of an anti-foaming organic solvent (e.g., methanol) and water. In the case of a mixture of water and methanol, the content of methanol in the total amount of solvents is preferably 1% by mass or more, more preferably 9% by mass or more. By adding an organic solvent, foaming is suppressed, making it possible to remarkably reduce surface defects of the alignment film and the first optical anisotropic layer.

Preferred examples of the method of spreading the alignment film coating solution include spin coating method, dip coating method, curtain coating method, extrusion coating method, rod coating method, and roll coating method. The rod coating method is particularly preferred. The dry thickness of the coat layer is preferably from 0.1 μm to 10 μm. The heating/drying step can be effected at a temperature of from 20° C. to 110° C. In order to attain sufficient crosslinking, the heating/drying step is effected at a temperature of from 60° C. to 100° C., more preferably from 80° C. to 100° C. The drying time may be from 1 minute to 36 hours, preferably from 1 to 30 minutes. The pH value is preferably predetermined to a value optimum for the crosslinking agent used. If glutaraldehyde is used, the pH value is preferably from 4.5 to 5.5.

The alignment film can be obtained by subjecting the polymer to surface rubbing. The rubbing treatment is the same as that widely employed at LCD liquid crystal alignment step. In other words, by rubbing the surface of the alignment film with paper, gauze, felt, rubber, nylon fiber or polyester fiber in a predetermined direction, alignment can be established. In general, rubbing is effected by several times with a cloth obtained by uniformly plating fibers having uniform length and thickness.

(Polarizing Plate)

The second optical anisotropic layer and the first optical anisotropic layer are stuck to a polarizing film to form a polarizing plate. Examples of the polarizing film include aligned polarizing film and coated polarizing film (produced by Optiva Inc.). The aligned polarizing film is composed of a binder and iodine or dichroic dye. Iodine and dichroic dye are aligned in the binder to perform polarizing properties. Iodine and dichroic dye are preferably aligned along the binder molecules. Alternatively, dichroic dye is preferably aligned in one direction by self-structuring as performed in liquid crystal. Commercially available aligned polarizing films are prepared by dipping a stretched polymer in an iodine or dichroic dye solution in a tank so that the binder is impregnated with iodine or dichroic dye. A commercially available polarizing film has iodine or dichroic dye distributed therein over the region extending from the surface of the polymer to a depth of about 4 μm (about 8 μm in total on both sides). In order to obtain sufficient polarizing properties, at least 10 μm thickness is needed. The penetration of iodine and dichroic dye can be controlled by the concentration of the iodine and dichroic dye solution, the tank temperature and the dipping time. The thickness of the polarizing film is preferably not greater than that of commercially available polarizing plates (about 30 μm), more preferably 25 μm or less, most preferably 20 μm or less. When the thickness of the polarizing plate is 20 μm or less, light leakage can be no longer observed with 17-inch liquid crystal displays.

The binder in the polarizing film may be crosslinked. As the polarizing film binder there may be used a polymer which is crosslinkable itself. A polymer having a functional group or a polymer having a functional group incorporated therein can be irradiated with light or given heat or pH change, the functional group is reacted so that the polymers are crosslinked to form a polarizing film. Alternatively, a crosslinking agent may be used to introduce a crosslinked structure into the polymer. A crosslinking agent which is a compound having a high reaction activity may be used to introduce a linkage group derived from crosslinking agent between the binders so that the binder molecules are crosslinked to form a polarizing film. Crosslinking can be normally effected by spreading a coating solution containing a crosslinkable polymer or a mixture thereof with a crosslinking agent over a transparent support, and then heating the coated material. Since it suffices if the desired durability of the final commercial product is assured, the crosslinking treatment may be effected at any step up to the point at which the final polarizing plate product is obtained.

As the binder of the polarizing film there may be used a polymer which is crosslinkable itself or a polymer which is crosslinked with a crosslinking agent. Examples of the polymer employable herein include polymethyl methacrylates, polyacrylic acids, polymethacrylic acids, polystyrenes, polyvinyl alcohols, modified polyvinyl alcohols, poly(N-methylol acrylamide), polyvinyl toluenes, chlorosulfonated polyethylenes, nitrocelluloses, chlorinated polyolefins (e.g., polyvinyl chloride), polyesters, polyimides, polyvinyl acetates, polyethylenes, carboxymethyl celluloses, polypropylenes, polycarbonates, and copolymers thereof (e.g., acrylic acid/methacrylic acid copolymer, styrene/maleimide copolymer, styrene/vinyl toluene copolymer, vinyl acetate/vinyl chloride copolymer, ethylene/vinyl acetate copolymer). Water-soluble polymers (e.g., poly (N-methylolacrylamide), carboxymethyl cellulose, gelatin, polyvinyl alcohol, polyvinyl alcohol, modified polyvinyl alcohol) are preferably used. Gelatin, polyvinyl alcohols and modified polyvinyl alcohols are more preferably used. Polyvinyl alcohols and modified polyvinyl alcohols are most preferably used.

The percent saponification of the polyvinyl alcohol and modified polyvinyl alcohol is preferably from 70% to 100%, more preferably from 80% to 100%, most preferably from 95% to 100%. The polymerization degree of the polyvinyl alcohol is preferably from 100 to 5,000. The modified polyvinyl alcohol is obtained by introducing a modifying group into a polyvinyl alcohol by copolymerization modification, chain transfer modification or block polymerization modification. Examples of the modifying group to be introduced in copolymerization include —COONa, —Si(OX)$_3$ (in which X represents a hydrogen atom or alkyl group), —N(CH$_3$)$_3$.Cl, —C$_9$H$_{19}$, —COO, —SO$_3$Na, and —C$_{12}$H$_{25}$. Examples of the modifying group introduced by chain transfer include —COONa, —SH and —SC$_{12}$H$_{25}$. The polymerization degree of the modified polyvinyl alcohol is preferably from 100 to 3,000. For the details of modified polyvinyl alcohols, reference can be made to JP-A-8-338913, JP-A-9-152509 and JP-A-9-316127. An unmodified polyvinyl alcohol and an alkylthio-modified polyvinyl alcohol having a percent saponification of from 85% to 95% are particularly preferred. Two or more polyvinyl alcohols and modified polyvinyl alcohols may be used in combination.

For the details of crosslinking agents, reference can be made to U.S. Reissued patent 23,297. Boron compounds (e.g., boric acid, borax) may be used as crosslinking agent. When the binder crosslinking agent is added in a large amount, the heat moisture resistance of the polarizing film can be enhanced. However, when the crosslinking agent is added in an amount of 50% by mass or more based on the weight of binder, the alignability of iodine or dichroic dye is deteriorated. The added amount of the crosslinking agent is preferably from 0.1 to 20% by mass, more preferably from 0.5 to 15% by mass based on the binder. The binder contains unreacted crosslinking agent in some amount even after the termination of the crosslinking reaction. However, the amount of remaining crosslinking agent is preferably 1.0 parts by mass or less, more preferably 0.5% by mass or less based on the binder. When the crosslinking agent is incorporated in the binder in an amount of more than 1.0% by mass, there are some cases where durability problem arises. In other words, when a liquid crystal display comprising a polarizing film having a large residual amount of a crosslinking agent incorporated therein is used or allowed to stand in a high temperature and humidity atmosphere over an extended period of time, the deterioration of polarization can occur.

Examples of dichroic dye employable herein include azo-based dyes, stilbene-based dyes, pyrazolone-based dyes, triphenylmethane-based dyes, quinoline-based dyes, oxazine-based dyes, thiazine-based dyes, and anthraquinone-based dyes. The dichroic dye is preferably water-soluble. The dichroic dye preferably has a hydrophilic substituent (e.g., sulfo, amino, hydroxyl). Specific examples of the dichroic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. For the details of dichroic dyes, reference can be made to JP-A-1-161202, JP-A-1-172906, JP-A-1-172907, JP-A-1-183602, JP-A-1-248105, JP-A-1-265205, and JP-A-7-261024.

The dichroic dye is used in the form of free acid or salt (e.g., alkaline metal salt, ammonium salt, amine salt). A polarizing film having various hues can be produced by blending two or more dichroic dyes. A polarizing film comprising a compound (dye) which assumes black when the polarizing axes cross each other or a polarizing film having various dichroic dyes blended so as to assume black is excellent in single plate transmission and percent polarization.

In the polarizing film, the binder is stretched in the longitudinal direction (MD direction) of the polarizing film (stretching method). Alternatively, the binder thus rubbed is dyed with iodine and dichroic dye (rubbing method). In the case of stretching method, the draw ratio is preferably from 2.5 to 30.0, more preferably from 3.0 to 10.0. Stretching may be effected in the air in a dry process. Alternatively, wet stretching may be effected in water. The draw ratio during dry stretching is preferably from 2.5 to 5.0. The draw ratio during wet stretching is preferably from 3.0 to 10.0. Stretching may be effected batchwise in several portions. By stretching the binder batchwise in several portions, the binder can be uniformly stretched even if the draw ratio is high. Before the full stretching, the binder may be somewhat crosswise or longitudinally stretched (to an extent such that the crosswise shrinkage can be prevented).

From the standpoint of yield, the binder is preferably stretched at an angle of from 10° to 80° with respect to longitudinal direction. In this case, stretching can be accomplished by effecting tenter stretching in biaxial stretching at steps which differ from right edge to left edge. The aforementioned biaxial stretching is the same as the stretching to be effected in ordinary film forming. In the biaxial stretching process, stretching is effected at a rate which differs from right edge to left edge. It is thus necessary that the thickness of the unstretched binder film differ from right edge to left edge. In the cast film-forming method, the die can be tapered to make the flow rate of the binder solution different from right to left. Stretching is preferably effected such that the tilt angle coincides with the angle of the transmission axis of the two sheets of polarizing plates stacked on the respective side of the liquid crystal cell constituting the liquid crystal display with respect to the longitudinal or crosswise direction of the liquid crystal cell. The tilt angle is normally 45°. However, transmission type, reflection type and semi-transmission type liquid crystal displays the tilt angle of which is not necessarily 45° have been recently developed. It is thus preferred that the stretching direction be arbitrarily adjusted according to the design of the liquid crystal display.

In this manner, a binder film which is stretched obliquely at an angle of from 10° to 80° with respect to MD direction of the polarizing film is produced.

As the rubbing method there may be applied a rubbing method which is widely used as step of aligning liquid crystal molecules in liquid crystal displays. In some detail, the surface of the film is rubbed with paper, gauze, felt, rubber or nylon or polyester fiber in a predetermined direction to attain alignment. In general, rubbing is carried out by rubbing the material several times with a cloth woven uniformly by fibers having a uniform length and thickness. A rubbing roll having a roundness, cylindricalness and deflection (eccentricity) of 30 μm is preferably used to perform rubbing. The lapping angle of the film on the rubbing roll is preferably from 0.1° to 90°. As disclosed in JP-8-160430, the film can be wound up for 360° or more on the rubbing roll to attain stable rubbing. In order to subject a film of continuous length to rubbing, the film is preferably conveyed with a constant tension at a rate of from 1 to 100 m/min over a conveying device. The rubbing roll is preferably arranged so as to freely rotate parallel to the moving direction of the film to attain arbitrary predetermination of rubbing angle. The rubbing angle is preferably predetermined within a range of from 0° to 60°. When the polarizing film is incorporated in a liquid crystal display, the rubbing angle is preferably from 40° to 50°, particularly preferably 45°.

A protective film is preferably provided on the both sides of the polarizing film. As one of the protective film there is preferably used a part of rolled optical compensation film. For example, a laminate obtained by superposing a protective film, polarizing film, a second optical anisotropic layer and a first optical anisotropic layer in this order or a protective film, polarizing film, second optical anisotropic layer, an alignment layer and a first optical anisotropic layer in this order is preferably used. The polarizing film may be stuck to the front surface of the first optical anisotropic layer. Sticking may be made with an adhesive. As such an adhesive there may be used a polyvinyl alcohol-based resin (including acetoacetyl group-, sulfonic acid group-, carboxyl group- or oxyalkylene group-modified polyvinyl alcohol) or an aqueous solution of boron compound. A polyvinyl alcohol-based resin is preferably used. The dried thickness of the adhesive layer is preferably from 0.01 μm to 10 μm, more preferably from 0.05 μm to 5 μm. A light-diffusion film or anti-glare film may be stuck to the surface of the polarizing plate.

(Light-Diffusion or Anti-Glare Film)

Figure 4:
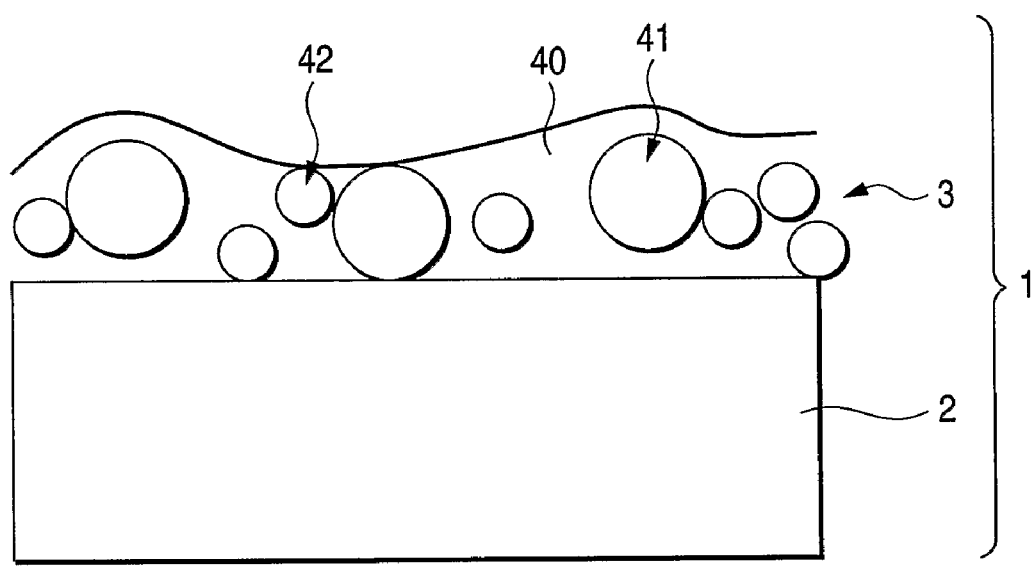
FIG. 4 is a diagrammatic sectional view illustrating a representative embodiment of light-diffusion film.

FIG. 4 is a diagrammatic sectional view illustrating a representative embodiment of the light-diffusion film.

A light-diffusion film (1) shown in FIG. 4 comprises a transparent substrate film (2) and a light-diffusion layer (3) stacked therein, the light-diffusion layer (3) having a first light-transmitting particulate material (41) and a second light-transmitting particulate material (42) incorporated in a light-transmitting resin (40). While the present embodiment is described with reference to two light-transmitting particulate materials (having different refractive indexes) having two peaks of particle diameter distribution, the same light-transmitting particulate material (having the same refractive index) having two peaks of particle diameter distribution may be used or one light-transmitting particulate material may be used.

The first light-transmitting particulate material (41) is composed of a light-transmitting resin such as particulate silica (average particle diameter: 1.0 μm; refractive index:

1.51). The second light-transmitting particulate material (42) is composed of a light-transmitting resin such as styrene bead (average particle diameter: 3.5 μm; refractive index: 1.61). The light-diffusion capacity can be obtained by the difference in refractive index between the light-transmitting particulate material (41 and 42) and the light-transmitting resin (40). The difference in refractive index between the light-transmitting particulate material (41 and 42) and the light-transmitting resin (40) is preferably from not smaller than 0.02 to not greater than 0.15. When the difference in refractive index falls below 0.02, the desired light-diffusing effect cannot be obtained. When the difference in refractive index exceeds 0.15, the resulting light-diffusing effect is too high, occasionally causing the whitening of the entire film. The difference in refractive index is more preferably from not smaller than 0.03 to not greater than 0.13, most preferably from not smaller than 0.04 to not greater than 0.10.

In the case where a polarizing film is used in a liquid crystal display, an anti-reflection layer is preferably provided on the viewing side surface thereof. The anti-reflection layer may act also as a protective layer for the viewing side of the polarizing film. In order to suppress the change of tint of the liquid crystal display with viewing angle, the inner haze of the anti-reflection layer is preferably predetermined to be 50% or more. For the details of anti-reflection layer, reference can be made to JP-A-2001-33783, JP-A-2001-343646 and JP-A-2002-328228.

(OCB Mode Liquid Crystal Display)

An OCB mode liquid crystal cell is a liquid crystal cell of bend alignment mode wherein rod-shaped liquid crystal molecules are oriented in substantially opposing directions (symmetrically) from the upper part to the lower part of the liquid crystal cell. For the details of liquid crystal display comprising a bend alignment mode liquid crystal cell, reference can be made to U.S. Pat. Nos. 4,583,825 and 5,410,422. In the OCB mode liquid crystal cell, rod-shaped liquid crystal molecules are aligned symmetrically with each other from the upper part to the lower part of the liquid crystal cell. Therefore, the bend alignment mode liquid crystal cell has a self optical compensation capacity. Accordingly, this liquid crystal mode is also called OCB (optically compensated bend) liquid crystal mode. Similarly to TN mode liquid crystal cell, OCB mode liquid crystal cell has rod-shaped liquid crystal molecules aligned erected in the central portion thereof and aligned lying in the vicinity of the substrate during black display. The value Δn×d of the liquid crystal cell is preferably from 50 nm to 1,000 nm, more preferably from 500 nm to 1,000 nm.

The evaluation of tint of the liquid crystal display was made on CIE1976 (u'v') chromaticity diagram in the invention. In some detail, the measurement of tit in black state is effected using a Type SR-3 spectral brightness meter (produced by TOPCON Co., Ltd.). Calculation is made in the spectral brightness meter to calculate u'v'. The value v' which represents blue when the black state developed by an ordinary polarizing plate is evaluated is close to 0.45. Thus, the closer to this value v' of the liquid crystal display during black display is, the less is black display problem.

<Third Aspect>

Exemplary embodiments of the third aspect of the invention will be described in connection with the attached drawings.

Figure 5:
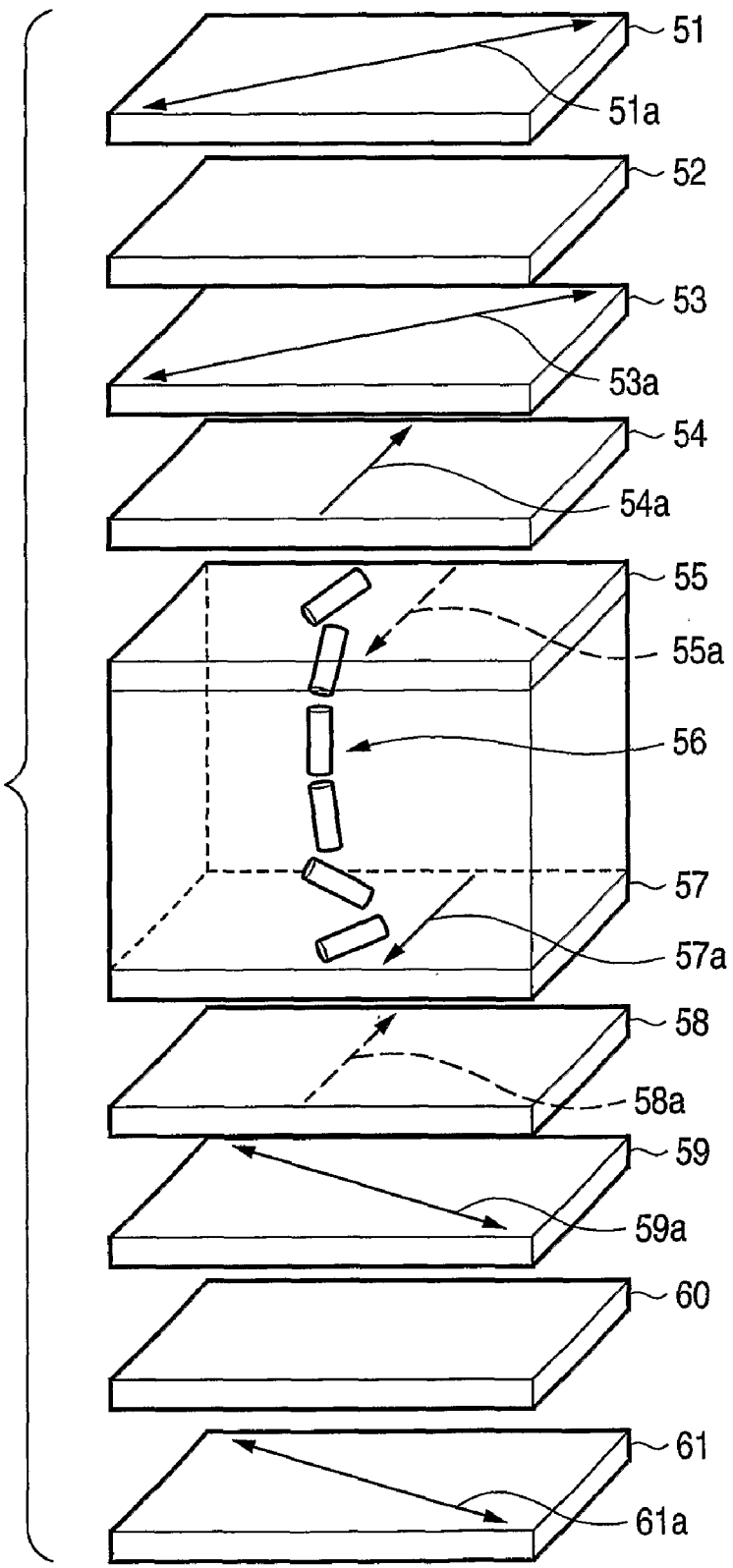
FIG. 5 is a schematic diagram of an exemplary embodiment of the liquid crystal display of the invention.

FIG. 5 depicts a diagrammatic view of an example of the configuration of the liquid crystal display of the invention. The liquid crystal display of OCB mode shown in FIG. 5 has a liquid crystal cell comprising a liquid crystal layer 56 which is bend-aligned with respect to the surface of a substrate upon the application of a voltage, i.e., during black display and upper and lower liquid crystal cell electrode substrates 55 and 57 with the liquid crystal layer 56 provided interposed therebetween. Upper and lower polarizing films 51 and 61 are disposed with the liquid crystal cell interposed therebetween. Disposed between the upper and lower polarizing films 51 and 61 and the liquid crystal are upper and lower first optical anisotropic layers 54 and 58, upper and lower second optical anisotropic layers 53 and 59 and upper and lower third optical anisotropic layers 52 and 60, respectively. The order of the three optical anisotropic layers is not specifically limited. Besides the lamination order shown in FIG. 5, i.e., (polarizing film)→third optical anisotropic layer→second optical anisotropic layer→first optical anisotropic layer→(liquid crystal cell), the lamination order of (polarizing film)→second optical anisotropic layer→third optical anisotropic layer→first optical anisotropic layer→(liquid crystal cell) may be used. In addition to the first to third optical anisotropic layers, fourth and fifth optical anisotropic layers may be provided.

The first to third optical anisotropic layers may be integrally or separately incorporated in the liquid crystal display. Alternatively, two or more of the first to third optical anisotropic layers may be combined to prepare an integrated member which is then incorporated in the liquid crystal display. Alternatively, the first to third optical anisotropic layers may be disposed between the liquid crystal cell and the polarizing film on the display surface side or between the liquid crystal cell and the polarizing film on the back light side. Alternatively, some of the first to third optical anisotropic layers may be disposed on the display surface side and some of the first to third optical anisotropic layers may be disposed on the back light side. In this case, a combination of the first and second optical anisotropic layers is preferably disposed on one side and a combination of the first optical anisotropic layer (1'st) and the third optical anisotropic layer is preferably disposed on the opposite side of the liquid crystal cell.

The upper and lower liquid crystal cell electrode substrates 55 and 57 are subjected to alignment on the liquid crystal surface thereof. The direction of alignment control (rubbing direction) is shown by the arrow (55*a*-57*a*). The first upper optical anisotropic layer 4 and the first lower optical anisotropic layer 8 each are subjected to alignment so that the discotic compound is aligned. The rubbing direction is shown by the arrow (54*a*-58*a*). Among the arrows shown in the drawings, those on the back surface are shown by arrow with broken line.

The upper polarizing film transmission axis 1*a* of the upper polarizing film 51 and the lower polarizing film transmission axis 61*a* of the lower polarizing film 61 are disposed perpendicular to each other and at an angle of 45° with respect to the direction 55*a* of alignment control of the upper liquid cell electrode substrate 55 and the direction 57*a* of alignment control of the lower liquid crystal cell electrode substrate 57.

The direction 54*a* of alignment control of the first upper optical anisotropic layer 57 and the direction 58*a* of alignment control of the first lower optical anisotropic layer 58 are disposed at an angle of 45° with respect to the direction of the upper polarizing film transmission axis 51*a* of the upper polarizing film 1 and the lower polarizing film transmission axis 11*a* of the lower polarizing film 61 so that they are not parallel to the direction 55*a* of alignment control of the upper liquid cell electrode substrate 55 and the direction 57*a* of alignment control of the lower liquid crystal cell electrode substrate 57.

The slow axis 53*a* of the second upper optical anisotropic layer 53 and the slow axis 59*a* of the second lower optical anisotropic layer 59 are disposed parallel to the transmission axis 51a of the upper polarizing film 51 and the transmission axis 61a of the lower polarizing film 61, respectively, and at an angle of 45° with respect to the rubbing direction 55a of the upper liquid crystal cell electrode substrate 55 and the rubbing direction 57a of the lower liquid crystal cell electrode 57, respectively.

The liquid crystal cell comprises the upper liquid crystal cell electrode substrate 55, the lower liquid crystal cell electrode substrate 57 and a liquid crystal layer 56 formed by liquid crystal molecules interposed therebetween. Formed on the surface of the upper liquid crystal cell electrode substrate 55 and the lower liquid crystal cell electrode substrate 57 in contact with the liquid crystal molecules (hereinafter occasionally referred to as "inner surface") is an alignment layer (not shown) by which the liquid crystal molecules are controlled to be aligned parallel to the surface of the alignment layer at a pretilt angle when no or a low voltage is applied thereto. Also formed on the inner surface of the upper liquid crystal cell electrode substrate 5 and the lower liquid crystal cell electrode substrate 57 is a transparent electrode (not shown) capable of applying a voltage to the liquid crystal formed by liquid crystal molecules. In the invention, the product $\Delta n \cdot d$ of the thickness d (μm) of the liquid crystal layer and the refractive index anisotropy $\Delta n$ of the liquid crystal layer is preferably from 0.1 to 1.5 μm, more preferably from 0.2 to 1.5 μm, even more preferably from 0.2 to 1.2 μm, still more preferably from 0.6 to 0.9 μm. When the product $\Delta n \cdot d$ falls within the above defined range, the brightness of white display during the application of voltage for white display is high, making it possible to obtain a display device having a high brightness and contrast. The liquid crystal material to be used herein is not specifically limited. However, in an embodiment wherein an electric field is applied across the upper and lower liquid crystal cell electrode substrates, a liquid crystal material which exhibits a positive anisotropy in dielectric constant so that the liquid crystal molecules respond in parallel to the direction of the electric field is used.

In the case where as the liquid crystal cell there is used an OCB mode liquid crystal cell, a nematic liquid crystal material having a positive anisotropy in dielectric constant, $\Delta n$ of 0.08 and $\Delta \in$ of about 5 may be provided interposed between the upper and lower liquid crystal cell electrode substrates. The thickness d of the liquid crystal layer is not specifically limited. However, in the case where a liquid crystal having properties as defined above is used, the thickness d of the liquid crystal layer may be predetermined to about 5 μm. Since the brightness of white display varies with the product $\Delta n \cdot d$ of the thickness d of the liquid crystal layer and the refractive index anisotropy $\Delta n$ of the liquid crystal layer, the product $\Delta n \cdot d$ during the application of no voltage is preferably predetermined to a range of from 0.6 to 1.5 μm to obtain a sufficient brightness during the application of voltage for white display.

OCB mode liquid crystal displays rarely comprise a chiral material which is normally incorporated in TN mode liquid crystal displays because it deteriorates dynamic response. However, a chiral material is occasionally incorporated in OCB mode liquid crystal devices. In the case of multi-domain structure, a chiral material is useful in the adjustment of alignment of liquid crystal molecules in the region of border of various domains. The multi-domain structure indicates one pixel of liquid crystal display which is divided into a plurality of regions. For example, an OCB mode liquid crystal display having a multi-domain structure exhibits improvements in viewing angle properties such as brightness and color tone to advantage. In some detail, by forming each of pixels by two or more (preferably 4 or 8) regions having different initial alignments of liquid crystal molecules to form an averaged structure, the deviation of brightness or color tone due to viewing angle can be eliminated. The same effect can be exerted also by forming each of pixels by two or more different regions showing continuous change of direction of alignment of liquid crystal molecules upon the application of voltage.

The principle of the image display of the liquid crystal display of FIG. 5 will be described hereinafter.

In the driven state wherein a driving voltage corresponding to black display is applied to the transparent electrode (not shown) of the upper liquid crystal cell substrate 55 and the lower liquid crystal cell substrate 57, the liquid crystal molecules in the liquid crystal layer 56 are bend-aligned to cause the in-plane retardation to be cancelled out by the in-plane retardation of the first upper optical anisotropic layer 54 and the first lower optical anisotropic layer 58. As a result, the polarization of incident light shows little change. Since the upper polarizing film transmission axis 1a and the lower polarizing film transmission axis 61a are disposed perpendicular to each other, the light incident on the lower side (e.g., on the back side electrode) is polarized by the lower polarizing film 61, transmitted by the liquid crystal cell while being kept polarized, and then blocked by the upper polarizing film 51. In other words, the liquid crystal display of FIG. 5 realizes an ideal black display in the driven state. On the contrary, in the driven state wherein a driving voltage corresponding to white display is applied to the transparent electrodes (not shown), the liquid crystal molecules in the liquid crystal layer are bend-aligned in a manner different from that of black display, showing in-plane retardation different from that of black display as viewed from the front. As a result, the in-plane retardation is not cancelled out by the in-plane retardation of the first optical anisotropic layers 54 and 58. Therefore, the incident light changes in its polarization when transmitted by the liquid crystal cell, and then transmitted by the upper polarizing film 51. In other words, white display is provided.

OCB mode liquid crystal displays have heretofore been disadvantageous in that they show a high contrast as viewed on the front but show a low contrast as viewed obliquely. During black display, OCB mode liquid crystal displays show a high contrast obtained by the compensation of the liquid crystal cell and the optical anisotropic layer but show birefringence and rotation of polarizing axis of liquid crystal molecules as viewed obliquely. Further, the angle of crossing of the upper polarizing film transmission axis 1a and the lower polarizing film transmission axis 11a is 90° as viewed on the front but is deviated from 90° as viewed obliquely. In the related art, it has been disadvantageous in that the two factors cause light leakage and hence a lowered contrast as viewed obliquely and compensation cannot be attained in all the wavelength ranges, raising coloration problem.

The invention is characterized by the use of an optical compensation film having such optical properties that the wavelength dispersion of retardation differs from when light is incident in the normal direction to when light is incident in an oblique direction, e.g., an extreme angle of 60° and the positive use of such optical properties of the optical compensation film, whereby light leakage in the horizontal direction during black display and color shift in the horizontal direction can be eliminated at the same time. So far as this principle is used, the scope of the invention is not limited by the display mode of the liquid crystal layer. Therefore, the invention can be used in liquid crystal displays having a liquid crystal layer of any display mode such as VA mode, IPS mode, ECB mode, TN mode, HAN mode and OCB mode.

The liquid crystal display of the invention is not limited to the configuration shown in FIG. 5 and may comprise other members. For example, a color filter may be provided interposed between the liquid crystal cell and the polarizing film. In the case where the liquid crystal display of the invention is used as a transmission type liquid crystal display, a back light having a cold cathode tube, hot cathode tube, light-emitting diode, field emission element or electroluminescent element may be provided on the back side thereof.

Examples of the liquid crystal display of the invention include image direct-viewing type, image projecting type and optical modulation type liquid crystal displays. The invention is particularly advantageous when applied to active matrix liquid crystal displays comprising three or two terminal semiconductor element such as TFT and MIM. Of course, the invention is also advantageous when applied to passive matrix liquid crystal displays such as STN type liquid crystal display called time-shared driving.

The optical properties, raw materials, production method, etc. of the members to be incorporated in the liquid crystal display of the invention will be further described hereinafter focusing on the optical compensation film of the invention.

(Optical Compensation Film)

The optical compensation film of the invention contributes to the expansion of contrast at the viewing angle and the elimination of color shift due to the viewing angle of a liquid crystal display, particularly of OCB mode. The optical compensation film of the invention may be disposed interposed between the polarizing plate on the observer side and the liquid crystal and/or between the polarizing plate on the back side and the liquid crystal cell. For example, the optical compensation film of the invention may be incorporated in the interior of the liquid crystal display as an independent member. Alternatively, the protective film for protecting the polarizing film may be provided with such optical properties so that it can act also as a transparent film which is a member of the polarizing plate to be incorporated in the interior of the liquid crystal display. The optical compensation film of the invention has at least three layers, i.e., first to third optical anisotropic layers. The various members constituting the optical compensation film of the invention will be further described hereinafter.

(First Optical Anisotropic Layer)

The optical anisotropic layer of the invention has a first optical anisotropic layer containing a hybrid-aligned discotic compound. The aforementioned first optical anisotropic layer may be formed directly on the surface of the support or may be formed on an alignment layer formed on the support. Alternatively, a liquid crystal compound layer formed on another substrate may be transferred onto the substrate to which it is then bonded with an adhesive or the like.

The aforementioned first optical anisotropic layer is formed by a composition containing at least one discotic compound (discotic compound). The discotic compound is preferably a discotic liquid crystal compound. However, the compound which is eventually incorporated in the optical anisotropic layer doesn't need to exhibit liquid crystal properties any longer. For example, when the optical anisotropic layer is prepared by a low molecule liquid crystal compound, the low molecular liquid crystal compound may be crosslinked to show liquid crystal properties no longer at the step of forming the optical anisotropic layer.

Examples of the discotic liquid crystal compound employable herein include benzene derivatives disclosed in C. Destrade et al's study report, "Mol. Cryst.", vol. 71, page 111 (1981), truxene derivatives disclosed in C. Destrade et al's study report, "Mol. Cryst.", vol. 122, page 141 (1985) and "Physics lett, A", vol. 78, page 82 (1990), cyclohexane derivatives disclosed in B. Kohne et al's study report, "Angew. Chem.", vol. 96, page 70 (1984), and azacrown-based and phenyl acetylene-based macrocycles disclosed in J. M. Lehn et al's study report, "J. Chem. Commun.", page 1,794 (1985) and J. Zhang et al's study report, "J. Am. Chem. Soc.", vol. 116, page 2,655 (1994).

The aforementioned discotic liquid crystal compound may be also a liquid crystal compound arranged such that the straight-chain alkyl group, alkoxy group or substituted benzoyloxy group substitutes on the central nucleus of molecule radially as straight-chain of nucleus. The discotic liquid crystal compound preferably comprises molecules or molecule aggregates having rotational symmetry that can be aligned specifically.

As mentioned above, when a liquid crystal compound is used to form an optical anisotropic layer, the compound which is eventually incorporated in the optical anisotropic layer doesn't need to exhibit liquid crystal properties any longer. For example, in the case where the low molecular discotic liquid crystal compound has a group that reacts when heated or irradiated with light to cause polymerization or crosslinking of the molecules to a polymer as an optical anisotropic layer, the compound incorporated in the optical anisotropic layer may lose its liquid crystal properties. Preferred examples of the discotic liquid crystal compound employable herein include those disclosed in JP-A-8-50206. For the details of the polymerization of discotic liquid crystal compound, reference can be made to JP-A-8-27284.

In order to fix the discotic liquid crystal compound by polymerization, it is necessary that a polymerizable group be connected to the discotic core of the discotic liquid crystal compound as a substituent. However, when a polymerizable group is directly connected to the discotic core, it is difficult to keep the liquid crystal compound aligned during the polymerization reaction. In order to solve this problem, a connecting group is incorporated in between the discotic core and the polymerizable group. Accordingly, the discotic liquid crystal compound having a polymerizable group is preferably a compound represented by the following formula (IV):

$$D(\text{-L-Q})_{n1}$$

wherein D represents a discotic core; L represents a divalent connecting group; Q represents a polymerizable group; and n1 represents an integer of from 4 to 12.

Examples of the discotic core (D) will be given below. In the following examples, LQ (or QL) indicates a combination of a divalent connecting group (L) and a polymerizable group (Q).

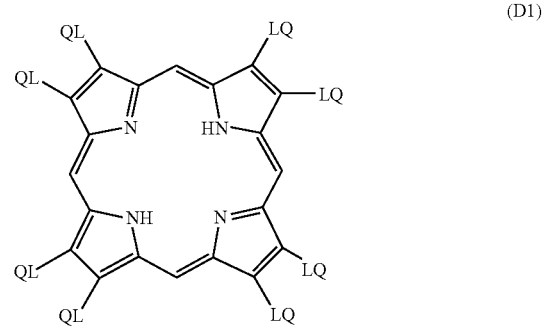

(D1)

-continued
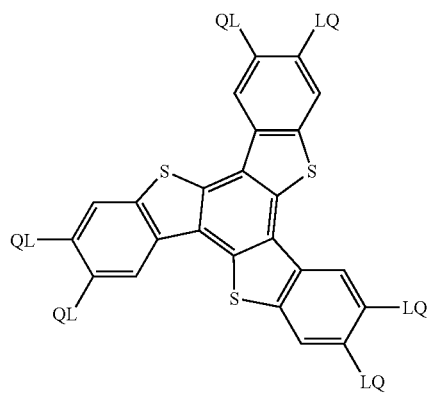
(D2)
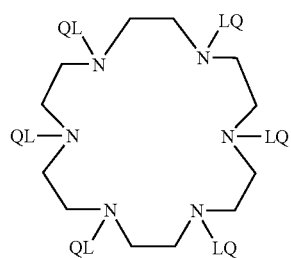
(D3)
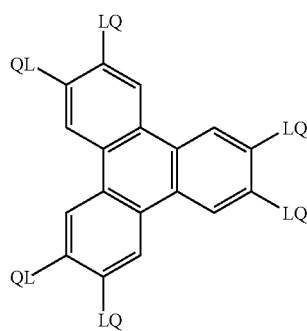
(D4)
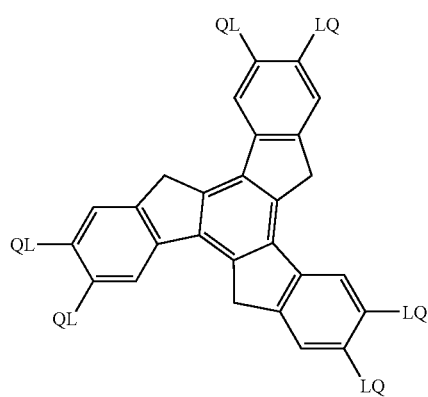
(D5)
-continued
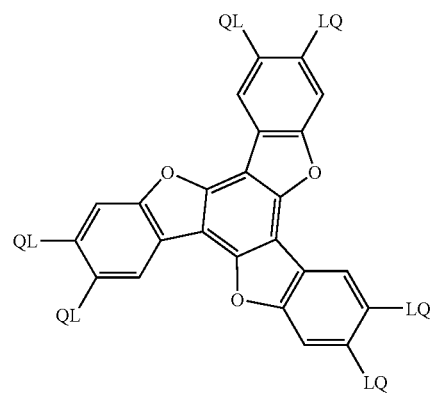
(D6)
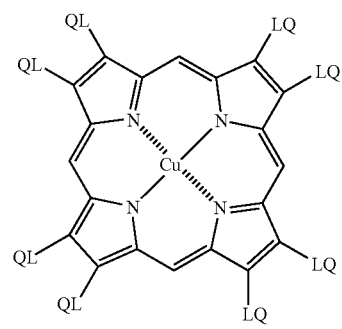
(D7)
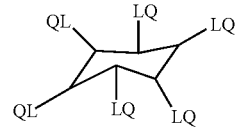
(D8)
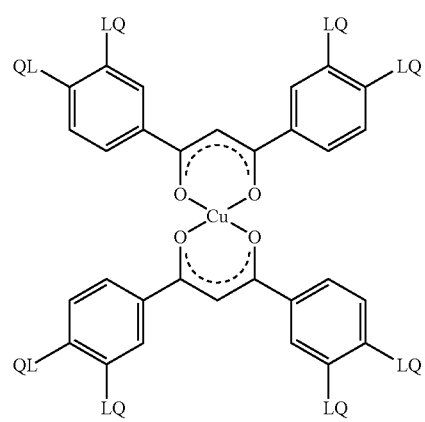
(D9)
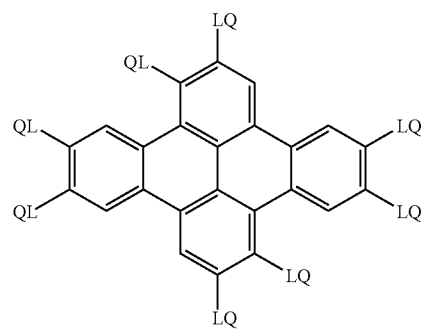
(D10)

-continued (D11)

(D12)

(D13)

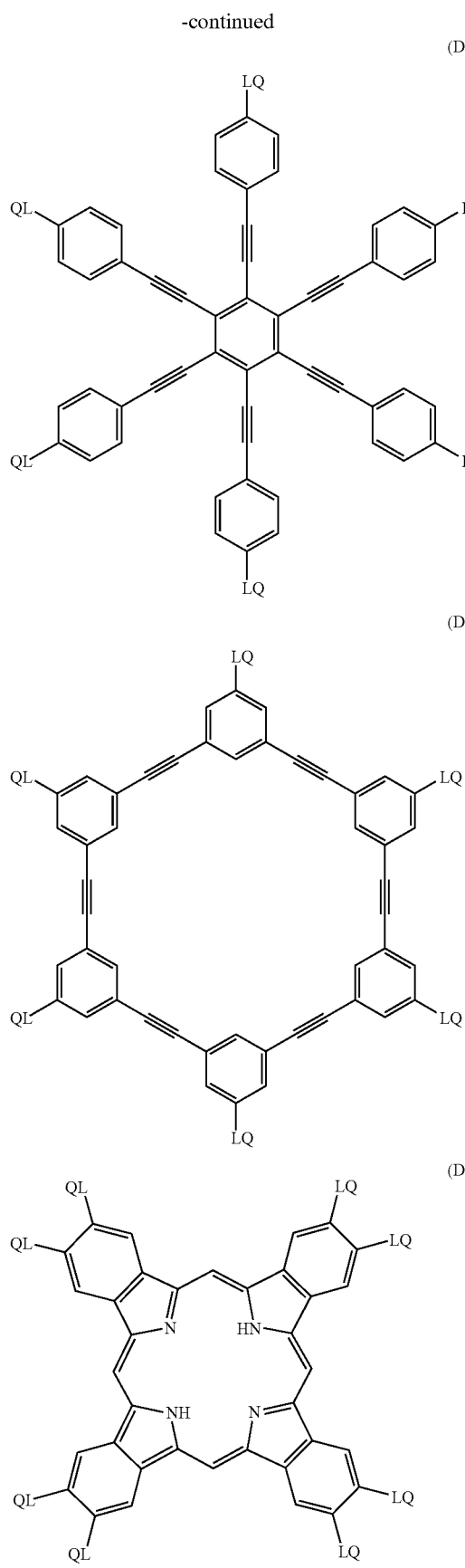

-continued (D14)

(D15)

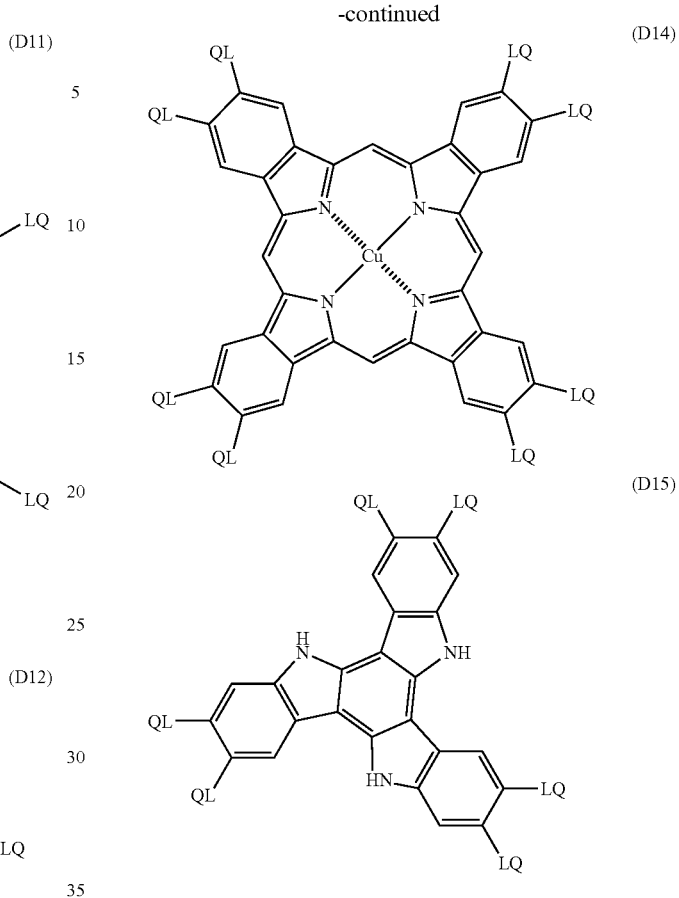

In the formula (IV), the divalent connecting group (L) is preferably a divalent connecting group selected from the group consisting of alkylene group, alkenylene group, arylene group, —CO—, —NH—, —O—, —S— and combination thereof. The divalent connecting group (L) is more preferably a divalent connecting group obtained by combining at least two divalent groups selected from the group consisting of alkylene group, arylene group, —CO—, —NH—, —O— and —S—. The divalent connecting group (L) is even more preferably a divalent connecting group obtained by combining at least two divalent groups selected from the group consisting of alkylene group, arylene group, —CO— and —O—. The aforementioned alkylene group preferably has from 1 to 12 carbon atoms. The aforementioned alkenylene group preferably has from 2 to 12 carbon atoms. The aforementioned arylene group preferably has from 6 to 10 carbon atoms.

Examples of the divalent connecting group (L) will be given below. The divalent connecting group is connected to the discotic core (D) on the left side thereof and to the polymerizable group (Q) on the right side thereof. AL indicates an alkylene group or alkenylene group and AR represents an arylene group. The alkylene group, alkenylene group and arylene group may have substituents (e.g., alkyl group).

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—

L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (Q) in the formula (IV) can be determined depending on the kind of the polymerization reaction. The polymerizable group (Q) is preferably an unsaturated polymerizable group or epoxy group, more preferably an unsaturated polymerizable group, most preferably an ethylenically unsaturated polymerizable group.

In the formula (IV), n represents an integer of from 4 to 12. The detailed figure of n is determined depending on the kind of the discotic core (D). The plurality of combinations of L and Q may be different but is preferably the same.

In the invention, the aforementioned discotic compound molecules in the aforementioned first optical anisotropic layer are fixed in hybrid alignment. The average direction of alignment of axis of symmetry of the discotic compound molecules on the interface on the support side thereof crosses the in-plane slow axis of the support at an angle of about 45°. The term "about 45°" as used herein is meant to indicate an angle falling within a range of 45°±5°, preferably from 42° to 48°, more preferably from 43° to 47°. The average direction of axis of symmetry of discotic compound molecules in the aforementioned first optical anisotropic layer is disposed at an angle of from 43° to 47° with respect to the longitudinal direction of the support (i.e., direction of the fast axis of the support).

The average direction of alignment of axis of symmetry of the discotic compound molecules can be normally adjusted by selecting the material of the discotic compound or the alignment layer or by selecting the rubbing method. In the invention, in order to prepare the alignment layer for forming the first optical anisotropic layer by rubbing, the material can be subjected to rubbing in the direction of 45° with respect to the slow axis of the support to form a first optical anisotropic layer comprising discotic compound molecules the axis of symmetry of which are aligned in the direction of 45° with respect to the slow axis of the support on the average at least on the interface on the support side thereof. For example, the optical compensation film of the invention can be continuously prepared from a continuous support the slow axis of which is parallel to the longitudinal direction. In some detail, an optical compensation film of continuous length can be continuously prepared by a process which comprises continuously spreading an alignment layer-forming coating solution over the surface of a support of continuous length to prepare an alignment layer, rubbing the surface of the alignment layer in the direction of 45° with respect to the longitudinal direction to prepare an alignment layer, continuously spreading a first optical anisotropic layer-forming coating solution containing a liquid crystal compound over the alignment layer thus prepared, aligning the liquid crystal compound molecules, and then fixing the liquid crystal compound molecules aligned to prepare an optical anisotropic layer. The optical compensation film thus prepared in continuous form is slit into a desired shape before being incorporated in the liquid crystal display. Of course, in the invention, the case where a second or third optical anisotropic layer is provided interposed between the support and the first optical anisotropic layer is not excluded as mentioned above.

Referring to the average direction of alignment of axis of symmetry of the discotic compound molecules on the surface side (air side), the average direction of alignment of axis of symmetry of the discotic compound molecules on the air interface side is preferably disposed at an angle of about 45°, more preferably from 42° to 48°, even more preferably from 43° to 47° with respect to the slow axis of the support. The average direction of alignment of axis of symmetry of the discotic compound molecules on the air interface side can be normally adjusted by selecting the kind of the discotic compound or the additives to be used therewith. Examples of the additives to be used with the discotic compound include plasticizers, surface active agents, polymerizable monomers, and polymers. The degree of change of the direction of alignment of axis of symmetry of molecules can be adjusted by selecting the discotic compound and additives as in the aforementioned case. In particular, it is preferred that the surface tension be controlled so as to satisfy both the surface active agent and the aforementioned coating solution.

It is preferred that the plasticizer, surface active agent and polymerizable monomer to be used with the discotic compound be compatible with the discotic compound to provide the discotic compound with a change of tilt angle or prevent the impairment of alignment of the discotic compound. The polymerizable monomer (e.g., compound having vinyl group, vinyloxy group, acryloyl group or methacryloyl group) is preferably used. The amount of the aforementioned compound to be added is preferably from 1 to 50% by mass, more preferably from 5 to 30% by mass based on the liquid crystal compound. The incorporation of a monomer having four or more polymerizable reactive functional groups makes it possible to enhance the adhesion between the alignment layer and the optical anisotropic layer.

In the case where the discotic compound is used, a polymer which is somewhat compatible with the discotic compound to provide the discotic compound with a change of tilt angle is preferably used.

As the polymer there may be used a cellulose ester. Preferred examples of the cellulose ester include cellulose acetate, cellulose acetate propionate, hydroxypropyl cellulose, and cellulose acetate butyrate. In order that the alignment of the discotic compound might not be impaired, the amount of the aforementioned polymer to be added is preferably from 0.1 to 10% by mass, more preferably from 0.1 to 8% by mass, even more preferably from 0.1 to 5% by mass based on the discotic compound.

The discotic nematic liquid crystal phase-solid phase transition temperature of the discotic compound is preferably from 70° C. to 300° C., more preferably from 70° C. to 170° C.

In the invention, the aforementioned first optical anisotropic layer has at least an in-plane optical anisotropy. The in-plane retardation Re of the first optical anisotropic layer is preferably from 3 to 300 nm, more preferably from 5 to 200 nm, even more preferably from 10 to 100 nm. The thickness-direction retardation Rth of the aforementioned optical anisotropic layer is preferably from 20 to 400 mm, more preferably from 50 to 200 nm. The thickness of the aforementioned optical anisotropic layer is preferably from 0.1 μm to 20 μm, more preferably from 0.5 μm to 15 μm, even more preferably from 1 μm to 10 μm.

(Alignment Layer)

In order to form the aforementioned first optical anisotropic layer, an alignment layer may be utilized. The alignment layer may be eventually incorporated in the optical compensation film of the invention or may be used only during the formation of the aforementioned first optical anisotropic layer so that it is not eventually incorporated in the optical compensation film of the invention.

In the invention, the aforementioned alignment layer is preferably a layer formed by a crosslinked polymer. As the polymer to be used in the alignment layer there may be used either a polymer which is crosslinkable itself or a polymer which can be crosslinked with a crosslinking agent. The aforementioned alignment layer is formed by allowing polymers having a functional group or polymers having a functional group incorporated therein to react with each other upon the irradiation with light, application of heat or the change of pH or by incorporating a connecting group derived from a crosslinking agent in between the polymers in the presence of a crosslinking agent which is a compound having a high reaction activity to crosslink the polymers.

The alignment layer composed of a crosslinked polymer can be normally formed by spreading a coating solution containing the aforementioned polymer optionally mixed with a crosslinking agent over a support, and then subjecting the coated material to heating or the like.

In the rubbing process described later, it is preferred that the crosslinking degree be raised to suppress the dusting of the alignment layer. Supposing that the value (1-(Ma/Mb)) obtained by subtracting the ratio (Ma/Mb) of the amount (Ma) of crosslinking agent left after crosslinking to the amount (Mb) of crosslinking agent incorporated in the aforementioned coating solution from 1 is defined as crosslinking degree, the crosslinking degree is preferably from 50% to 100%, more preferably from 65% to 100%, even more preferably from 75% to 100%.

In the invention, as the polymer to be incorporated in the aforementioned alignment layer there may be used either a polymer which is crosslinkable itself or a polymer which is crosslinked by a crosslinking agent. Of course, a polymer having both the two functions may be used. Examples of the aforementioned polymer include polymers such as polymethyl methacrylate, acrylic acid-methacrylic acid copolymer, styrene/maleinimide copolymer, polyvinyl alcohol, modified polyvinyl alcohol, poly(N-methylolacrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene-vinyl acetate copolymer, carboxymethyl cellulose, gelatin, polyethylene, polypropylene and polycarbonate, and compounds such as silane coupling agent. Preferred among these polymers are water-soluble polymers such as poly(N-methylolacrylamide), carboxymethyl cellulose, gelatin, polyvinyl alcohol and modified polyvinyl alcohol. More desirable among these polymers are gelatin, polyvinyl alcohol and modified polyvinyl alcohol. Particularly preferred among these polymers are polyvinyl alcohol and modified polyvinyl alcohol.

As the polyvinyl alcohol there is preferably used one having a saponification degree of from 70% to 100%, more preferably from 80% to 100%, even more preferably from 82% to 98%. The polymerization degree of the polyvinyl alcohol is preferably from 100 to 3,000.

As the modified polyvinyl alcohol there may be used a modification product of polyvinyl alcohol such as copolymerization-modified polyvinyl alcohol (as the modifying group there is incorporated, e.g., COONa, $Si(OX)_3$, $N(CH_3)_3 \cdot Cl$, $C_9H_{19}COO$, $SO_3Na$, $C_{12}H_{25}$) and chain transfer-modified polyvinyl alcohol (as the modifying group there is incorporated, e.g., COONa, SH, $SC_{12}H_{25}$), block polymerization-modified polyvinyl alcohol (as the modifying group there is incorporated, e.g., COOH, $CONH_2$, COOR, $C_6H_5$). The polymerization degree of the modified polyvinyl alcohol is preferably from 100 to 3,000. Preferred among these polyvinyl alcohols is unmodified or modified polyvinyl alcohol having a saponification degree of from 80% to 100%. Even more desirable among these polyvinyl alcohols is unmodified or alkylthio-modified polyvinyl alcohol having a saponification degree of from 85% to 95%.

As the modified polyvinyl alcohol to be used in the alignment layer there is preferably used a product of reaction of a compound represented by the following formula (6) with a polyvinyl alcohol.

Formula (6):

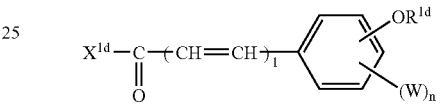

wherein $R^{1d}$ represents an unsubstituted alkyl group or an alkyl group substituted by acryloyl group, methacryloyl group or epoxy group; W represents a halogen atom, alkyl group or alkoxy group; $X^{1d}$ represents an atomic group required to form an active ester, acid anhydride or acid halide; 1 represents 0 or 1; and n represents an integer of from 0 to 4.

As the modified polyvinyl alcohol to be used in the alignment layer there is preferably used a product of reaction of a compound represented by the following formula (7) with a polyvinyl alcohol. Formula (7):

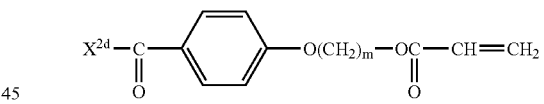

wherein $X^{2d}$ represents an atomic group required to form an active ester, acid anhydride or acid halide; and m represents an integer of from 2 to 24.

Examples of the polyvinyl alcohol to be used in the reaction with the compound represented by the formula (6) or (7) include the aforementioned unmodified polyvinyl alcohols, and modified polyvinyl alcohols such as the aforementioned copolymerization-modified polyvinyl alcohols, i.e., chain transfer-modified polyvinyl alcohol, and block polymerization-modified polyvinyl alcohol. Preferred examples of the aforementioned specified modified polyvinyl alcohols include those disclosed in JP-A-8-338913.

In the case where the alignment layer comprises a hydrophilic polymer such as polyvinyl alcohol incorporated therein, the hydrophilic polymer is preferably controlled in its water content from the standpoint of film hardness. The wafer content of the hydrophilic polymer is preferably from 0.4% to 2.5%, more preferably from 0.6% to 1.6%. For the measurement of water content, a commercially available Karl Fischer process water content meter can be used.

The alignment layer preferably has a thickness of 10 μm or less.

(Second Optical Anisotropic Layer)

The optical compensation film of the invention has a second optical anisotropic layer satisfying the following expression (I):

$$Re_2(450) < Re_2(550) < Re_2(650) \qquad (I)$$

$R_2(\lambda)$ represents the in-plane retardation of the second optical anisotropic layer at the wavelength λ nm. Preferably, Re (450)/Re (550) is smaller than 0.95 and Re (650)/Re (550) is greater than 1.02. $Re_2$ (550) is preferably from 5 to 200 nm, more preferably from 10 to 120 nm. $Rth_2$ (550) is preferably from 5 to 150 nm, more preferably from 10 to 120 nm.

The aforementioned second optical anisotropic layer may be optically monoaxial or biaxial so far as it satisfies the aforementioned optical properties. The material of the second optical anisotropic layer is not specifically limited so far as it satisfies the aforementioned optical properties. So far as the aforementioned optical properties are satisfied, the second optical anisotropic layer may be a liquid crystal coat layer or a polymer film. The thickness of the second optical anisotropic layer is not specifically limited so far as Re is from 5 to 200 nm.

The aforementioned second optical anisotropic layer may be formed by a composition containing a rod-shaped liquid crystal compound. The aforementioned rod-shaped liquid crystal compound preferably has a polymerizable group. The rod-shaped liquid crystal compound, if it has a polymerizable group, is fixed aligned in substantially horizontal direction (homogenous). The term "substantially horizontal" as used herein is meant to indicate that the average angle (average angle of tilt) of the major axis direction of the rod-shaped liquid crystal compound molecules with respect to the surface of the optical anisotropic layer falls within a range of from 0° to 10°. The rod-shaped liquid crystal compound molecules may be aligned obliquely. In the case of oblique alignment, too, the average angle of tilt is preferably from 0° to 20°.

(Rod-Shaped Liquid Crystal Compound)

Preferred examples of the rod-shaped liquid crystal compound employable herein include azomethines, azoxys, cyanobiphenyls, cyanophenylesters, benzoic acid esters, cyclohexanecarboxylic acid phenylesters, cyanophenylcyclohexanes, cyano-substituted phenylpyrimidines, alkoxy-substituted phenylpyrimidines, phenyldioxanes, tolans, and alkenyl cyclohexylbenzonitriles. Further examples of the rod-shaped liquid crystal compound include metal complexes. Alternatively, a liquid crystal polymer containing a rod-shaped liquid crystal compound in its repeating units may be used. In other words, the rod-shaped liquid crystal compound may be connected to a (liquid crystal) polymer.

For the details of the rod-shaped liquid crystal compound, reference can be made to The Chemical Society of Japan, "Survey of Chemistry, Quarterly", vol. 22 (Liquid Crystal Chemistry), Chapter 4, 7 and 11, 1994, and The Japan Society for the Promotion of Science, "Liquid Crystal Device Handbook", 142nd Committee, Chapter 3.

The rod-shaped liquid crystal compound to be used in the invention preferably has a birefringence of from 0.001 to 0.7.

The rod-shaped liquid crystal compound preferably has a polymerizable group to fix its alignment. The polymerizable group is preferably an unsaturated polymerizable group or epoxy group, more preferably an unsaturated polymerizable group, even more preferably an ethylenically unsaturated polymerizable group.

The rod-shaped liquid crystal compound having a low molecular polymerizable group which is particularly preferably used is a rod-shaped liquid crystal compound represented by the following formula (V):

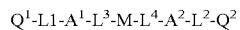

wherein $Q^1$ and $Q^2$ each independently represent a polymerizable group; $L^1$, $L^2$, $L^3$ and $L^4$ each independently represent a single bond or divalent connecting group; $A^1$ and $A^2$ each represent a spacer group having from 2 to 20 carbon atoms; and M represents a mesogen group.

The second optical anisotropic layer is preferably composed of a polymer film.

For example, those disclosed in International Patent Disclosure WO00/26705 may be used.

Other specific examples of the polymer employable herein include known polymers which can be film-formed by solution casting method or extrusion method such as aromatic polymer (e.g., norbornene-based polymer, polycarbonate-based polymer, polyarylate-based polymer, polyester-based polymer, polysulfone) and cellulose acylate. Preferred among these polymers are polycarbonate-based polymers and cellulose acylates.

The polymer film can be formed by subjecting a film made of the thermoplastic resin produced by a proper method such as extrusion method and cast film-forming method to stretching by longitudinal stretching method using roll or crosswise stretching or biaxial stretching method using tenter. The aforementioned longitudinal stretching method using roll may involve a proper method such as method using a heated roll, method involving the heating of atmosphere and combination thereof. The biaxial stretching method using tenter may involve a proper method such as simultaneous biaxial stretching method involving all tenter process and successive biaxial stretching method involving roll-tenter method.

The second optical anisotropic layer preferably has little unevenness in alignment or phase difference. The thickness of the second optical anisotropic layer can be properly determined depending on the phase difference but is normally preferably from 1 μm to 300 μm, more preferably from 10 μm to 200 μm, even more preferably from 20 μm to 150 μm from the standpoint of reduction of thickness of the liquid crystal display.

The norbornene-based polymer is a polymer of monomers mainly composed of a norbornene-based monomer such as norbornene, derivative thereof, tetracyclododecene, derivative thereof, dicyclopentadiene, derivative thereof, methanotetrahydrofluorene and derivative thereof. Examples of the norbornene-based polymer employable herein include ring-opening polymer of norbornene-based monomers, ring-opening copolymer of norbornene-based monomer with other monomers copolymerizable therewith, addition polymer of norbornene-based monomers, addition polymer of norbornene-based monomer with other monomers copolymerizable therewith, and hydrogenation product thereof. Most desirable among these norbornene-based polymers is hydrogenation product of ring-opening polymer of norbornene-based monomers from the standpoint of heat resistance, mechanical strength, etc. The molecular weight of the norbornene-based polymer, polymer of monocyclic olefins or polymer of cyclic conjugated dienes is properly predetermined depending on the purpose. However, when the molecular weight of such a polymer is preferably from 5,000 to 500,000, more preferably from 8,000 to 200,000, even more preferably from 10,000 to 100,0000 as calculated in terms of weight-average molecular weight in polystyrene equivalence as determined by gel permeation chromatography in cyclohexane solution (toluene solution in the case where the polymer resin is not dissolved in cyclohexane), the mechanical strength and the formability of the film (A) are highly balanced to advantage.

As the polycarbonate-based polymer to be used in the aforementioned optical anisotropic layer there may be used a polycarbonate or a mixture thereof with other polymers.

As the polyacrylate-based polymer to be used in the aforementioned optical anisotropic layer there may be used a polyoxy benzoate or a mixture thereof with other polymers.

As the polyester-based polymer to be used in the aforementioned optical anisotropic layer there may be used a polyethylene terephthalate, a polyethylene isophthalate, a polyphenylene isophthalate, a polybutylene terephthalate, a polyethylene-2,6-naphthalate or a mixture thereof with other polymers.

As the aromatic polymer such as polysulfone to be used in the aforementioned optical anisotropic layer there may be used a polysulfone, a polyether sulfone, a polyallyl sulfone or a mixture thereof with other polymers.

As the cellulose acylate there is preferably used a cellulose triacetate, a cellulose acetate propionate, a cellulose acetate butyrate or the like. Further, the cellulose acylate may be used in admixture with other polymers.

(Cellulose Acylate)

As the raw cotton from which the cellulose acylate is produced there may be used any raw material known as such (see, e.g., Japan Institute of Invention and Innovation's Kokai Giho 2001-1745). The synthesis of cellulose acylate can be accomplished by any known method (see, e.g., Migita et al, "Mokuzai Kagaku (Chemistry of Wood)", Kyoritsu Shuppan, pp. 180-190, 1968.). The viscosity-average polymerization degree of the cellulose acylate is preferably from 200 to 700, more preferably from 250 to 500, even more preferably from 250 to 350. The cellulose ester to be used in the invention preferably has a sharp distribution of molecular weight Mw/Mn (Mw represents weight-average molecular weight and Mn represents number-average molecular weight) as determined by gel permeation chromatography. In some detail, Mw/Mn is preferably from 1.5 to 5.0, more preferably from 2.0 to 4.5, even more preferably from 3.0 to 4.0.

The acyl group in the cellulose acylate film is not specifically limited but is preferably an acetyl group or propionyl group, more preferably acetyl group. The total substitution degree of acyl groups is preferably from 2.7 to 3.0, more preferably from 2.8 to 2.95. The term "substitution degree of acyl groups" as used herein is meant to indicate a value calculated according to ASTM D817. The acyl group is most preferably an acetyl group. In the case where a cellulose acetate having an acetyl group as acyl group is used, the percent acetylation of the cellulose acetate is preferably from 57.0% to 62.5%, more preferably from 58.0% to 61.5%. When the percent acetylation of the cellulose acetate falls within the above defined range, the resulting cellulose acylate film can be prevented from having an Re value exceeding the desired range due to conveyance tension during casting and has little in-plane dispersion of Re and little retardation change with temperature and humidity. The substitution degree of acyl group in the 6-position is preferably 0.9 or more from the standpoint of suppression of dispersion of Re and Rth.

The glass transition temperature (Tg) of the transparent resin to be used in the invention may be properly predetermined depending on the purpose but is preferably from 70° C. or more, more preferably from 80° C. to 250° C., even more preferably from 90° C. to 200° C. When the glass transition temperature of the transparent resin falls within the above defined range, the heat resistance and the formability of the transparent resin are highly balanced to advantage.

As the method for forming the transparent resin into sheet or film there may be used any of heat-melt forming method and solution casting method. The heat-melt forming method can be classified as extrusion method, press molding method, inflation method, injection method, blow molding method, stretching method, etc. In order to obtain a film excellent in mechanical strength, surface precision, etc., extrusion method, inflation method and press molding method are preferably used among these methods. Most desirable among these methods is extrusion method. The forming conditions are properly predetermined depending on the purpose or forming method. In the case of heat-melt forming method, the cylinder temperature is preferably properly predetermined to a range of from 100° C. to 400° C., more preferably from 150° C. to 350° C. The thickness of the aforementioned sheet or film is preferably from 10 µm to 300 µm, more preferably from 30 µm to 200 µm.

The stretching of the aforementioned sheet or film, supposing that the glass transition temperature of the transparent resin is Tg, is effected at least in one way, preferably at a draw ratio of from 1.01 to 2, at a temperature of from Tg −30° C. to Tg +60° C., more preferably from Tg −20° C. to Tg +50° C. The stretching may be effected at least one way. However, the stretching direction preferably follows the mechanical flow direction (extrusion direction) of the resin if the sheet is obtained by extrusion method. The stretching preferably involves free shrinkage monoaxial stretching method, fixed width monoaxial stretching method, biaxial stretching method or the like.

In some detail, the stretching method may involve the following steps.

(1) The sheet is passed over a roller (heated roller) heated to a predetermined temperature so that it is adjusted to a desired temperature.

(2) Subsequently, the sheet which has thus been temperature-adjusted is passed over a first roller having a relatively low rotary speed and then over a second roller having a higher rotary speed so that it is stretched. By controlling the ratio of the rotary speed of the first roller to the second roller, the draw ratio can be adjusted to a range of from 1 to 4. An infrared heater is preferably disposed between the heated roller and the first roller and between the first roller and the second roller to keep the temperature of the sheet constant.

(3) The film thus stretched is then passed over a cold roller so that it is cooled.

(4) The stretched film thus cooled is then wound up on a winding roller so that it is recovered. For the purpose of preventing blocking of films with each other during winding, the stretched film may be wound up with a masking film having the same width as the stretched film superposed thereon or with a slender tape having a low adhesiveness stuck to at least one end, preferably both ends thereof.

The sheet to be passed over the heated roller at the aforementioned step (1) may be at a temperature higher than that of the heated roller, i.e., in the state developed shortly after formation by an extruder or the like but is preferably at a temperature lower than that of the heated roller, more preferably at room temperature to attain a high draw ratio. The sheet having a low temperature can be obtained by cooling the sheet thus formed, and then winding up it on a roller so that it is recovered. The stretching speed is preferably from 5 to 1,000 mm/sec, more preferably from 10 to 750 mm/sec. When the stretching speed falls within the above defined range, stretching can be easily controlled and the in-plane dispersion (fluctuation) of surface precision or retardation can be reduced.

(Third Optical Anisotropic Layer)

The optical compensation film of the invention has a third optical anisotropic layer satisfying the following expressions (II) and (III):

$$Rth_3 (450) > Rth_3 (550) > Rth_3 (650) \quad (II)$$

$$Re_3 (550) < 5 \quad (III)$$

wherein $Re_3 (\lambda)$ represents in-plane retardation of the third optical anisotropic layer at the wavelength $\lambda$ nm; and $Rth_3 (\lambda)$ represents thickness-direction retardation of the third optical anisotropic layer at the wavelength $\lambda$ nm. $Rth_3 (450)/Rth_3 (550)$ is preferably greater than 1.03. $Rth_3 (650)/Rth_3 (550)$ is preferably smaller than 0.97. $Re_3 (550)$ is 5 nm or less, preferably 3 nm or less. $Rth_3 (550)$ is preferably from 20 nm to 200 nm, more preferably from 25 nm to 150 nm.

The thickness of the third optical anisotropic layer is not specifically limited so far as Re is 5 nm or less but is preferably from 0.1 μm to 5 μm.

The material constituting the third optical anisotropic layer is not specifically limited so far as the aforementioned optical properties can be satisfied and may be a liquid crystal coat layer or polymer film.

The aforementioned third optical anisotropic layer may be formed, e.g., by a composition containing a rod-shaped liquid crystal compound or discotic compound.

As the discotic compound there is preferably used one described with reference to the first optical anisotropic layer. The discotic compound constituting the first optical anisotropic layer and the third optical anisotropic layer may be the same or different.

Further, the aforementioned third optical anisotropic layer may be a polymer film. Examples of the polymer employable herein include known polymers which can be film-formed by solution casting method or extrusion method such as aromatic polymer (e.g., norbornene-based polymer, polycarbonate-based polymer, polyarylate-based polymer, polyester-based polymer, polysulfone) and triacetyl cellulose.

In order to form the third optical anisotropic layer, an alignment layer may be utilized. As the alignment layer there may be used the same material as described with reference to the first optical anisotropic layer, including their preferred range.

The aforementioned third optical anisotropic layer is preferably formed by fixing the discotic compound aligned horizontally. As a horizontal alignment agent there may be used the following material.

(Horizontal Alignment Agent)

The discotic compound constituting the optical anisotropic layer can be substantially horizontally aligned by using at least one of compounds represented by the following formulae (4), (5) and (8) in combination therewith. The term "horizontal alignment" as used herein is meant to indicate that the major axis direction of the discotic compound (i.e., disc surface of core) is parallel to the horizontal surface of the liquid crystal layer (e.g., surface of the support in the case where the liquid crystal layer is formed on the support). However, it is not required that the two components be strictly parallel to each other. In the invention, the angle of the disc surface of core with respect to the horizontal surface is less than 10°. The angle of tilt is preferably 5° or less, more preferably 3° or less, even more preferably 2° or less, most preferably 11 or less. The aforementioned angle of tilt may be 0°.

The formulae (4), (5) and (8) will be sequentially described hereinafter.

Formula (4):

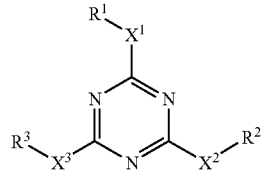

wherein $R^1$, $R^2$ and $R^3$ each independently represent a hydrogen atom or substituent; and $X^1$, $X^2$ and $X^3$ each represent a single bond or divalent connecting group.

Formula (5):

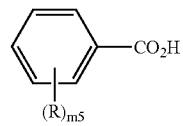

wherein R represents a substituent; and m5 represents an integer of from 0 to 5, with the proviso that when m5 is an integer of 2 or more, the plurality of R's may be the same or different.

Formula (8)

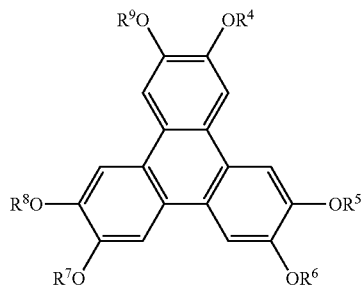

wherein $R^4$, $R^5$, $R^6$, $R^7$, $R^8$ and $R^9$ each independently represent a hydrogen atom or substituent.

The compounds represented by the formulae (4), (5) and (8) will be further described hereinafter. Firstly, the compound represented by the formula (4) will be described.

Examples of the substituents represented by $R^1$, $R^2$ and $R^3$ include alkyl groups (preferably alkyl groups having from 1 to 40 carbon atoms, more preferably from 1 to 30 carbon atoms, particularly preferably from 1 to 20 carbon atoms, e.g., methyl, ethyl, isopropyl, tert-butyl, n-octyl, n-decyl, n-hexadecyl, cyclopropyl, cyclopentyl, cyclohexyl), alkenyl groups (preferably alkenyl groups having from 2 to 40 carbon atoms, more preferably from 2 to 30 carbon atoms, particularly preferably from 2 to 20 carbon atoms, e.g., vinyl, allyl, 2-butenyl, 3-pentenyl), alkynyl groups (preferably alkynyl groups having from 2 to 40 carbon atoms, more preferably from 2 to 30 carbon atoms, particularly preferably from 2 to 20 carbon atoms, e.g., propargyl, 3-pentynyl), aryl groups (preferably aryl groups having from 6 to 30 carbon atoms, more preferably from 6 to 20 carbon atoms, particularly preferably from 6 to 12 carbon atoms, e.g., phenyl, p-methylphenyl, naphthyl), substituted or unsubstituted amino groups (preferably amino groups having from 0 to 40 carbon atoms, more preferably from 0 to 30 carbon atoms, particularly preferably from 0 to 20 carbon atoms, e.g., unsubstituted amino group, methylamino group, dimethylamino group, diethylamino group, anilino group), alkoxy groups (preferably alkoxy groups having from 1 to 40 carbon atoms, more preferably from 1 to 30 carbon atoms, particularly preferably from 1 to 20 carbon atoms, e.g., methoxy, ethoxy, butoxy), aryloxy groups (preferably aryloxy groups having from 6 to 40 carbon atoms, more preferably from 6 to 30 carbon atoms, particularly preferably from 6 to 20 carbon atoms, e.g., phenyloxy, 2-naphthyloxy), acyl groups (preferably acyl groups having from 1 to 40 carbon atoms, more preferably from 1 to 30 carbon atoms, particularly preferably from 1 to 20 carbon atoms, e.g., acetyl, benzoyl, formyl, pivaloyl), alkoxycarbonyl groups (preferably alkoxycarbonyl groups having from 2 to 40 carbon atoms, more preferably from 2 to 30 carbon atoms, particularly preferably from 2 to 20 carbon atoms, e.g., methoxycarbonyl, ethoxycarbonyl), aryloxycarbonyl groups (preferably aryloxycarbonyl groups having from 7 to 40 carbon atoms, more preferably from 7 to 30 carbon atoms, particularly preferably from 7 to 20 carbon atoms, e.g., phenyloxycarbonyl), acyloxy groups (preferably acyloxy groups having from 2 to 40 carbon atoms, more preferably from 2 to 30 carbon atoms, particularly preferably from 2 to 20 carbon atoms, e.g., acetoxy, benzoyloxy), acylamino groups (preferably acylamino groups having from 2 to 40 carbon atoms, more preferably from 2 to 30 carbon atoms, particularly preferably from 2 to 20 carbon atoms, e.g., acetylamino, benzoylamino), alkoxycarbonylamino groups (preferably alkoxycarbonylamino groups having from 2 to 40 carbon atoms, more preferably from 2 to 30 carbon atoms, particularly preferably from 2 to 20 carbon atoms, e.g., methoxycarbonylamino), aryloxycarbonylamino groups (preferably aryloxycarbonylamino groups having from 7 to 40 carbon atoms, more preferably from 7 to 30 carbon atoms, particularly preferably from 7 to 20 carbon atoms, e.g., phenyloxycarbonylamino), sulfonylamino groups (preferably sulfonylamino groups having from 1 to 40 carbon atoms, more preferably from 1 to 30 carbon atoms, particularly preferably from 1 to 20 carbon atoms, e.g., methanesulfonylamino, benzenesulfonylamino), sulfamoyl groups (preferably sulfamoyl groups having from 0 to 40 carbon atoms, more preferably from 0 to 30 sulfamoyl groups, particularly preferably from 0 to 20 carbon atoms, e.g., sulfamoyl, methylsulfamoyl, dimethylsulfamoyl, phenylsulfamoyl), carbamoyl groups (preferably sulfamoyl groups having from 1 to 40 carbon atoms, more preferably from 1 to 30 carbon atoms, particularly preferably from 1 to 20 carbon atoms, e.g., unsubstituted carbamoyl group, methylcarbamoyl group, diethylcarbamoyl group, phenylcarbamoyl group), alkylthio groups (preferably alkylthio groups having from 1 to 40 carbon atoms, more preferably from 1 to 30 carbon atoms, particularly preferably from 1 to 20 carbon atoms, e.g., phenylthio), sulfonyl groups (preferably sulfonyl groups having from 1 to 40 carbon atoms, more preferably from 1 to 30 carbon atoms, particularly preferably from 1 to 20 carbon atoms, e.g., mesyl, tosyl), sulfinyl groups (preferably sulfinyl groups having from 1 to 40 carbon atoms, more preferably from 1 to 30 carbon atoms, particularly preferably from 1 to 20 carbon atoms, e.g., methanesulfinyl, benzenesulfinyl), ureido groups (preferably ureido groups having from 1 to 40 carbon atoms, more preferably from 1 to 30 carbon atoms, particularly preferably from 1 to 20 carbon atoms, e.g., unsubstituted ureido group, methylureido group, phenylureido group), phosphoric acid amide groups (preferably phosphoric acid amide groups having from 1 to 40 carbon atoms, more preferably from 1 to 30 carbon atoms, particularly preferably from 1 to 20 carbon atoms, e.g., diethylphosphoric acid amide, phenylphosphoric acid amide), hydroxyl groups, mercapto groups, halogen atoms (e.g., fluorine, chlorine, bromine, iodine), cyano groups, sulfo groups, carboxyl groups, nitro groups, hydroxamic acid groups, sulfino groups, hydrazino groups, imino groups, heterocyclic groups (preferably heterocyclic groups having from 1 to 30 carbon atoms, more preferably from 1 to 12 carbon atoms, e.g., heterocyclic group having hetero atoms such as nitrogen, oxygen and sulfur (e.g., imidazolyl, pyridyl, quinolyl, furyl, piperidyl, morpholino, benzooxazolyl, benzimidazolyl, benzthiazolyl, 1,3,5-triazyl)), and silyl groups (preferably silyl groups having from 3 to 40 carbon atoms, more preferably from 3 to 30 carbon atoms, particularly preferably from 3 to 24 carbon atoms, e.g., trimethylsilyl, triphenylsilyl). These substituents may be further substituted by the same substituents. Two or more of these substituents, if any, may be the same or different. If possible, these substituents may be connected to each other to form a ring.

Preferred examples of the substituents represented by $R^1$, $R^2$ and $R^3$ include alkyl groups, aryl groups, substituted or unsubstituted amino groups, alkoxy groups, alkylthio groups, and halogen atoms.

The divalent connecting groups represented by $X^1$, $X^2$ and $X^3$ each are preferably a divalent connecting group selected from the group consisting of alkylene group, alkenylene group, divalent aromatic group, divalent heterocyclic residue, —CO—, —NR$^a$—(in which R$^a$ represents a $C_1$-$C_5$ alkyl group or hydrogen atom), —O—, —S—, —SO—, —SO$_2$— and combination thereof. The divalent connecting group is preferably an allylene group, phenyl group, —CO—, —NR$^a$—, —O—, —S—, —SO$_2$— or a group comprising in combination at least two divalent connecting groups selected from the group consisting of these divalent connecting groups. The number of carbon atoms in the alkylene group is preferably from 1 to 12. The number of carbon atoms in the alkenylene group is preferably from 2 to 12. The number of carbon atoms in the divalent aromatic group is preferably from 6 to 10. The alkylene group, alkenylene group and divalent aromatic group may be substituted by the groups exemplified above as substituents on $R^1$, $R^2$ and $R^3$ (e.g., alkyl group, halogen atom, cyano, alkoxy, acyloxy) if possible.

Particularly preferred among the compounds represented by the formula (4) are compounds represented by the following formula (Ia) or (Ib).

Formula (Ia):

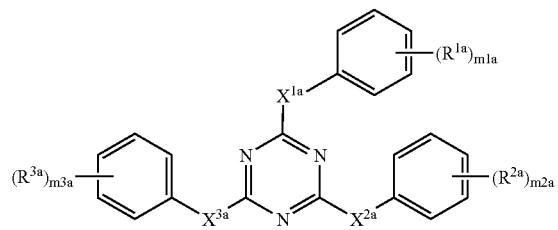

wherein $R^{1a}$, $R^{2a}$ and $R^{3a}$ each represent a hydrogen atom or substituent; $X^{1a}$, $X^{2a}$ and $X^{3a}$ each represent —NH—, —O— or —S—; and m1a, m2a and m3a each represent an integer of from 1 to 3.

Formula (Ib):

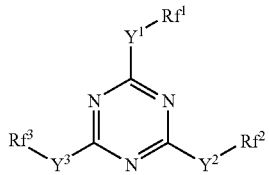

wherein $Rf^1$, $Rf^2$ and $Rf^3$ each represent an alkyl group terminated by $CF_3$ group or $CF_2H$ group; and $Y^1$, $Y^2$ and $Y^3$ each represent an alkylene group, —CO—, —NH—, —O—, —S—, —SO$_2$— or a group having in combination at least two divalent connecting groups selected from the group consisting of these divalent connecting groups.

Firstly, the compound represented by the formula (Ia) will be described.

The substituents represented by $R^{1a}$, $R^{21}$ and $R^{3a}$ have the same meaning as $R^1$, $R^2$ and $R^3$ in the formula (4), including their preferred range. The substituents represented by $R^{1e}$, $R^{2a}$ and $R^{3a}$ each are particularly preferably an alkoxy group terminated by $CF_3$ group or $CF_2H$ group. The alkyl chain contained in the alkoxy group may be straight-chain or branched and preferably has from 4 to 20 carbon atoms, more preferably from 4 to 16 carbon atoms, particularly preferably from 6 to 16 carbon atoms. The aforementioned alkoxy group terminated by $CF_3$ group or $CF_2H$ group is an alkoxy group having some or whole of hydrogen atoms substituted by fluorine atoms. The hydrogen atoms in the alkoxy group are preferably substituted by fluorine atoms in a proportion of 50% or more, more preferably 60% or more, particularly preferably 70% or more. Examples of the alkoxy group represented by $R^{1a}$, $R^{2a}$ and $R^{3a}$ terminated by $CF_3$ group or $CF_2H$ group will be given below.

R1: n-C$_8$F$_{17}$—O—
R2: n-C6F$_{13}$—O—
R3: n-C$_4$F$_9$—O—
R4: n-C$_8$F$_{17}$—(CH$_2$)$_2$—O—(CH$_2$)$_2$—O—
R5: n-C$_6$F$_{13}$—(CH$_2$)$_2$—O—(CH$_2$)$_2$—O—
R6: n-C$_4$F$_9$—(CH$_2$)$_2$—O—(CH$_2$)$_2$—O—
R7: n-C$_8$F$_{17}$—(CH$_2$)$_3$—O—
R8: n-C$_6$F$_{13}$—(CH$_2$)$_3$—O—
R9: n-C4F$_9$—(CH$_2$)$_3$—O—
R10: H—(CF$_2$)$_8$—O—
R11: H—(CF$_2$)$_6$—O—
R12: H—(CF$_2$)$_4$—O—
R13: H—(CF$_2$)$_8$—(CH$_2$)—O—
R14: H—(CF$_2$)$_6$—(CH$_2$)—O—
R15: H—(CF$_2$)$_4$—(CH$_2$)—O—
R16: H—(CF$_2$)$_8$—(CH$_2$)—O—(CH$_2$)$_2$—O—
R17: H—(CF$_2$)$_6$—(CH$_2$)—O—(CH$_2$)$_2$—O—
R18: H—(CF$_2$)$_4$—(CH$_2$)—O—(CH$_2$)$_2$—O—

$X^{1a}$, $X^{2a}$ and $X^{3a}$ each preferably represent —NH— or —O—, more preferably —NH—. The suffixes m1a, m2a and m3a each preferably represent 2.

The compound represented by the formula (Ib) will be further described hereinafter. The alkyl groups represented by $Rf^4$, $Rf^2$ and $Rf^3$ terminated by $CF_3$ group or $CF_2H$ group may be straight-chain or branched and preferably have from 4 to 20 carbon atoms, more preferably from 4 to 16 carbon atoms, even more preferably from 6 to 16 carbon atoms. The alkyl group may have substituents other than $CF_3$ group or $CF_2H$ group. The aforementioned alkyl group terminated by $CF_3$ group or $CF_2H$ group is an alkyl group having some or whole of hydrogen atoms substituted by fluorine atoms. The hydrogen atoms in the alkyl group are preferably substituted by fluorine atoms in a proportion of 50% or more, more preferably 60% or more, particularly preferably 70% or more. Examples of the alkyl group represented by $Rf^1$, $Rf^2$ and $Rf^3$ terminated by $CF_3$ group or $CF_2H$ group will be given below.

Rf1: n-C$_8$F$_{17}$—
Rf2: n-C$_6$F$_{13}$—
Rf3: n-C$_4$F$_9$—
Rf4: n-C$_8$F$_{17}$—(CH$_2$)$_2$—
Rf5: n-C$_6$F$_{13}$—(CH$_2$)$_2$—
Rf6: n-C$_4$F$_9$—(CH$_2$)$_2$—
Rf7: H—(CF$_2$)$_8$—
Rf8: H—(CF$_2$)$_6$—
Rf9: H—(CF$_2$)$_4$—
Rf10: H—(CF$_2$)$_8$—(CH$_2$)—
Rf11: H—(CF$_2$)$_6$—(CH$_2$)—
Rf12: H—(CF$_2$)$_4$—(CH$_2$)—

$Y^1$, $Y^2$ and $Y^3$ each preferably represent an alkylene group, —NH—, —O—, —S— or a group having in combination at least two divalent connecting groups selected from the group consisting of these divalent connecting groups, particularly preferably an alkylene group, —NH—, —O— or a group having in combination at least two divalent connecting groups selected from the group consisting of these divalent connecting groups, most preferably —NH—, —O— or —NH(CH$_2$)$_r$—O— (in which r represents an integer of from 1 to 8, most preferably 3).

The compound represented by the formula (5) will be further described hereinafter.

In the formula (5), the substituent represented by R has the same meaning as the substituents represented by $R^1$, $R^2$ and $R^3$ in the formula (4), including their preferred range. The suffix m preferably represents an integer of from 1 to 3, particularly preferably 2 or 3.

Particularly preferred among the compounds represented by the formula (51 are compounds represented by the following formula (IIa):

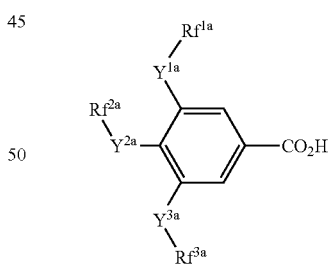

wherein $Rf^{1a}$, $Rf^{2a}$ and $Rf^{3a}$ each independently represent an alkyl group terminated by $CF_3$ group or $CF_2H$ group; and $Y^{1a}$, $Y^{2a}$ and $Y^{3a}$ each independently represent an alkylene group, —CO—, —NH—, —O—, —S—, —SO$_2$— or a group having in combination at least two divalent connecting groups selected from the group consisting of these divalent connecting groups.

The alkyl groups represented by $Rf^{1a}$, $Rf^{2a}$ and $Rf^{3a}$ terminated by $CF_3$ group or $CF_2H$ group each have the same meaning as the alkyl groups represented by $Rf^1$, $Rf^2$ and $Rf^3$ terminated by $CF_3$ group or $CF_2H$ group in the formula (Ib), including their preferred range. $Y^{1a}$, $Y^{2a}$ and $Y^{3a}$ have the same meaning as $Y^1$, $Y^2$ and $Y^3$ in the formula (Ib), respectively, including their preferred range. Most desirable among the groups represented by $Y^{1a}$, $Y^{2a}$ and $Y^{3a}$ are allylene group, —O— and group having in combination at least two divalent connecting groups selected from the group consisting of these divalent connecting groups.

Finally, the compound represented by the formula (8) will be described.

The substituents represented by $R^4$, $R^5$, $R^6$, $R^7$, $R^8$ and $R^9$ have the same meaning as those represented by $R^1$, $R^2$ and $R^3$ in the formula (4), including their preferred range.

Particularly preferred among the compounds represented by the formula (8) are compounds represented by the following formula (IIIa):

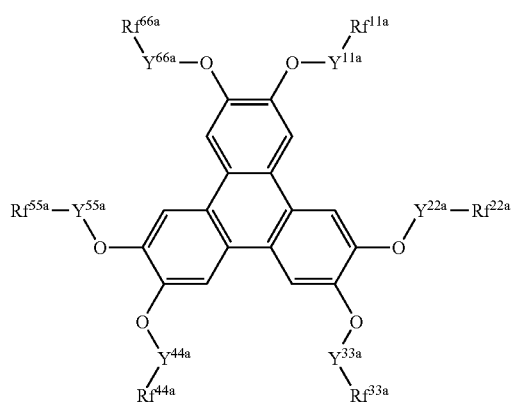

wherein $Rf^{11a}$, $Rf^{22a}$, $Rf^{33a}$, $Rf^{44a}$, $Rf^{55a}$ and $Rf^{66a}$ each independently represent an alkyl group terminated by $CF_3$ group or $CF_2H$ group; and $Y^{11a}$, $Y^{22a}$, $Y^{33a}$, $Y^{44a}$, $Y^{55a}$ and $Y^{66a}$ each independently represent an alkylene group, —CO—, —NH—, —O—, —S—, —$SO_2$— or a group having in combination at least two divalent connecting groups selected from the group consisting of these divalent connecting groups.

The alkyl groups represented by $Rf^{11a}$, $Rf^{22a}$, $Rf^{33a}$, $Rf^{44a}$, $Rf^{55a}$ and $Rf^{66a}$ terminated by $CF_3$ group or $CF_2H$ group each have the same meaning as the alkyl groups represented by $Rf^1$, $Rf^2$ and $Rf^3$ terminated by $CF_3$ group or $CF_2H$ group in the formula (Ib), including their preferred range. $Y^{11a}$, $Y^{22a}$, $Y^{33a}$, $Y^{44a}$, $Y^{55a}$ and $Y^{66a}$ have the same meaning as $Y^1$, $Y^2$ and $Y^3$ in the formula (Ib), respectively, including their preferred range. Most desirable among the groups represented by $Y^{11a}$, $Y^{22a}$, $Y^{33a}$, $Y^{44a}$, $Y^{55a}$ and $Y^{66a}$ are alkylene group, —O— and group having in combination at least two divalent connecting groups selected from the group consisting of these divalent connecting groups.

Specific examples of the compounds represented by the formulae (4), (5) and (8) will be given below, but the invention is not limited thereto. In the following specific examples, No. I-1 to 39 indicate examples of the compound represented by the formula (4), No. I-40 to 50 indicate examples of the compound represented by the formula (5), and No. I-51 to 59 indicate examples of the compound represented by the formula (8).

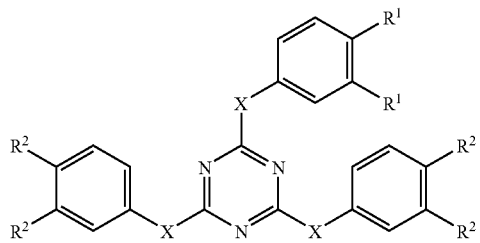

| Compound No. | $R^1$ | $R^2$ | X |
| --- | --- | --- | --- |
| I-1 | $O(CH_2)_3(CF_2)_4F$ | $O(CH_2)_3(CF_2)_4F$ | NH |
| I-2 | $O(CH_2)_3(CF_2)_6F$ | $O(CH_2)_3(CF_2)_6F$ | NH |
| I-3 | $O(CH_2)_3(CF_2)_8F$ | $O(CH_2)_3(CF_2)_8F$ | NH |
| I-4 | $OCH_2(CF_2)_6H$ | $OCH_2(CF_2)_6H$ | NH |
| I-5 | $OCH_2(CF_2)_8H$ | $OCH_2(CF_2)_8H$ | NH |
| I-6 | $O(CH_2)_2O(CH_2)_2(CF_2)_6F$ | $O(CH_2)_2O(CH_2)_2(CF_2)_6F$ | NH |
| I-7 | $O(CH_2)_2O(CH_2)_2(CF_2)_4F$ | $O(CH_2)_2O(CH_2)_2(CF_2)_4F$ | NH |
| I-8 | $O(CH_2)_3O(CH_2)_2(CF_2)_6F$ | $O(CH_2)_3S(CH_2)_2(CF_2)_6F$ | NH |
| I-9 | $O(CH_2)_3O(CH_2)_2(CF_2)_4F$ | $O(CH_2)_3S(CH_2)_2(CF_2)_4F$ | NH |
| I-10 | $O(CH_2)_6O(CH_2)_2(CF_2)_6F$ | $O(CH_2)_6S(CH_2)_2(CF_2)_6F$ | NH |
| I-11 | $O(CH_2)_6O(CH_2)_2(CF_2)_4F$ | $O(CH_2)_6S(CH_2)_2(CF_2)_4F$ | NH |
| I-12 | $OC_{10}H_{21}$ | $OC_{10}H_{21}$ | NH |
| I-13 | $OC_{12}H_{25}$ | $OC_{12}H_{25}$ | NH |
| I-14 | $OC_8H_{17}$ | $OC_{12}H_{25}$ | NH |
| I-15 | $OC_{16}H_{33}$ | $OC_{12}H_{25}$ | NH |
| I-16 | $OC_{12}H_{25}$ | $OC_{16}H_{33}$ | NH |
| I-17 | $O(CH_2)_2O(CH_2)(CF_2)_6H$ | $O(CH_2)_2O(CH_2)(CF_2)_6H$ | NH |
| I-18 | $O(CH_2)_3(CF_2)_6F$ | $O(CH_2)_3(CF_2)_6F$ | O |
| I-19 | $OCH_2(CF_2)_6H$ | $OCH_2(CF_2)_6H$ | O |
| I-20 | $O(CH_2)_2O(CH_2)_2(CF_2)_6F$ | $O(CH_2)_2O(CH_2)_2(CF_2)_6F$ | O |
| I-21 | $O(CH_2)_3S(CH_2)_2(CF_2)_6F$ | $O(CH_2)_3S(CH_2)_2(CF_2)_6F$ | O |
| I-22 | $O(CH_2)_2O(CH_2)(CF_2)_6H$ | $O(CH_2)_2O(CH_2)(CF_2)_6H$ | O |
| I-23 | $O(CH_2)_3(CF_2)_6F$ | $O(CH_2)_3(CF_2)_6F$ | S |
| I-24 | $OCH_2(CF_2)_6H$ | $OCH_2(CF_2)_6H$ | S |
| I-25 | $O(CH_2)_2O(CH_2)_2(CF_2)_6F$ | $O(CH_2)_2O(CH_2)_2(CF_2)_6F$ | S |
| I-26 | $O(CH_2)_3S(CH_2)_2(CF_2)_6F$ | $O(CH_2)_3S(CH_2)_2(CF_2)_6F$ | S |
| I-27 | $O(CH_2)_2O(CH_2)_2(CF_2)_6H$ | $O(CH_2)_2O(CH_2)_2(CF_2)_6H$ | S |

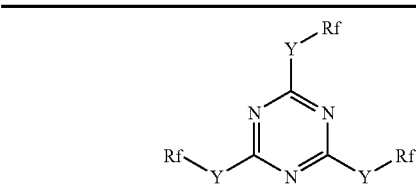

| Compound No. | Rf | Y |
| --- | --- | --- |
| I-28 | $(CH_2)_2(CF_2)_4F$ | O |
| I-29 | $(CH_2)_2(CF_2)_6F$ | O |
| I-30 | $(CH_2)_2(CF_2)_8F$ | O |
| I-31 | $CH_2(CF_2)_6H$ | O |
| I-32 | $CH_2(CF_2)_8H$ | O |
| I-33 | $(CH_2)_2(CF_2)_6F$ | $O(CH_2)_2O$ |
| I-34 | $(CH_2)_2(CF_2)_4F$ | $O(CH_2)_2O$ |
| I-35 | $(CH_2)_2(CF_2)_6F$ | $O(CH_2)_3S$ |
| I-36 | $(CH_2)_2(CF_2)_6F$ | $O(CH_2)_6S$ |
| I-37 | $(CH_2)_3(CF_2)_6F$ | $NH(CH_2)_3O$ |
| I-38 | $CH_2(CF_2)_6H$ | $NH(CH_2)_3O$ |
| I-39 | $CH_2(CF_2)_8H$ | $NH(CH_2)_3O$ |

In the table above, Y is connected to the triazine ring on the left side thereof and to Rf on the right side thereof.

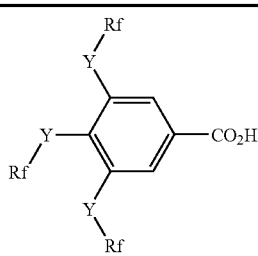

| Compound No. | Rf | Y |
|---|---|---|
| I-40 | $(CH_2)_3(CF_2)_4F$ | O |
| I-41 | $(CH_2)_3(CF_2)_6F$ | O |
| I-42 | $(CH_2)_3(CF_2)_8F$ | O |
| I-43 | $CH_2(CF_2)_6H$ | O |
| I-44 | $CH_2(CF_2)_8H$ | O |
| I-45 | $(CH_2)_2(CF_2)_6F$ | $O(CH_2)_2O$ |
| I-46 | $(CH_2)_2(CF_2)_4F$ | $O(CH_2)_2O$ |
| I-47 | $(CH_2)_2(CF_2)_6F$ | $O(CH_2)_3S$ |
| I-48 | $(CH_2)_2(CF_2)_6F$ | $O(CH_2)_6S$ |

In the table above, Y is connected to the benzene ring on the left side thereof and to Rf on the right side thereof.

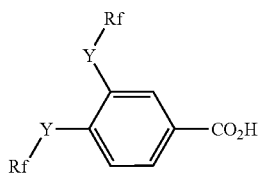

| Compound No. | Rf | Y |
|---|---|---|
| I-49 | $(CH_2)_3(CF_2)_6F$ | O |
| I-50 | $(CH_2)_3(CF_2)_6F$ | $O(CH_2)_2O$ |

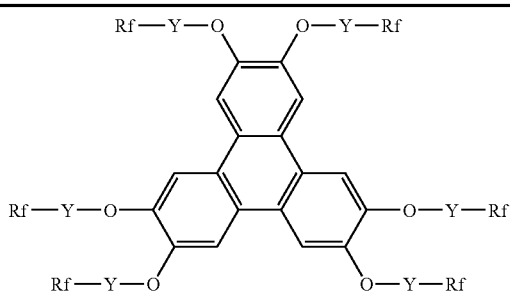

| Compound No. | Rf | Y |
|---|---|---|
| I-51 | $(CF_2)_4F$ | $(CH_2)_3$ |
| I-52 | $(CF_2)_6F$ | $(CH_2)_3$ |
| I-53 | $(CF_2)_8F$ | $(CH_2)_3$ |
| I-54 | $(CF_2)_6H$ | $CH_2$ |
| I-55 | $(CF_2)_8H$ | $CH_2$ |
| I-56 | $(CH_2)_2(CF_2)_6F$ | $(CH_2)_2O$ |
| I-57 | $(CH_2)_2(CF_2)_4F$ | $(CH_2)_2O$ |
| I-58 | $(CH_2)_2(CF_2)_6F$ | $(CH_2)_3S$ |
| I-59 | $(CH_2)_2(CF_2)_6F$ | $(CH_2)_6S$ |

In the table above, Y is connected to the oxygen atom on the left side thereof and to Rf on the right side thereof.

In the invention, the added amount of the compounds represented by the formulae (4) to (8) each are preferably from 0.01 to 20% by mass, more preferably from 0.05 to 10% by mass, particularly preferably from 0.1 to 5% by mass based on the weight of the discotic compound. The compounds represented by the formulae (4), (5) and (8) may be used singly or in combination of two or more thereof.

(Polarizing Plate)

In the invention, a polarizing plate comprising a polarizing film and a pair of protective films with the polarizing film provided interposed therebetween may be used. For example, a polarizing plate obtained by dyeing a polarizing film made of a polyvinyl alcohol film with iodine, stretching the polarizing film thus dyed, and then laminating the polarizing film with a protective layer on the sides thereof may be used. The polarizing plate is disposed on the outer side of the liquid crystal cell. A pair of polarizing plates each comprising a polarizing film and a pair of protective films with the polarizing film interposed therebetween are preferably disposed with the liquid crystal cell interposed therebetween. As mentioned above, the protective film disposed on the liquid crystal cell side may be any of the optical anisotropic layers constituting the optical compensation film of the invention.

(Protective Film)

The polarizing plate employable in the invention may comprise a pair of protective films stacked on the respective side of a polarizing film. The kind of the protective film is not specifically limited. A cellulose ester such as cellulose acetate, cellulose acetate butyrate and cellulose propionate, a polycarbonate, a polyolefin, a polystyrene, a polyester or the like may be used. As mentioned above, a cellulose acylate film (fourth optical anisotropic layer) satisfying the aforementioned optical properties is preferably used as a protective film.

The protective film is normally preferably supplied in rolled form from which it is then continuously stacked on a polarizing film of continuous length in such an arrangement that the longitudinal direction of the two films coincide with each other. The alignment axis (slow axis) of the protective film may be disposed in any direction and is preferably disposed parallel to the longitudinal direction from the standpoint of convenience in handling.

In an embodiment wherein the protective film is not allowed to act as a support, the retardation of the protective film is preferably low. As a polymer film having a low retardation there is preferably used a polyolefin such as cellulose triacetate, Zeneox, Zeonoa (produced by ZEON CORPORATION) and ARTON (produced by JSR Co., Ltd.). Other examples of the polymer film having a low retardation include non-birefringent optical resin materials as disclosed in JP-A-8-110402 and JP-A-11-293116.

In order to laminate the protective film and the polarizing film on each other, the protective film and the polarizing film are preferably stacked on each other in such an arrangement that the slow axis (alignment axis) of at least one of the protective films (protective film disposed closer to the liquid crystal cell when incorporated in the liquid crystal display) and the absorption axis (stretched axis) of the aforementioned polarizing film cross each other. In some detail, the angle of the absorption axis of the polarizing film with respect to the slow axis of the aforementioned protective film is preferably from 10° to 90°, more preferably from 20° to 70°, even more preferably from 40° to 50°, particularly preferably from 43° to 47°. The angle of the slow axis of the other protective film with respect to the absorption axis of the polarizing film is not specifically limited and can be properly predetermined depending on the purpose of the polarizing plate but preferably falls within the above defined range. It is preferred that the slow axis of the pair of protective films coincide with each other.

When the slow axis of the protective film and the absorption axis of the polarizing film are disposed parallel to each other, the mechanical stability of the polarizing plate such as prevention of dimensional change and curling of the polarizing plate can be enhanced. Similar effects can be exerted by disposing the axis of at least two of the three films, i.e., polarizing film, a pair of protective films, and the slow axis of one of the protective films substantially parallel to the absorption axis of the polarizing film or the slow axis of two sheets of protective films.

<<Adhesive>>

The adhesive with which the polarizing film and the protective film are bonded to each other is not specifically limited but may be a PVA-based resin (including modified PVA such as acetoacetyl group, sulfonic acid group, carboxyl group and oxyalkylene group), aqueous solution of boron compound or the like, preferably PVA-based resin. The thickness of the adhesive layer dried is preferably from 0.01 µm to 10 µm, more preferably from 0.05 µm to 5 µm.

<<Continuous Process for the Production of Polarizing Film and Protective Film>>

The process for the production of the polarizing plate of the invention preferably involves a drying step of shrinking the film for polarizing film stretched to reduce the volatile fraction thereof. However, the drying step is more preferably effected after the lamination of a protective film on at least one side of the film after or during drying. In an embodiment wherein the aforementioned protective film acts also as a support for the optical anisotropic layer which acts as a transparent film, the film is preferably provided with a protective film on one side thereof and an optical anisotropic layer on the other side thereof before heated. Referring further to laminating method, a protective film is stuck to the polarizing film with an adhesive while being retained at the both edges thereof during the film drying step. The laminate is then trimmed at the both edges thereof. Alternatively, the film for polarizing film thus dried is released from the edge retaining portions, trimmed at the both edges thereof, and then provided with a protective film. As the trimming method there may be used any ordinary technique such as method involving the use of cutter such as blade and method involving the use of laser beam. In order to dry the adhesive after lamination and improve the polarizing properties, the laminate is preferably heated. The heating conditions depend on the kind of the adhesive. In the case where an aqueous adhesive is used, the heating temperature is preferably 30° C. or more, more preferably from 40° C. to 100° C., even more preferably from 50° C. to 90° C. These steps are extremely preferably effected in a continuous line from the standpoint of properties and production efficiency.

<<Properties of Polarizing Plate>>

The optical properties and durability (short-term and long-term preservability) of the polarizing plate comprising a protective film, a polarizing film and a support related to the invention are preferably equivalent to or higher than that of commercially available super high contrast products (e.g., HLC2-5618, produced by SANRITZ CORPORATION). In some detail, the polarizing plate of the invention preferably exhibits a visible light transmission of 42.5% or more. Further, the polarization of the polarizing plate of the invention $\{(Tp-Tc)/(Tp+Tc)\}^{1/2}$ is preferably 0.9995 or more (wherein Tp is parallel light transmission and Tc is crossing light transmission). When allowed to stand at 60 C and 90% RH for 500 hours and then in dry atmosphere for 500 hours, the polarizing plate of the invention preferably exhibits a light transmission change of 3% or less, more preferably 1% or less on absolute value basis. The percent change of polarization of the polarizing plate of the invention is preferably 1% or less, more preferably 0.1% or less on absolute value basis.

<Fourth Aspect>

In the following description, "polymer" is sometimes used as having the meaning of including "copolymer".

Below, exemplary embodiments of the fourth aspect the invention will be described in details.

The optical compensation film of the invention has an optical anisotropic layer containing at least one of polymers containing repeating units derived from fluoroaliphatic group-containing monomers represented by the formula (1) or (2) (which may be abbreviated as "a fluorine-based polymer"), and at least one of discotic compounds having a cyclopropylcarbonyl group.

(Fluorine-Based Polymer)

In the invention, at least one of fluorine-based polymers containing repeating units derived from fluoroaliphatic group-containing monomers represented by the formula (1) or (2) is used. The fluorine-based polymers are preferably acrylic resins or methacrylic resins containing both of repeating units derived from monomers represented by the following formula (1) or (2), and repeating units derived from monomers represented by the formula (3) described later, and further, they are also preferably acrylic resins or methacrylic resins resulting from copolymerization of the monomers and copolymerizable vinyl type monomers.

One of the fluoroaliphatic groups in the fluorine-based polymers in accordance with the invention is derived from fluoroaliphatic compounds produced by the telomerization method (which is also referred to as the telomer method) or the oligomerization method (which is also referred as the oligomer method). The production methods of these fluoroaliphatic compounds are described, for example, on pages 117 and 118 of *FUSSOKAGOUBUTSU NO GOUSEI TO KINOU* (general editor: Nobuo Ishikawa, publisher: CMC Publishing Co., Ltd., 1987), and on pages 747 to 752 of *Chemistry of Organic Fluorine Compounds II* (Monograph 187, Ed by Milos Hudlicky and Attila E. Pavlath, American Chemical Society 1995). The telomerization method is a method in which using an alkyl halide having a large chain transfer constant such as iodide as a telogen, radical polymerization of a fluorine-containing vinyl compound such as tetrafluoroethylene is carried out to synthesize a telomer (an example is shown in Scheme-1).

Scheme 1

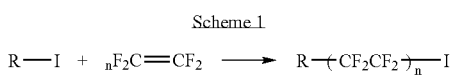

The obtained terminal iodinated telomer is generally subjected to an appropriate terminal chemical modification, for example, as in [Scheme 2], and led to a fluoroaliphatic compound. The compound is furthermore converted into a desired monomer structure, if required, and used in the production of a fluoroaliphatic group-containing polymer. n in [Scheme 2] represents a natural number.

Scheme 2

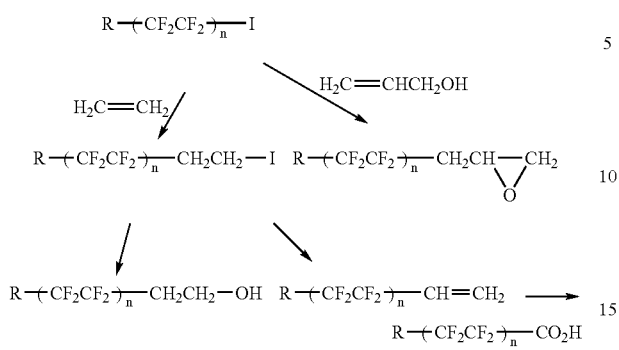

The fluorine-based polymer has a repeating unit derived from a fluoroaliphatic group-containing monomer represented by the following formula (1) or (2).

Formula (1):

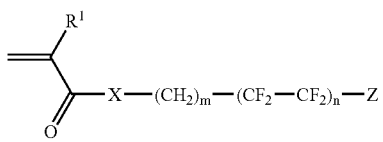

In the formula (1), $R^1$ represents a hydrogen atom or a methyl group, X represents an oxygen atom, a sulfur atom, or —N($R^2$)— ($R^2$ represents a hydrogen atom or an alkyl group having 1 to 4 carbon atoms, and preferably a hydrogen atom or a methyl group), Z represents a hydrogen atom or a fluorine atom, m represents an integer of 1 to 6, and n represents au integer of 2 to 4.

X is preferably an oxygen atom, Z is preferably a hydrogen atom, m is preferably 1 or 2, and n is preferably 3 or 4, and a mixture thereof may be used.

Formula (2):

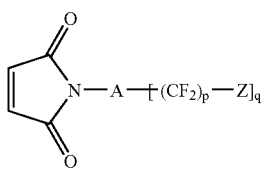

In the formula (2), A represents a divalent (q=1) or trivalent (q=2) linking group selected from the following group A of linking groups, or a divalent (q=1) or trivalent (q=2) linking group formed from a combination of two or more selected from the following group A of linking groups, and the linking groups may combine with each other through an oxygen atom, (Group a of Linking Groups)

—$CH_2$—, —$CH_2CH_2$—, —$CH_2CH_2CH_2$—, —$C_6H_4$—, and —$C_6H_3$<: provided that the substitution site on a benzene ring may be any given site.

In the formula (2), Z represents a hydrogen atom or a fluorine atom, p represents an integer of 3 to 8, and q represents 1 or 2.

A is preferably the structure shown below.

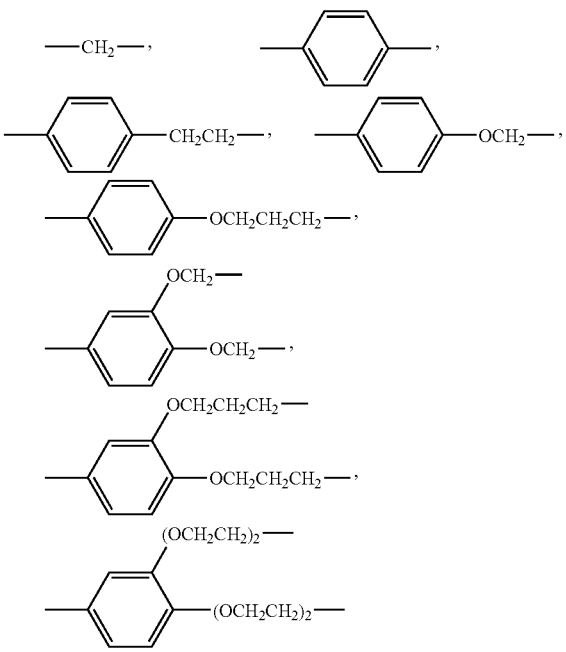

Z is preferably a fluorine atom, and p is preferably 4 or 6. A mixture thereof may be used.

Specific examples of a monomer which can be utilized for production of the fluorine-based polymer usable in the invention are shown below. However, the invention is not limited to the following specific examples at all.

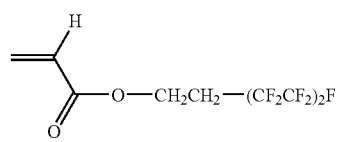

F-1

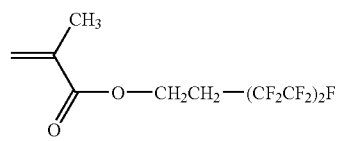

F-2

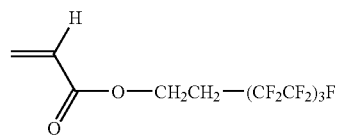

F-3

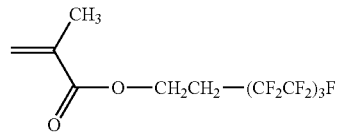

F-4

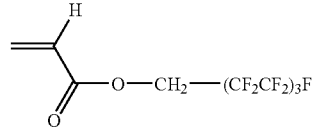

F-5

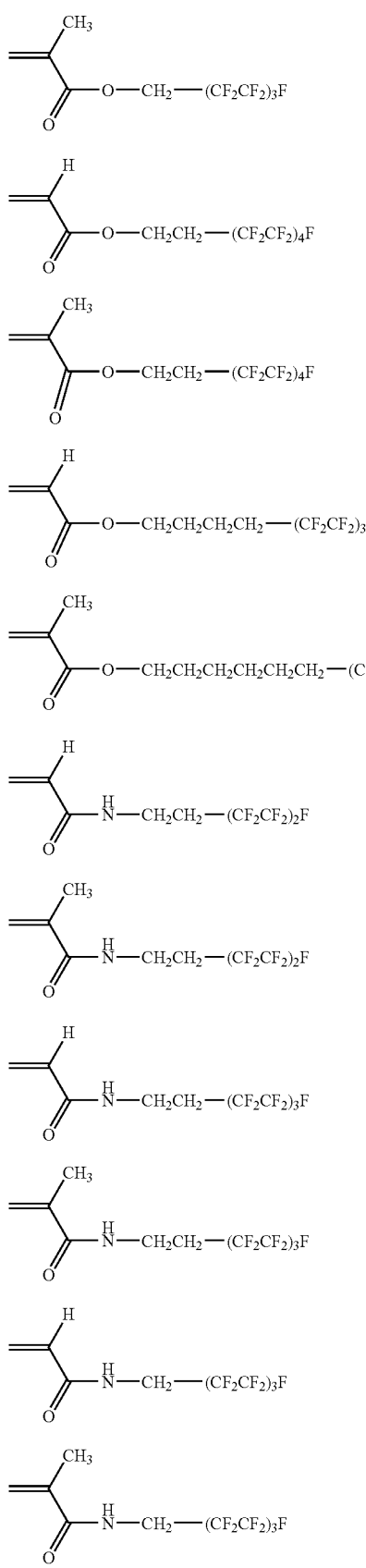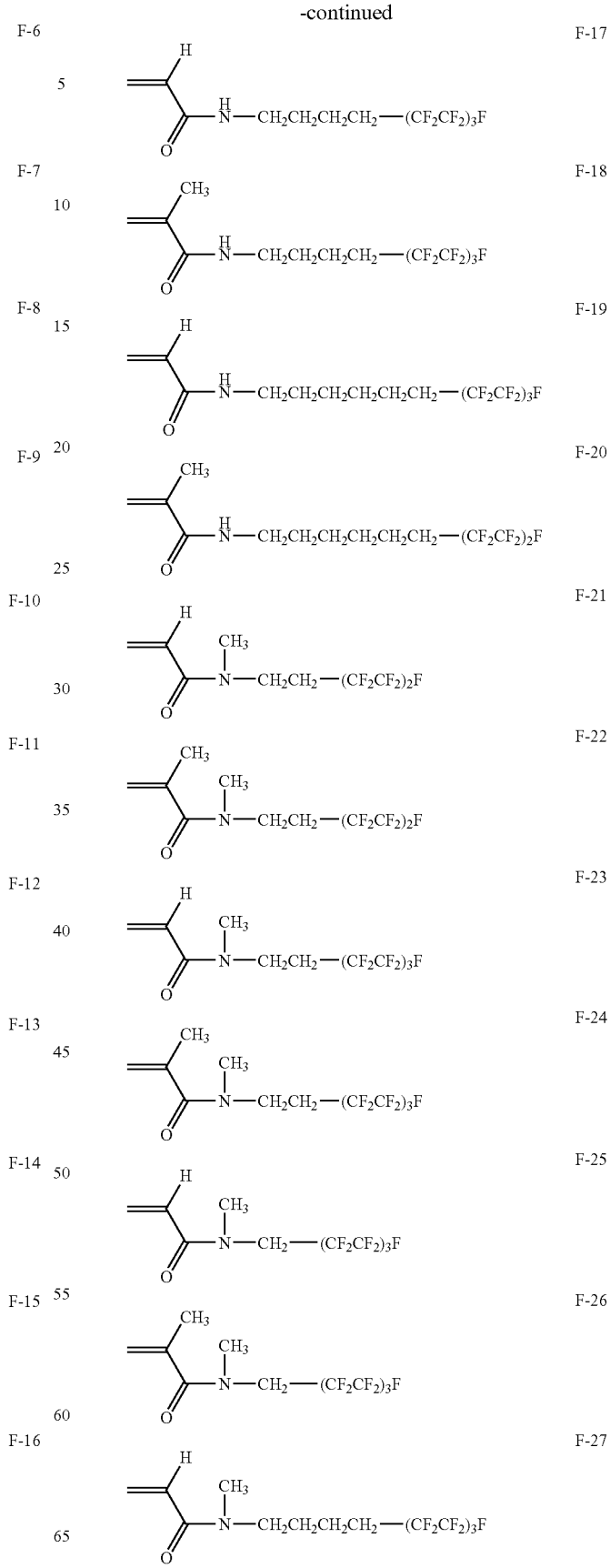

-continued
F-28
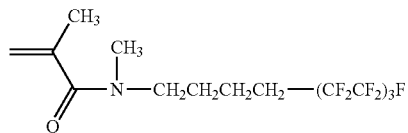
F-29
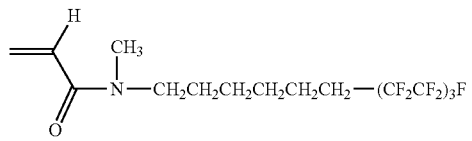
F-30
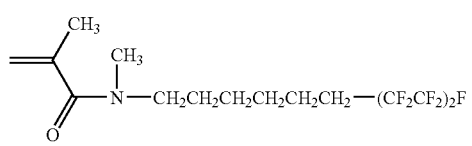
F-31
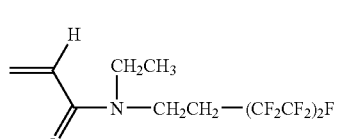
F-32
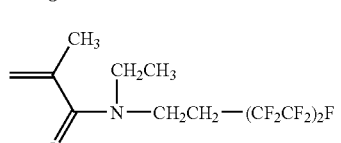
F-33
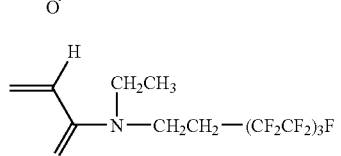
F-34
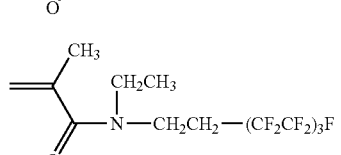
F-35
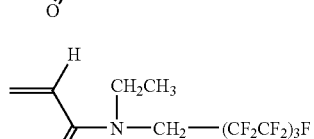
F-36
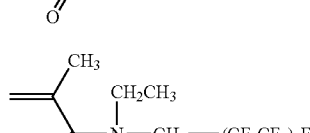
F37
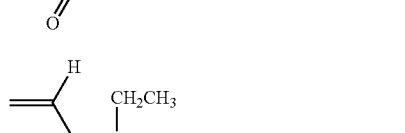
F38
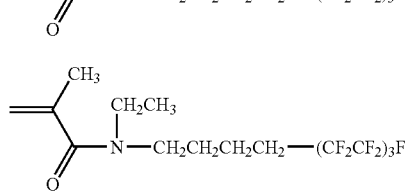
-continued
F-39
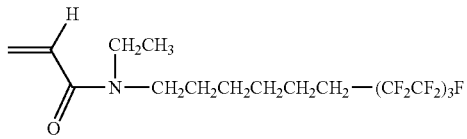
F-40
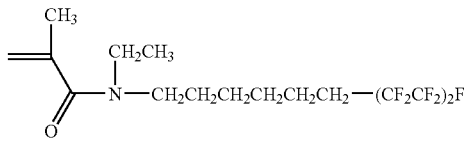
F-41
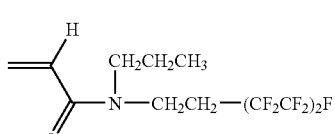
F-42
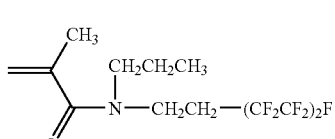
F-43
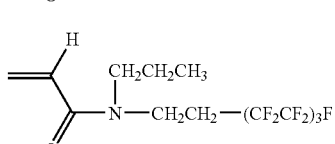
F-44
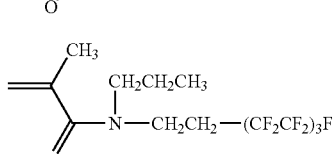
F-45
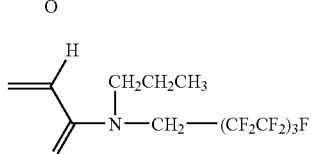
F-46
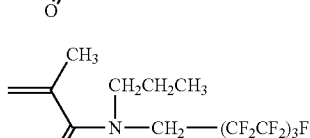
F-47
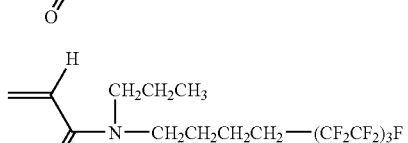
F-48
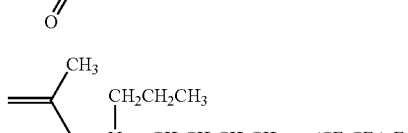
F-49
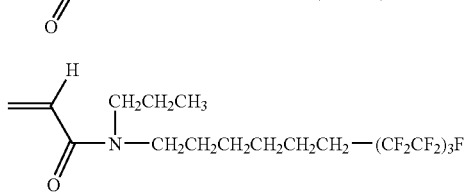

-continued
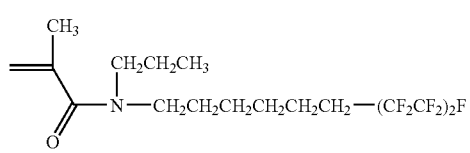 F-50
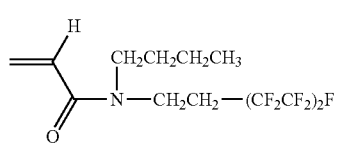 F-51
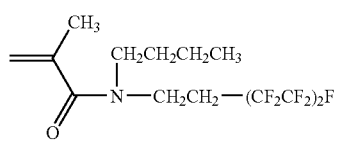 F-52
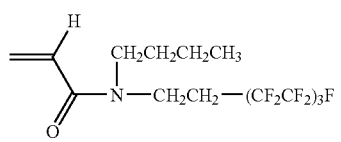 F-53
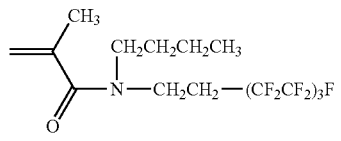 F-54
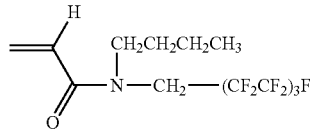 F-55
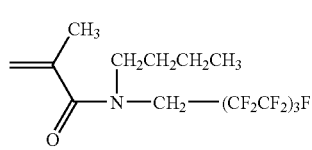 F-56
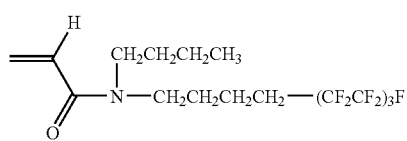 F-57
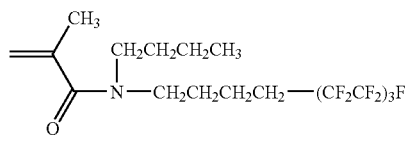 F-58
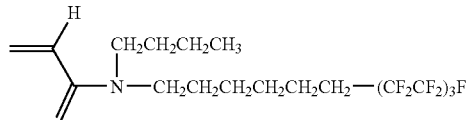 F-59
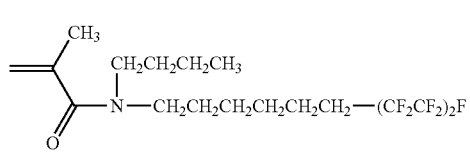 F-60
-continued
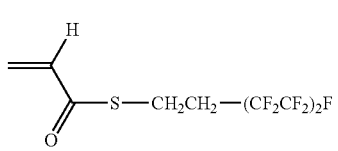 F-61
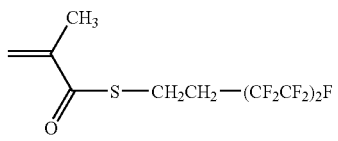 F-62
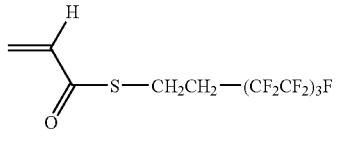 F-63
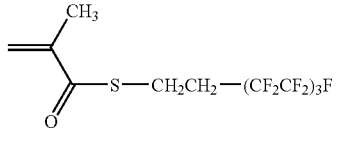 F-64
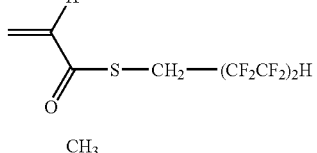 F-65
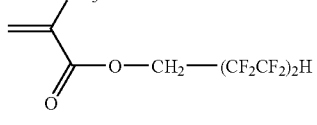 F-66
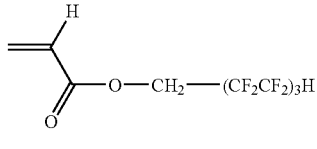 F-67
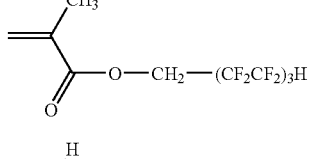 F-68
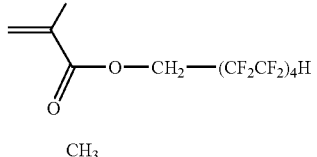 F-69
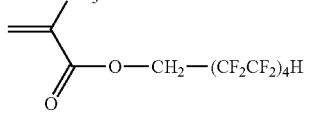 F-70
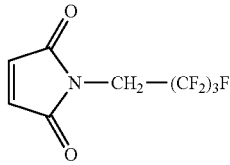 F-71

-continued
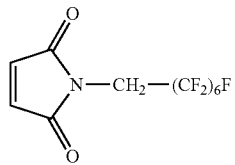
F-72
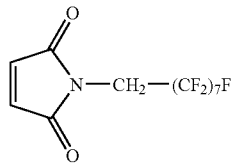
F-73
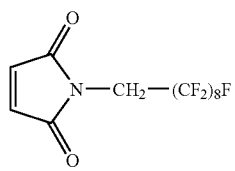
F-74
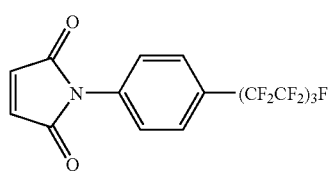
F-75
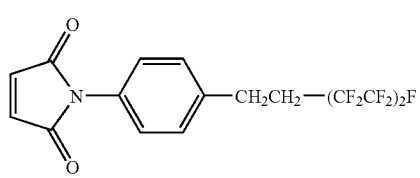
F-76
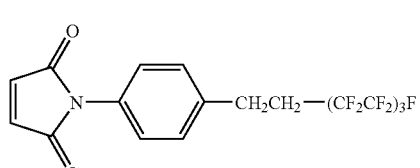
F-77
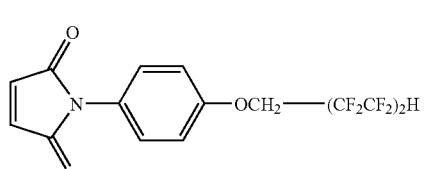
F-78
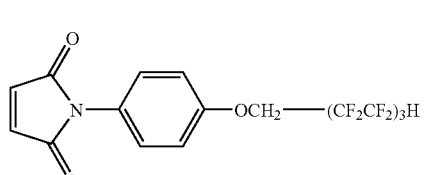
F-79
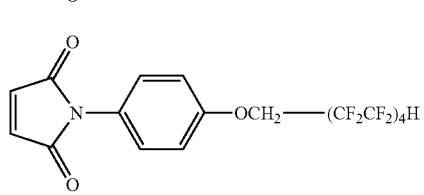
F-80
-continued
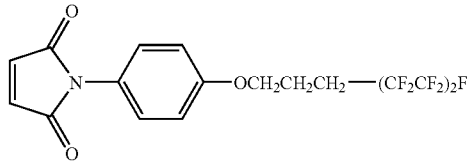
F-81
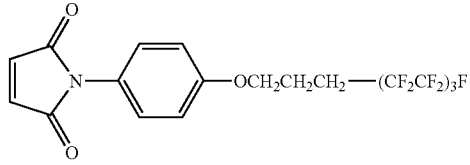
F-82
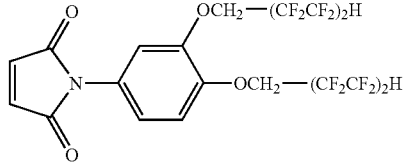
F-83
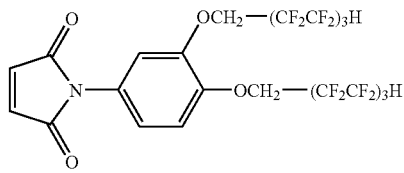
F-84
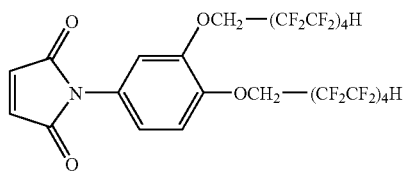
F-85
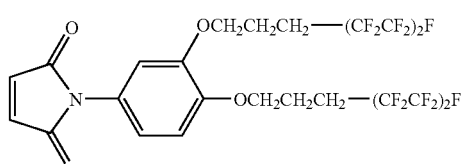
F-86
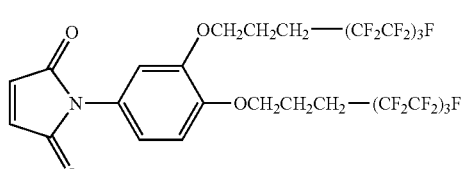
F-87
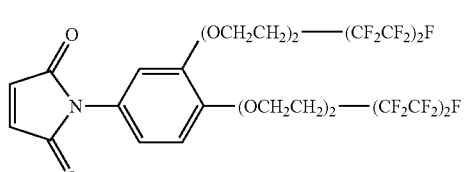
F-88
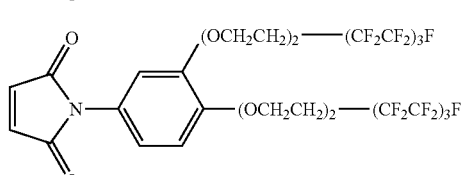
F-89

A form of the fluorine-based polymer usable in the invention is a copolymer of a repeating unit derived from a fluoroaliphatic group-containing monomer, and a repeating unit derived from a monomer containing a hydrophilic group represented by the following formula (3):

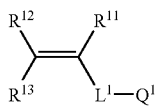

In the formula (3), $R^{11}$, $R^{12}$, and $R^{13}$ each independently represent a hydrogen atom or a substituent; $Q^1$ represents a carboxyl group (—COOH) or a salt thereof, a sulfo group (—$SO_3H$) or a salt thereof, a phosphonoxy group (—OP(=O)(OH)$_2$) or a salt thereof, an alkyl group, or a poly(alkylenoxy) group the end of which is a hydrogen atom or an alkyl group. L1 represents a given group selected from the following group of linking groups or a divalent linking group formed from a combination of two or more thereof:

(Group of Linking Groups)

a single bond, —O—, —CO—, —$NR^4$— (where $R^4$ represents a hydrogen atom, an alkyl group, an aryl group, or an aralkyl group), —S—, —$SO_2$—, —P(=O)(O$R^5$)— (where $R^5$ represents an alkyl group, an aryl group, or an aralkyl group), an alkylene group, and an arylene group.

In the formula (3), $R^{11}$, $R^{12}$, and $R^{13}$ each independently represent a hydrogen atom or a substituent selected from the following substituent group.

(Substituent Group)

an alkyl group (an alkyl group having preferably 1 to 20 carbon atoms, more preferably 1 to 12 carbon atoms, and in particular preferably 1 to 8 carbon atoms, examples of which may include a methyl group, an ethyl group, an isopropyl group, a tert-butyl group, a n-octyl group, a n-decyl group, a n-hexadecyl group, a cyclopropyl group, a cyclopentyl group, and a cyclohexyl group), an alkenyl group (an alkenyl group having preferably 2 to 20 carbon atoms, more preferably 2 to 12 carbon atoms, and in particular preferably 2 to 8 carbon atoms, examples of which may include a vinyl group, an aryl group, a 2-butenyl group, and a 3-pentenyl group), an alkynyl group (an alkynyl group having preferably 2 to 20 carbon atoms, more preferably 2 to 12 carbon atoms, and in particular preferably 2 to 8 carbon atoms, examples of which may include a propargyl group and a 3-pentynyl group), an aryl group (an aryl group having preferably 6 to 30 carbon atoms, more preferably 6 to 20 carbon atoms, and in particular preferably 6 to 12 carbon atoms, examples of which may include a phenyl group, a p-methylphenyl group, and a naphthyl group), an aralkyl group (an aralkyl group having preferably 7 to 30 carbon atoms, more preferably 7 to 20 carbon atoms, and in particular preferably 7 to 12 carbon atoms, examples of which may include a benzyl group, a phenethyl group, and a 3-phenylpropyl group), a substituted or unsubstituted amino group (an amino group having preferably 0 to 20 carbon atoms, more preferably 0 to 10 carbon atoms, and in particular preferably 0 to 6 carbon atoms, examples of which may include an unsubstituted amino group, a methylamino group, a dimethylamino group, a diethylamino group, and an anilino group), an alkoxy group (an alkoxy group having preferably 1 to 20 carbon atoms, more preferably 1 to 16 carbon atoms, and in particular preferably 1 to 10 carbon atoms, examples of which may include a methoxy group, an ethoxy group, and a butoxy group), an alkoxycarbonyl group (an alkoxycarbonyl group having preferably 2 to 20 carbon atoms, more preferably 2 to 16 carbon atoms, and particular preferably 2 to 10 carbon atoms, examples of which may include a methoxycarbonyl group and an ethoxycarbonyl group), an acyloxy group (an acyloxy group having preferably 2 to 20 carbon atoms, more preferably 2 to 16 carbon atoms, and in particular preferably 2 to 10 carbon atoms, examples of which may include an acetoxy group and a benzoyloxy group), an acylamino group (an acylamino group having preferably 2 to 20 carbon atoms, more preferably 2 to 16 carbon atoms, and in particular preferably 2 to 10 carbon atoms, examples of which may include an acetylamino group and a benzoylamino group), an alkoxycarbonylamino group (an alkoxycarbonylamino group having preferably 2 to 20 carbon atoms, more preferably 2 to 16 carbon atoms, and in particular preferably 2 to 12 carbon atoms, examples of which may include a methoxycarbonylamino group), an aryloxycarbonylamino group (an aryloxycarbonylamino group having preferably 7 to 20 carbon atoms, more preferably 7 to 16 carbon atoms, and in particular preferably 7 to 12 carbon atoms, examples of which may include a phenyloxycarbonylamino group), a sulfonylamino group (a sulfonylamino group having preferably 1 to 20 carbon atoms, more preferably 1 to 16 carbon atoms, and in particular preferably 1 to 12 carbon atoms, examples of which may include a methanesulfonylamino group and a benzenesulfonylamino group), a sulfamoyl group (a sulfamoyl group having preferably 0 to 20 carbon atoms, more preferably 0 to 16 carbon atoms, and in particular preferably 0 to 12 carbon atoms, examples of which may include a sulfamoyl group, a methylsulfamoylamino group, a dimethylsulfamoyl group, and a phenylsulfamoyl group), a carbamoyl group (a carbamoyl group having preferably 1 to 20 carbon atoms, more preferably 1 to 16 carbon atoms, and in particular preferably 1 to 12 carbon atoms, examples of which may include an unsubstituted carbamoyl group, a methylcarbamoyl group, a diethylcarbamoyl group, and a phenylcarbamoyl group), an alkylthio group (an alkylthio group having preferably 1 to 20 carbon atoms, more preferably 1 to 16 carbon atoms, and in particular preferably 1 to 12 carbon atoms, examples of which may include a methylthio group and an ethylthio group), an arylthio group (an arylthio group having preferably 6 to 20 carbon atoms, more preferably 6 to 16 carbon atoms, and in particular preferably 6 to 12 carbon atoms, examples of which may include a phenylthio group), a sulfonyl group (a sulfonyl group having preferably 1 to 20 carbon atoms, more preferably 1 to 16 carbon atoms, and in particular preferably 1 to 12 carbon atoms, examples of which may include a mesyl group and a tosyl group), a sulfinyl group (a sulfinyl group having preferably 1 to 20 carbon atoms, more preferably 1 to 16 carbon atoms, and in particular preferably 1 to 12 carbon atoms, examples of which may include a methanesulfinyl group and a benzenesulfinyl group), an ureido group (an ureido group having preferably 1 to 20 carbon atoms, more preferably 1 to 16 carbon atoms, and in particular preferably 1 to 12 carbon atoms, examples of which may include an unsubstituted ureido group, a methylureido group, and a phenylureido group), a phosphoric acid amido group (a phosphoric acid amido group having preferably 1 to 20 carbon atoms, more preferably 1 to 16 carbon atoms, and in particular preferably 1 to 12 carbon atoms, examples of which may include a diethyl phosphoric acid amido group and a phenyl phosphoric acid amido group), a hydroxy group, a mercapto group, a halogen atom (e.g., a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (a heterocyclic group having preferably 1 to 30 carbon atoms, and more preferably 1 to 12 carbon atoms, for example, a heterocyclic group having a hetero atom such as a nitrogen atom, an oxygen atom, or a sulfur atom, examples of which may include an imidazolyl group, a pyridyl group, a quinolyl group, a furyl group, a piperidyl group, a morpholino group, a benzoxazolyl group, a benzimidazolyl group, and a benzothiazolyl group), and a silyl group (a silyl group having preferably 3 to 40 carbon atoms, more preferably 3 to 30 carbon atoms, and in particular preferably 3 to 24 carbon atoms, examples of which may include a trimethylsilyl group and a triphenylsilyl group) are included. These substituents may be further substituted with these substituents. Whereas, when two or more substituents are included, they may be the same or different. Further, if possible, they may combine with each other to form a ring.

$R^{11}$, $R^{12}$, and $R^{13}$ each independently are preferably a hydrogen atom, an alkyl group, a halogen atom (e.g., a fluorine atom, a chlorine atom, a bromine atom, or an iodine atom), or a group represented by -L1-$Q^1$ described later, more preferably a hydrogen atom, an alkyl group having 1 to 6 carbon atoms, a chlorine atom, or a group represented by -L1-$Q^1$, further preferably a hydrogen atom, or an alkyl group having 1 to 4 carbon atoms, and in particular preferably a hydrogen atom, or an alkyl group having 1 to 2 carbon atoms, and most preferably, $R^2$ and $R^3$ are each a hydrogen atom, and $R^1$ is a hydrogen atom or a methyl group. Specific examples of the alkyl group may include a methyl group, an ethyl group, a n-propyl group, a n-butyl group, and a sec-butyl group. The alkyl group may have an appropriate substituent. As the substituent, mention may be made of a halogen atom, an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamido group, a sulforyl group, a carboxyl group, or the like. Incidentally, the number of carbons of an alkyl group does not include the number of the carbon atoms of the substituent. Below, the same goes for the number of carbon atoms of other groups.

L1 represents a divalent linking group selected from the group of linking groups, or a divalent linking group formed from a combination of two or more thereof. In the group of linking groups, $R^4$ of —$NR^4$— represents a hydrogen atom, an allyl group, an aryl group, or an aralkyl group, preferably a hydrogen atom or an alkyl group. Whereas, $R^5$ of —PO(OR$^5$)— represents an alkyl group, an aryl group, or an aralkyl group, and preferably an alkyl group. The number of carbon atoms when $R^4$ and $R^5$ each represent an alkyl group, an aryl group, or an aralkyl group is the same as that described in connection with the "substituent group". L preferably includes a single bond, —O—, —CO—, —$NR^4$—, —S—, —$SO_2$—, an alkylene group, or an arylene group, in particular preferably includes a single bond, —CO—, —O—, —$NR^4$—, an alkylene group, or an arylene group, and most preferably is a single bond. When L includes an alkylene group, the number of carbons of the alkylene group is preferably 1 to 12, more preferably 1 to 8, and in particular preferably 1 to 6. Particularly preferred specific examples of an alkylene group may include methylene, ethylene, trimethylene, tetrabutylene, and hexamethylene groups. When L includes an arylene group, the number of carbon atoms of the arylene group is preferably 6 to 24, more preferably 6 to 18, and in particular preferably 6 to 12. Particularly preferred specific examples of an arylene group may include phenylene and naphthalene groups. When L includes a divalent linking group (i.e., an aralkylene group) obtained from a combination of an alkylene group and an arylene group, the number of carbon atoms of the aralkylene group is preferably 7 to 36, more preferably 7 to 26, and in particular preferably 7 to 16. Particularly preferred specific examples of an aralkylene group may include a phenylenemethylene group, a phenyleneethylene group, and a methylenephenylene group. The groups mentioned as L1 may have appropriate substituents. As such substituents, mention may be made of the same ones as the substituents mentioned as the substituents in $R^{11}$ to $R^{13}$ previously. Below, specific structures of L will be shown. However, the invention is not limited to these specific examples.

L-1 —— (Single bond)

L-2 ——COO—(CH$_2$)$_2$—

L-3 ——COO—(CH$_2$)$_3$—

L-4 ——COO—(CH$_2$)$_5$—

L-5 ——COO—(CH$_2$)$_8$—

L-6 ——COO—(CH$_2$)$_{11}$—

L-7 ——COO—(CH$_2$)$_3$—CH(CH$_3$)CH$_2$—

L-8 ——CONH—(CH$_2$)$_3$—

L-9 ——CONH—(CH$_2$)$_5$—

L-10 ——CON(CH$_3$)—(CH$_2$)$_8$—

L-11 ——CONH—(CH$_2$)$_{11}$—

L-12 ——C$_6$H$_4$—

L-13 ——COO—C$_6$H$_4$—

L-14 ——COO—C$_6$H$_3$(CH$_3$)—

L-15 ——CONH—C$_6$H$_3$(CH$_3$)—

L-16 ——COOCH$_2$CH$_2$OCH$_2$—

L-17 ——COO—(CH$_2$CH$_2$O)$_2$—CH$_2$—

L-18 ——CONH—C$_6$H$_4$(OCH$_2$—)

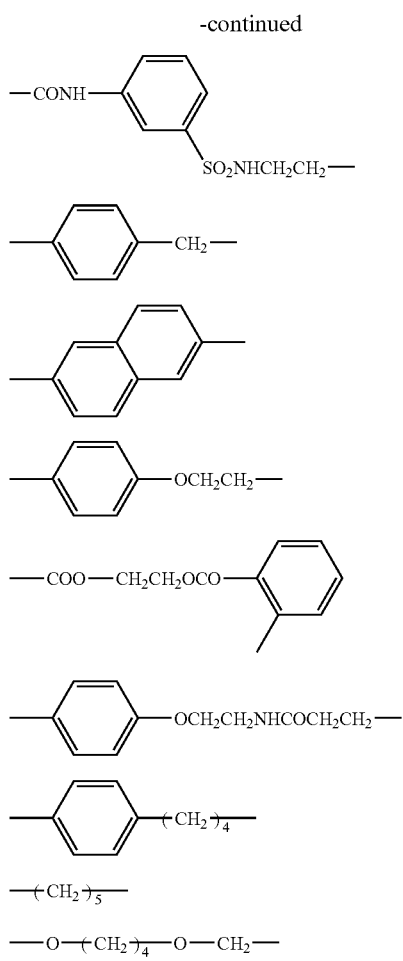

In the formula (3), $Q^1$ represents a carboxyl group, a salt of a carboxyl group (e.g., a lithium salt, a sodium salt, a potassium salt, an ammonium salt (e.g., ammonium, tetramethyl ammonium, trimethyl-2-hydroxyethyl ammonium, tetrabutyl ammonium, trimethylbenzyl ammonium, or dimethylphenyl ammonium), or a pyridinium salt), a sulfo group, a salt of a sulfo group (the examples of the salt-forming cation are the same as the ones described for the carboxyl group), a phosphonoxy group, a salt of a phosphonoxy-group (the examples of the salt-forming cation are the same as the ones described for the carboxyl group), an alkyl group (1 to 18 carbon atoms), or a poly(alkylenoxy) group the end of which is a hydrogen atom or an alkyl group.

The poly(alkylenoxy) group can be represented by $(OR)_x$-G, where R is preferably an alkylene group having 2 to 4 carbon atoms, such as —CH$_2$CH$_2$—, —CH$_2$CH$_2$CH$_2$—, —CH(CH$_3$)CH$_2$—, or —CH(CH$_3$)CH(CH$_3$)—; G is a hydrogen atom or an alkyl group having 1 to 12 carbon atoms, and preferably a hydrogen atom or a methyl group; X represents a natural number; and the oxyalkylene units in the poly(oxyalkylene) group may be the same or two or more irregularly dispersed, mutually different oxyalkylenes, and may be straight-chain or branched oxypropylene or oxyethylene units, or may be present as in the form of a block of straight-chain or branched oxypropylene units and a block of oxyethylene units. The poly(oxyalkylene) chain may include the one linked through one or more linking groups (e.g., —CONH-Ph-NHCO—, and —S—: where Ph represents a phenylene group). When the linking group has a valence of 3 or more, a branched oxyalkylene unit can be obtained. Whereas, when a copolymer containing a polymer unit having a poly(oxyalkylene) group is used in the invention, the molecular weight of the poly(oxyalkylene) group is properly 80 to 3000, and more preferably 250 to 3000. Poly(oxyalkylene) acrylate and methacrylate can be produced by allowing commercially available hydroxypoly(oxyalkylene) materials such as trade name "Pluronic" (manufactured by Asahi Denka Co., Ltd.), ADEKA polyether (manufactured by Asahi Denka Co., Ltd.), "Carbowax" (Glico Products), and "Toriton" (manufactured by Rohm and Haas), and P.E.G (DAI-ICHI KOGYO SEIYAKU CO., Ltd.) to react with acrylic acid, methacrylic acid, acryl chloride, methacryl chloride, acrylic anhydride, or the like by a known method. Separately, poly(oxyalkylene) diacrylate or the like produced by a known method can also be used.

Specific examples of the monomer corresponding to the formula (3) which can be utilized for production of the fluorine-based polymer usable in the invention will be shown below. However, the invention is not limited to the following specific examples at all. Poly(alkylenoxy) groups are often mixtures of the ones different in degree of polymerization x. In the compounds shown as the specific examples, the degree of polymerization is expressed as an integer close to the average of the degrees of polymerization.

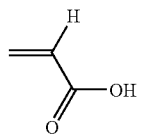

C-1

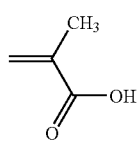

C-2

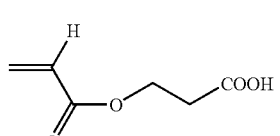

C-3

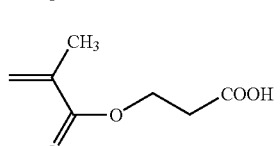

C-4

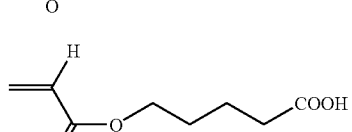

C-5

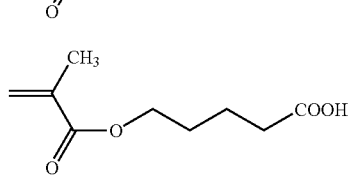

C-6

-continued
C-7
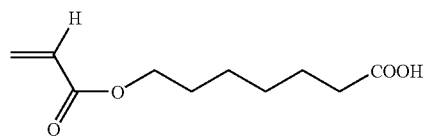
C-8
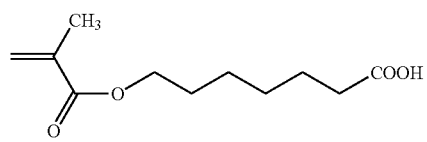
C-9
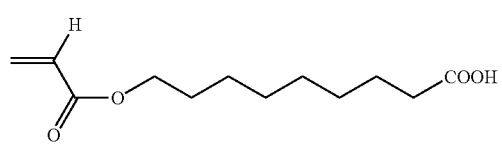
C-10
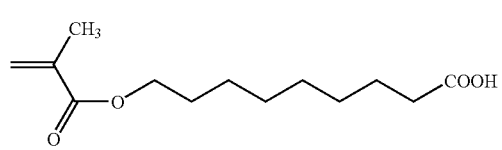
C-11
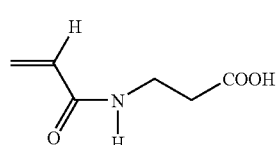
C-12
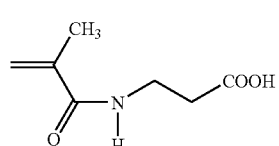
C-13
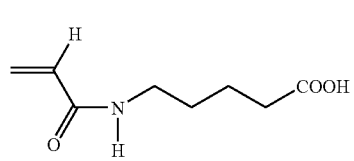
C-14
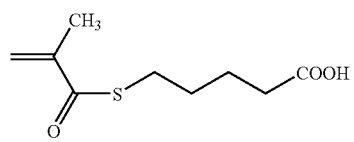
C-15
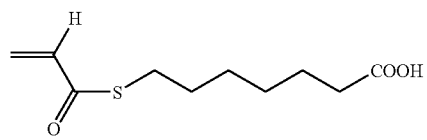
C-16
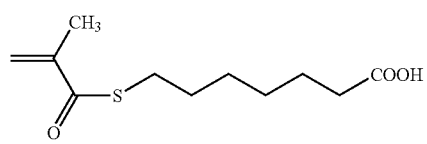
-continued
C-17
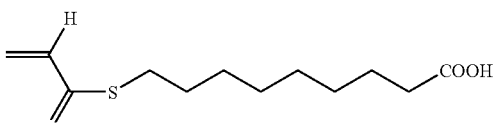
C-18
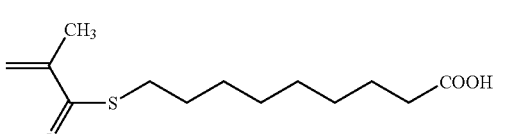
C-19
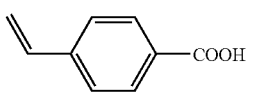
C-20
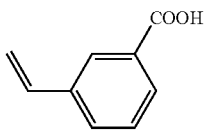
C-21
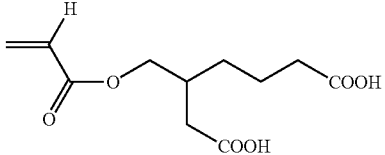
C-22
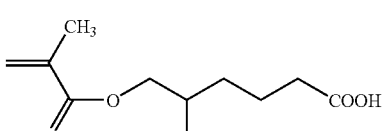
C-23
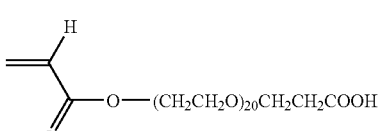
C-24
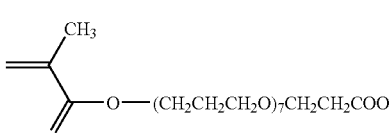
C-25
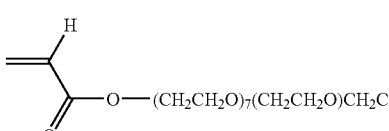
C-26
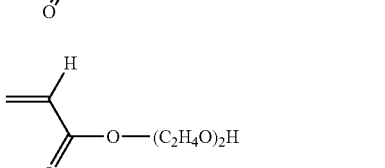

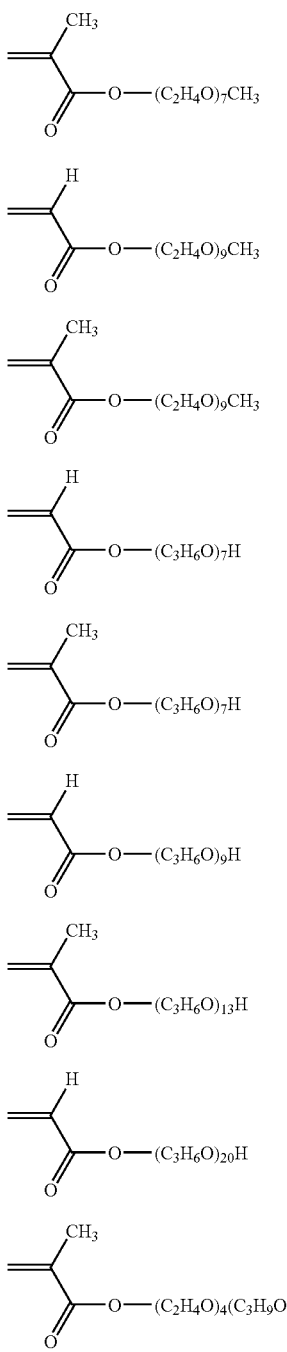

The fluorine-based polymer may contain one of the repeating units represented by the formula (3), or may contain two or more thereof. Further, the fluorine-based polymer may contain one, or two or more of other repeating units than the repeating units. The other repeating units have no particular restriction. The repeating units derived from monomers capable of general radical polymerization reaction can be mentioned as preferred examples. Below, specific examples of the monomers for deriving the other repeating units will be shown. The fluorine-based polymer may contain repeating units derived from one, or two or more selected from the following monomer group.

Monomer group (1) Alkenes ethylene, propylene, 1-butene, isobutene, 1-hexene, 1-dodecene, 1-octadecene, 1-eicosene, hexafluoropropene, vinylidene fluoride, chlorotrifluoroethylene, 3,3,3-trifluoropropylene, tetrafluoroethylene, vinyl chloride, vinylidene chloride, and the like;

(2) Dienes 1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinylcyclohexane, and the like;

(3) Derivatives of α,β-unsaturated carboxylic acids (3a) alkyl acrylates methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furyl acrylate, tetrahydrofurfuryl acrylate, 2-methoxyethyl acrylate, ω-methoxypolyethylene glycol acrylate (with a number of moles of polyoxyethylene added: n=2 to 100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate, and the like);

(3b) Alkyl methacrylates methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetrahydrofurfuryl methacrylate, cresyl methacrylate, naphthyl methacrylate, 2-methoxyethyl methacrylate, 3-methoxybutyl methacrylate, ω-methoxypolyethylene glycol methacrylate (with a number of moles of polyoxyethylene added: n=2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimethoxysilylpropyl methacrylate, allyl methacrylate, 2-isocyanatoethyl methacrylate, and the like;

(3c) Diesters of unsaturated polyhydric carboxylic acid dimethyl maleate, dibutyl maleate, dimethyl itaconate, dibutyl itaconate, dibutyl crotonate, dihexyl crotonate, diethyl fumarate, dimethyl fumarate, and the like;

(3e) Amides of α,β-unsaturated carboxylic acid

N,N-dimethylacrylamide, N,N-diethylacrylamide, N-n-propylacrylamide, N-tert-butylacrylamide, N-tert-octylmethacrylamide, N-cyclohexylacrylamide, N-phenylacrylamide, N-(2-acetoacetoxyethyl)acrylamide, N-benzylacrylamide, N-acryloylmorpholine, diacetoneacrylamide, N-methylmaleimide, and the like;

(4) Unsaturated nitriles acrylonitrile, methacrylonitrile, and the like;

(5) Styrene and derivatives thereof styrene, vinyl toluene, ethyl styrene, p-tert-butyl styrene, P-vinyl methyl benzoate, α-methyl styrene, p-chloromethyl styrene, vinyl naphthalene, p-methoxy styrene, p-hydroxymethyl styrene, p-acetoxy styrene, and the like;

(6) Vinyl esters vinyl acetate, vinyl propionate, vinyl butyrate, vinyl isobutyrate, vinyl benzoate, vinyl salicylate, vinyl chloroacetate, vinyl methoxyacetate, vinyl phenylacetate, and the like;

(7) Vinyl ethers methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether, and the like; and (8) Other polymerizable monomers n-vinyl pyrrolidone, methyl vinyl ketone, phenyl vinyl ketone, methoxyethyl vinyl ketone, 2-vinyl oxazoline, 2-isopropenyl oxazoline, and the like.

As the monomers for deriving other repeating units, the monomers represented by the following formula (4) are preferably used.

Formula (4)

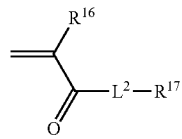

In the formula (4), $R^{16}$ represents a hydrogen atom or a methyl group, $L^2$ represents a divalent linking group, and $R^{17}$ represents a straight-chain, branched, or cyclic alkyl group having 1 or more and 20 or less carbon atoms which may have a substituent. The divalent linking group represented by $L^2$ is preferably an oxygen atom, a sulfur atom, or —N($R^5$)—. Herein, $R^5$ is preferably a hydrogen atom, an alkyl group having 1 to 4 carbon atoms, such as methyl, ethyl, propyl, or butyl. $R^5$ is more preferably a hydrogen atom or methyl. Z is in particular preferably an oxygen atom, —NH—, or —N(CH$_3$)—.

As the straight-chain, branched, or cyclic alkyl groups having 1 or more and 20 or less carbon atoms represented by $R^{17}$, a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group, an eicosanyl group, or the like, which may be straight chain or branched, further, a monocyclic cycloalkyl group such as a cyclopentyl group, a cyclohexyl group, or a cyclobutyl group, and a polycyclic cycloalkyl group such as a bicycloheptyl group, a bicyclononyl group, a bicyclodecyl group, a tricyclodecyl group, a tricycloundecyl group, a tetracyclododecyl group, an adamantyl group, a norbornyl group, or a tetracyclodecyl group are preferably used.

As the substituents of the alkyl group represented by $R^{17}$, mention may be made of a hydroxy group, an alkyl carbonyl group, an aryl carbonyl group, an alkyl carbonyloxy group, a carboxyl group, an alkyl ether group, an aryl ether group, a halogen atom such as a fluorine atom, a chlorine atom, or a bromine atom, a nitro group, a cyano group, an amino group, or the like, which are non-exclusive.

The monomer represented by the formula (4) is in particular preferably alkyl (meth)acrylate or poly(alkylenoxy) (meth)acrylate.

Specific examples of the monomer represented by the formula (4) will be shown next. However, the invention is not limited to the following specific examples at all

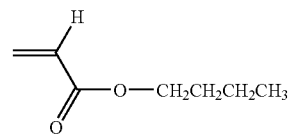
A-1

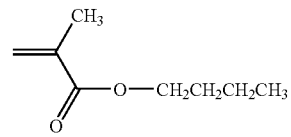
A-2

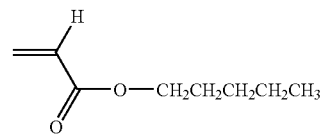
A-3

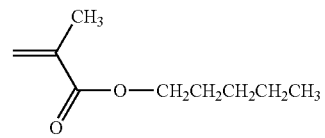
A-4

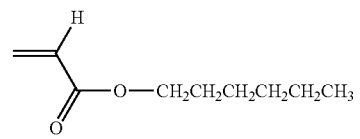
A-5

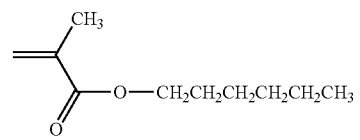
A-6

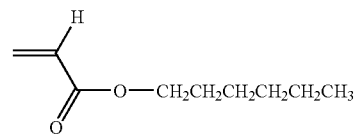
A-7

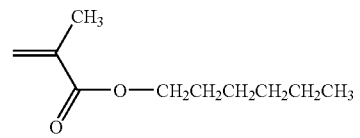
A-8

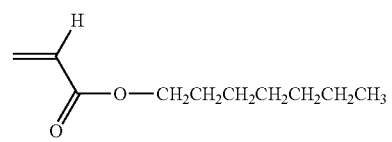
A-9

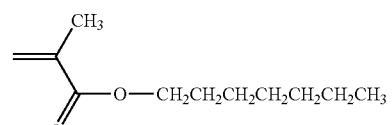
A-10

-continued
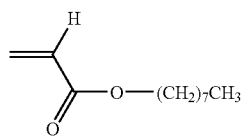 A-11
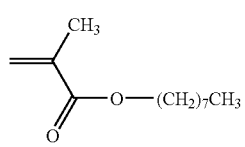 A-12
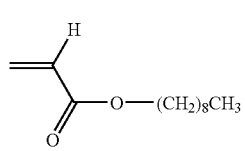 A-13
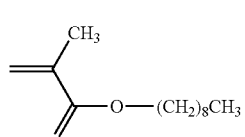 A-14
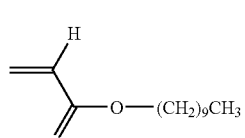 A-15
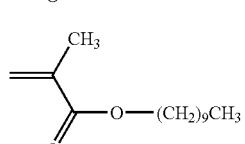 A-16
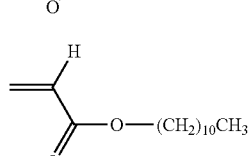 A-17
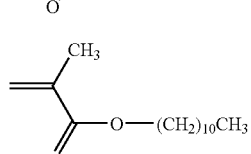 A-18
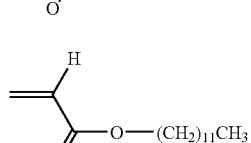 A-19
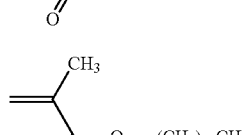 A-20
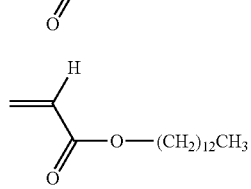 A-21
-continued
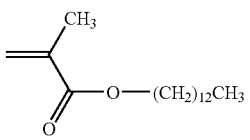 A-22
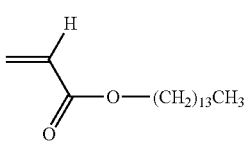 A-23
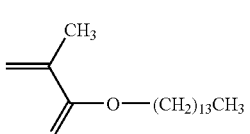 A-24
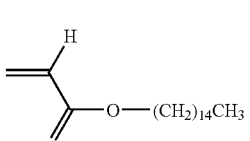 A-25
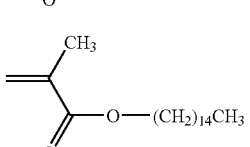 A-26
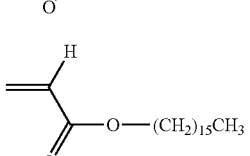 A-27
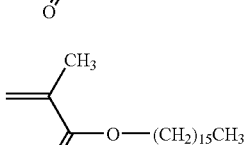 A-28
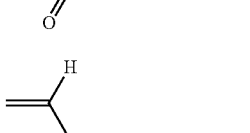 A-29
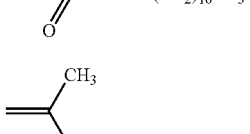 A-30
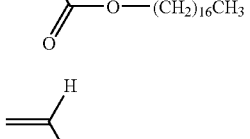 A-31
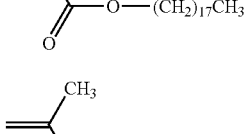 A-32

-continued
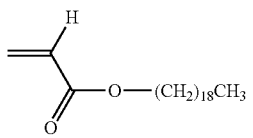
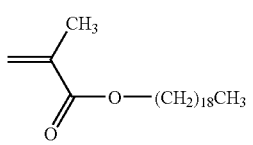
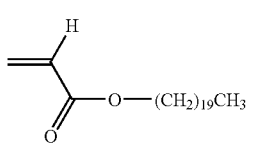
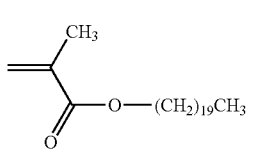
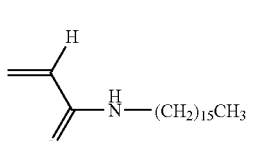
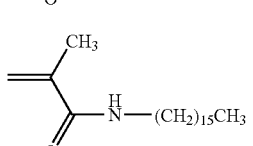
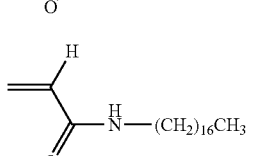
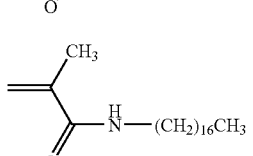
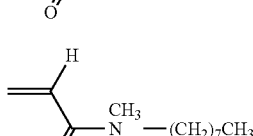
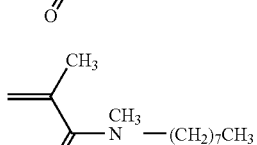
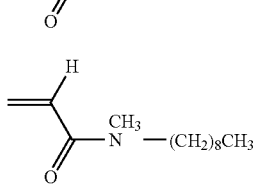
-continued
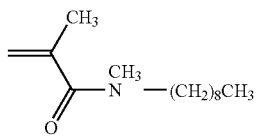 A-33
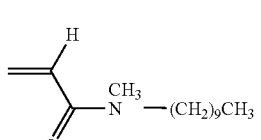 A-34
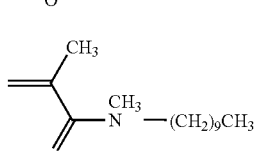 A-35
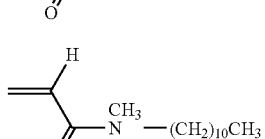 A-36
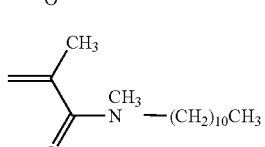 A-37
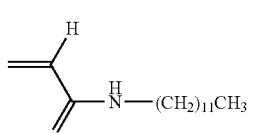 A-38
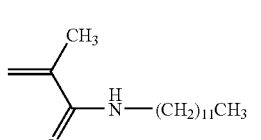 A-39
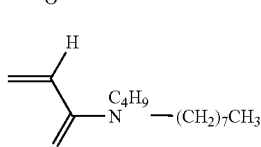 A-40
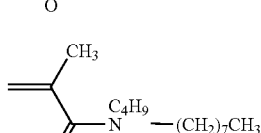 A-41
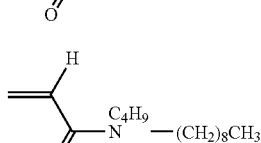 A-42
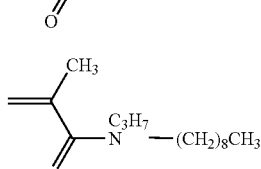 A-43
A-44
A-45
A-46
A-47
A-48
A-49
A-50
A-51
A-52
A-53
A-54

-continued
A-55 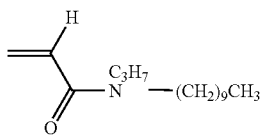
A-56 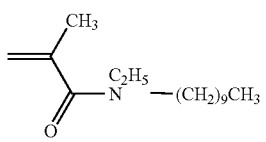
A-57 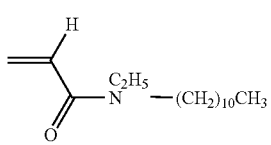
A-58 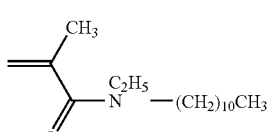
A-59 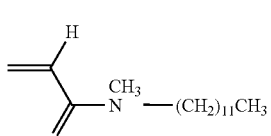
A-60 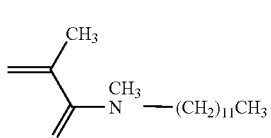
A-61 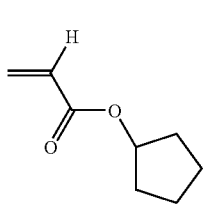
A-62 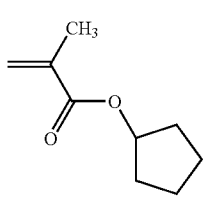
A-63 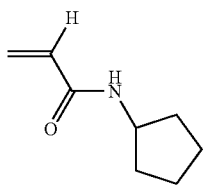
-continued
A-64 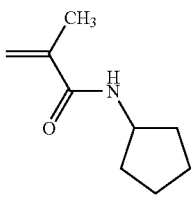
A-65 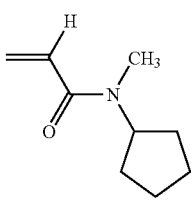
A-66 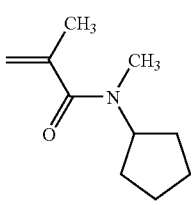
A-67 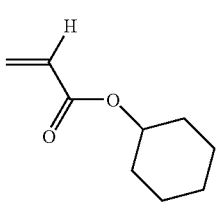
A-68 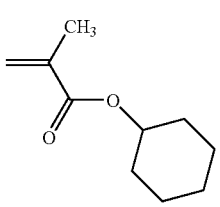
A-69 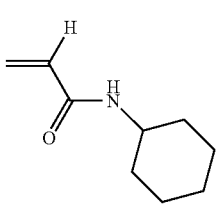
A-70 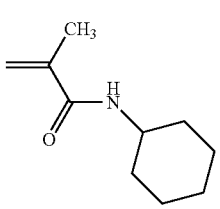
A-71 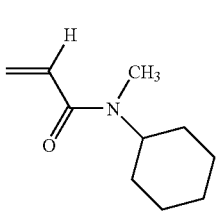

A-72 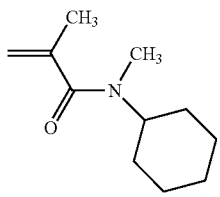
A-73 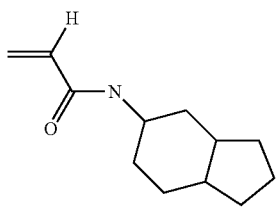
A-74 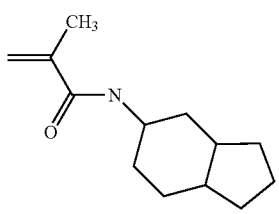
A-75 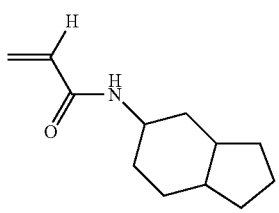
A-76 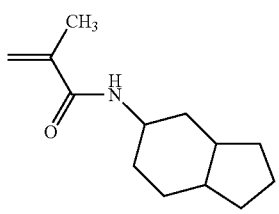
A-77 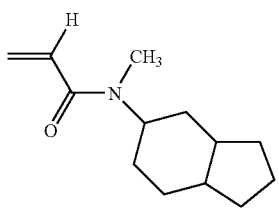
A-78 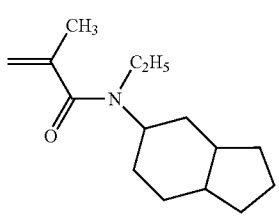
A-79 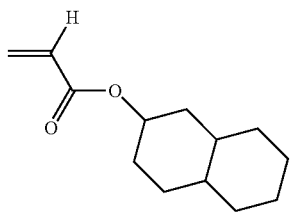
A-80 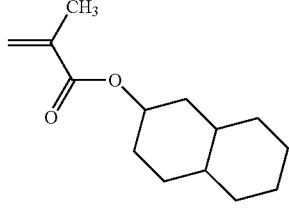
A-81 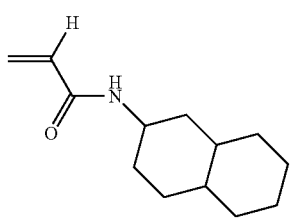
A-82 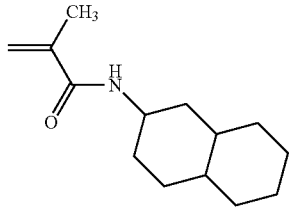
A-83 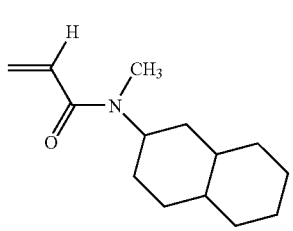
A-84 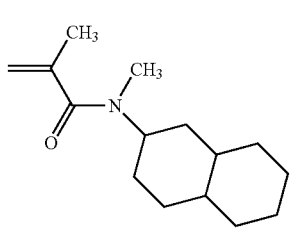
A-85 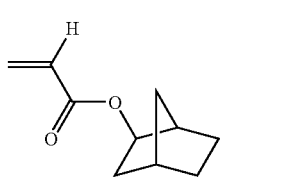

-continued
A-86
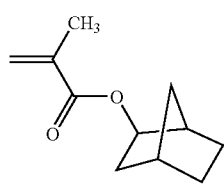
A-87
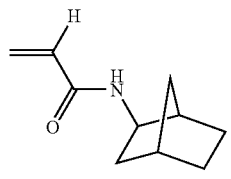
A-88
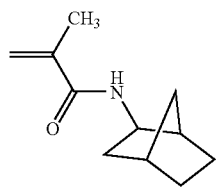
A-89
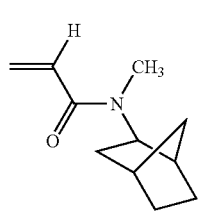
A-90
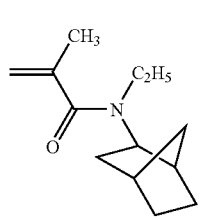
A-91
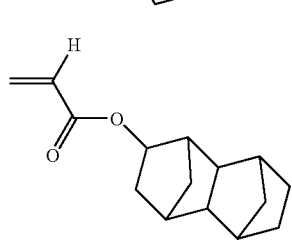
A-92
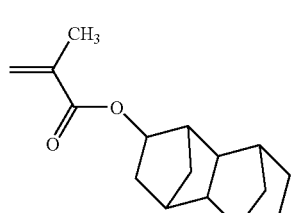
A-93
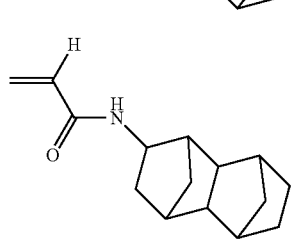
-continued
A-94
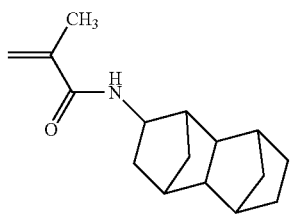
A-95
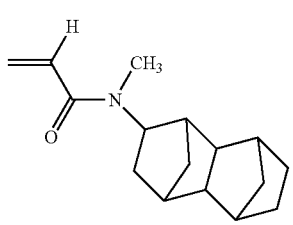
A-96
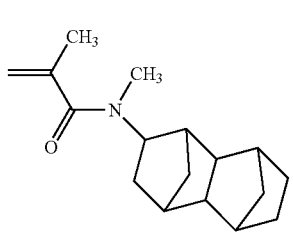
A-97
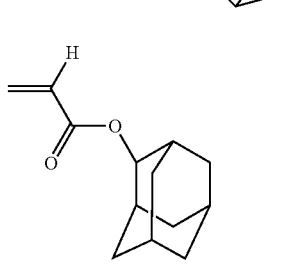
A-98
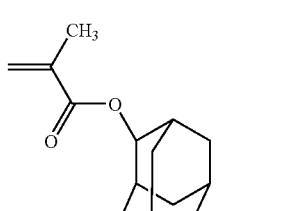
A-99
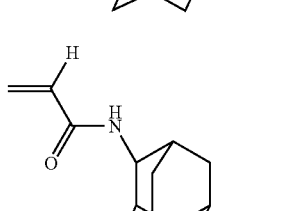
A-100
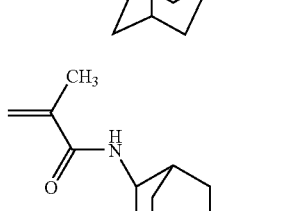

-continued
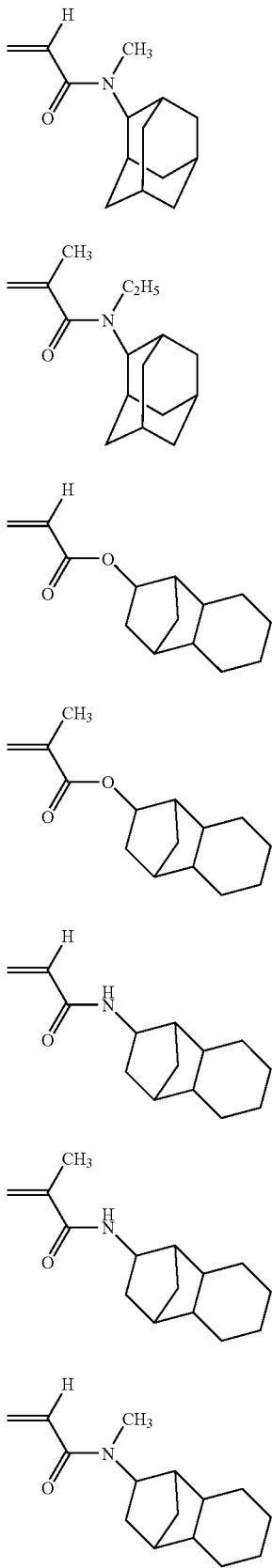
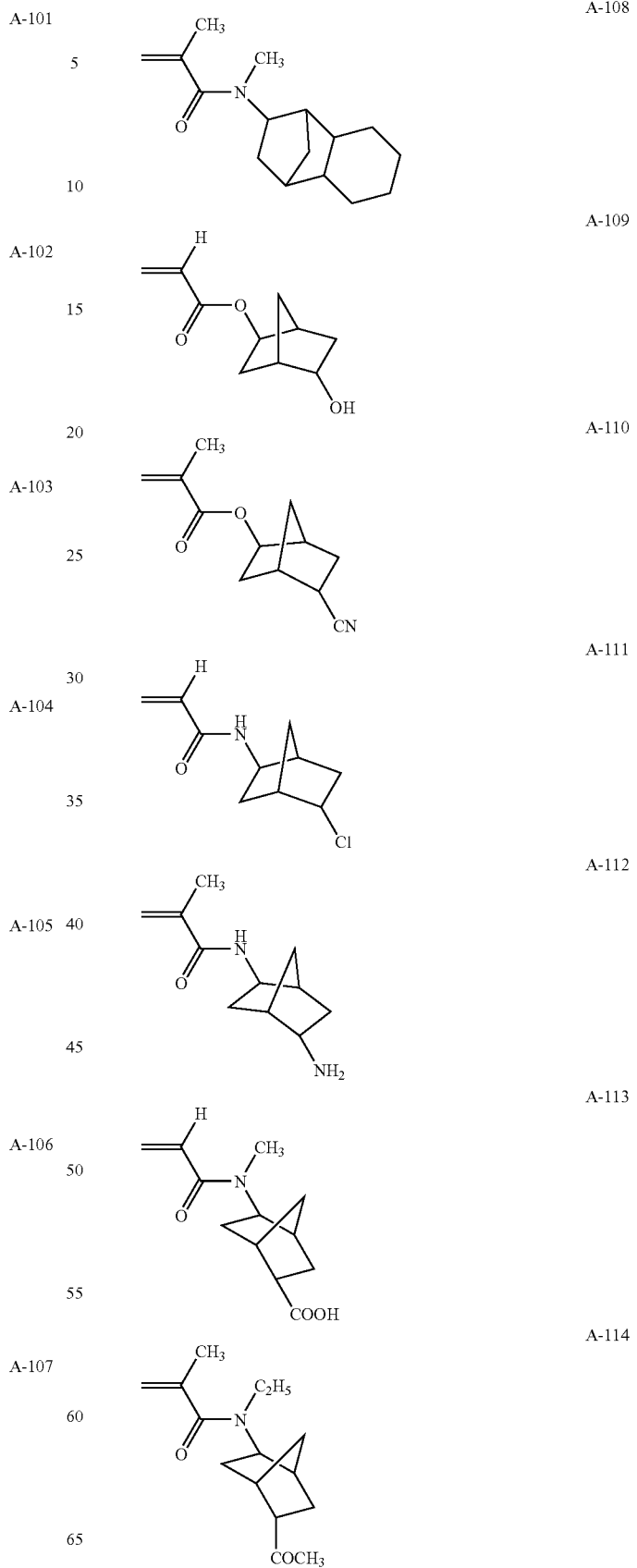

-continued

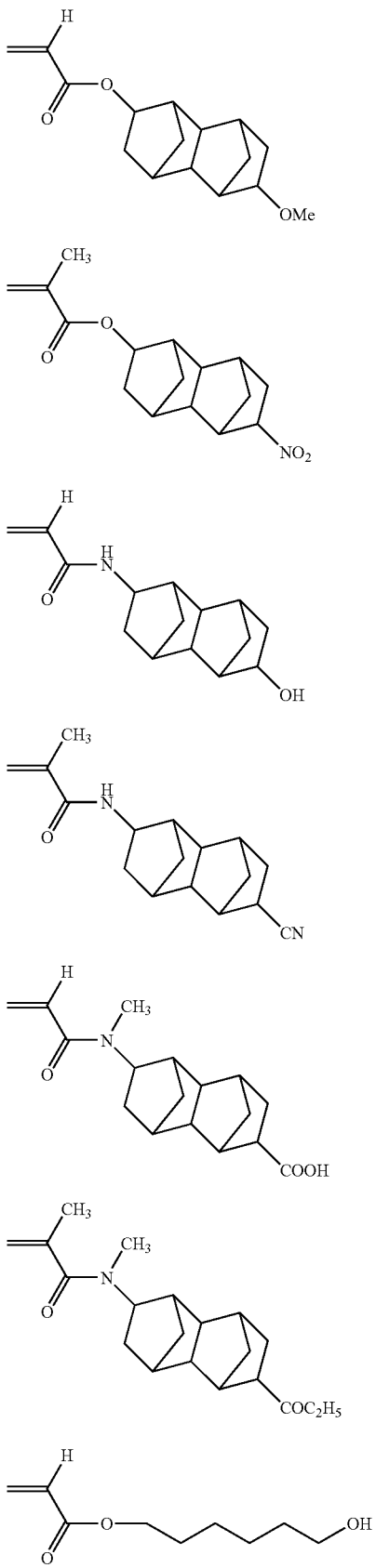

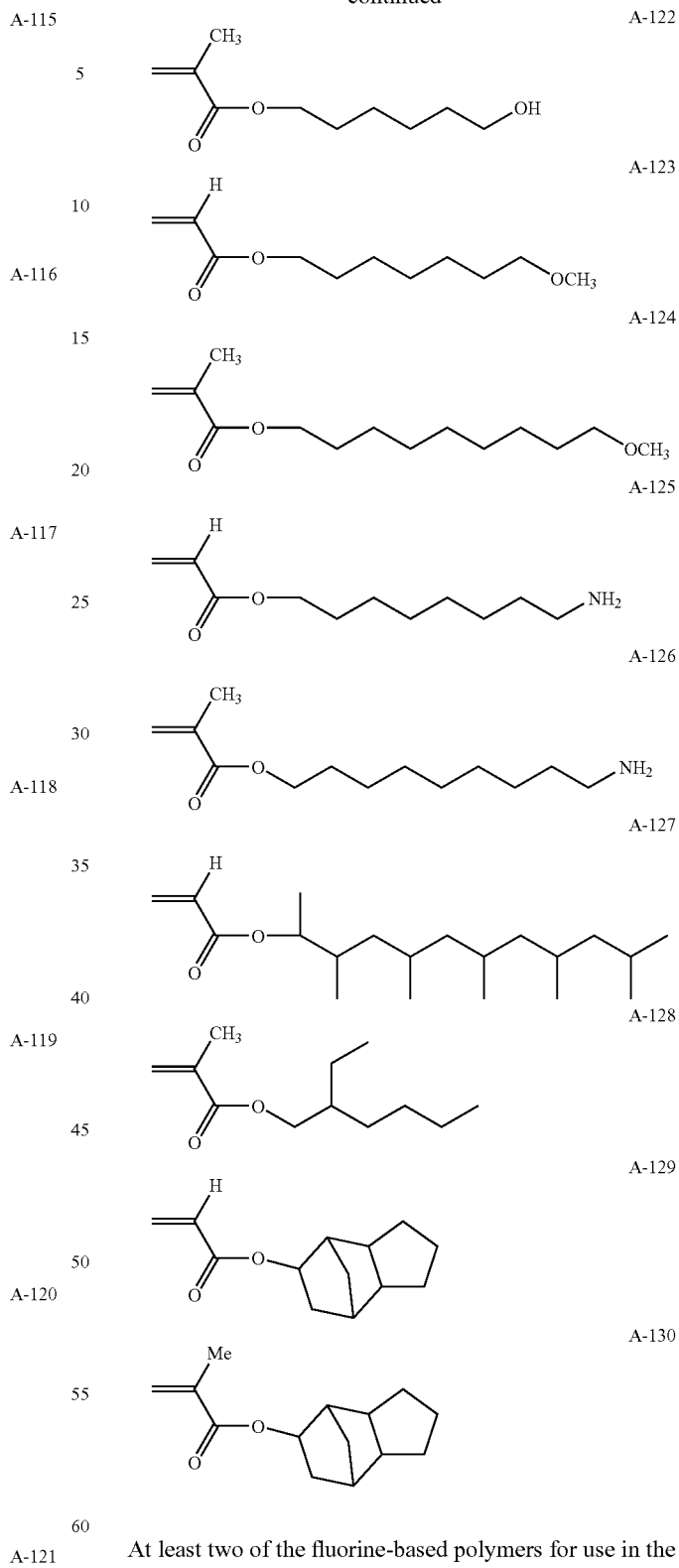

At least two of the fluorine-based polymers for use in the invention are preferably contained in the optical anisotropic layer. The fact that at least two thereof are contained therein enables the nonuniformity improvement and the control of the liquid crystalline compound to be performed independently. This enables both of the surface properties and the viewing angle characteristics to be implemented.

The amount of the fluoroaliphatic group-containing monomer in the fluorine-based polymer is preferably 5 mass % or more, more preferably 10 mass % or more, and further preferably 30 mass % or more based on the total amount of the polymer-forming monomer.

The mass average molecular weight of the fluorine-based polymer for use in the invention is preferably 1000 or more and 1,000,000 or less, more preferably 1000 or more and 500,000 or less, and further preferably 1000 or more and 100,000 or less. The mass average molecular weight can be measured as the polystyrene (PS) equivalent value by the use of gel permeation chromatography (GPC).

The polymerization method of the fluorine-based polymer has no particular restriction. However, for example, a polymerization methods such as cation polymerization, radical polymerization, and anion polymerization using a vinyl group can be adopted. Out of these, radical polymerization is particularly preferred in terms of the general versatility. As a polymerization initiator for the radical polymerization, a known compound such as a thermal radical polymerization initiator or a radical photopolymerization initiator can be used. However, particularly, a thermal radical polymerization initiator is preferably used. Herein, the thermal radical polymerization initiator is a compound for generating radicals by heating to the decomposition temperature or higher. Examples of such a thermal radical polymerization initiator may include diacyl peroxides (such as acetyl peroxide and benzoyl peroxide), ketone peroxides (such as methyl ethyl ketone peroxide and cyclohexanone peroxide), hydroperoxides (such as hydrogen peroxide, tert-butyl hydroperoxide, and cumene hydroperoxide), dialkyl peroxides (such as di-tert-butyl peroxide, dicumyl peroxide, and dilauroyl peroxide), peroxy esters (such as tert-butyl peroxy acetate, and tert-butyl peroxy pivalate), azo type compounds (such as azobisisobutyronitrile and azobisisovaleronitrile), and persulfates (such as ammonium persulfate, sodium persulfate, and potassium persulfate). Such thermal radical polymerization initiators may be used independently alone, or may be used in combination of two or more thereof.

The radical polymerization method has no particular restriction, and an emulsion polymerization method, a suspension polymerization method, a block polymerization method, a solution polymerization method, or the like can be adopted. The solution polymerization which is a typical radical polymerization method will be further specifically described. The other polymerization methods are also similar in general outline, and the details thereof are described in, for example, *KOUBUNNSHI KAGAKU JIKKENNHOU*, edited by the Society of Polymer Science, Japan (TOKYO KAGAKU DOZIN Co., Ltd., 1981).

For carrying out solution polymerization, organic solvents are used. These organic solvents can be arbitrarily selected in such a range as not to impair the objects and the advantage of the invention. These organic solvents are organic compounds generally having a boiling point within in the range of 50 to 200° C. under an atmospheric pressure, and preferably organic compounds which uniformly dissolve respective components. Preferred examples of the organic solvents may include alcohols such as isopropanol and butanol; ethers such as dibutyl ether, ethylene glycol dimethyl ether, tetrahydrofuran, and dioxane; ketones such as acetone, methyl ethyl ketone, methyl isobutyl ketone, and cyclohexanone; esters such as ethyl acetate, butyl acetate, amyl acetate, and γ-butyrolactone; and aromatic hydrocarbons such as benzene, toluene, and xylene. Incidentally, these organic solvents may be used independently alone, or in combination of two or more thereof. Further, water-mixed organic solvents obtained by combining the organic solvents with water are also applicable from the viewpoint of the solubility of monomers or the resulting polymers.

Whereas, the solution polymerization conditions also have no particular restriction. However, it is preferable that heating is carried out at a temperature in the range of 50 to 200° for 10 minutes to 30 hours. Further, in order to prevent the formed radicals from being deactivated, inert gas purge is preferably carried out naturally during solution polymerization, and also before the start of the solution polymerization. As an inert gas, in general, a nitrogen gas is preferably used.

In order to obtain the fluorine-based polymer in a preferred molecular weight range, a radical polymerization method using a chain transfer agent is particularly effective. As the chain transfer agents, any of mercaptans (such as octyl mercaptan, decyl mercaptan, dodecyl mercaptan, tert-dodecyl mercaptan, octadecyl mercaptan, thiophenol, and p-nonylthiophenol), alkyl polyhalides (such as carbon tetrachloride, chloroform, 1,1,1-trichloroethane, and 1,1,1-tribromooctane), and low activity monomers (such as a-methyl styrene and α-methyl styrene dimer) can be used. However, mercaptans having 4 to 16 carbon atoms are preferred. The amount of the chain transfer agents to be used is considerably affected by the activity of the chain transfer agent, the combination of monomers, the polymerization conditions, and the like, and it is required to be controlled with precision. However, it is generally about 0.01 mol % to 50 mol %, preferably 0.05 mol % to 30 mol %, and in particular preferably 0.08 mol % to 25 mol % based on the total number of moles of the monomers used. The chain transfer agents may be properly present in the system simultaneously with the monomer which is an object to be controlled in degree of polymerization in the process of polymerization, and the addition method does not particularly matter. The agent may be dissolved in the monomer to be added, or it can also be added separately from the monomer.

Below, specific examples of the fluoroaliphatic group-containing copolymer to be preferably used as a fluorine-based polymer in the invention will be shown. However, the invention is not limited to these specific examples at all. Herein, each numerical value is the mass percentage showing the composition ratio of each monomer, and Mw is the PS equivalent mass average molecular weight measured by GPC. The numerical values of a, b, c, d, and the like represent the mass ratios.

P-1

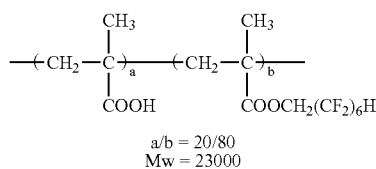

a/b = 20/80
Mw = 23000

P-2

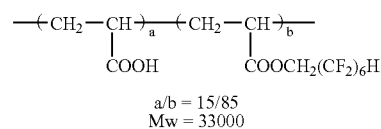

a/b = 15/85
Mw = 33000

-continued
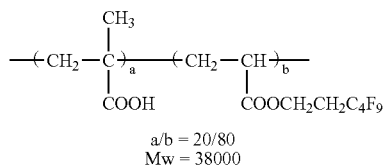
P-3
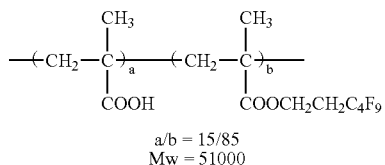
P-4
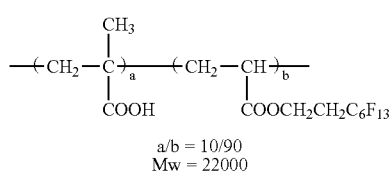
P-5
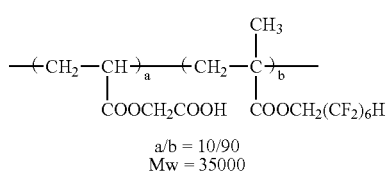
P-6
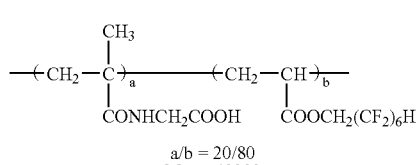
P-7
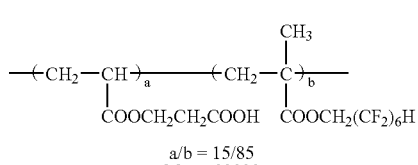
P-8
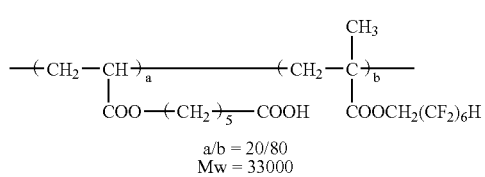
P-9
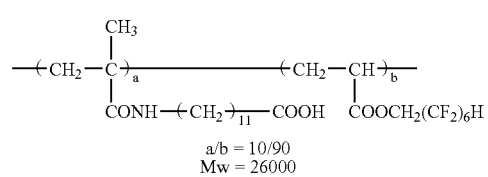
P-10
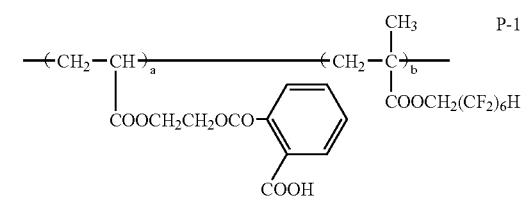
P-11
P-12
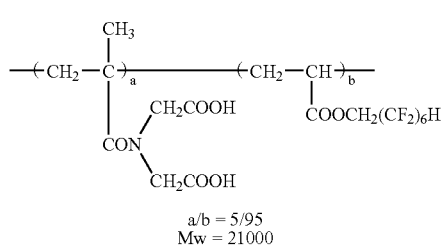
P-13
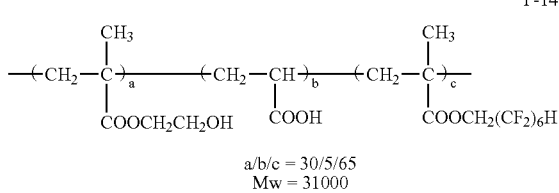
P-14
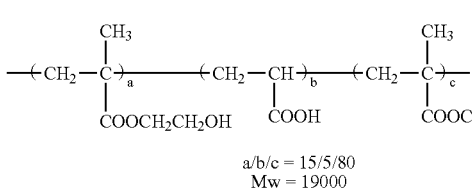
P-15
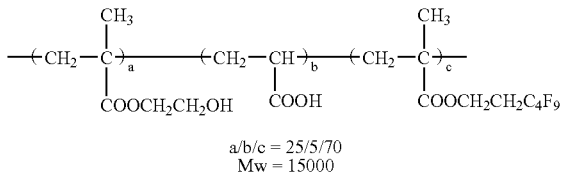
P-16

-continued
P-17
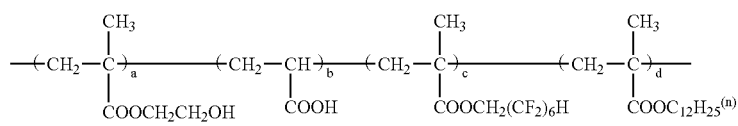
a/b/c/d = 25/5/50/20
Mw = 42000
P-18
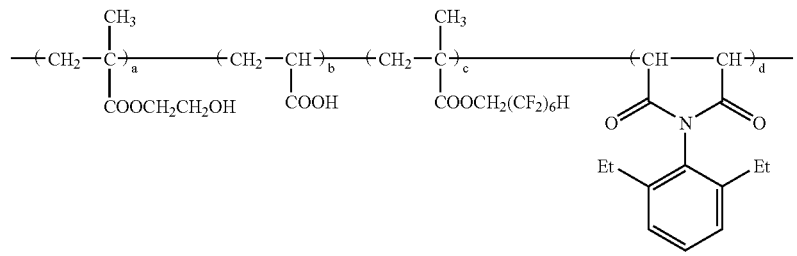
a/b/c/d = 32/6/30/32
Mw = 16000
P-19
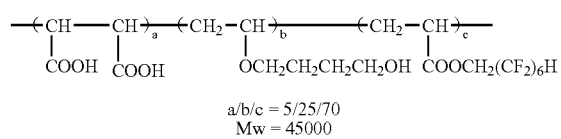
a/b/c = 5/25/70
Mw = 45000
P-20
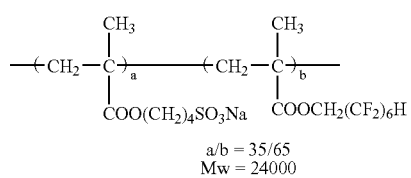
a/b = 35/65
Mw = 24000
P-21
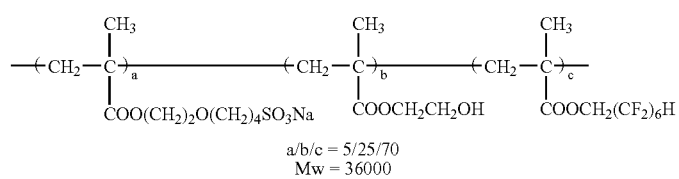
a/b/c = 5/25/70
Mw = 36000
P-22
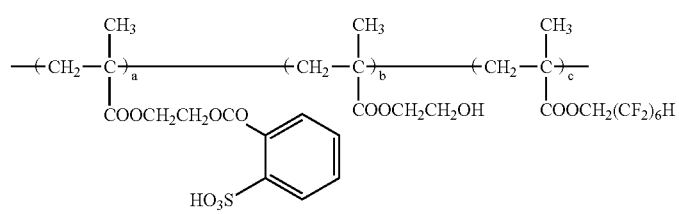
a/b/c = 5/25/70
Mw = 36000
P-23
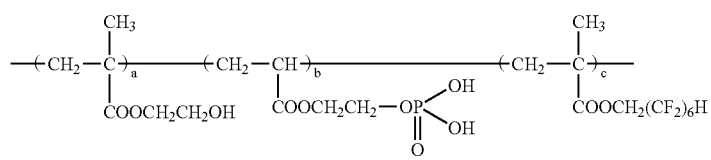
a/b/c/ = 23/7/70
Mw = 46000

-continued
P-24
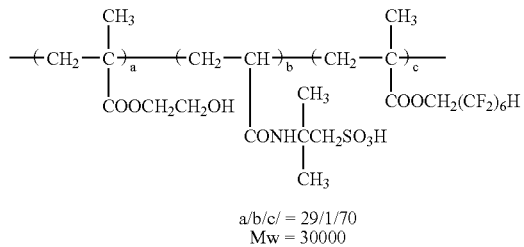
a/b/c/ = 29/1/70
Mw = 30000
P-25
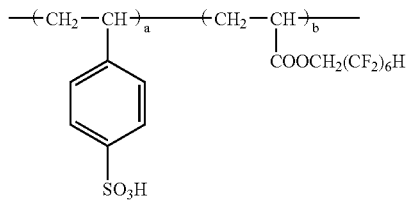
a/b/ = 10/90
Mw = 33000
P-26
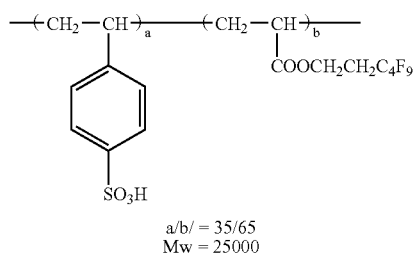
a/b/ = 35/65
Mw = 25000
P-27
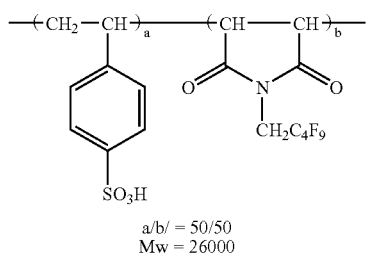
a/b/ = 50/50
Mw = 26000
P-28
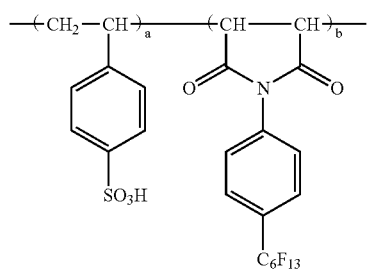
a/b/ = 50/50
Mw = 30000
P-29
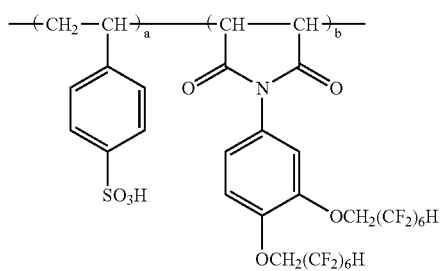
a/b/ = 50/50
Mw = 21000
P-30
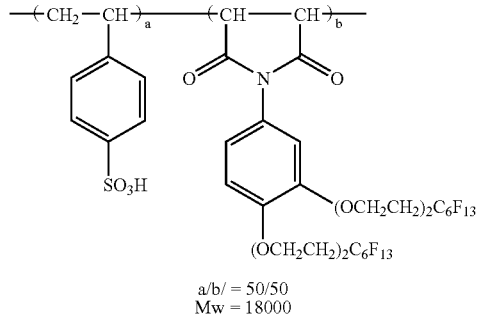
a/b/ = 50/50
Mw = 18000
P-31
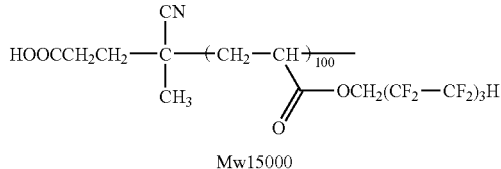
Mw15000
P-32
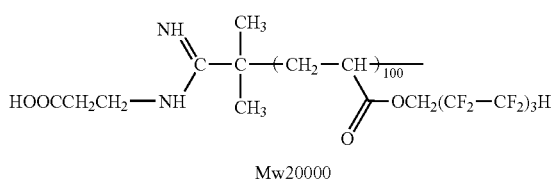
Mw20000
P-33
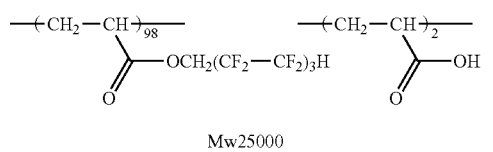
Mw25000
P-34
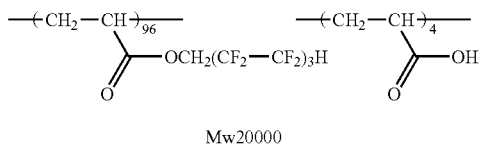
Mw20000
P-35
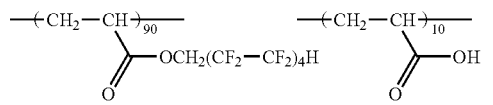
Mw13000

-continued
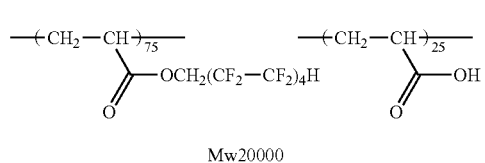
P-36
Mw20000
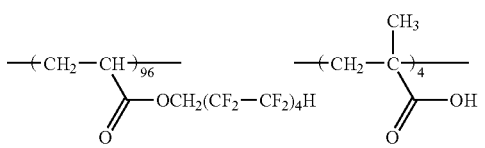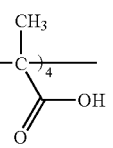
P-37
Mw32000
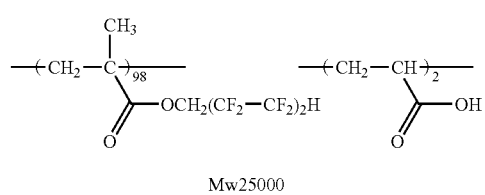
P-38
Mw25000
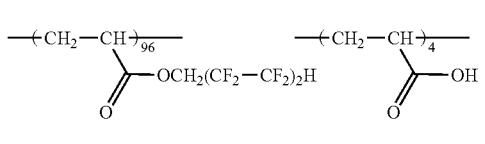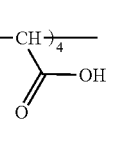
P-39
Mw27000
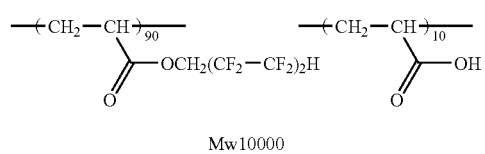
P-40
Mw10000
P-41
Mw20000
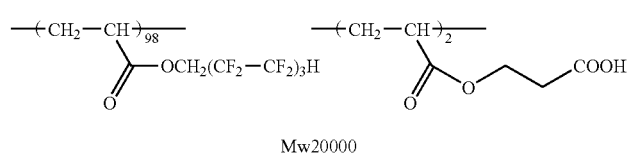
P-42
Mw15000
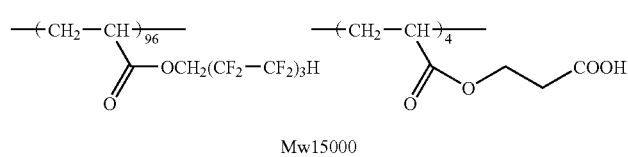
P-43
Mw15000
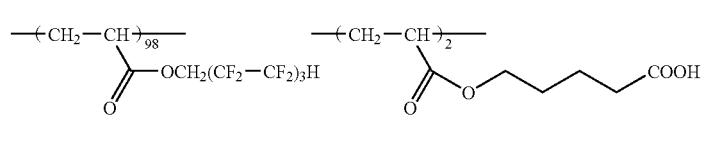
P-44
Mw15000
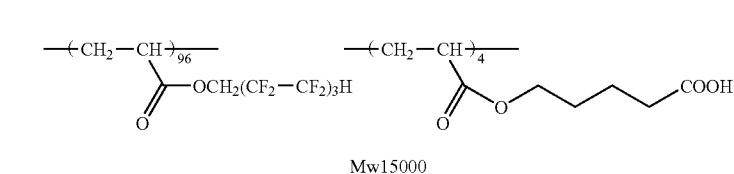
P-45
Mw22000
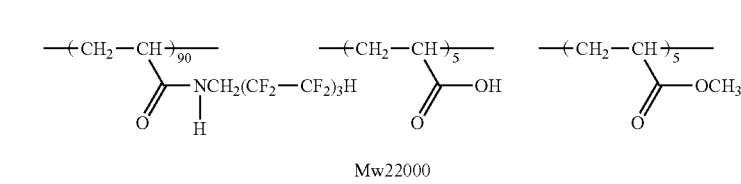
P-46
Mw19000
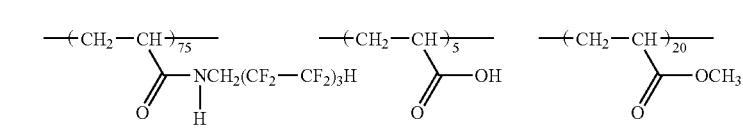

-continued

P-47

$\left[\!\!\begin{array}{c}\text{CH}_2\text{—CH}\end{array}\!\!\right]_{91}$  $\left[\!\!\begin{array}{c}\text{CH}_3\\ \text{CH}_2\text{—C}\end{array}\!\!\right]_4$  $\left[\!\!\begin{array}{c}\text{CH}_2\text{—CH}\end{array}\!\!\right]_5$ NCH$_2$(CF$_2$—CF$_2$)$_3$H    OH     O(CH$_2$)$_3$CH$_3$
O  CH$_2$CH$_2$CH$_2$CH$_3$    O     O Mw30000

P-48

$\left[\!\!\begin{array}{c}\text{CH}_3\\ \text{CH}_2\text{—C}\end{array}\!\!\right]_{93}$  $\left[\!\!\begin{array}{c}\text{CH}_2\text{—CH}\end{array}\!\!\right]_2$  $\left[\!\!\begin{array}{c}\text{CH}_2\text{—CH}\end{array}\!\!\right]_5$

SCH$_2$(CF$_2$—CF$_2$)$_3$H    OH     O(C$_3$H$_6$O)$_{20}$CH$_3$
O     O     O

Mw23000

P-49

$\left[\!\!\begin{array}{c}\text{CH}_2\text{—CH}\end{array}\!\!\right]_{91}$  $\left[\!\!\begin{array}{c}\text{CH}_2\text{—CH}\end{array}\!\!\right]_4$  $\left[\!\!\begin{array}{c}\text{CH}_2\text{—CH}\end{array}\!\!\right]_5$

SCH$_2$(CF$_2$—CF$_2$)$_3$H    OH     O(C$_3$H$_6$O)$_7$H
O     O     O

Mw15000

P-50

$\left[\!\!\begin{array}{c}\text{CH}_2\text{—CH}\end{array}\!\!\right]_{90}$  $\left[\!\!\begin{array}{c}\text{CH}_2\text{—CH}\end{array}\!\!\right]_5$  $\left[\!\!\begin{array}{c}\text{CH}_2\text{—CH}\end{array}\!\!\right]_5$ SCH$_2$(CF$_2$—CF$_2$)$_3$H    OH     O—cyclohexyl
O     O     O Mw23000

P-51

$\left[\!\!\begin{array}{c}\text{CH}_2\text{—CH}\end{array}\!\!\right]_{98}$  $\left[\!\!\begin{array}{c}\text{CH}_2\text{—CH}\end{array}\!\!\right]_2$ OCH$_2$(CF$_2$—CF$_2$)$_3$H    O—CH$_2$—C(CH$_2$COOH)(H)—CH$_2$CH$_2$CH$_2$COOH
O     O Mw25000

P-52

$\left[\!\!\begin{array}{c}\text{CH}_2\text{—CH}\end{array}\!\!\right]_{96}$  $\left[\!\!\begin{array}{c}\text{CH}_2\text{—CH}\end{array}\!\!\right]_4$

OCH$_2$(CF$_2$—CF$_2$)$_3$H    O(CH$_2$CH$_2$O)$_{20}$CH$_2$CH$_2$COOH
O     O

Mw25000

P-53

$\left[\!\!\begin{array}{c}\text{CH}_2\text{—CH}\end{array}\!\!\right]_{98}$  $\left[\!\!\begin{array}{c}\text{CH}_2\text{—CH}\end{array}\!\!\right]_2$ OCH$_2$(CF$_2$—CF$_2$)$_3$H    O(CH$_2$CH$_2$CH$_2$O)$_7$CH$_2$CH$_2$COOH
O     O Mw13000

P-54

$\left[\!\!\begin{array}{c}\text{CH}_2\text{—CH}\end{array}\!\!\right]_{96}$  $\left[\!\!\begin{array}{c}\text{CH}_2\text{—CH}\end{array}\!\!\right]_4$ OCH$_2$(CF$_2$—CF$_2$)$_2$H    O(CH$_2$CH$_2$CH$_2$O)$_7$CH$_2$CH$_2$COOH
O     O Mw25000

P-55

$\left[\!\!\begin{array}{c}\text{CH}_2\text{—CH}\end{array}\!\!\right]_{88}$  $\left[\!\!\begin{array}{c}\text{CH}_2\text{—CH}\end{array}\!\!\right]_2$  $\left[\!\!\begin{array}{c}\text{CH}_2\text{—CH}\end{array}\!\!\right]_{10}$ OCH$_2$(CF$_2$—CF$_2$)$_2$H    O(CH$_2$CH$_2$CH$_2$O)$_7$CH$_2$CH$_2$COOH    OH
O     O     O Mw30000

-continued
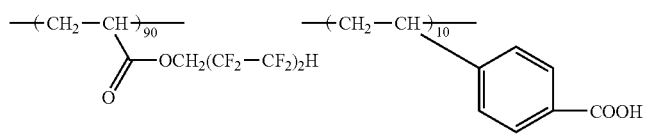
P-56
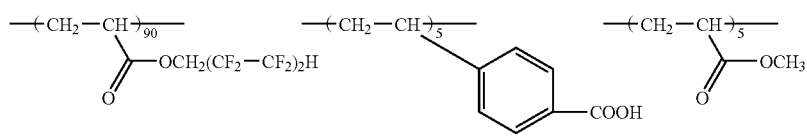
P-57
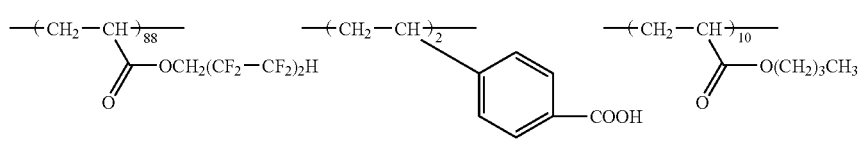
P-58
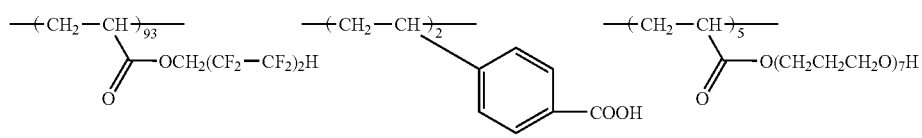
P-59
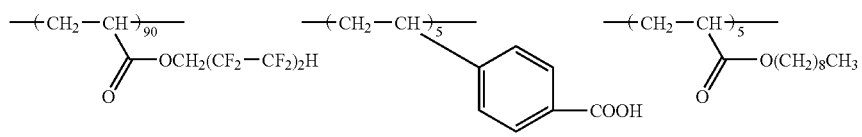
P-60
P-61
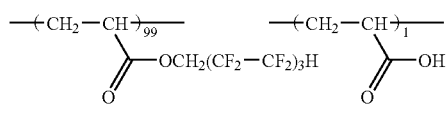
P-62
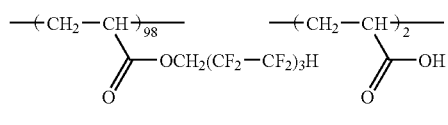
P-63
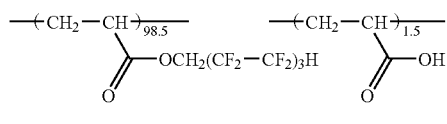
P-64
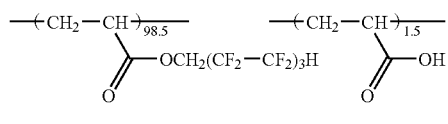
P-65
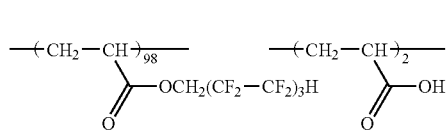
P-66
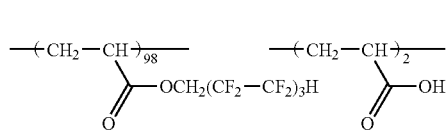

-continued

P-67

$$\mathrm{-(CH_2-CH)_{96}\!\!-\!\!\underset{\underset{O}{\|}}{C}\!\!-\!\!OCH_2(CF_2-CF_2)_3H \quad -(CH_2-CH)_4\!\!-\!\!\underset{\underset{O}{\|}}{C}\!\!-\!\!OH}$$

Mw 10000

P-68

$$\mathrm{-(CH_2-\underset{\underset{\underset{O}{\|}}{C}}{\overset{CH_3}{|}})_{98}\!\!-\!\!\underset{\underset{O}{\|}}{C}\!\!-\!\!OCH_2(CF_2-CF_2)_3H \quad -(CH_2-CH)_2\!\!-\!\!\underset{\underset{O}{\|}}{C}\!\!-\!\!OH}$$

Mw 15000

P-69

$$\mathrm{-(CH_2-CH)_{98}\!\!-\!\!\underset{\underset{O}{\|}}{C}\!\!-\!\!OCH_2(CF_2-CF_2)_3H \quad -(CH_2-CH)_2\!\!-\!\!C_6H_4\!\!-\!\!COOH}$$

Mw 16000

P-70

$$\mathrm{-(CH_2-CH)_{98}\!\!-\!\!\underset{\underset{O}{\|}}{C}\!\!-\!\!OCH_2(CF_2-CF_2)_3F \quad -(CH_2-CH)_2\!\!-\!\!\underset{\underset{O}{\|}}{C}\!\!-\!\!OH}$$

Mw 10000

P-71

$$\mathrm{-(CH_2-CH)_{40}\!\!-\!\!\underset{\underset{O}{\|}}{C}\!\!-\!\!O\!\!-\!\!CH_2CH_2\!\!-\!\!(CF_2CF_2)_2F \quad -(CH_2-CH)_{60}\!\!-\!\!\underset{\underset{O}{\|}}{C}\!\!-\!\!O\!\!-\!\!(C_2H_4O)_{20}CH_3}$$

Mw 15,000

P-72

$$\mathrm{-(CH_2-CH)_{50}\!\!-\!\!\underset{\underset{O}{\|}}{C}\!\!-\!\!O\!\!-\!\!CH_2CH_2\!\!-\!\!(CF_2CF_2)_2F \quad -(CH_2-CH)_{50}\!\!-\!\!\underset{\underset{O}{\|}}{C}\!\!-\!\!O\!\!-\!\!(C_2H_4O)_7CH_3}$$

Mw 15,000

P-73

$$\mathrm{-(CH_2-CH)_{30}\!\!-\!\!\underset{\underset{O}{\|}}{C}\!\!-\!\!O\!\!-\!\!CH_2CH_2\!\!-\!\!(CF_2CF_2)_2F \quad -(CH_2-CH)_{70}\!\!-\!\!\underset{\underset{O}{\|}}{C}\!\!-\!\!O\!\!-\!\!(C_3H_6O_{13}H)}$$

Mw 8,000

P-74

$$\mathrm{-(CH_2-CH)_{40}\!\!-\!\!\underset{\underset{O}{\|}}{C}\!\!-\!\!O\!\!-\!\!CH_2CH_2\!\!-\!\!(CF_2CF_2)_2F \quad -(CH_2-CH)_{60}\!\!-\!\!\underset{\underset{O}{\|}}{C}\!\!-\!\!O\!\!-\!\!(C_3H_6O)_7H}$$

Mw 39,000

P-75

$$\mathrm{-(CH_2-\underset{\underset{\underset{O}{\|}}{C}}{\overset{CH_3}{|}})_{60}\!\!-\!\!\underset{\underset{O}{\|}}{C}\!\!-\!\!O\!\!-\!\!CH_2CH_2\!\!-\!\!(CF_2CF_2)_2F \quad -(CH_2-CH)_{40}\!\!-\!\!\underset{\underset{O}{\|}}{C}\!\!-\!\!O\!\!-\!\!(C_2H_4O)_{20}CH_3}$$

Mw 20,000

P-76

$$\mathrm{-(CH_2-\underset{\underset{\underset{O}{\|}}{C}}{\overset{CH_3}{|}})_{30}\!\!-\!\!\underset{\underset{O}{\|}}{C}\!\!-\!\!O\!\!-\!\!CH_2CH_2\!\!-\!\!(CF_2CF_2)_2F \quad -(CH_2-CH)_{70}\!\!-\!\!\underset{\underset{O}{\|}}{C}\!\!-\!\!O\!\!-\!\!(C_2H_4O)_7CH_3}$$

Mw 6,000

P-77

$$\mathrm{-(CH_2-\underset{\underset{\underset{O}{\|}}{C}}{\overset{CH_3}{|}})_{40}\!\!-\!\!\underset{\underset{O}{\|}}{C}\!\!-\!\!O\!\!-\!\!CH_2CH_2\!\!-\!\!(CF_2CF_2)_2F \quad -(CH_2-CH)_{60}\!\!-\!\!\underset{\underset{O}{\|}}{C}\!\!-\!\!O\!\!-\!\!(C_3H_6O)_{20}CH_3}$$

Mw 50,000

-continued
P-78
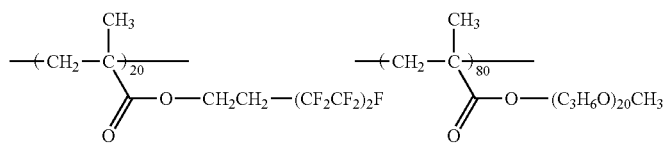
Mw 10,000
P-79
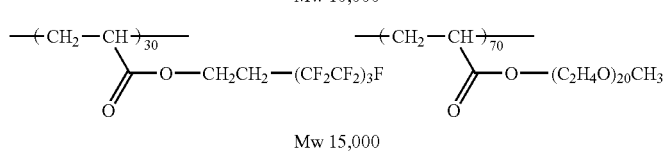
Mw 15,000
P-80
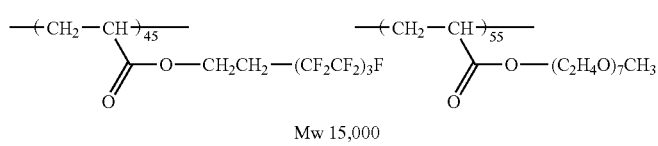
Mw 15,000
P-81
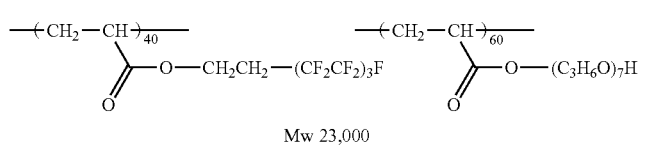
Mw 23,000
P-82
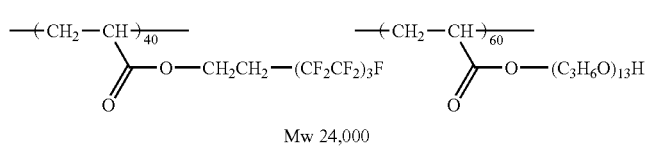
Mw 24,000
P-83
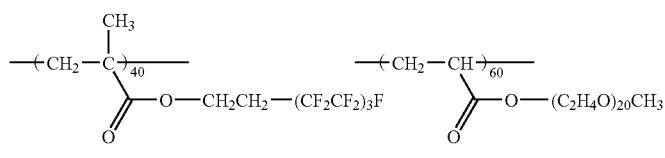
Mw 15,000
P-84
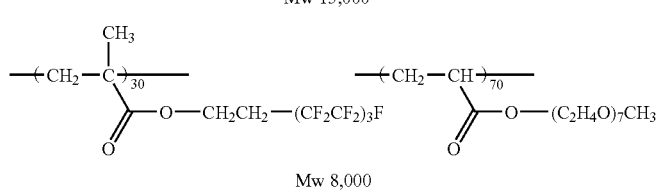
Mw 8,000
P-85
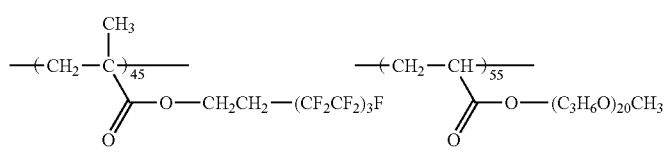
Mw 40,000
P-86
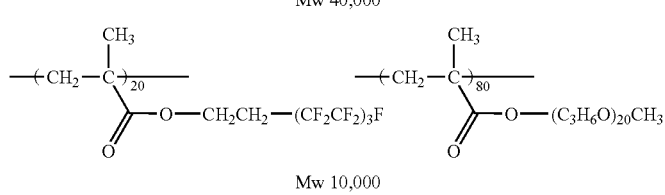
Mw 10,000
P-87
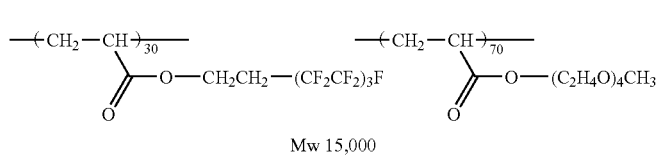
Mw 15,000

-continued
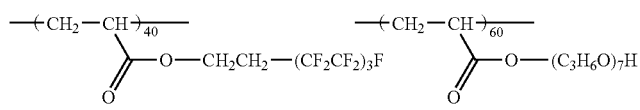
Mw 15,000
P-88
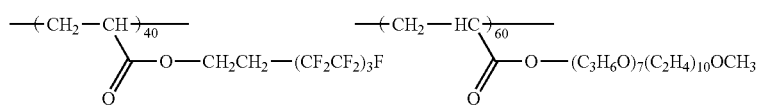
Mw 20,000
P-89
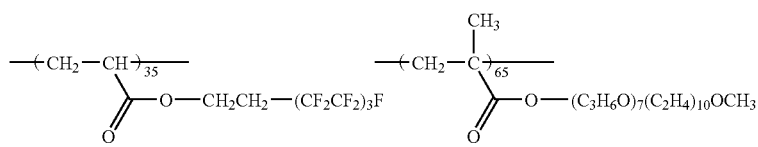
Mw 25,000
P-90
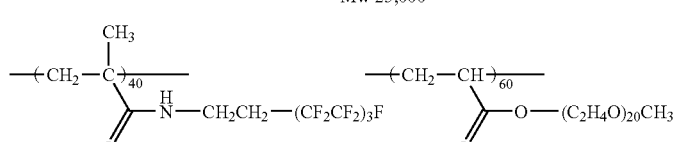
Mw 15,000
P-91
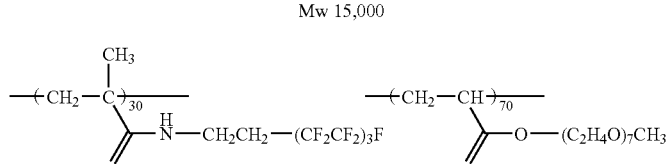
Mw 8,000
P-92
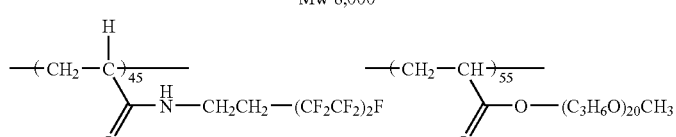
Mw 40,000
P-93
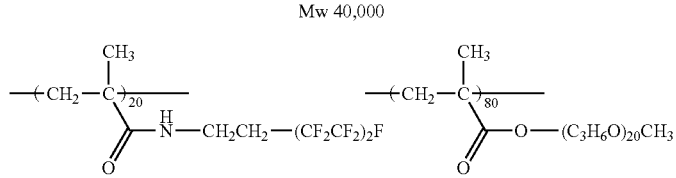
Mw 10,000
P-94
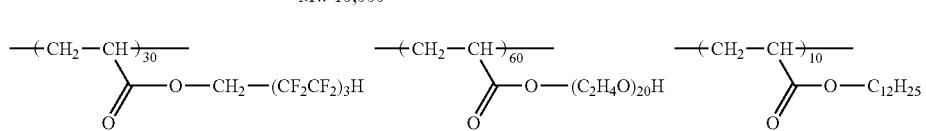
Mw 15,000
P-95
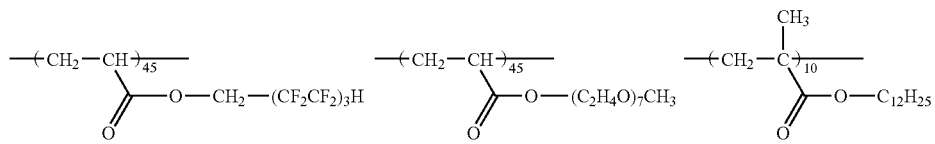
Mw 15,000
P-96
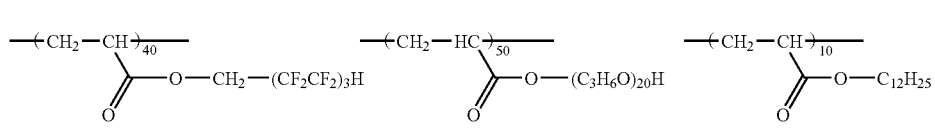
Mw 9,000
P-97

-continued
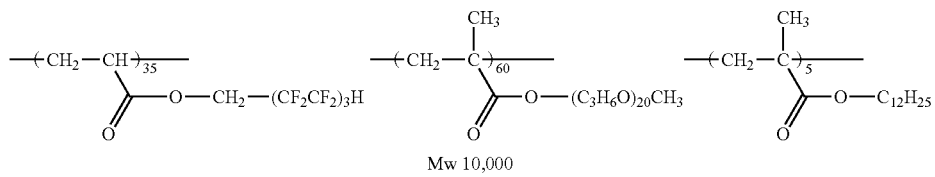
P-98
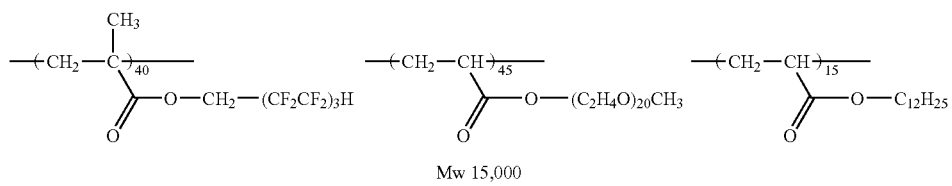
P-99
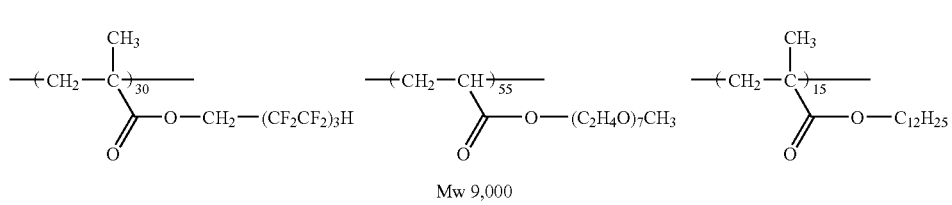
P-100
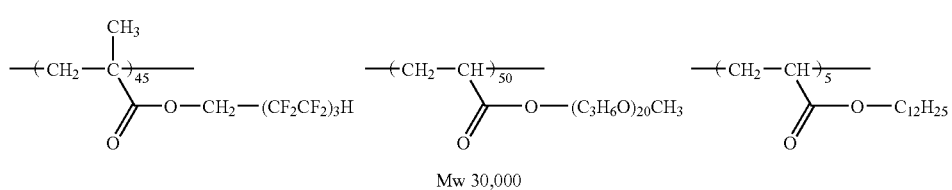
P-101
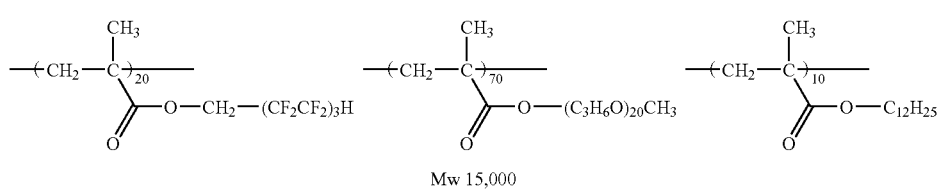
P-102
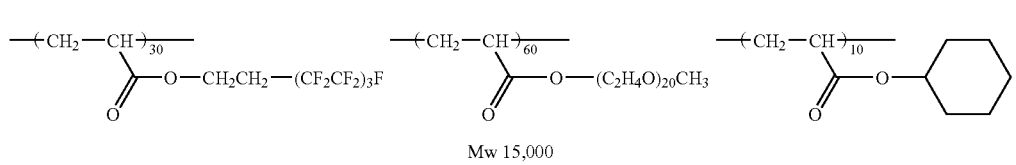
P-103
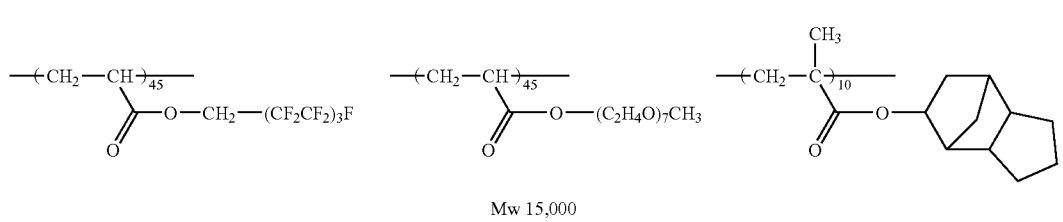
P-104
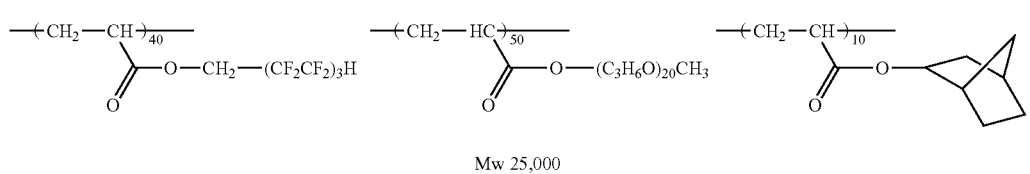
P-105

-continued
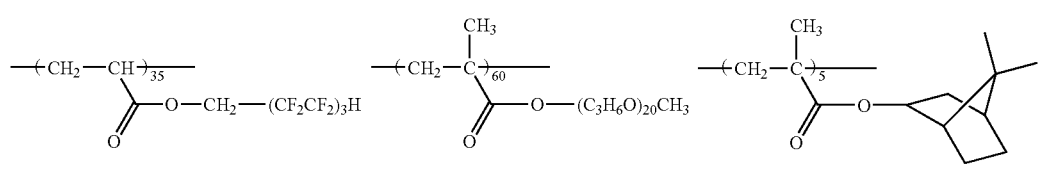
P-106
Mw 15,000
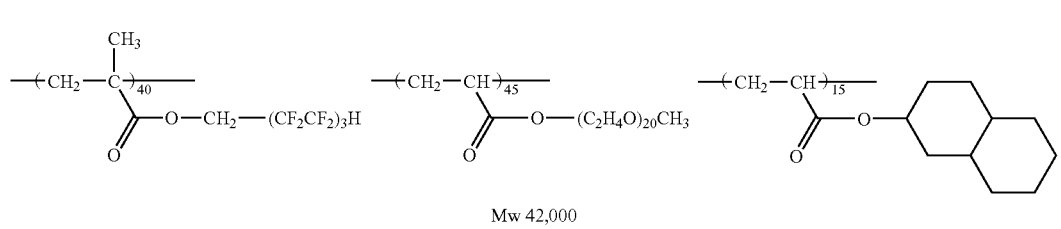
P-107
Mw 42,000
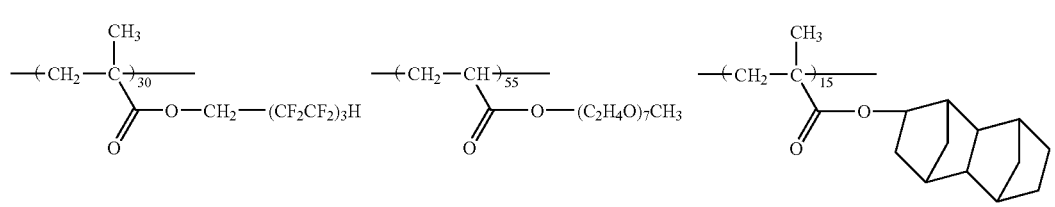
P-108
Mw 58,000
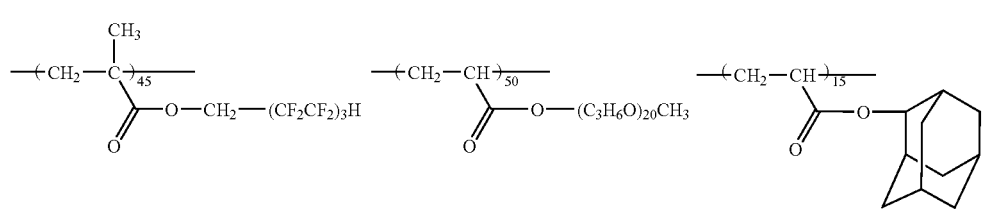
P-109
Mw 18,000
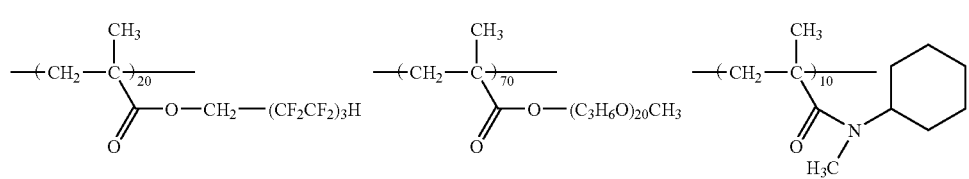
P-110
Mw 5,000
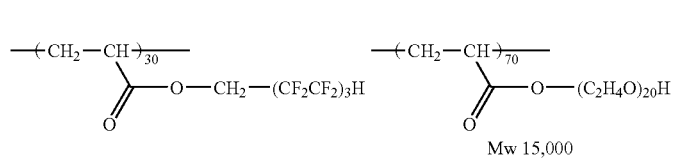
P-111
Mw 15,000
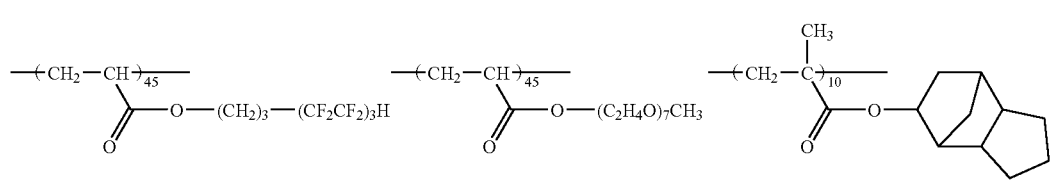
P-112
Mw 15,000

-continued
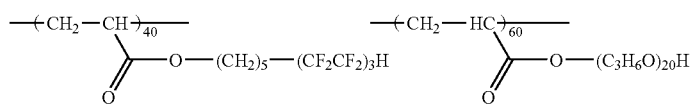
Mw 29,000
P-113
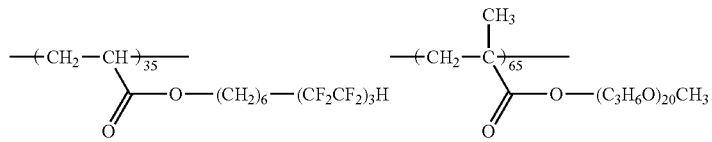
Mw 5,000
P-114
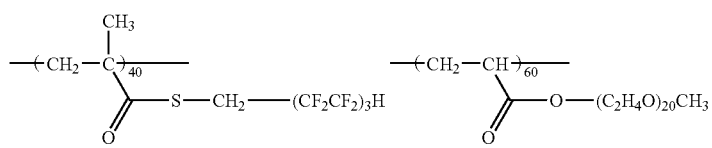
Mw 32,000
P-115
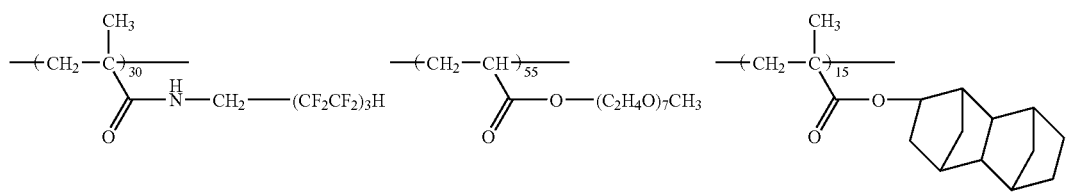
Mw 48,000
P-116
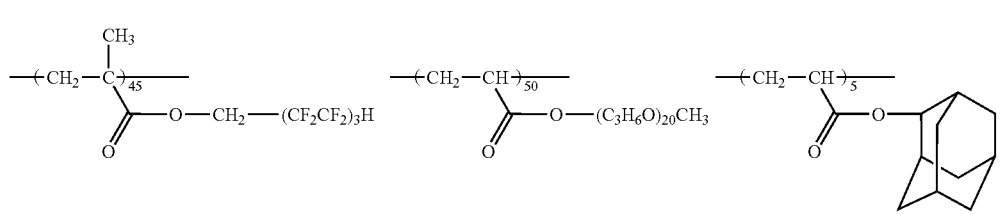
Mw 25,000
P-117
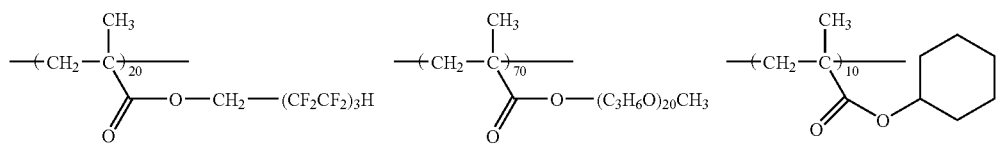
Mw 7,000
P-118
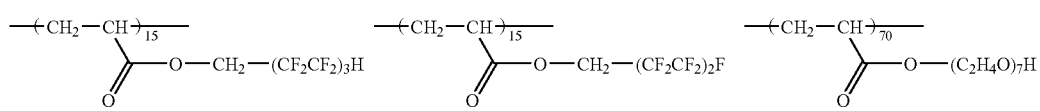
Mw 15,000
P-119

-continued
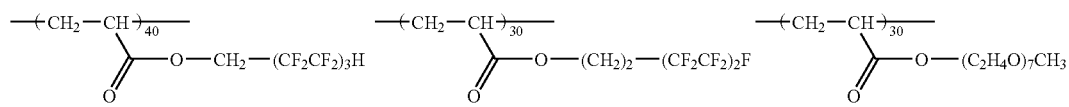
P-120
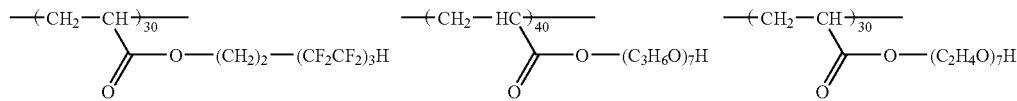
P-121
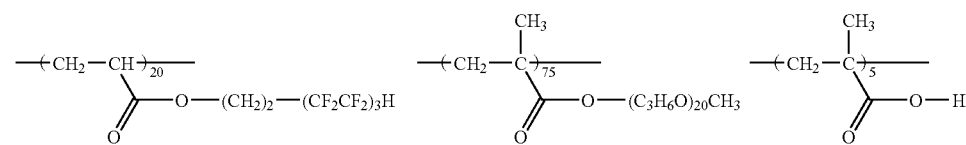
P-122
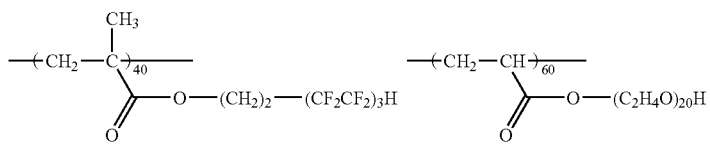
P-123
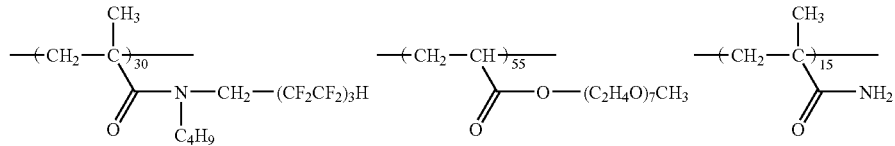
P-124
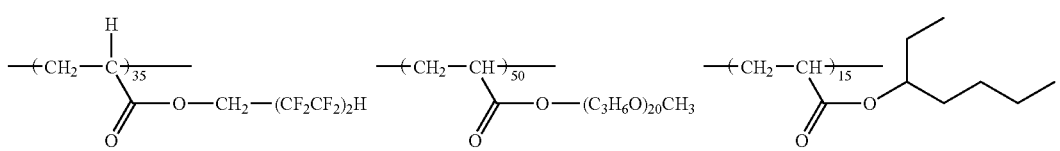
P-125
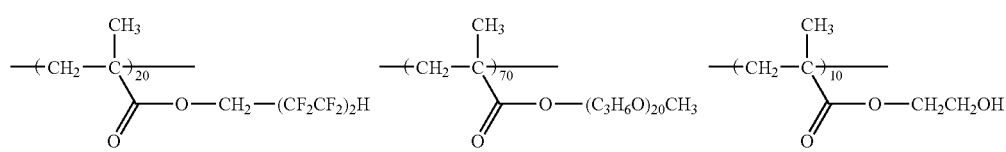
P-126
P-127
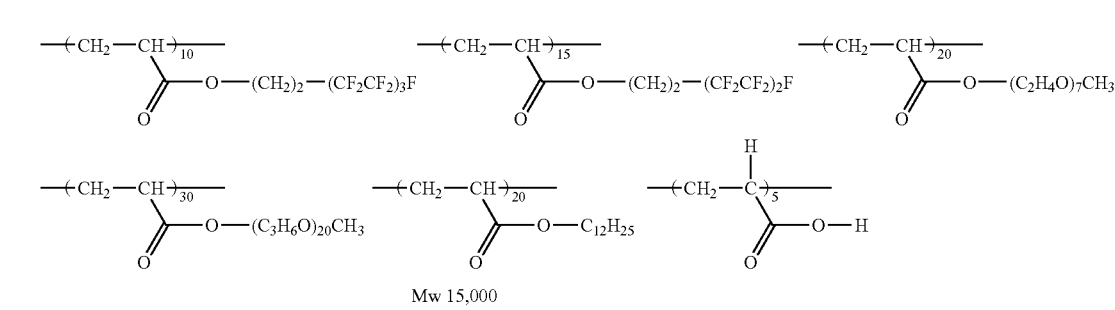

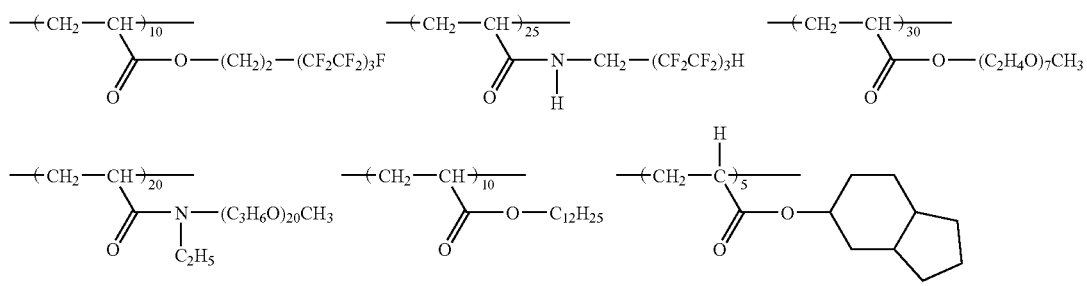
P-128
Mw 18,000
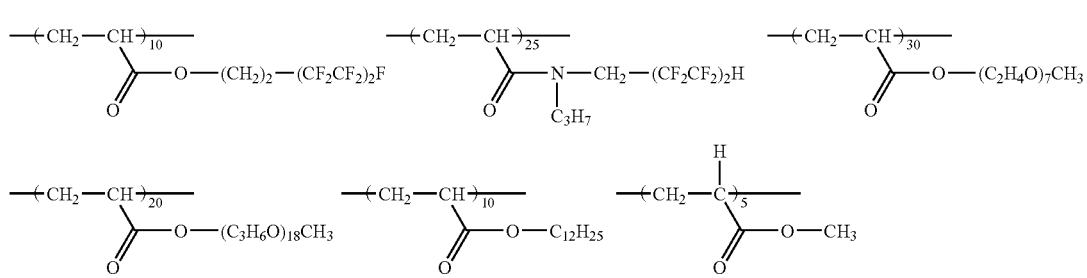
P-129
Mw 31,000
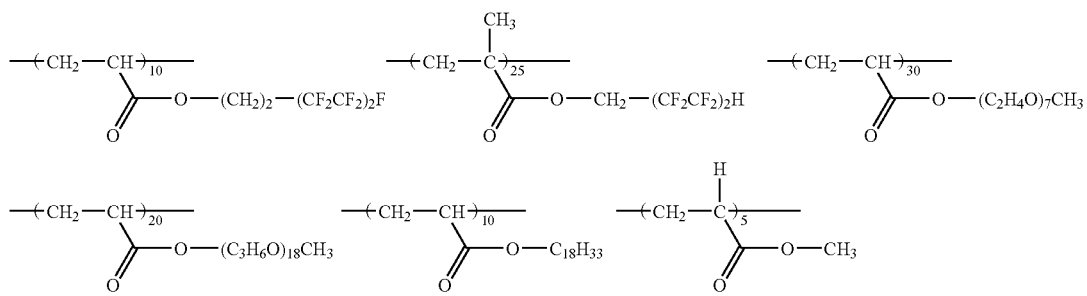
P-130
Mw 12,000
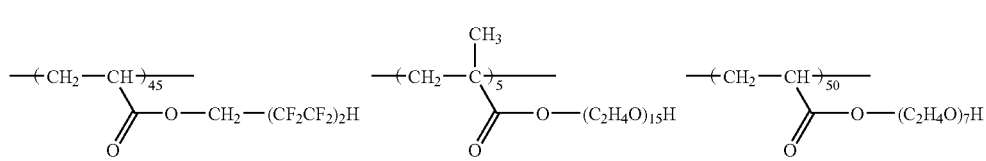
P-131
Mw 45,000
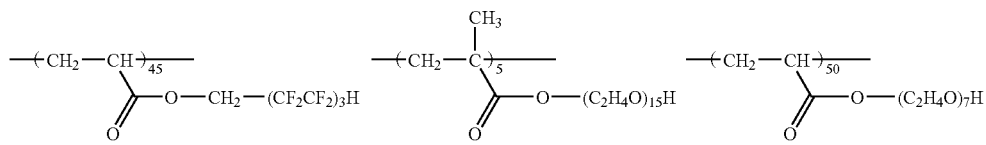
P-132
Mw 30,000
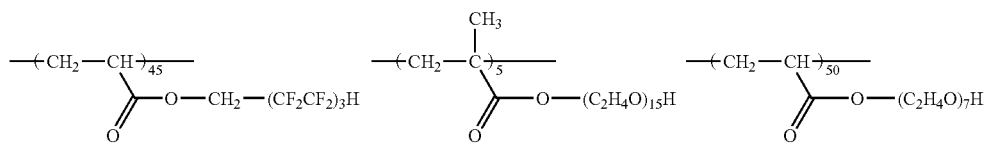
P-133
Mw 35,000

-continued

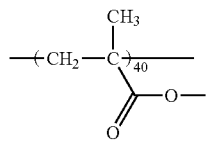 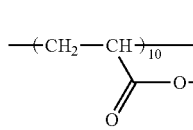 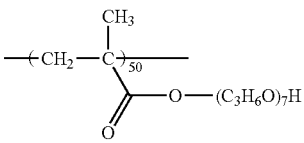

P-134

Mw 15,000

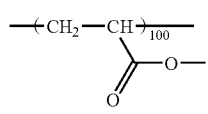

P-135

Mw 19,000

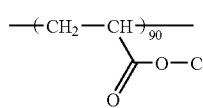 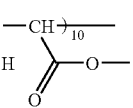 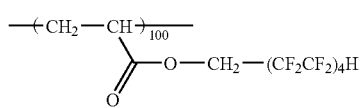

P-136     P-137

Mw 14,000     Mw 18,000

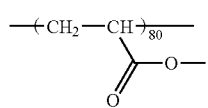 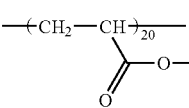

P-138

Mw 15,000

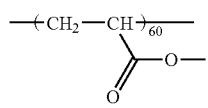 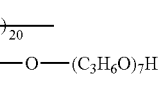

P-139

Mw 48,000

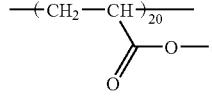 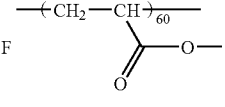 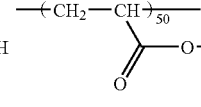

P-140

Mw 15,000

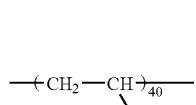 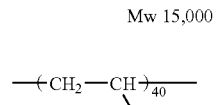 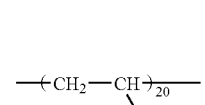

P-141

Mw 18,000

The fluorine-based polymer for use in the invention can be produced by a commonly known method. For example, it can be produced in the following manner. In an organic solvent containing a monomer having the fluoroaliphatic group descried previously, and a hydrogen bondable group, a general-purpose radical polymerization initiator is added for effecting polymerization. Further, if required, another addition polymerizable unsaturated compound is further added, so that the production can be carried out in the same manner as described above. A dropwise addition polymerization method in which polymerization is effected while dropwise adding a monomer and an initiator in a reaction vessel according the polymerizability of each monomer, or the like is also effective for obtaining a polymer with a uniform composition.

The preferred range of the content of the fluorine-based polymer in the composition differs according to the intended use. However, in general, it is preferably 0.005 to 8 mass %, more preferably 0.01 to 5 mass %, and further preferably 0.05 to 2.5 mass % in the composition (composition exclusive of the solvent for a coating solution). When the amount of the fluorine-based polymer to be added falls within the foregoing range, the effects can be sufficiently exerted, and further, the coating film can be sufficiently dried, and the performances (e.g., the uniformity of retardation) of the optical compensation film are favorable.

(Discotic Compound Having a Cyclopropylcarbonyl Group)

In the invention, at least one of discotic compounds having a cyclopropylcarbonyl group is used. The discotic compounds are preferably the compounds represented by the following formula (1):

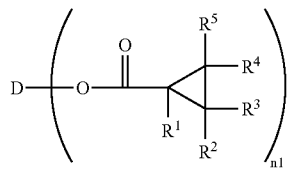

In the formula (1), D is a discotic core. The discotic core is situated at the center of the discotic compound, and forms the discotic plane. The discotic core is a well known conception in the molecular structure of the discotic liquid crystalline molecules. The discotic liquid crystal is described in various documents (C. Destrade et al., *Mol. Crysr. Liq. Cryst.*, vol. 71, page 111 (1981); *Kikann Kagaku No Sousetsu* No. 22, *Ekisyou No Kagaku*, chapter 5, chapter 10, section 2, (1994) edited by the Chemical Society of Japan; B. Kohne et al., *Angew. Chem. Soc. Chem. Comm.*, page 1794 (1985); J. Zhang et al., *J. Am. Chem. Soc.*, vol. 116; page 2655 (1994); and the like.

Below, examples of the discotic core will be shown. Y in each compound denotes the following formula (VI). $R^1$, $R^2$, $R^3$, $R^4$, and $R^5$ in the formula (VI) have the same definitions as those of the formula (1), and the preferred ranges thereof are also the same.

Formula (VI):

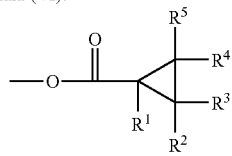

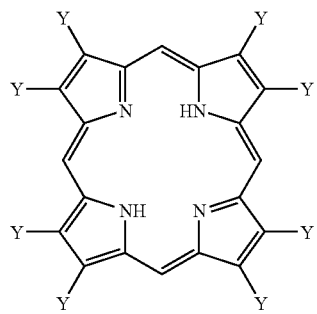

(Z1)

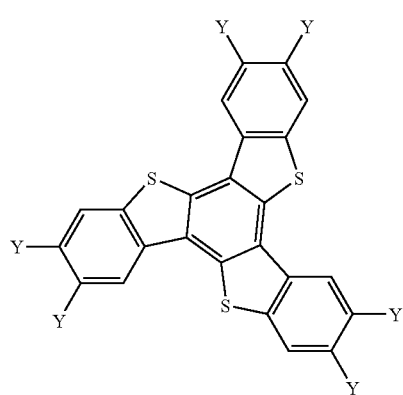

(Z2)

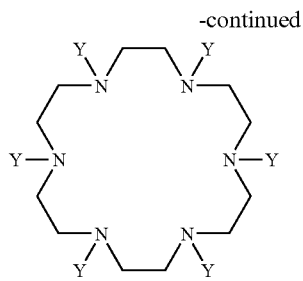

(Z3)

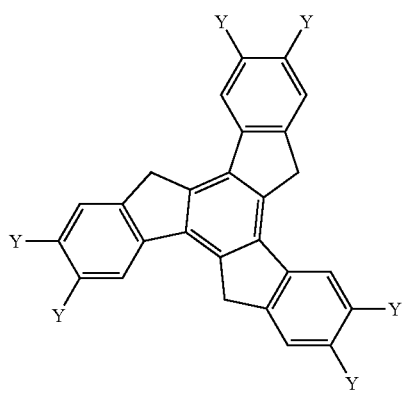

(Z4)

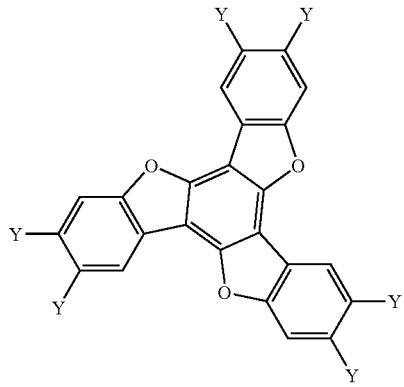

(Z5)

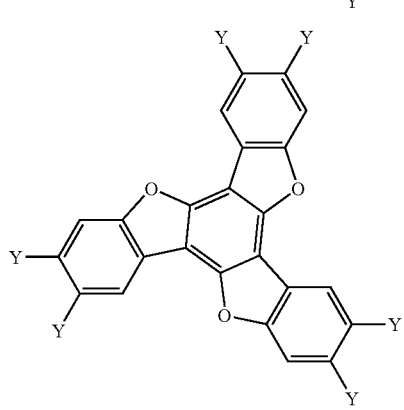

(Z6)

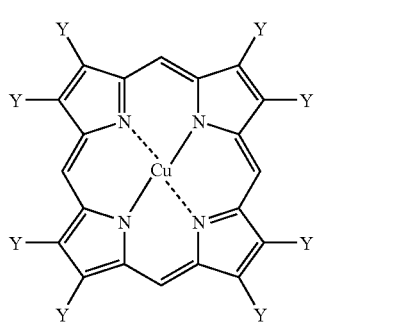

(Z7)

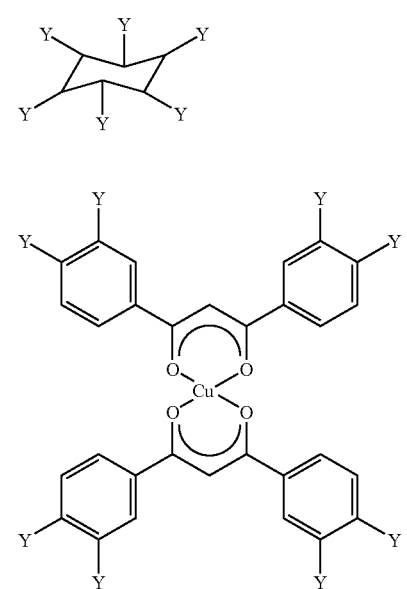 (Z8)
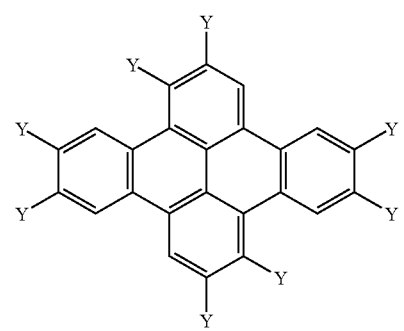 (Z9)
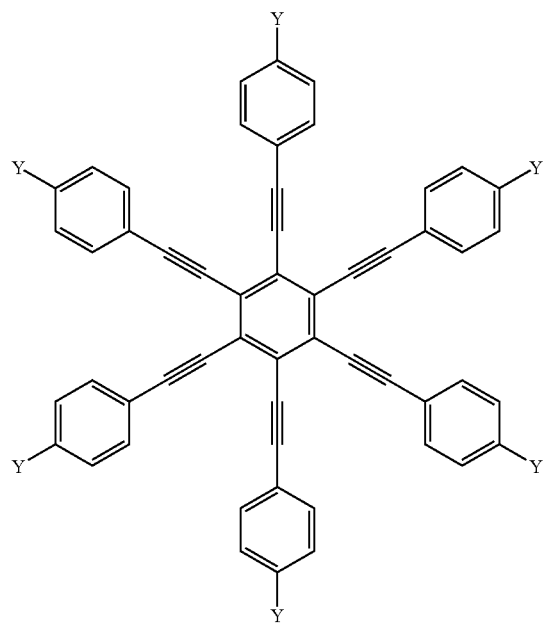
(Z10)
(Z11)
 (Z12)
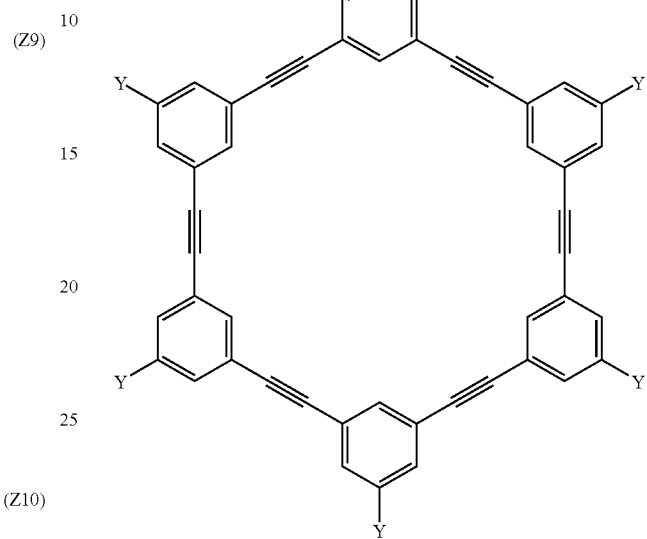
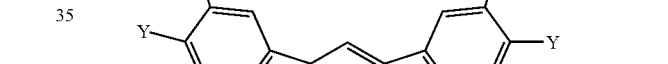 (Z13)
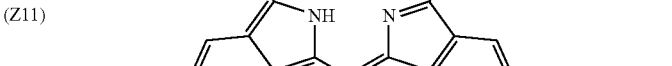
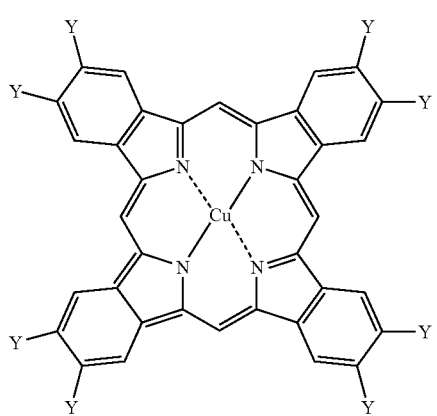 (Z14)

-continued

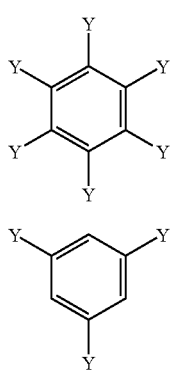

(Z15)

(Z16)

The discotic core (D) is particularly preferably triphenylene (Z4).

The discotic core (D) may have a substituent other than Y (the formula (VI)). Examples of the substituent which the discotic core may have include halogen atoms (a fluorine atom, a chlorine a atom, bromine atom, and an iodine atom), a cyano group, a hydroxyl group, an amino group, a carbamoyl group, a sulfamoyl group, a mercapto group, an ureido group, an alkyl group, a substituted alkyl group, an alkenyl group, a substituted alkenyl group, an alkynyl group, a substituted alkynyl group, an aryl group, a substituted aryl group, a heterocyclic group, an alkoxy group, a substituted alkoxy group, an aryloxy group, a substituted aryloxy group, an acyl group, an acyloxy group, an alkoxycarbonyl group, a substituted alkoxycarbonyl group, an aryloxycarbonyl group, a substituted aryloxycarbonyl group, a substituted amino group, an amido group, an imido group, an alkoxycarbonylamino group, a substituted alkoxycarbonylamino group, an aryloxycarbonylamino group, a substituted aryloxycarbonylamino group, a substituted carbamoyl group, a sulfonamido group, a substituted sulfamoyl group, an alkylthio group, a substituted alkylthio group, an arylthio group, a substituted arylthio group, an alkyl sulfonyl group, a substituted alkyl sulfonyl group, an aryl sulfonyl group, a substituted aryl sulfonyl group, an alkyl sulfinyl group, a substituted alkyl sulfinyl group, an aryl sulfinyl group, a substituted aryl sulfinyl group, a substituted ureido group, a phosphoric acid amido group, a substituted silyl group, an alkoxycarbonyloxy group, a substituted alkoxycarbonyloxy group, an aryloxycarbonyloxy group, and a substituted aryloxycarbonyloxy group.

The alkyl group may have a cyclic structure or a branched structure. The number of carbon atoms of the alkyl group is preferably 1 to 30. The alkyl moiety of a substituted alkyl group has the same definition as that for an alkyl group, and the preferred range thereof also has the same definition. Examples of the substituent of the substituted alkyl group have the same definition as that for the examples of the substituent of the discotic core except for an alkyl group, a substituted alkyl group, an alkenyl group, a substituted alkenyl group, an alkynyl group, and a substituted alkynyl group, and the preferred range thereof also has the same definition.

The alkenyl group may have a cyclic structure or a branched structure. The number of carbon atoms of the alkenyl group is preferably 2 to 30. The alkenyl moiety of a substituted alkenyl group has the same definition as that for an alkenyl group, and the preferred range thereof also has the same definition. Examples of the substituent of the substituted alkenyl group are the same as the examples of the substituent of a substituted alkyl group. The alkynyl group may have a cyclic structure or a branched structure. The number of carbon atoms of the alkynyl group is preferably 2 to 30. The alkynyl moiety of a substituted alkynyl group has the same definition as that for an alkynyl group. Examples of the substituent of the substituted alkynyl group have the same definition as that for the examples of the substituent of a substituted alkyl group, and the preferred range thereof also has the same definition.

The number of carbon atoms of the aryl group is preferably 6 to 30. The aryl moiety of a substituted aryl group has the same definition as that for an aryl group, and the preferred range thereof also has the same definition. Examples of the substituent of the substituted aryl group have the same definition as that for the examples of the substituent of the discotic core, and the preferred range thereof also has the same definition.

The heterocyclic group preferably has a 5-membered or 6-membered heterocyclic ring. The heterocyclic ring may be condensed with another heterocyclic ring, aliphatic ring, or aromatic ring. The hetero atom of the heterocyclic ring is preferably a nitrogen atom, an oxygen atom, or a sulfur atom. The heterocyclic group may have a substituent. Examples of the substituent of the heterocyclic group have the same definition as that for the examples of the substituent of the discotic core, and the preferred range thereof also has the same definition.

The alkyl moieties of an alkoxy group and a substituted alkoxy group have the same definition as that for an alkyl group, and the preferred ranges thereof also have the same definition. Examples of the substituent of the substituted alkoxy group have the same definition as that for the examples of the substituent of a substituted alkyl group, and the preferred range thereof also has the same definition. The aryl moieties of an aryloxy group and a substituted aryloxy group have the same definitions as those for an aryl group, and the preferred ranges also have the same definitions. Examples of the substituent of the substituted aryloxy group have the same definition as that for the examples of the substituent of the discotic core, and the preferred range thereof also has the same definition.

The acyl group is represented by formyl or —CO—R, where R is an alkyl group, a substituted alkyl group, an alkenyl group, a substituted alkenyl group, an alkynyl group, a substituted alkynyl group, an aryl group, or a substituted aryl group.

The acyloxy group is represented by formyloxy or —O—CO—R, where R is an alkyl group, a substituted alkyl group, an alkenyl group, a substituted alkenyl group, an alkynyl group, a substituted alkynyl group, an aryl group, or a substituted aryl group.

The alkyl moieties of an alkoxycarbonyl group and a substituted alkoxycarbonyl group are the same as an alkyl group. Examples of the substituent of a substituted alkoxycarbonyl group have the same definition as that for the examples of the substituent of a substituted alkyl group, and the preferred range thereof also has the same definition.

The aryl moieties of an aryloxycarbonyl group and a substituted aryloxycarbonyl group have the same definition as that for an aryl group, and the preferred range thereof also has the same definition. Examples of the substituent of a substituted aryloxycarbonyl group have the same definition as that for the examples of the substituent of the discotic core, and the preferred range thereof also has the same definition.

The substituted amino group is represented by —NH—R or —N(—R)$_2$, where R is an alkyl group, a substituted alkyl group, an alkenyl group, a substituted alkenyl group, an alkynyl group, a substituted alkynyl group, an aryl group, or a substituted aryl group.

The amido group is represented by —NH—CO—R, where R is an alkyl group, a substituted alkyl group, an alkenyl group, a substituted alkenyl group, an alkynyl group, a substituted alkynyl group, an aryl group, or a substituted aryl group.

The imido group is represented by —N(—CO—R)$_2$, where R is an alkyl group, a substituted alkyl group, an alkenyl group, a substituted alkenyl group, an alkynyl group, a substituted alkynyl group, an aryl group, or a substituted aryl group.

The alkyl moieties of an alkoxycarbonylamino group and a substituted alkoxycarbonylamino group have the same definition as that for an alkyl group, and the preferred range thereof also has the same definition. Examples of the substituent of a substituted alkoxycarbonylamino group are the same as the examples of the substituent of a substituted alkyl group.

The aryl moieties of an aryloxycarbonylamino group and a substituted aryloxycarbonylamino group have the same definition as that for an aryl group, and the preferred range thereof also has the same definition. Examples of the substituent of a substituted aryloxycarbonylamino group are the same as the examples of the substituent of the discotic core.

The substituted carbamoyl group is represented by —CO—NH—R or —CO—N(—R)$_2$, where R is an alkyl group, a substituted alkyl group, an alkenyl group, a substituted alkenyl group, an alkynyl group, a substituted alkynyl group, an aryl group, or a substituted aryl group.

The sulfonamido group is represented by —NH—SO$_2$—R, where R is an alkyl group, a substituted alkyl group, an alkenyl group, a substituted alkenyl group, an alkynyl group, a substituted alkynyl group, an aryl group, or a substituted aryl group. The substituted sulfamoyl group is represented by —SO$_2$—NH—R or —SO$_2$—N(—R)$_2$, where R is an alkyl group, a substituted alkyl group, an alkenyl group, a substituted alkenyl group, an alkynyl group, a substituted alkynyl group, an aryl group, or a substituted aryl group.

The alkyl moieties of an alkylthio group and a substituted alkylthio group are the same as an alkyl group. Examples of the substituent of the substituted alkylthio group are the same as the examples of the substituent of a substituted alkyl group.

The aryl moieties of an arylthio group and a substituted arylthio group have the same definition as that for an aryl group, and the preferred range thereof also has the same definition. Examples of the substituent of the substituted arylthio group have the same definition as that for the examples of the substituent of the discotic core, and the preferred range thereof also has the same definition.

The alkyl moieties of an alkyl sulfonyl group and a substituted alkyl sulfonyl group have the same definition as that for an alkyl group, and the preferred range thereof also has the same definition. Examples of the substituent of a substituted alkyl sulfonyl group have the same definition as that for the examples of the substituent of a substituted alkyl group, and the preferred range thereof also has the same definition.

The aryl moieties of an aryl sulfonyl group and a substituted aryl sulfonyl group have the same definition as that for an aryl group, and the preferred range thereof also has the same definition. Examples of the substituent of a substituted aryl sulfonyl group have the same definition as that for the examples of the discotic core, and the preferred range thereof also has the same definition.

The alkyl moieties of an alkyl sulfinyl group and a substituted alkyl sulfinyl group have the same definition as that for an alkyl group, and the preferred range thereof also has the same definition. Examples of the substituent of a substituted alkyl sulfinyl group have the same definition as that for the examples of the substituent a substituted alkyl group, and the preferred range thereof also has the same definition.

The aryl moieties of an alkyl sulfinyl group and a substituted alkyl sulfinyl group have the same definition as that for an aryl group, and the preferred range thereof also has the same definition. Examples of the substituent of a substituted alkyl sulfinyl group have the same definition as that for the examples of the substituent of the discotic core, and the preferred range thereof also has the same definition.

The substituted ureido group is represented by —NH—CO—NH—R or —NH—CO—N(—R)$_2$, where R is an alkyl group, a substituted alkyl group, an alkenyl group, a substituted alkenyl group, an alkynyl group, a substituted alkynyl group, an aryl group, or a substituted aryl group.

The phosphoric acid amido group is represented by —NH—O—P(=O)(—OH)—O—R or —NH—O—P(=O)(—O—R)$_2$, where R is an alkyl group, a substituted alkyl group, an alkenyl group, a substituted alkenyl group, an alkynyl group, a substituted alkynyl group, an aryl group, or a substituted aryl group.

The substituted silyl group is represented by —SiH$_2$—R, —SiH(—R)$_2$ or —Si(—R)$_3$, where R is an alkyl group, a substituted alkyl group, an alkenyl group, a substituted alkenyl group, an alkynyl group, a substituted alkynyl group, an aryl group, or a substituted aryl group.

The alkyl moieties of an alkoxycarbonyloxy group and a substituted alkoxycarbonyloxy group are the same as an alkyl group. Examples of the substituent of a substituted alkoxycarbonyloxy group have the same definition as that for the examples of a substituted alkyl group, and the preferred range thereof also has the same definition.

The aryl moieties of an aryloxycarbonyloxy group and a substituted aryloxycarbonyloxy group have the same definition as that for an aryl group, and the preferred range thereof also has the same definition. Examples of the substituent of a substituted aryloxycarbonyloxy group have the same definition as that for the examples of the discotic core, and the preferred range thereof also has the same definition.

In the formula (1), n1 is an integer of 3 to 20, preferably an integer of 3 to 15, more preferably an integer of 3 to 12, further preferably an integer of 3 to 10, still further preferably an integer of 4 to 8, and most preferably 6.

In the formula (1), $R^1$, $R^2$, $R^3$, $R^4$, and $R^5$ each represent a hydrogen atom or a substituent, and examples thereof may include the same ones as the examples of the substituent of the discotic core. Whereas, any two of $R^1$, $R^2$, $R^3$, $R^4$, and $R^5$ may combine with each other to form a ring. Examples thereof may include an aliphatic or aromatic ring. Preferably, $R^1$, $R^2$, $R^3$, $R^4$, and $R^5$ are each independently a hydrogen atom, a substituted or unsubstituted alkyl group, a cyano group, a substituted or unsubstituted alkoxycarbonyl group or a halogen atom.

$R^2$ and $R^3$, and $R^4$ and $R^5$ are in a cis-trans positional relationship with respect to a carbonyloxy group. The cis form is the form in which substituents are present along the same direction as the carbonyloxy group with respect to the cyclopropane ring plane. Whereas, the trans form is the form in which substituents are present in the opposite direction from the carbonyloxy group with respect to the cyclopropane ring plane. This positional relationship has no particular restriction unless otherwise specified.

In the formula (1), stereoisomers of enantiomer and diastereoisomer are present according to the combination of the substituents of $R^1$, $R^2$, $R^3$, $R^4$, and $R^5$, but these have no particular restriction unless otherwise specified.

The discotic compound represented by the formula (1) is preferably represented by the following formula (II):

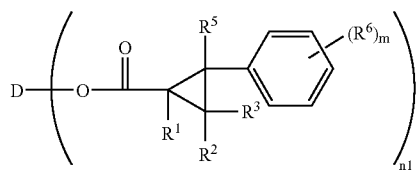

In the formula (II), D is a discotic core; n1 is an integer of 3 to 20; $R^1$, $R^2$, $R^3$ and $R^5$ each represent a hydrogen atom or a substituent, and may combine with each other to form a ring; m represents an integer of 1 to 5; and $R^6$ represents a substituent, and when a plurality of $R^6$'s are present, these may be respectively the same or different from each other, and may combine with each other to form a ring.

The D, n1, $R^1$, $R^2$, $R^3$, and $R^5$ are the same as D, n1, $R^1$, $R^2$, $R^3$, and $R^5$ defined in relation to the formula (1), and the preferred range thereof also has the same definition.

In the formula (II), $R^6$ represents a substituent, and examples thereof may include the same ones as the examples of the substituents of the discotic core. Preferred examples of $R^6$ may include a halogen atom, a substituted or unsubstituted alkyl group, a substituted or unsubstituted alkoxy group, a substituted or unsubstituted alkoxycarbonyl group, a substituted or unsubstituted aryl group, a substituted or unsubstituted aryloxy group, a substituted or unsubstituted alkoxycarbonyloxy group, a substituted or unsubstituted aryloxycarbonyloxy group, or a substituted or unsubstituted acyloxy group. Further preferably, at least one $R^6$ is a substituted alkyl group, a substituted alkoxy group, a substituted alkoxycarbonyl group, a substituted aryl group, a substituted aryloxy group, a substituted alkoxycarbonyloxy group, a substituted aryloxycarbonyloxy group, or a substituted acyloxy group, and has a polymerizable group at the end of the substituent.

In the formula (II), the substitution site of $R^6$ has no particular restriction unless otherwise specified. Preferably, at least one $R^6$ is present at the para position.

In the formula (II), $R^5$ is in a cis/trans positional relationship with respect to the carbonyloxy group. This positional relationship has no particular restriction unless otherwise specified. Cis is preferred.

The discotic compound of the invention, for example, the discotic compound represented by the formula (1), can have a polymerizable group. The discotic compound having a polymerizable group (polymerizable discotic compound) can be fixed in the state in which the discotic plane of the discotic compound is oriented by the polymerization reaction.

When the compound represented by the formula (1) has a polymerizable group, it is preferable that $R^4$ is a substituted alkyl group, a substituted alkoxy group, a substituted aryl group, or a substituted aryloxy group, and has a polymerizable group at the end of each substituent.

The polymerizable discotic compound is further preferably represented by the following formula (III):

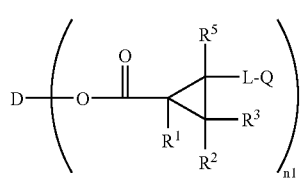

In the formula (III), D is a discotic core; n1 represents an integer of 3 to 20; $R^1$, $R^2$, $R^3$, and $R^5$ each represent a hydrogen atom or a substituent, and may combine with each other to form a ring.

D, n1, $R^1$, $R^2$, $R^3$, and $R^5$ are the same as D, n1, $R^1$, $R^2$, $R^3$, and $R^5$ defined in relation to the formula (1), and the preferred range thereof also has the same definition.

In the formula (III), L is a divalent linking group selected from an oxygen atom, a sulfur atom, a carbonyl group, a substituted or unsubstituted alkylene group, a substituted or unsubstituted arylene group, and combinations thereof.

The alkylene group may have a cyclic structure or a branched structure. The number of carbon atoms of the alkylene group is preferably 1 to 30.

The alkylene moiety of a substituted alkylene group has the same definition as that for an alkylene group. Examples of the substituent of the substituted alkylene group are the same as the examples of the substituent of the discotic core described in relation to the formula (1), except for an alkyl group, a substituted alkyl group, an alkenyl group, a substituted alkenyl group, an alkynyl group and a substituted alkynyl group.

The number of carbon atoms of the arylene group is preferably 1 to 30. The arylene group is preferably phenylene or naphthylene, further preferably phenylene, and most preferably p-phenylene.

The arylene moiety of a substituted arylene group is the same as the arylene group. Examples of the substituent of the substituted arylene group are the same as the examples of the substituent of the discotic core described in relation to the formula (1).

In the formula (III), Q is a polymerizable group. The polymerizable group is further preferably an epoxy group or an ethylenic unsaturated group, and most preferably an ethylenic unsaturated group (e.g., vinyl, 1-propenyl, or isopropenyl).

The particularly preferred discotic compound as the discotic compound of the invention is a triphenylene compound represented by the following formula (IV):

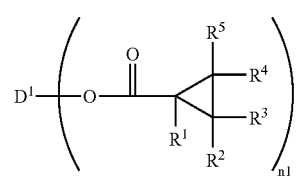

In the formula (IV), $D^1$ represents triphenylene, n1 represents an integer of 3 to 6, $R^1$, $R^2$, $R^3$, $R^4$, and $R^5$ are each a hydrogen atom, a substituted or unsubstituted alkyl group having 1 to 20 carbon atoms, a substituted or unsubstituted alkenyl group having 3 to 20 carbon atoms, a substituted or unsubstituted alkoxy group having 1 to 20 carbon atoms, a substituted or unsubstituted alkenyloxy group having 3 to 20 carbon atoms, a substituted or unsubstituted aryl group having 6 to 20 carbon atoms, or a substituted or unsubstituted aryloxy group having 6 to 20 carbon atoms, or a substituted or unsubstituted alkoxycarbonyl group having 1 to 20 carbon atoms. The definition and examples of each group are the same as those for the formula (1), and the preferred range thereof also has the same definition.

In the formula (IV), $R^1$, $R^2$, $R^3$, $R^4$, and $R^5$ are each preferably a hydrogen atom, a methyl group, an ethyl group, a methyloxy group, an ethyloxy group, a cyano group, a halogen atom, or a substituted or unsubstituted alkoxycarbonyl group.

In the formula (IV), preferably, $R^4$ is a substituted or unsubstituted aryl group having 6 to 20 carbon atoms. In the formula (IV), preferably, $R^4$ is in trans relation with respect to the carbonyloxy group.

The triphenylene compound represented by the formula (IV) can have a polymerizable group. The triphenylene compound having a polymerizable group (polymerizable triphenylene compound) can be fixed in the state in which the discotic plane including triphenylene is oriented by the polymerization reaction.

When the triphenylene compound represented by the formula (IV) has a polymerizable group, it is preferable that $R^4$ is a substituted alkyl group having 2 to 20 carbon atoms, a substituted alkoxy group having 2 to 20 carbon atoms, a substituted aryl group having 6 to 20 carbon atoms, or a substituted aryloxy group having 6 to 20 carbon atoms, and has a polymerizable group at the end of the substituent.

In the formula (IV), an asymmetric carbon atom is present, and hence a diastereomer or an enantiomer is present. However, in the invention, no distinction is made between these, and all are assumed to be included. In other words, it is assumed that no distinction is made between the stereoisomers according to the method of describing the structure.

Below, examples of the discotic compound represented by the formula (1) will be shown. Incidentally, when each exemplified compound is shown, it is shown as the exemplified compound (x), where x is the numerical value (x) described beside the exemplified compound.

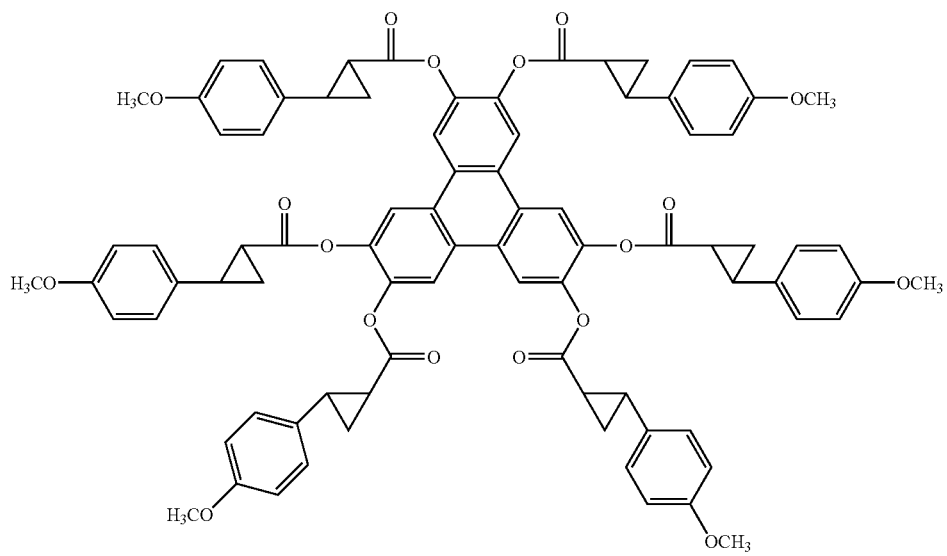

(1)

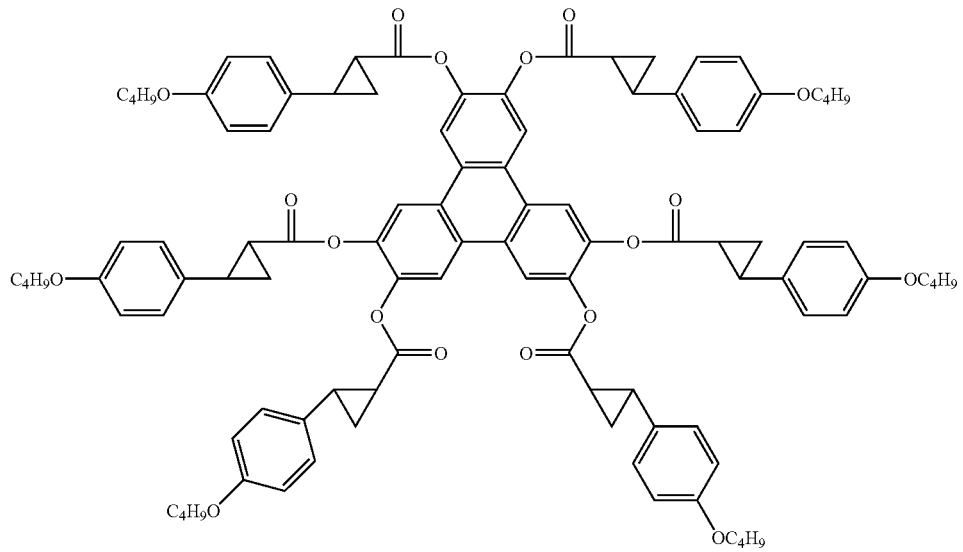

(2)

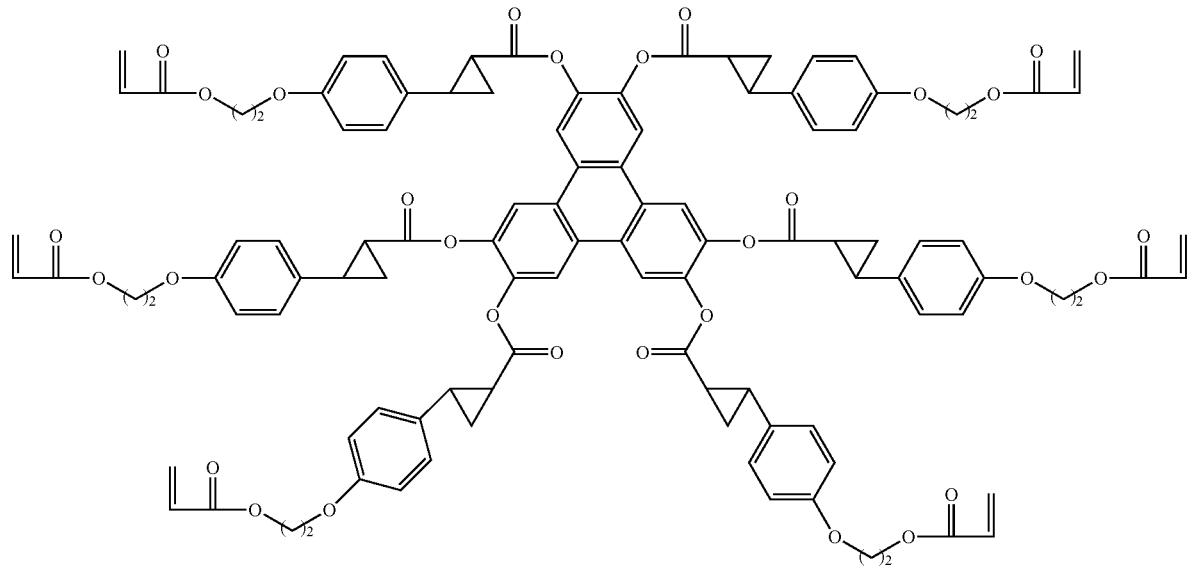
(3)
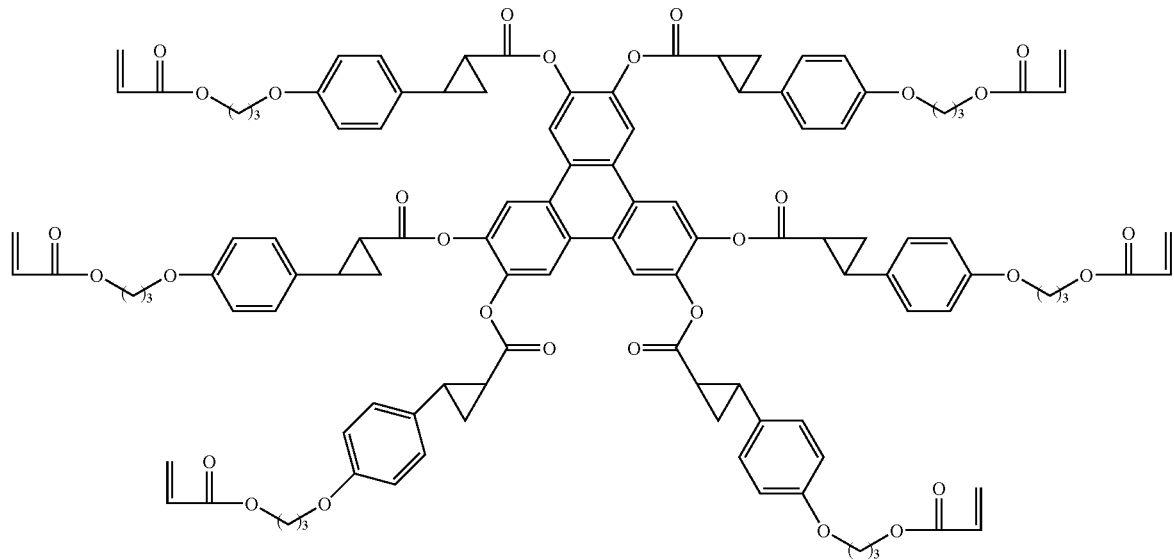
(4)

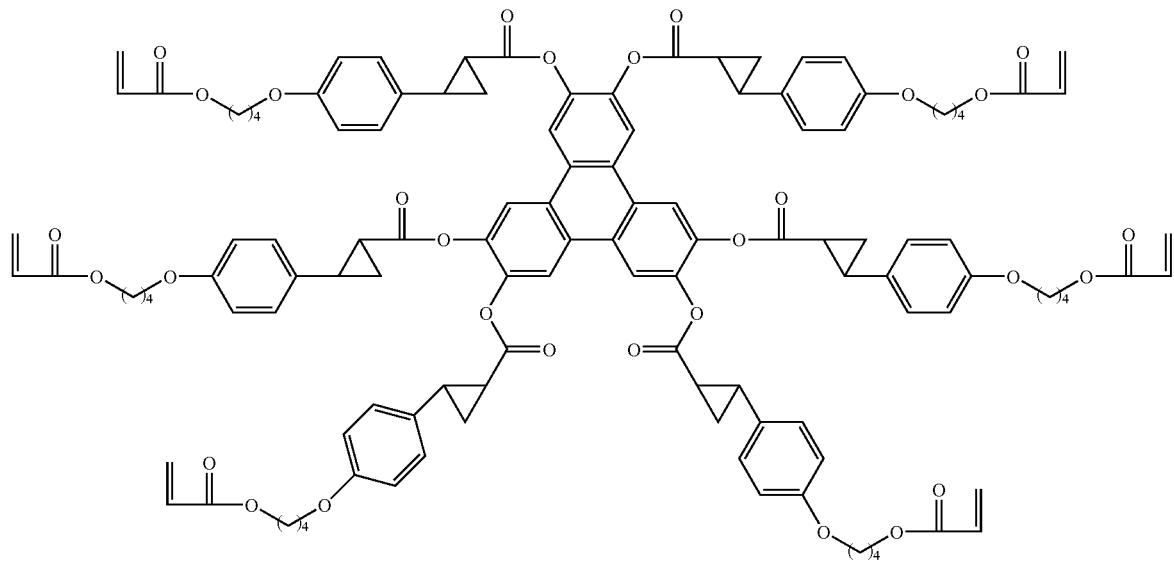
(5)
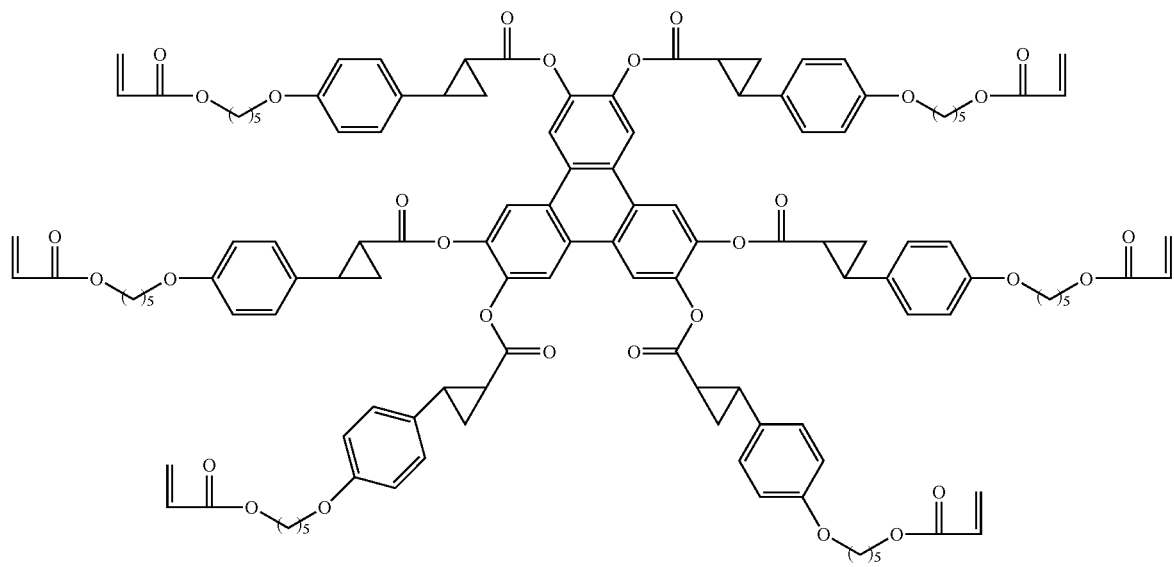
(6)

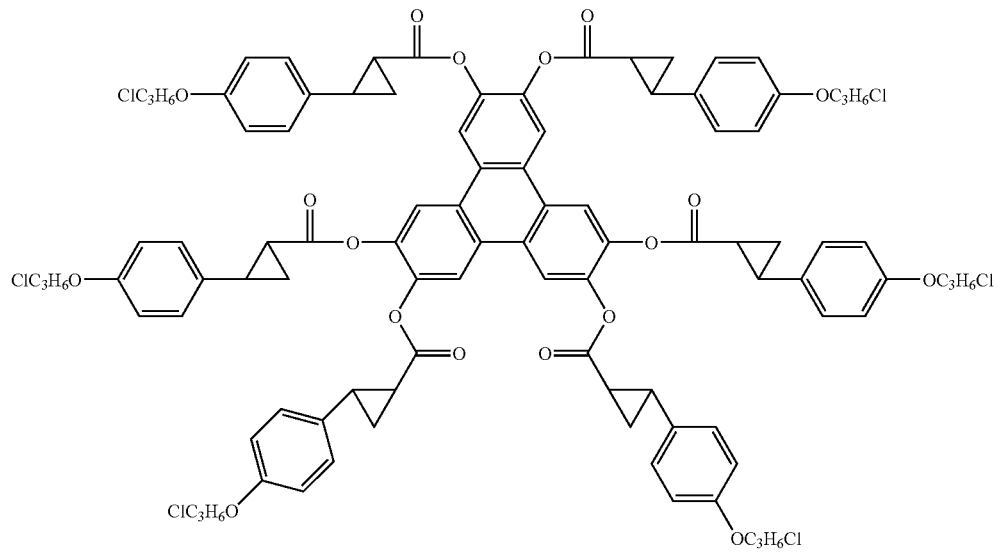
(7)
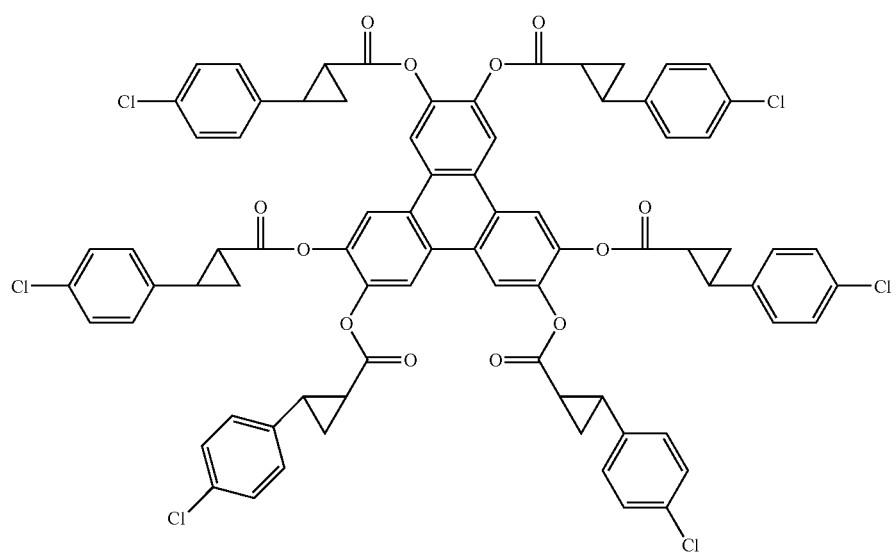
(8)

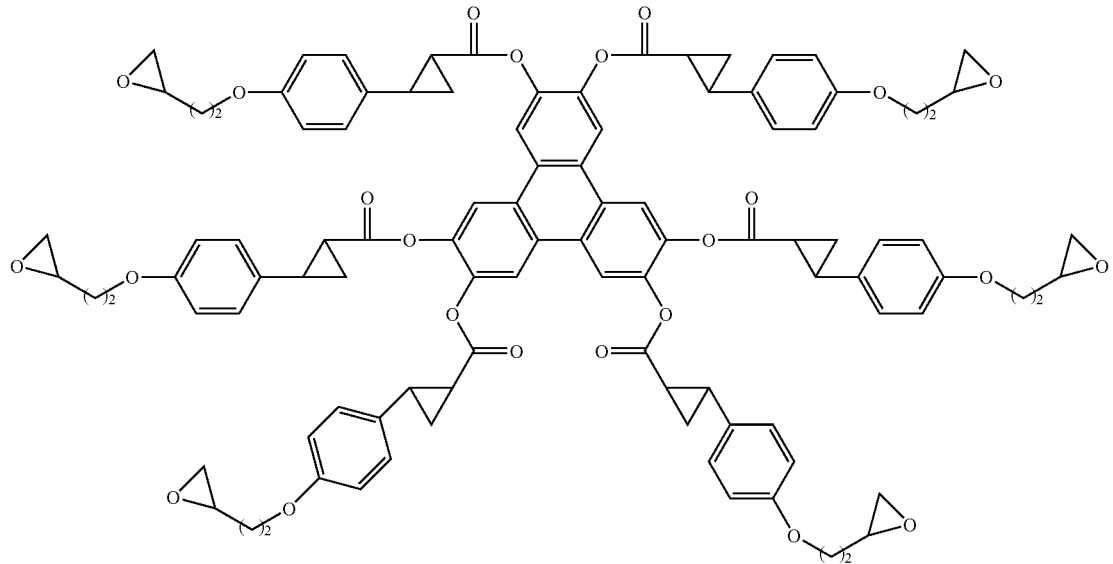
(9)
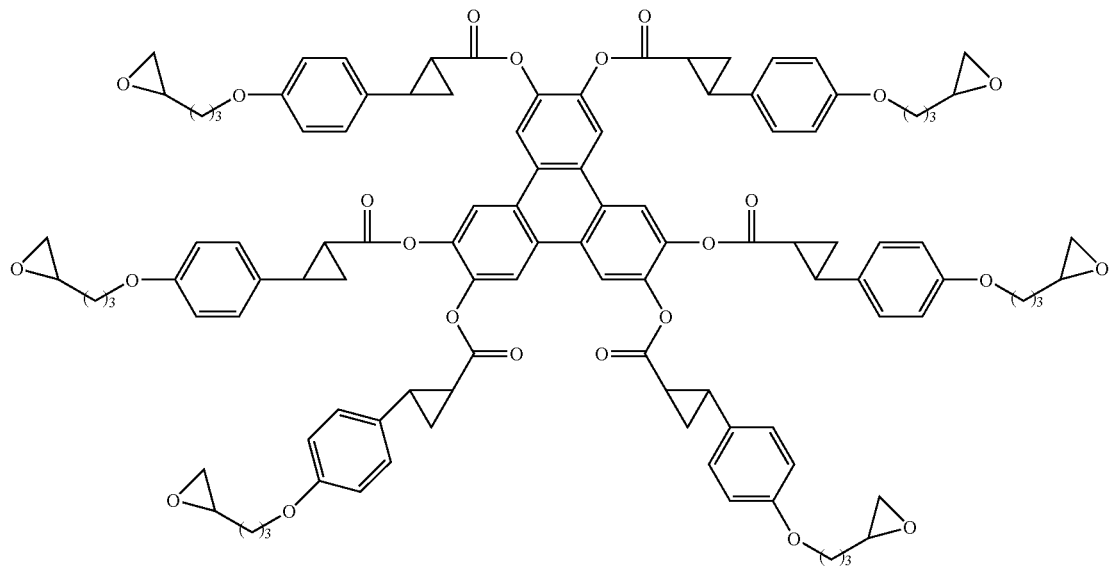
(10)

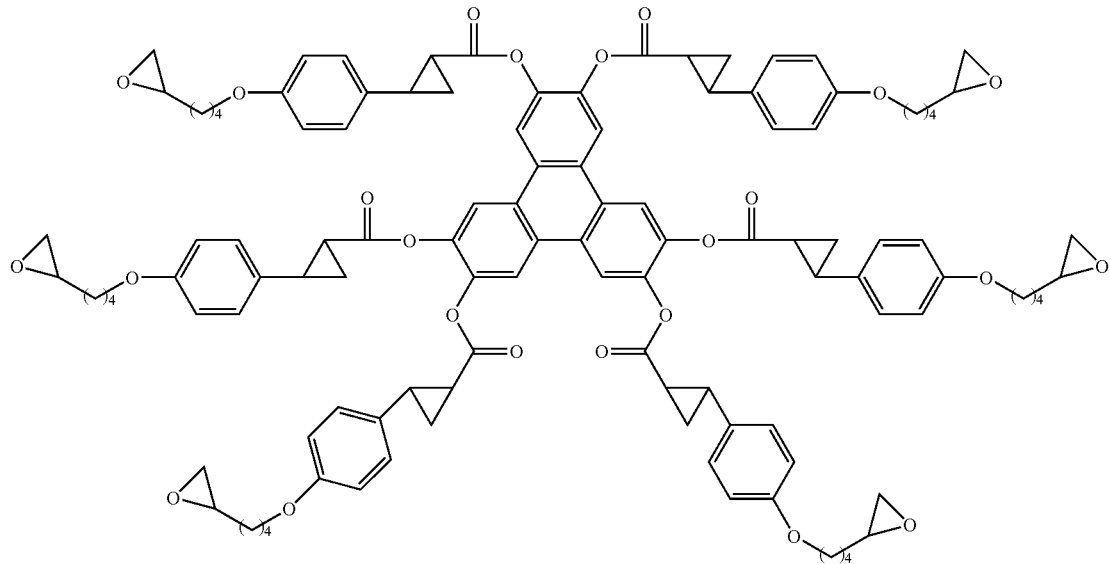
(11)
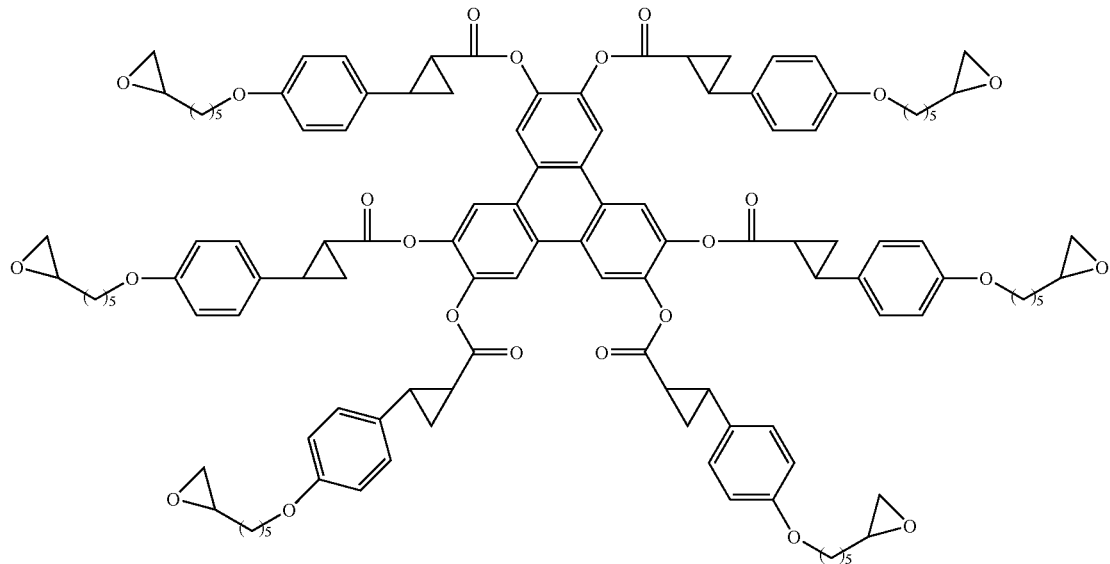
(12)

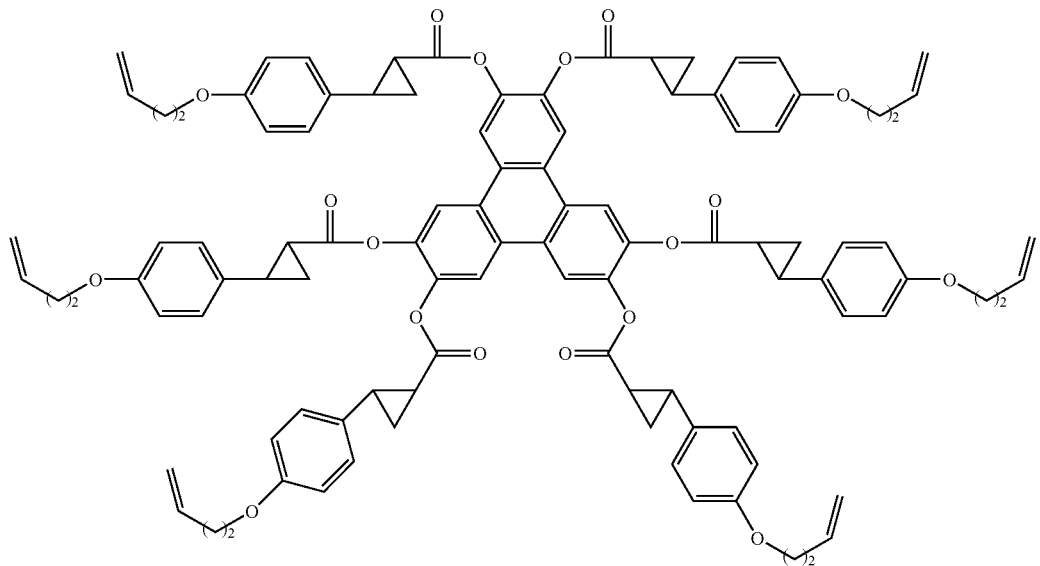
(13)
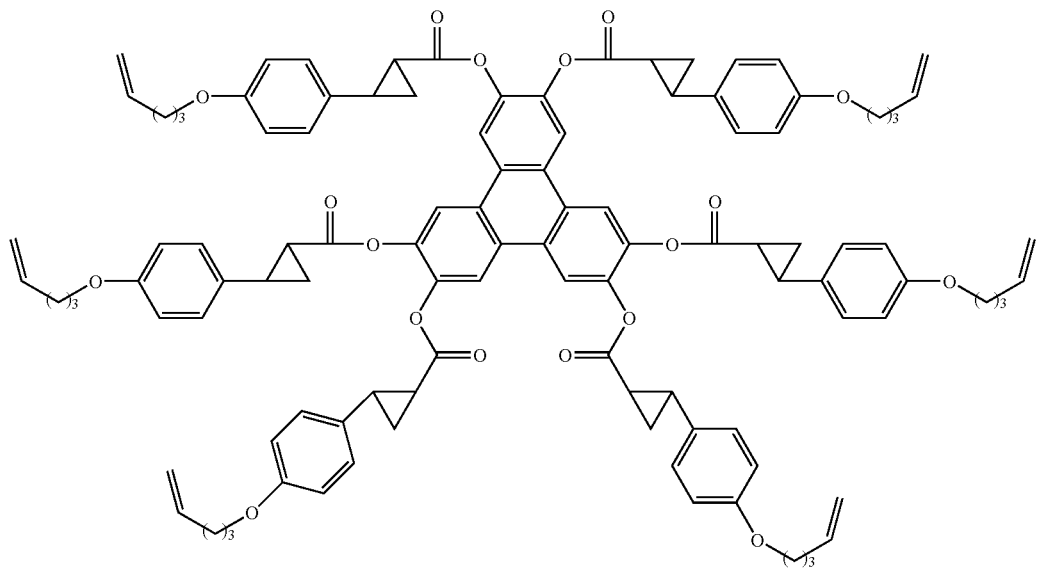
(14)

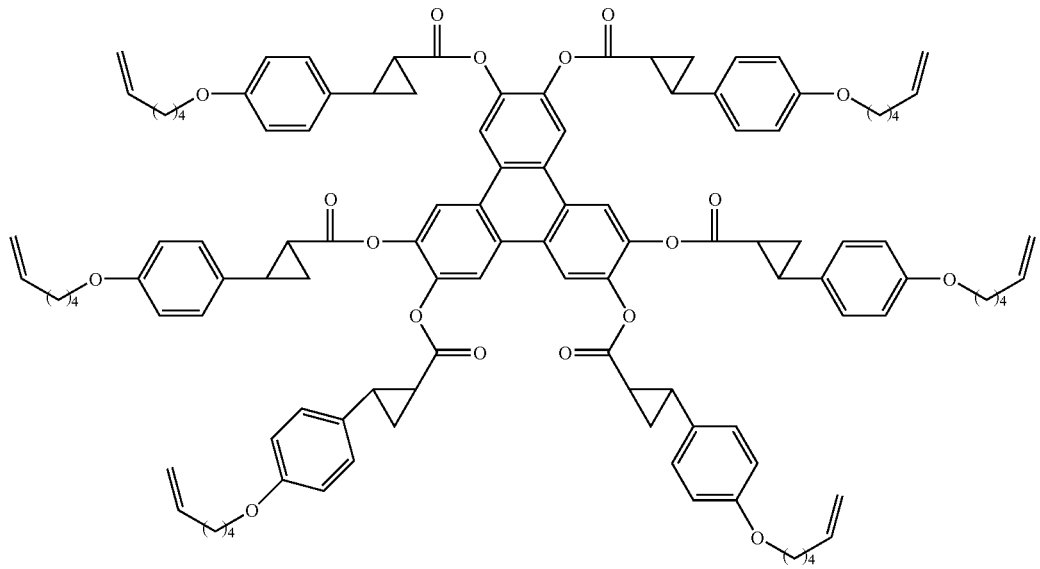
(15)
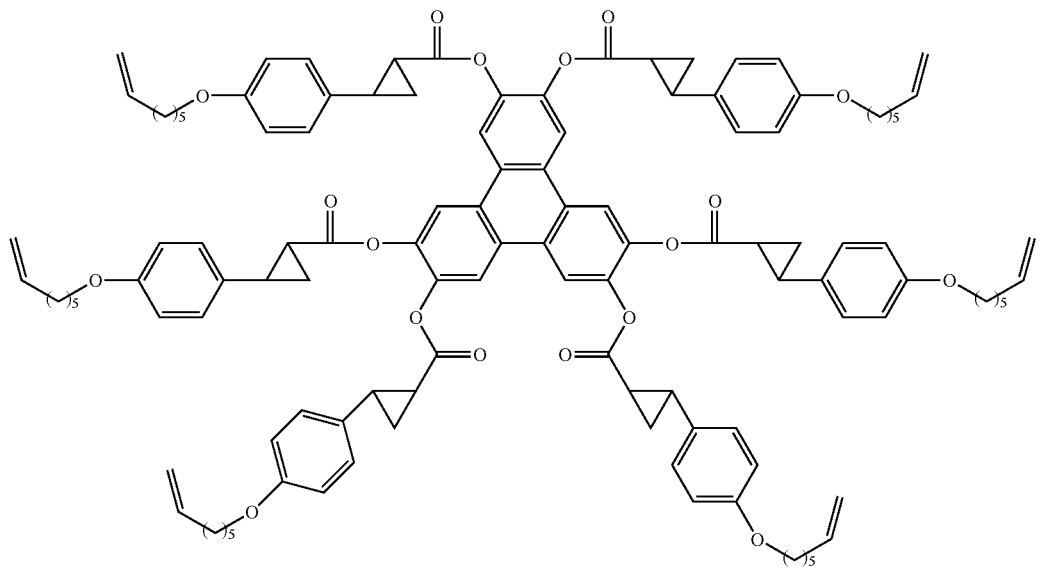
(16)

-continued
(17)
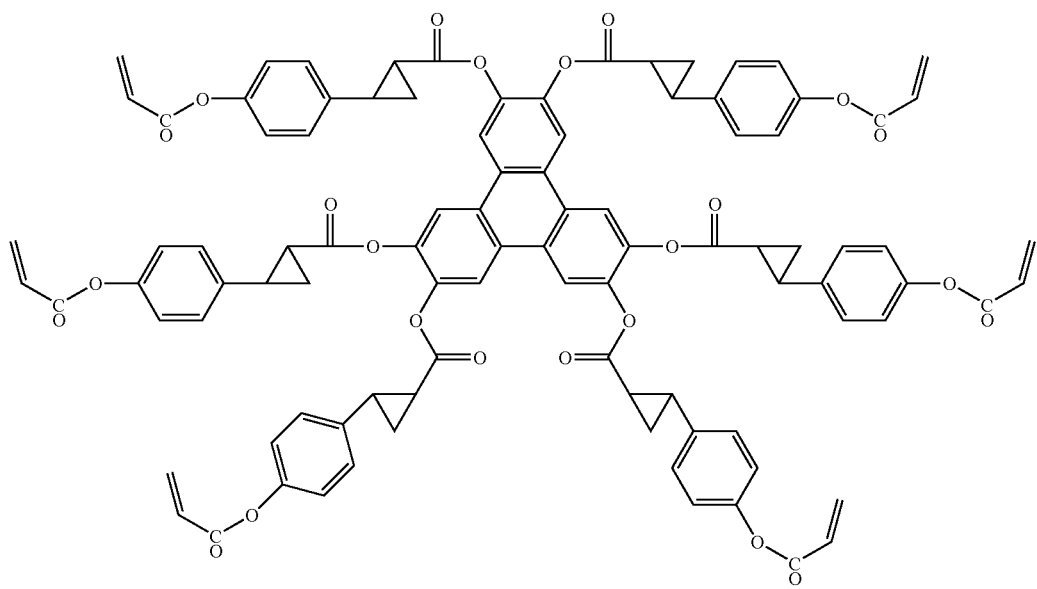
(18)
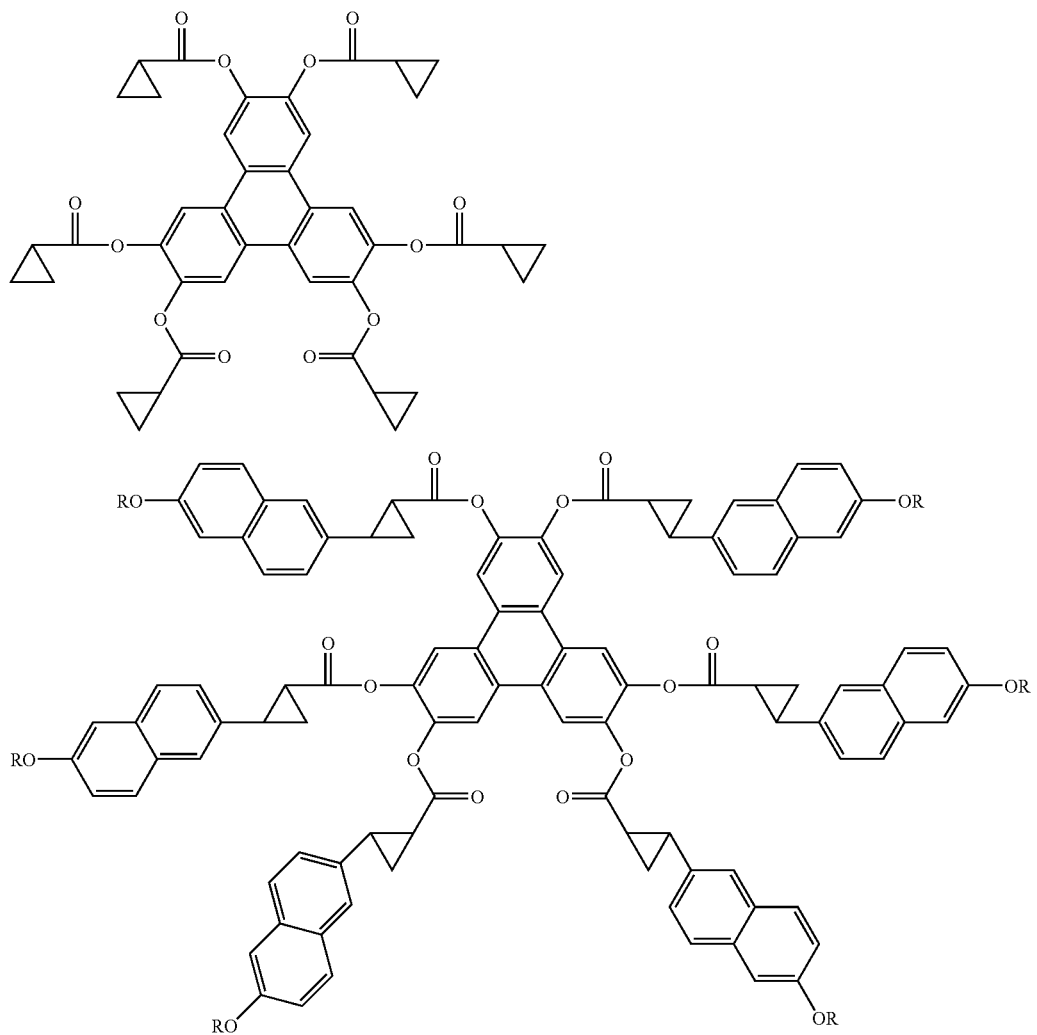

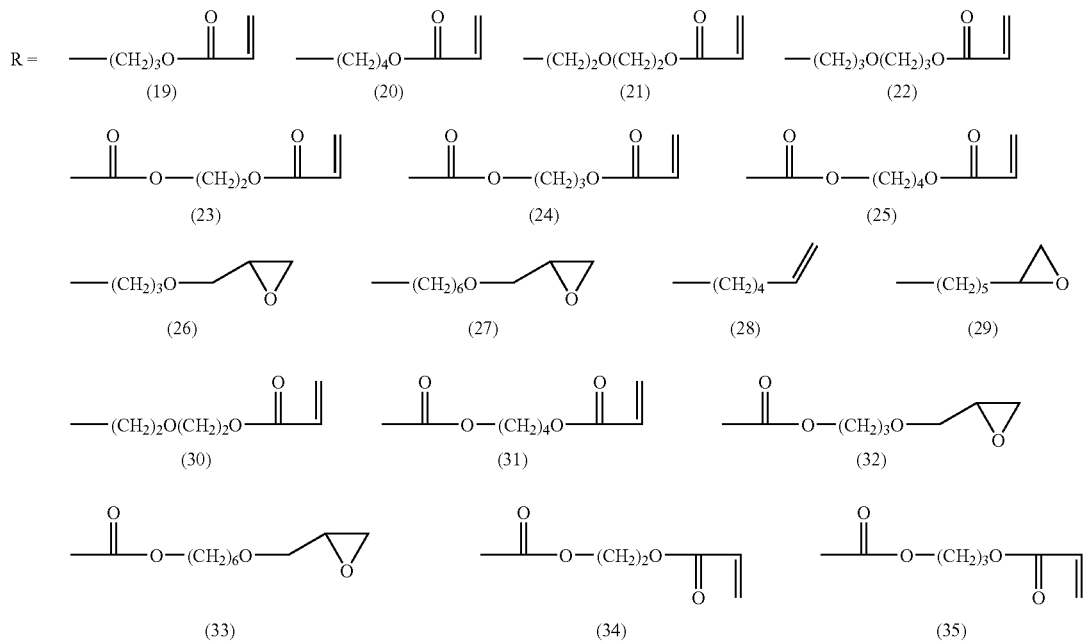
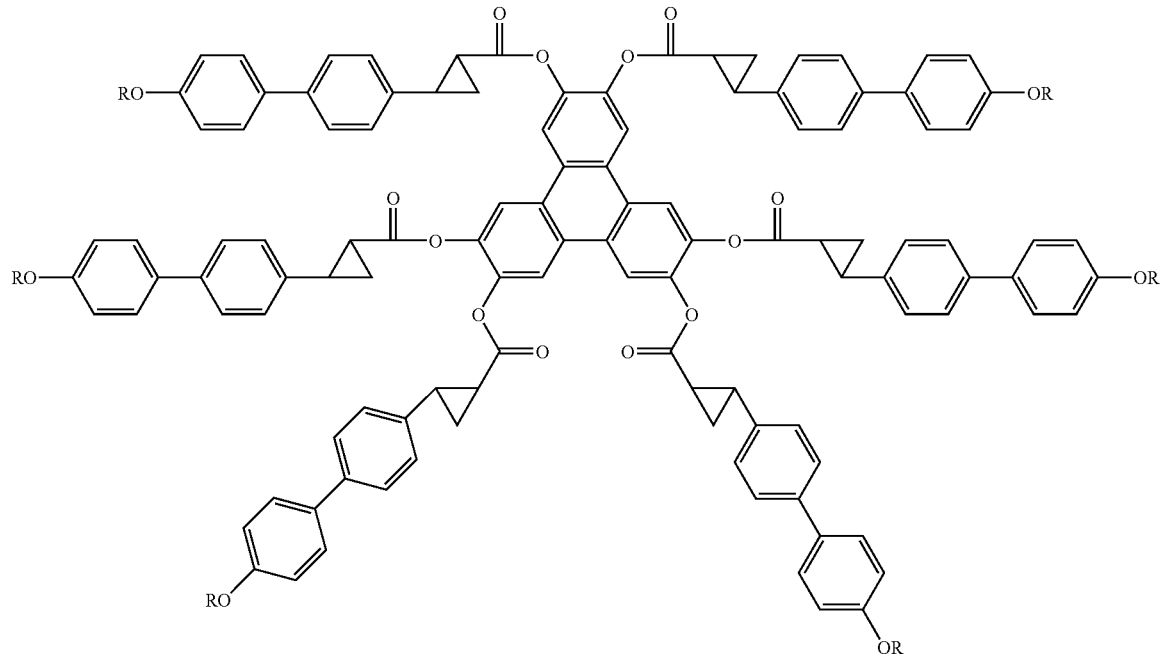

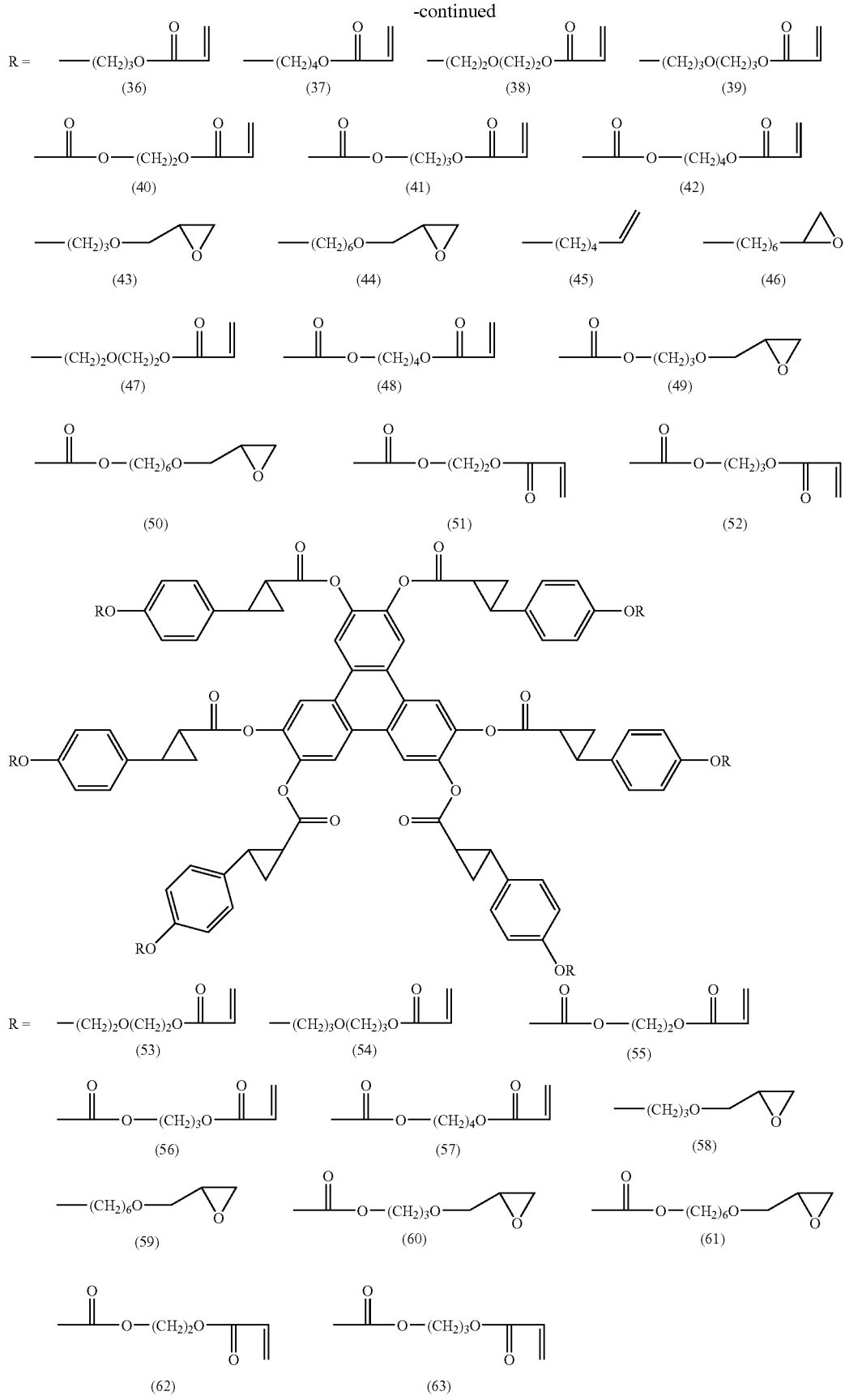

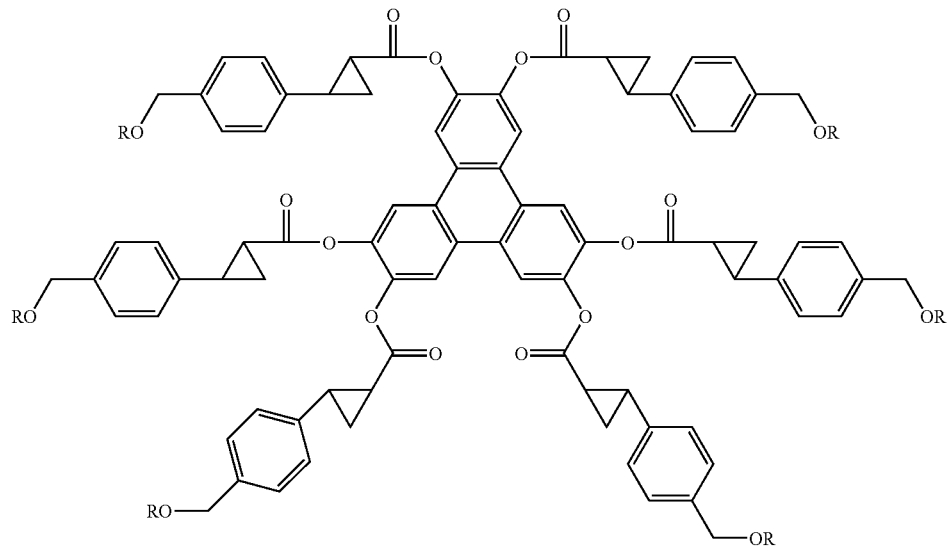
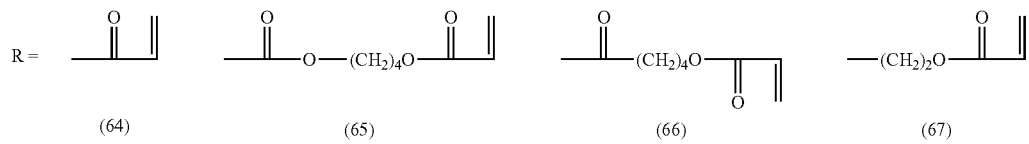
(64) (65) (66) (67)
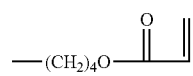
(68)
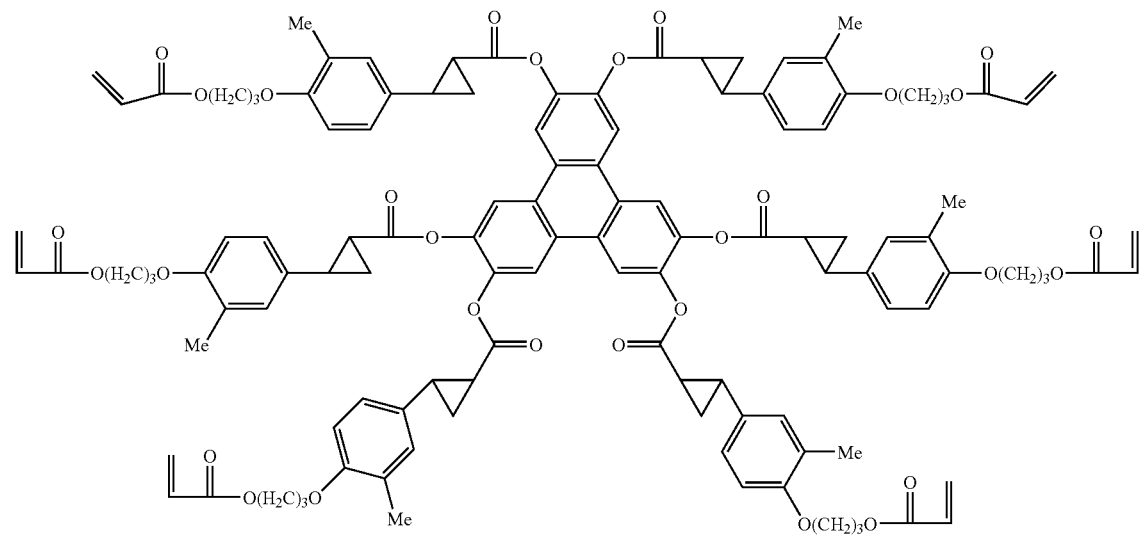
(69)

(70)
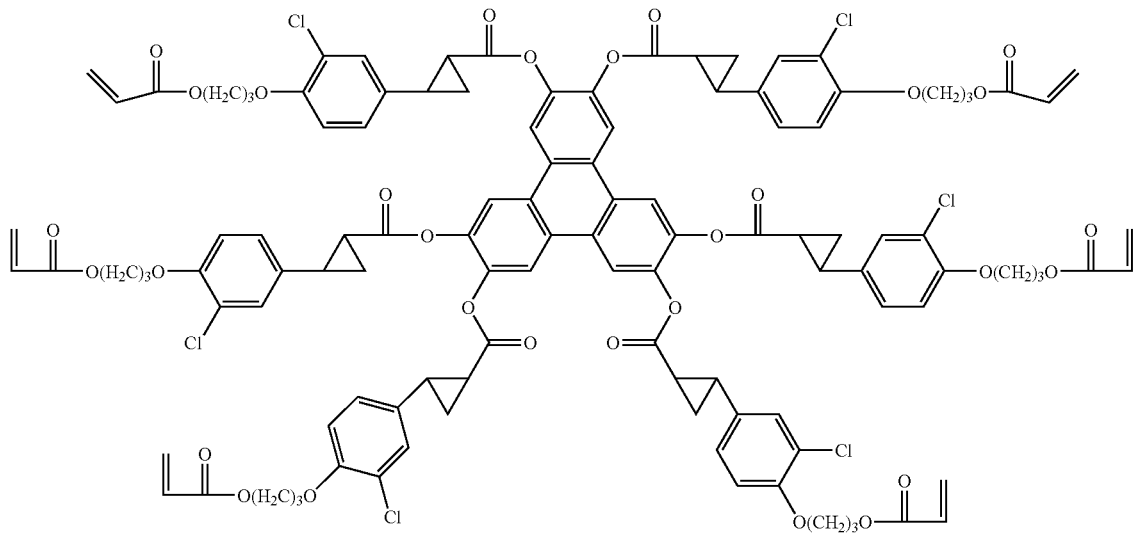
(71)
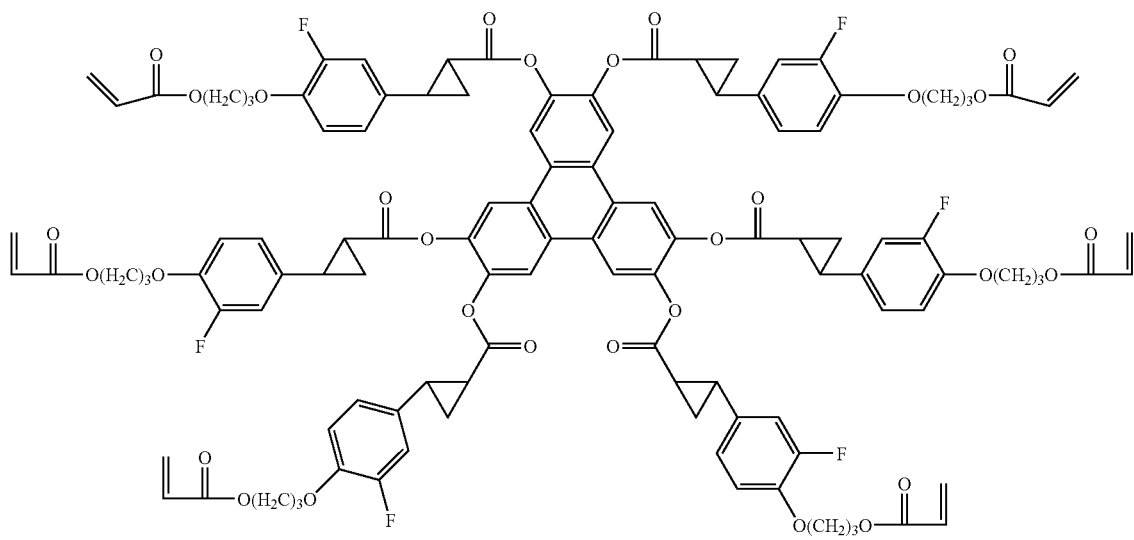

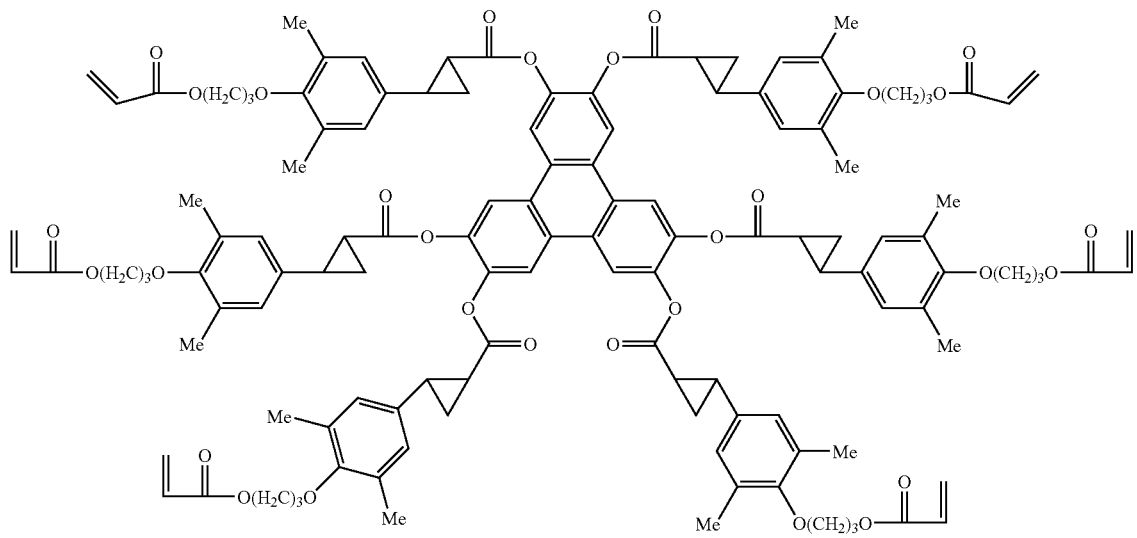
(72)
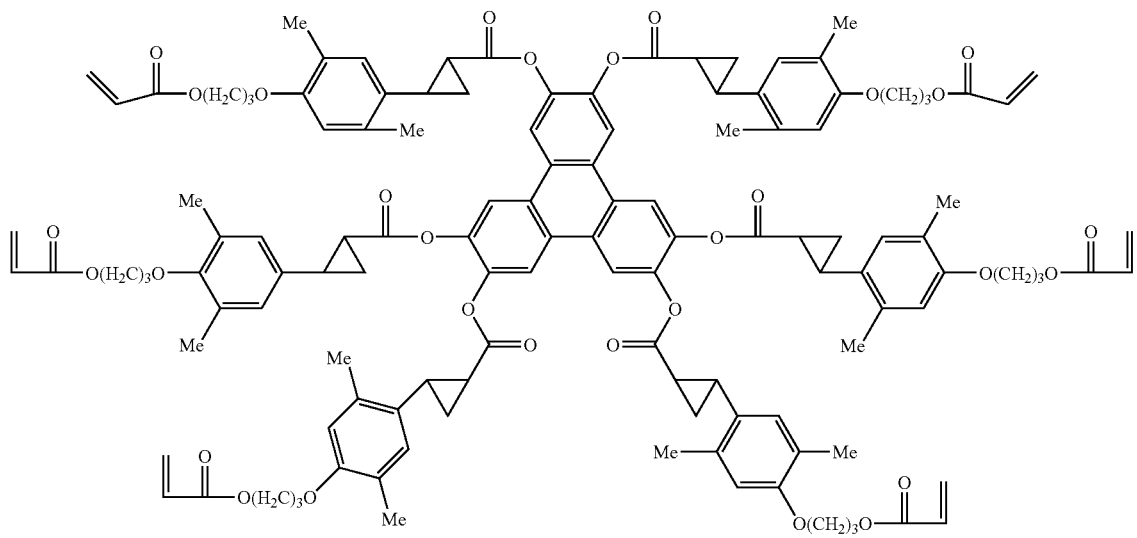
(73)

-continued
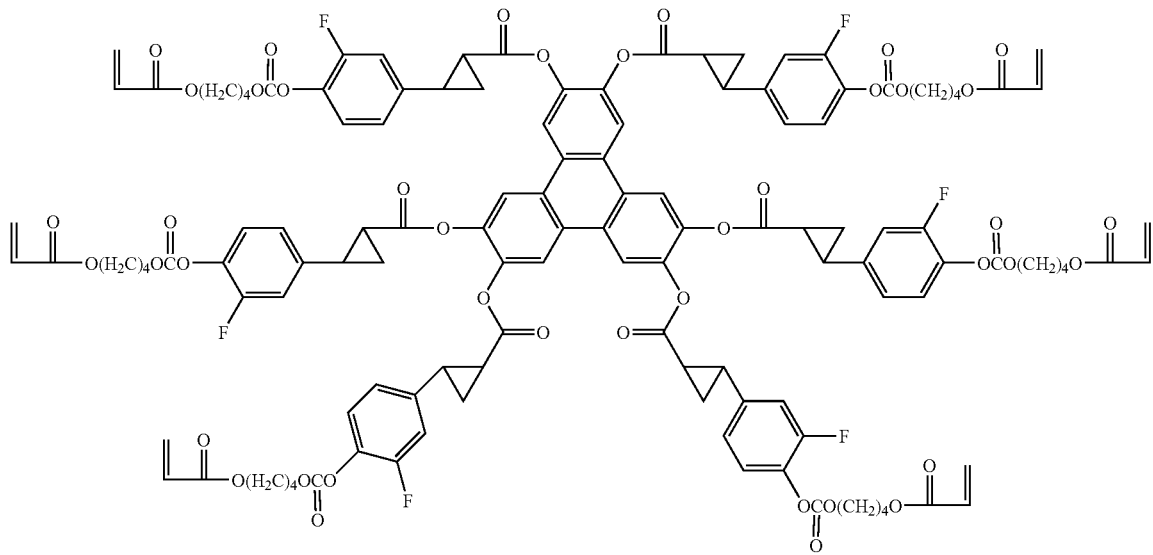
(74)
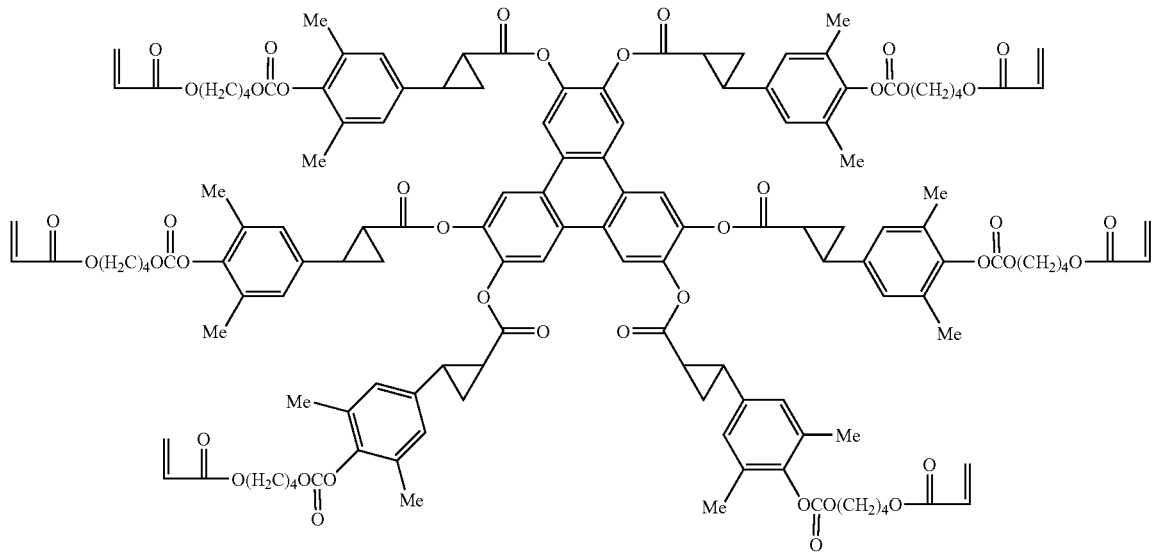
(75)

-continued (76)

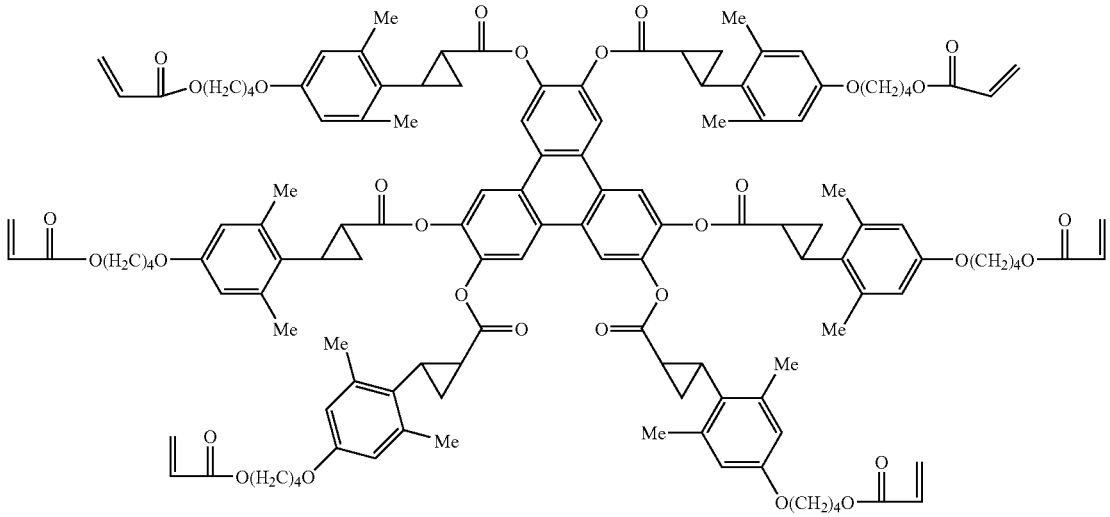

The discotic compounds disclosed in the invention may exhibit liquid crystallinity independently alone, or by being mixed with other liquid crystals. When the compound of the invention is mixed with another discotic liquid crystalline compound to be used, the ratio of the discotic compound in accordance with the invention based on the total amount of the liquid crystalline molecules is preferably 1 to 100 mass %, further preferably 10 to 98 mass %, and most preferably 30 to 95 mass %.

(Optical Anisotropic Layer)

The optical compensation film of the invention has an optical anisotropic layer containing at least one of the fluorine-based polymers, and at least one of the prescribed discotic compounds. The optical anisotropic layer exhibits optical anisotropy based on the orientation of the discotic compound. The optical anisotropic layer may be formed from a composition containing the prescribed discotic compound, and the fluorine-based polymer, and if desired, other materials such as a material contributing to the control of the orientation and a material contributing to the fixing of the oriented state. The discotic compound is once heated to the liquid crystal phase formation temperature, and then cooled while being kept in the oriented state. As a result, it can be fixed without damaging the oriented form in the liquid crystal state. Whereas, the discotic compound can also be fixed by heating a composition containing a polymerization initiator added therein to the liquid crystal phase formation temperature, and then, polymerizing and cooling it. In the invention, the state in which the oriented state is fixed includes the state in which the orientation is held as the most typical and preferable embodiment. However, it is not limited thereto. Specifically, it denotes the state in which the layer has no flowability at generally 0° C. to 50° C., and under more severe conditions, at a temperature in the range of −30° C. to 70° C., and the fixed oriented form can be continuously kept with stability without causing a change in the oriented form by the external field or the external force.

Incidentally, when the oriented state has been finally fixed, the liquid crystalline composition is not required to exhibit the liquid crystallinity any longer. For example, when a polymerizable compound is used as the liquid crystalline compound, the polymerization or crosslinking reaction may resultingly proceed by the reaction by heat, light, or the like, resulting in an increase in molecular weight, and a loss of the liquid crystallinity.

When the optical anisotropic layer is manufactured by the use of the discotic compound having a polymerizable group, the compound is polymerized alone or with another compound in the process of manufacturing, and finally, an optical anisotropic layer containing a polymer having the compound of the invention as a polymer unit is manufactured. Such an optical anisotropic layer is also included in the scope of the invention.

An embodiment of the optical compensation film of the invention has a transparent support and the optical anisotropic layer. Herein, the optical anisotropic layer can be manufactured in the following manner. A composition containing at least respective ones of the discotic compounds and the fluorine-based polymers, and if required, other additives is coated on an alignment film, and then, fixed in the oriented state in the liquid crystal state. Incidentally, after fixing the liquid crystalline molecules in the oriented state on the alignment film, the resulting layer can be transferred on other supports. the liquid crystal compound fixed in the oriented state can keep the oriented state even without the alignment film. Therefore, the optical compensation film of the invention may not have an alignment film. The thickness of the optical anisotropic layer is preferably 0.1 to 20 μm, further preferably 0.2 to 15 μm, and most preferably 0.5 to 10

(Additives of Optical Anisotropic Layer)

Examples of the additive which can be added to the discotic compound and the fluorine-based polymer for the formation of the optical anisotropic layer may include the air interface orientation (alignment) controller, the cissing inhibitor, the polymerization initiator, and the polymerizable monomer.

(Air Interface Alignment Controller)

The liquid crystal compound is oriented at a pretilt angle of the air interface at the air interface. The pretilt angles include three types: the pretilt angle formed between the nx refractive index direction and the air interface; the pretilt angle formed between the ny refractive index direction and the air interface; and the pretilt angle formed between the nz refractive index direction and the air interface. The pretilt angle varies in its degree according to the type of the compound, and hence the pretilt angle at the air interface is required to be arbitrarily controlled according to the purpose.

For the control of the pretilt angle, for example, the external field such as an electric field or a magnetic field can be used, and additives can be used. However, use of additives is preferred.

Such an additive is preferably a compound having, in the molecule, one or more substituted or unsubstituted aliphatic groups having 6 to 40 carbon atoms, or substituted or unsubstituted aliphatic substituted oligosiloxanoxy groups having 6 to 40 carbon atoms, and further preferably a compound containing two or more thereof in the molecule. For example, as the air interface alignment controller, the hydrophobic excluded volume effect compound described in JP-A-2002-20363 can be used.

The amount of the additive for controlling the orientation on the air interface side is preferably 0.001 mass % to 20 mass %, further preferably 0.01 mass % to 10 mass %, and most preferably 0.1 mass % to 5 mass % based on the amount of the discotic compound.

(Cissing Inhibitor)

As the materials to be added to the discotic compound for preventing cissing upon coating of the composition, generally, macromolecular compounds can be preferably used. The polymer to be used has no particular restriction so long as it does not considerably inhibit the change in tilt angle, and the orientation of the discotic compound.

Examples of the polymer are described in JP-A-8-95030. Particularly preferred specific examples of the polymer may include cellulose esters. Examples of the cellulose ester may include cellulose acetate, cellulose acetate propionate, hydroxypropyl cellulose, and cellulose acetate butyrate. The amount of the polymer to be used for the purpose of cissing prevention so as not to inhibit the orientation of the discotic compound preferably falls generally within a range of 0.1 to 10 mass %, more preferably within a range of 0.1 to 8 mass %, and further preferably within a range of 0.1 to 5 mass % based on the amount of the discotic compound.

(Polymerization Initiator)

In the invention, the liquid crystalline compound is preferably fixed in the monodomain orientation, i.e., in a substantially uniformly oriented state. When a polymerizable discotic compound is used to this end, the discotic compound is preferably fixed by the polymerization reaction. The polymerization reactions include a thermal polymerization reaction using a thermal polymerization initiator, a photopolymerization reaction using a photopolymerization initiator, and a polymerization reaction by electron beam irradiation. Even in order to prevent the deformation or deterioration of the support or the like by heat, the photopolymerization reaction and the polymerization reaction by electron beam irradiation are preferred. Examples of the photopolymerization intiator may include α-carbonyl compounds (described in U.S. Pat. Nos. 2,367,661 and 2,367,670), acyloin ether (described in U.S. Pat. No. 2,448,828), 1-hydrocarbon-substituted aromatic acyloin compounds (described in U.S. Pat. No. 2,722,512), polynuclear quinone compounds (described in U.S. Pat. Nos. 3,046,127 and 2,951,758), combinations of triaryl imidazole dimers and p-amino phenyl ketones (described in U.S. Pat. No. 3,549,367), acridine and phenazine compounds (described in JP-A-60-105667 and U.S. Pat. No. 4,239,850), and oxadiazole compounds (described in U.S. Pat. No. 4,212,970). The amount of the photopolymerization initiator to be used is preferably 0.01 to 20 mass %, and further preferably 0.5 to 5 mass % based on the solid content of the coating solution. In the light irradiation for the polymerization of the discotic compound, an ultraviolet ray is preferably used. The irradiation energy is preferably 10 mJ to 50 J/cm$^2$, and further preferably 50 mJ to 800 mJ/cm$^2$. In order to promote the photopolymerization reaction, the light irradiation may be carried out under the heating condition. Whereas, the oxygen concentration of the atmosphere is involved in the degree of polymerization. Therefore, when a desirable degree of polymerization is not reached in air, the oxygen concentration is preferably reduced by a method of nitrogen substitution or the like. The preferred oxygen concentration is preferably 10% or less, further preferably 7% or less, and most preferably 3% or less.

(Polymerizable Monomer)

To the liquid crystal composition to be used for forming the optical anisotropic layer, a polymerizable monomer may be added. The polymerizable monomer to be used together with the liquid crystalline compound has no particular restriction so long as it has a compatibility with the liquid crystalline compound, and it does not remarkably cause the change in the tilt angle and the orientation inhibition of the liquid crystalline compound. Out of these, the compounds having polymerizable ethylenically unsaturated groups such as a vinyl group, a vinyloxy group, an acryloyl group, and a methacryloyl group are preferably used. The amount of the polymerizable monomer to be added falls generally within a range of 0.5 to 50 mass %, and falls preferably within the range of 1 to 30 mass % based on the amount of the liquid crystalline compound. Whereas, when monomers having 2 or more reactive functional groups are used, the effect of enhancing the adhesion between the alignment film and the optical anisotropic layer is expectable, and hence use of such monomers is particularly preferred.

(Coating Solvent)

As the solvent to be used for the preparation of the liquid crystal composition, an organic solvent is preferably used. Examples of the organic solvent may include amides (e.g., N,N-dimethylformamide), sulfoxides (e.g., dimethylsulfoxide), heterocyclic compounds (e.g., pyridine), hydrocarbons (e.g., toluene and hexanle), alkyl halides (e.g., chloroform and dichloromethane), esters (e.g., methyl acetate and butyl acetate), ketones (e.g., acetone, methyl ethyl ketone, methyl isobutyl ketone, and cyclohexanone), and ethers (e.g., tetrahydrofuran and 1,2-dimethoxyethane). Alkyl halides, esters, and ketones are preferred. Two or more organic solvents may be used in combination.

(Coating Method)

The optical anisotropic layer is formed by preparing a coating solution of a liquid crystal composition using the solvent, coating it on the alignment film, and subjecting the discotic compound to an orientation treatment. The coating of the coating solution can be carried out by a known method (e.g., a wire bar coating method, an extrusion coating method, a direct gravure coating method, a reverse gravure coating method, or a slot die coating method). However, coating is preferably carried out by the slot die coating method. Herein, the slot die coating method represents the method for coating by means of a slot coater.

Figure 8:
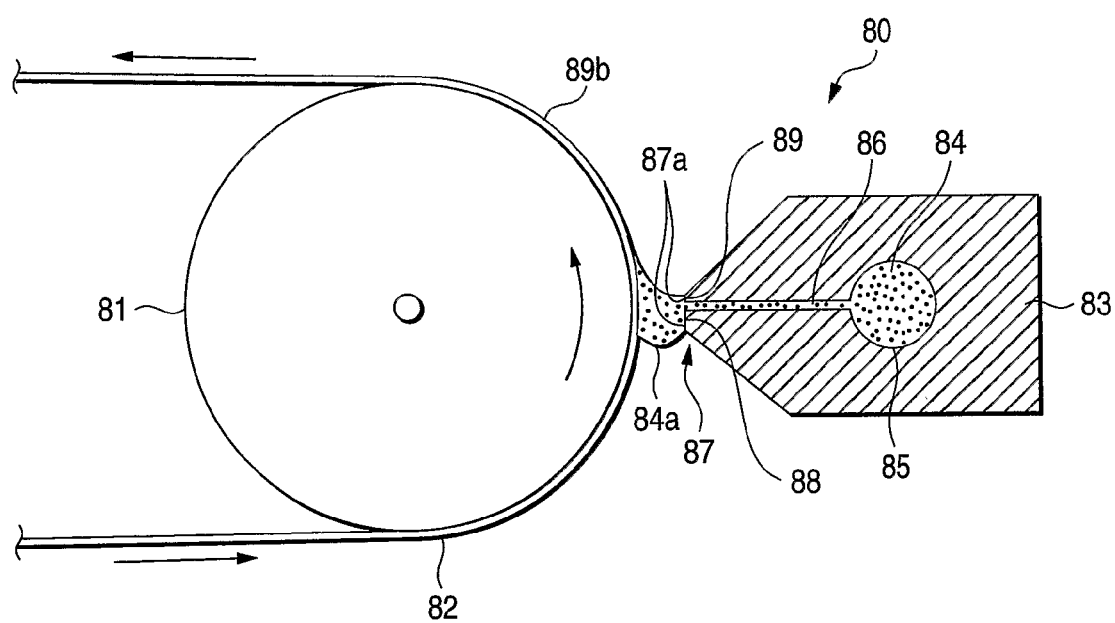
FIG. 8 is a schematic diagram of a slot coater usable in an exemplary embodiment of the present invention.

Then, a description will be given to a slot die coating method to be preferably used for manufacturing the optical compensation film of the invention. FIG. 8 is a schematic diagram of a slot coater usable for the invention. A coater 80 applies a coating solution 84 in the form of beads 84a from a slot die 83 on a web 82 (e.g., a transparent film serving as a support of the optical anisotropic layer) continuously running while being supported on a backup roll 81, thereby to form a coating film 84*b* on the web 82.

The slot die 83 includes a pocket 85 and a slot 86 formed therein. The cross section of the shape of the pocket 85 is formed of a curve and a straight line. For example, it may be generally circular as shown in FIG. 1, or may be semicircular. The pocket 85 is the space extending in the same cross sectional form in the direction of width of the slot die 83 (in FIG. 1, the direction through and perpendicular to the sheet plane; the same goes for the following), and used for reserving the coating solution. The effective length of the extension along the direction of width is generally set to be equal to, or a little larger than the coating width (e.g., the width of the transparent film). The supply of the coating solution 84 to the pocket 85 is carried out from the side of the slot die 83, or from the center of the side on the opposite side from the slot, for example, by a supply pump (not shown) capable of control of the supply amount, or the like. The pocket 85 may include a stopper for preventing the coating solution 84 from leaking, provided therein.

The slot 86 is, as with the pocket 85, the space extending in the same cross sectional shape in the direction of width of the slot die 83, and is the passage of the coating solution 84 from the pocket 85 to the web 82. An opening 86*a* situated on the web side is adjusted so as to have generally the same width as the coating width by the use of a width regulating plate (not shown), or the like. The angle formed between the slot 86 and the tangent along the direction of running of the web of the backup roll 81 at the slot tip is generally preferably 30° to 90°, but it is not limited to the range.

The tip lip 87 of the slot die 83 at which the opening 86*a* of the slot 86 is situated is formed in the tapered shape, and the tip is formed in a flat portion 87*a* referred to as a land. The part of the flat portion 87*a* which is upstream of the direction of advance of the web 82 with respect to the slot 86 is hereinafter referred to as an upstream lip land 18, and the downstream part thereof is referred to as a downstream lip land 89.

The length $l_{LO}$ in the direction of running of the web of the downstream lip land 89 is preferably 30 μm to 500 μm, more preferably 30 μm to 100 μm, and further preferably 30 μm to 60 μm. Whereas, the length $l_{UP}$ in the direction of advance of the web of the upstream lip land 88 has no particular restriction, but the length in the range of 500 μm to 1 mm is preferably used.

Figure 9A:
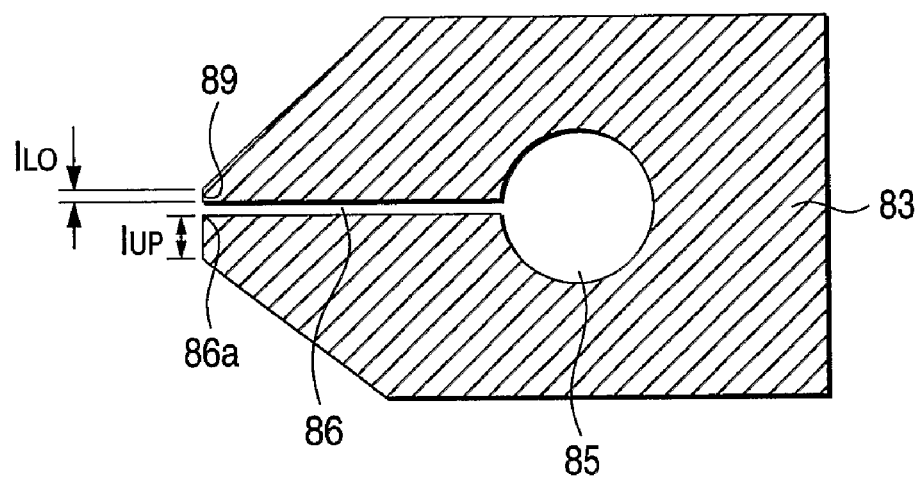
FIG. 9A is a schematic diagram of the cross sectional shape of a slot die 83 in FIG. 8.
Figure 9B:
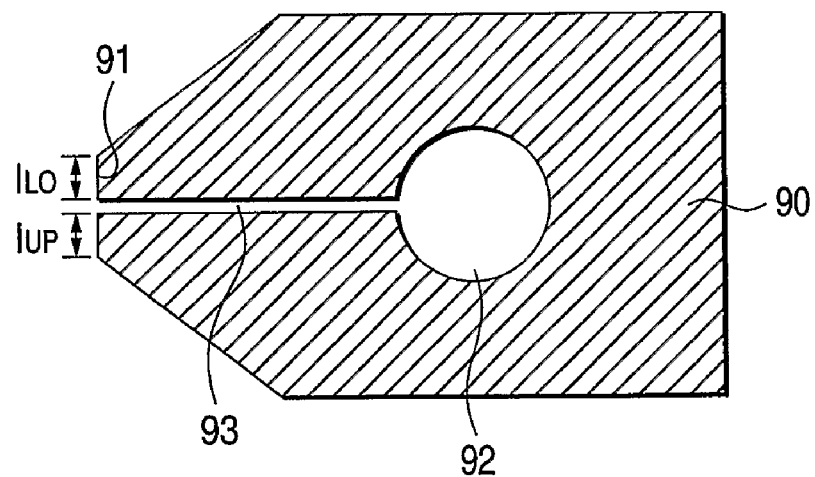
FIG. 9B is a schematic diagram of the cross sectional shape of another slot die 30.

FIG. 9A is a schematic diagram of the cross sectional shape of the slot die 83, and FIG. 9B is a schematic diagram of the cross sectional shape of another slot die 90. In the slot die 90 shown in FIG. 9B, the land length $l_{LO}$ of the downstream lip land 91 is the same as the length $l_{up}$ of the upstream lip land. Incidentally, a reference numeral 92 represents a pocket, and 93 represents a slot. In contrast, in the slot die 83 shown in FIG. 9A, the land length $l_{LO}$ of the downstream lip land 91 is shorter than the length $l_{UP}$ of the upstream lip land. In the invention, a slot die in any shape can be used. However, when coating is carried out with a film thickness of 20 μm or less, a slot die in the shape in which $l_{LO}$ is shorter than $l_{UP}$ as with the slot die 83 is preferably used because it can perform coating with a uniform film thickness and with higher precision. Further, a land length $l_{LO}$ of the downstream lip land 89 in the range of 30 μm to 100 μm is more preferred because it enables the formation of the lip land with high with high dimension precision.

Further, in order to make the thickness of the coating film uniform with high precision, the range of fluctuations in the direction of width of the slot die 83 of the land length $I_{LO}$ of the downstream lip land 89 is preferably set to be within 20 μm. When the range of fluctuations falls within the foregoing range, it is possible to form beads with more stability. Thus, even when disturbance or the like is caused, the beads are prevented from becoming unstable. This can keep the manufacturing suitability.

The material for the slot die has no particular restriction. However, from the viewpoints of the improvement of the strength and the surface state of the tip lip 87 including the opening 86*a* of the slot 86, the material of the slot die including at least this site is preferably a super hard material. Use of a super hard material can improve the uniformity of the surface shape, and can also prevent the abrasion of the tip lip by the constantly discharged coating solution. It is particularly effective when a magnetic solution containing an abrasive, or the like is coated as a coating solution. As the super hard material, mention may be made of a material containing WC as a main component. For example, mention may be made of a material prepared by bonding WC carbide crystal grains with a bonding metal including Co. The bonding metal is not limited to Co, and various metals including Ti, Ta, and Nb can also be used. The average grain size of the WC crystal has no particular restriction, but the average grain size is preferably small, and preferably 5 μm or less.

Figure 10:
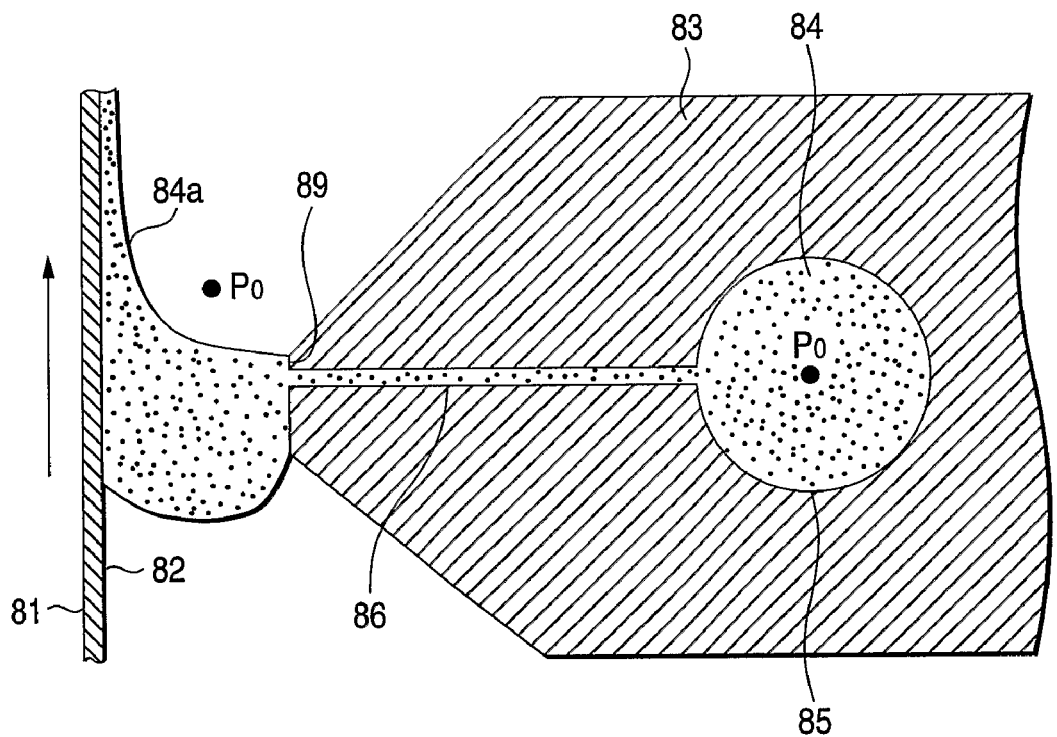
FIG. 10 is an enlarged schematic diagram of the cross sectional shape of a slot die 83 in FIG. 8.

Further, in order to keep the coating film thickness of the thin layer uniform with high precision, not only the dimensional precision at the tip portion of the slot die 80 but also the precision of the straightness of the backup roll 83 are important. Therefore, preferably, other than keeping the dimensional precision in the direction of coating width of the land length $l_{LO}$ of the downstream lip land 89, the precision of both the straightnesses of the tip lip 87 of the slot die 83 and the backup roll 81 is high. The straightness can be determined, although at a rough estimate, with practically sufficient precision by the following formula (1). However, even a slot die coater not satisfying the following formula (1) can, of course, be used in the invention. Herein, as shown in FIG. 10, Po is the pressure outside the bead meniscus on the side of the direction of advance of the web 82; Pp, the internal pressure of the pocket 85; σ, the surface tension of the coating solution 84; μ, the viscosity of the coating solution 84*a*; U, the coating speed; h, the film thickness; d, the length of the gap between the downstream lip land 89 and the web 82; L, the length of the slot 86 of the slot die 83; and D, the slot gap of the slot die 83. Then, the pressure difference Po−Pp between the internal pressure Pp of the pocket 85 of the slot die 83 and the pressure Po outside the bead meniscus on the side of the direction of advance of the web is made constant along the direction of width of the slot die 83. Thus, the necessary straightness is determined by using the following formula (1). This is due to the following fact. Even when the length d of the gap between the tip portion of the slot die 83 and the backup roll 81 changes, a flow along the direction of width of the slot die 83 is generated in the pocket 85 so as to make constant the pressure difference between inside the pocket 85 of the slot die 83 and outside the bead meniscus, resulting in a flow distribution.

$$Po-Pp=1.34\,\sigma/h\cdot(\mu U/\sigma)^{2/3}+12\,\mu U l_{LO}(d/2-h)/d^3-12\,\mu UL/D^3 \quad (1)$$

When coating is carried out by means of a slot die coater under the conditions satisfying the formula (1), in a coating system to be used for general industrial production, the coating film thickness distribution is about 2% (strictly, this may vary according to the conditions,) with a straightness in the direction of width of the die block of about 5 μm. Therefore, this numerical value can be regarded as the limit when high precision thin film coating is carried out. For this reason, it is preferable to keep the straightness of the tip lip and the backup roll so that the range of fluctuations in the slot die width direction of the gap between the tip lip and the web is 5 μm or less when the slot die 83 is set at the coating position.

(Alignment Film)

The alignment film can be provided by a means such as a rubbing treatment of an organic compound (preferably, a polymer), the oblique vapor deposition of an inorganic compound, the formation of a layer having microgrooves, or the accumulation of an organic compound (e.g., ω-tricosanic acid or methyl stearate) by the Langmuir-Blodgett technique (LB film). Further, there is also known an alignment film of which the orientation function is generated by the application of an electric field, the application of a magnetic filed, or light irradiation.

Any layer is acceptable as the alignment film so long as it can impart desirable orientation to the discotic compound of the optical anisotropic layer provided on the alignment film. However, in the invention, the alignment film formed by a rubbing treatment or light irradiation is preferred. Particularly, the alignment film formed by the rubbing treatment of a polymer is particularly preferred. The rubbing treatment can be generally carried out by rubbing the surface of the polymer layer with paper or a cloth in a given direction several times. Particularly, in the invention, it is preferably carried out by the method described in *EKISHOU BINNRANN* (Maruzen Co., Ltd.). The thickness of the alignment film is preferably 0.01 to 10 μm, and further preferably 0.05 to 3 μm.

In the invention, preferred examples of the alignment film may include the alignment films made of crosslinked polymers, and more preferably crosslinked polyvinyl alcohol, described in JP-A-8-338913. The alignment film can be formed by using a commonly known coating method (e.g., a wire bar coating method, an extrusion coating method, a direct gravure coating method, a reverse gravure coating method, or a die coating method). However, the film is preferably formed by coating with a slot die coating method as with the optical anisotropic layer in terms of (the uniformity of the film thickness, and particularly, the uniformity of the film thickness at the edge).

Incidentally, the following procedure is also acceptable. The rod-like liquid crystalline compound is oriented by the use of the alignment film. Then, the rod-like liquid crystalline compound is fixed still in the oriented state to form an optical anisotropic layer. Only the optical anisotropic layer is transferred on a polymer film (or a transparent support). The rod-like liquid crystalline compound with the oriented state fixed can hold the oriented state even without the alignment film. For this reason, in the phase plate, the alignment film is not essential (although it is essential in manufacturing of the phase plate).

In order to orient the discotic compound, a polymer for controlling the surface energy of the alignment film (general polymer for orientation) is used. The specific polymer types are described in various documents on the liquid crystal cells or optical compensation film. Any alignment film preferably has a polymerizable group for the purpose of improving the adhesion between the discotic compound and the transparent support. The polymerizable group can be introduced in the form of a repeating unit having a polymerizable group at the side chain, or can be introduced in the form of a substituent of a cyclic group. An alignment film which forms a chemical bond with the liquid crystalline compound at the interface is preferably used. Such an alignment film is described in JP-A-9-152509.

(Rubbing Density of Alignment Film)

The following relation is established between the rubbing density of the alignment film and the pretilt angle of the discotic compound at the alignment film interface. Namely, an increase in rubbing density results in a decrease in pretilt angle, and a decrease in rubbing density results in an increase in pretilt angle. Therefore by changing the rubbing density of the alignment film, it is possible to adjust the pretilt angle. As the method for changing the rubbing density of the alignment film, the method described in *EKISHOU BINNRANN*, edited by EKISHOU BINNRANN editing committee, (Maruzen Co., Ltd., 2000) can be used. The rubbing density (L) is quantified by the equation (A).

$$L = Nl\{1+(2\pi rn/60v)\}$$

where in the equation (A), N is the number of rubbing cycles; 1, the contact length of the rubbing roller; r, the radius of the roller; n, the number of revolutions of the roller (rpm); and v, the stage moving speed (speed per second). In order to increase the rubbing density, properly, the number of rubbing cycles is increased, the contact length of the rubbing roller is increased, the radius of the roller is increased, the number of revolutions of the roller is increased, and the stage moving speed is slowed. On the other hand, in order to reduce the rubbing density, it is sufficient only that the opposite procedure is followed.

(Transparent Support)

The optical compensation film of the invention may have a support, and the support is preferably a transparent support. The support has no particular restriction so long as it is mainly optically isotropic, and has an optical transmittance of 80% or more. However, a polymer film is preferred. Specific examples of the polymer may include films of cellulose esters (e.g., cellulose diacetate and cellulose triacetate), norbornene type polymer, and poly(meth)acrylate esters. A large number of commercially available polymers may be preferably used. Out of these, from the viewpoint of the optical performance, cellulose esters are preferred, and lower fatty acid esters of cellulose are further preferred. A lower fatty acid is a fatty acid having 6 or less carbon atoms, and the number of carbon atoms is preferably, 2, 3, or 4. Specifically, mention may be made of cellulose acetate, cellulose propionate, or cellulose butyrate. Out of these, cellulose triacetate is particularly preferred. Mixed fatty acid esters such as cellulose acetate propionate and cellulose acetate butyrate may also be used. Whereas, even among conventionally known polymers which tend to express birefringence such as polycarbonate and polysulfone, the ones reduced in the expressivity by modifying the molecules described in the pamphlet of WO 00/26705 may also be used.

Below, cellulose esters to be preferably used as transparent supports will be described in details.

The cellulose acetate preferably has a percent acetylation of from 55.0% to 62.5%, more preferably from 57.0% to 62.0%. The term "percent acetylation" as used herein is meant to indicate the amount of bonded acetic acid per unit weight of cellulose. The percent acetylation is determined by measurement and calculation of percent acetylation according to ASTM: D-817-91 (method of testing cellulose acetate).

A cellulose acetate tends to have hydroxyl substituted less in the 6-position of cellulose rather than equally in the 2-, 3- and 6-positions of cellulose. The substitution degree in the 6-position of cellulose acetate to be used in the optical anisotropic layer 2 preferably has hydroxyl substituted equally to or more than in the 2- and 3-positions of cellulose.

The proportion of the substitution degree in the 6-position in the sum of the substitution degree in the 2-, 3- and 6-positions of cellulose is preferably from 30% to 40%, more preferably from 31% to 40%, most preferably from 32% to 40%. The substitution degree in the 6-position is preferably 0.88 or more. The hydroxyl group at the 6 position may be substituted by an acyl group having 3 or more carbon atoms (e.g., propionyl, butyryl, valeroyl, benzoyl, or acryloyl) other than an acetyl group. The substitution degree at each position can be determined by NMR. Cellulose esters having a high substitution degree of the hydroxyl group at the 6 position can be synthesized by referring to the methods described in Synthesis Example 1 described in paragraph Nos. 0043 to 0044, Synthesis Example 2 described in paragraph Nos. 0048 to 0049, and Synthesis Example 3 described in paragraph Nos. 0051 to 0052 of JP-A-11-5851.

In the polymer film to be used as the transparent support, particularly in the cellulose acetate film, an aromatic compound having at least two aromatic rings may be used as a retardation raising agent in order to adjust the retardation value. When such a retardation raising agent is used, the retardation raising agent is used in an amount of 0.01 to 20 parts by mass per 100 parts by mass of cellulose acetate. The retardation raising agent is preferably used in an amount of 0.05 to 15 parts by mass, and further preferably used in an amount in the range of 0.1 to 10 parts by mass per 100 parts by mass of cellulose acetate. Two or more aromatic compounds may be used in combination. The aromatic rings of the aromatic compounds include an aromatic heterocyclic ring in addition to an aromatic hydrocarbon ring.

The aromatic hydrocarbon ring is in particular preferably a 6-membered ring (i.e., a benzene ring). The aromatic heterocyclic ring is generally an unsaturated heterocyclic ring. The aromatic heterocyclic ring is preferably a 5-membered ring, 6-membered ring or a 7-membered ring, and further preferably a 5-membered ring or a 6-membered ring. The aromatic heterocyclic ring generally has a largest number of double bonds. The hetero atom is preferably a nitrogen atom, an oxygen atom, and a sulfur atom, and in particular preferably a nitrogen atom. Examples of the aromatic heterocyclic ring may include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring, and a 1,3,5-triazine ring. The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring, and further preferably a benzene ring and a 1,3,5-triazine ring. The aromatic compound in particular preferably has at least one 1,3,5-triazine ring.

The number of aromatic rings which the aromatic compound has is preferably 2 to 20, more preferably 2 to 12, further preferably 2 to 8, and most preferably 2 to 6. The connecting relations between two aromatic rings can be classified into: (a) the case where a condensed ring is formed; (b) the case where the rings are directly connected to each other through a single bond; and (c) the case where the rings are connected to each other through a linking group (the spiro connection cannot be formed due to aromatic ring). The connecting relation may be any of (a) to (c). Such retardation raising agents are described in WO 01/88574, WO 00/2619, JP-A-2000-111914, JP-A-2000-275434, JP-A-2002-70009, and the like.

The cellulose acetate film is preferably manufactured by a solvent cast method from a prepared cellulose acetate solution (dope). To the dope, the retardation raising agent may be added. The dope is cast onto a drum or a band, and the solvent is evaporated to form a film. The dope before casting is preferably adjusted in concentration so that the solid content is 18 to 35%. The surface of the drum or the band is preferably finished in a mirror state. The casting and drying methods in the solvent cast method are described in U.S. Pat. Nos. 2,336, 310, 2,367,603, 2,492,078, 2,492,977, 2,492,978, 2,607,704, 2,739,069, 2,739,070, British Patent Nos. 640731 and 736892, JP-B-45-4554, JP-B-49-5614, JP-A-60-176834, JP-A-60-203430, and JP-A-62-115035. The dope is preferably cast on a drum or a band having a surface temperature of 10° C. or less. The dope is preferably applied with air for 2 seconds or more after casting to be dried. It is also possible that the resulting film is stripped off from the drum or the band, and further dried with a high temperature air sequentially changed in temperature from 100 to 160° C. to evaporate the residual solvent. This method is described in JP-B-5-17844. This method can shorten the time between casting and stripping. In order to carry out this method, the dope is required to gel at the surface temperature of the drum or the band upon casting.

For the dope, raw material flakes are dissolved in solvents such as hydrocarbon halides (such as dichloromethane), alcohols (such as methanol, ethanol, and butanol), esters (such as methyl formate, and methyl acetate), and ethers (such as dioxane, dioxolane, and diethyl ether). The solvent for dissolving cellulose acylate is typically dichloromethane. However, from the viewpoints of global environment and working environment, it is preferable that the solvent substantially does not contain hydrocarbon halide such as dichloromethane. The wording "substantially does not contain" denotes that the proportion of hydrocarbon halide in the organic solvent is less than 5 mass % (preferably less than 2 mass %). The cellulose acylate film substantially not containing hydrocarbon halide such as dichloromethane, and the manufacturing method thereof are described in *Journal of Technical Disclosure* (*KOUKAI GIHOU*) from Japan Institute of Invention and Innovation (Technical Disclosure No. 2001-1745, published on Mar., 15, which is hereinafter abbreviated as Technical Disclosure 2001-1745).

The cellulose acylate solution (dope) thus prepared may be casted into two or more layers to form a film. In this case, a solvent casting method is preferably employed to prepare a cellulose acylate film. In some detail, the dope is casted over a drum or band where the solvent is then evaporated to form a film. The dope which is ready to be casted is preferably adjusted in its concentration such that the solid content reaches a range of from 10% to 40%. The drum or band is preferably mirror-finished.

In order to cast two or more cellulose acylate solutions, a plurality of cellulose acylate solutions can be casted. In some detail, a solution containing a cellulose acylate may be discharged and casted from a plurality of casting nozzles provided at an interval along the movement of the support so that they are stacked to prepare a film. For example, methods as disclosed in JP-A-61-158414, JP-A-1-122419 and JP-A-11-198285 can be applied. Alternatively, a cellulose acylate solution may be casted from two casting nozzles to form a film. For example, methods as disclosed in JP-B-60-27562, JP-A-61-94724, JP-A-61-947245, JP-A-61-104813, JP-A-61-158413 and JP-A-6-134933 can be applied. Further, a cellulose acylate film casting method which comprises wrapping a high viscosity cellulose acylate solution flow with a low viscosity cellulose acylate, and then extruding the high and low viscosity cellulose acylate solutions at the same time as disclosed in JP-A-56-162617 may be used.

The retardation value of the cellulose acetate film can be further adjusted by a drawing treatment. The draw ratio preferably falls within the range of 0 to 100%. When the cellulose acetate film of the invention is drawn, tenter drawing is preferably used. In order to control the slow axis with high precision, it is preferable to minimize the differences in tenter clipping speed, releasing timing, and the like between on the left and right sides.

The cellulose acetate film may have a plasticizer incorporated therein to improve the mechanical properties thereof or enhance the drying rate. As the plasticizer there is used a phosphoric acid ester or carboxylic acid ester. Examples of the phosphoric acid ester employable herein include triphenyl phosphate (TPP) and tricresyl phosphate (TCP). Representative examples of the carboxylic acid ester employable herein include phthalic acid ester and citric acid ester. Examples of the phthalic acid ester employ-able herein include dimethyl phthalate (DMP), diethyl phthalate (DEP), dibutyl phthalate (DBP), dioctyl phthalate (DOP), diphenyl phthalate (DPP), and diethyl hexyl phthalate (DEHP). Examples of the citric acid ester employable herein include triethyl O-acetylcitrate (OACTE) and tributyl O-acetylcitrate (OACTB). Other examples of carboxylic acid ester employable herein include butyl oleate, methylacetyl ricinoleate, dibutyl sebacate, and various trimellitic acid esters. Preferred among these plasticizers are phthalic acid ester-based plasticizers (DMP, DEP, DBP, DOP, DPP, DEHP). Particularly preferred among these phthalic acid ester-based plasticizers are DEP and DPP. The added amount of the plasticizer is preferably from 0.1 to 25% by mass, more preferably from 1 to 20% by mass, most preferably from 3 to 15% by mass based on the weight of cellulose ester.

To the cellulose ester film, may be added deterioration inhibitors (e.g., an antioxidant, a peroxide decomposing agent, a radical inhibitor, a metal deactivator, an acid capturing agent, and amines) and an ultraviolet inhibitor. The deterioration inhibitors are described in JP-A-3-199201, JP-A-5-197073, JP-A-5-194789, JP-A-5-271471, and JP-A-6-107854. The amount of the deterioration inhibitor to be added is preferably 0.01 to 1 mass %, and further preferably 0.01 to 0.2 mass % based on the amount of a solution to be prepared (dope). When the amount is less than 0.01 mass %, almost no effects of the deterioration inhibitor are observed. When the amount exceeds 1 mass %, bleed-out of the deterioration inhibitor onto the film surface may be observed. Particularly preferred examples of the deterioration inhibitor may include butylated hydroxytoluene (BHT). The ultraviolet inhibitor is described in JP-A-7-11056.

The cellulose acetate film is preferably subjected to a surface treatment. As specific methods, mention may be made of a corona discharge treatment, a glow discharge treatment, a flame treatment, an acid treatment, an alkali treatment, or an ultraviolet irradiation treatment. Whereas, as described in JP-A-7-333433, it is preferably utilized to provide an undercoat layer. From the viewpoint of holding the flat properties of the film, the temperature of the cellulose acetate film in these treatments is preferably set at Tg (glass transition temperature) or lower, specifically, at 150° C. or lower.

For the surface treatment of the cellulose acetate film, an acid treatment or an alkali treatment, i.e., a saponification treatment on cellulose acetate is in particular preferably carried out from the viewpoint of the adhesion with an alignment film or the like.

Below, a specific description will be given to the alkali saponification treatment as an example.

The alkali saponification treatment is preferably carried out by a cycle of dipping the film surface in an alkali solution, then, neutralizing it in an acidic solution, washing it with water, and drying it. As the alkali solution, mention may be made of a potassium hydroxide solution or a sodium hydroxide solution. The normal concentration of the hydroxide ion preferably falls within the range of 0.1 to 3.0 N, and further preferably falls within the range of 0.5 to 2.0 N. The alkali solution temperature preferably falls within the range of room temperature to 90° C., and further preferably falls within the range of 40 to 70° C.

Whereas, the surface energy of the cellulose acetate film is preferably 55 mN/m or more, and further preferably falls within the range of 60 to 75 mN/m.

The thickness of the cellulose acetate film falls, in general, preferably within the range of 5 to 500 μm, preferably in the range of 20 to 250 μm, more preferably in the range of 30 to 180 μm, and in particular preferably in the range of 30 to 110 μm.

The optical compensation film of the invention can be subjected to use as an elliptical polarizing plate by combination with a polarizing film. Further, it is applied to transmission type, reflection type, and semi-transmission type Liquid crystal displays in combination with a polarizing film, thereby to contribute to the enlargement of the viewing angle. Below, an elliptical polarizing plate utilizing an optical compensation film and a Liquid crystal display will be described.

(Elliptical Polarizing Plate)

By stacking the optical compensation film and the polarizing film one on another, it is possible to manufacture an elliptical polarizing plate. Use of the optical compensation film can provide an elliptical polarizing plate capable of enlarging the viewing angle of a Liquid crystal display. The polarizing films include an iodine type polarizing film, and a dye type polarizing film and a polyene type polarizing film using a dichroic dye. The iodine type polarizing film and the dye type polarizing film are generally manufactured by the use of a polyvinyl alcohol type film. The polarization axis of the polarizing film corresponds to the direction perpendicular to the drawing direction of the film.

The polarizing film is stacked on the optical anisotropic layer side of the optical compensation film. A transparent protective film is preferably formed on the side opposite to the side on which the optical compensation film of the polarizing film has been stacked. The transparent protective film preferably has an optical transmittance of 80% or more. As the transparent protective film, generally, a cellulose ester film, and preferably, a triacetyl cellulose film is used. A cellulose ester film is preferably formed by the solvent cast method. The thickness of the transparent protective film is preferably 20 to 500 μm, and further preferably 50 to 200 μm.

(Liquid Crystal Display)

By utilizing an optical compensation film using the discotic compound of the invention, it is possible to provide a Liquid crystal display enlarged in viewing angle. A Liquid crystal display generally has a liquid crystal cell, a polarizing element, and a phase plate (optical compensation film). The polarizing element is generally made of a polarizing film and a protective film. For the polarizing film and the protective film, the ones described in connection with elliptical polarization can be used. The phase plate for a TN mode liquid crystal cell (optical compensation film) is described in JP-A-6-214116, U.S. Pat. Nos. 5,583,679 and 5,646,703, and German Patent No. 3,911,620A1. An optical compensation film for an IPS mode or FLC mode liquid crystal cell is described in JP-A-10-54982. Further, an optical compensation film for an OCB mode or HAN mode liquid crystal cell is described in U.S. Pat. No. 5,805,253 and WO 96/37804. Still further, an optical compensation film for a STN mode liquid crystal cell is described in JP-A-9-26572. Then, an optical compensation film for a VA mode liquid crystal cell is described in Japanese Patent No. 2866372.

In the invention, phase plates (optical compensation films) for liquid crystal cells of various modes can be manufactured by reference to the above-mentioned publications. The phase plate can be used for Liquid crystal displays of various display modes such as TN (Twisted Nematic), IPS (In-Plane Switching), FLC (Ferroelectric Liquid Crystal), OCB (Optically Compensatory Bend), STN (Super Twisted Nematic), VA (Vertically Aligned), and HAN (Hybrid Aligned Nematic) modes. The phase plate is particularly effective for optical compensation of a Liquid crystal display for the TN (Twisted Nematic) or the CB (Optically Compensatory Bend) mode.

In the invention, each component or element in one aspect the first to fourth aspects may be used in combination of components in the other aspects.

EXAMPLES

The invention will be further described in the following examples. The materials, reagents, amount and proportion of materials, procedure and other factors defined hereinafter may be properly changed unless they depart from the spirit of the invention. Accordingly, the scope of the invention is not specifically limited to the following examples.

<Apect>

(Preexamination 1)

(Spectrometry of Retardation Raising Agent)

Retardation raising agents (10-trans), (41-trans) and (29-trans) were each subjected to spectrometry in the ultraviolet to visible light range (UV-vis).

The retardation raising agents were each dissolved in tetrahydrofuran (free of stabilizer (BHT)). Adjustment was made such that the concentration reached $10^{-5}$ mol/dm$^3$. These solutions thus prepared were each then subjected to spectrometry using a measuring instrument produced by Hitachi Ltd. The results are set forth in Table 1-1.

TABLE 1-1

(10-trans) $C_5H_{11}$—⌬—O—CO⫿⫿⫿⟨H⟩—CO—O—⌬—$C_5H_{11}$ (41-trans) $C_7H_{15}$—⌬—O—CO⫿⫿⫿⟨H⟩—CO—O—⌬—$C_7H_{15}$ (29-trans) $C_5H_{11}$—⌬—O—CO⫿⫿⫿⟨H⟩—CO—O—⌬—$C_5H_{11}$

| Retardation raising agent | Absorption maxima wavelength ($\lambda$ max) | Absorptivity coefficient at absorption maxima ($\epsilon$) |
|---|---|---|
| 10-trans | 220 nm | 15,000 |
| 41-trans | 230 nm | 16,000 |
| 29-trans | 240 nm | 20,000 |

Example 1-1

Preparation of Second Optical Anisotropic Layer A

The components set forth in Table 1-2 were charged in a mixing tank where they were then heated with stirring to prepare a cellulose acetate solution.

TABLE 1-2

| Formulation of materials and solvents | Outer layer side | Inner layer side |
|---|---|---|
| Cellulose acetate | Substitution degree: 2.87 Percent acetylation: 60.9% 100 parts by mass | Substitution degree: 2.75 Percent acetylation: 59.5% 100 parts by mass |
| Triphenyl phosphate (plasticizer) | 7.8 parts by mass | 7.8 parts by mass |
| Biphenyl diphenyl phosphate (plasticizer) | 3.9 parts by mass | 3.9 parts by mass |
| Methylene chloride (first solvent) | 300 parts by mass | 300 parts by mass |
| Methanol (second solvent) | 45 parts by mass | 45 parts by mass |
| Dye (360FP, produced by Fine-chem Co., Ltd.) | 0.0009 parts by mass | 0.0009 parts by mass |
| Retardation raising agent (41-trans) | 1.32 parts by mass | 1.32 parts by mass |

The dope thus obtained was then casted using a casting machine having a band having a width of 2 in and a length of 65 m. When the temperature of the film on the band reached 40° C., the film was then dried for 1 minute. The film was peeled off the band, and then stretched crosswise at a draw ratio of 28% with 140° C. drying air using a tenter. Thereafter, the film was dried with 135° C. drying air for 20 minutes to prepare a second optical anisotropic layer A having a residual solvent content of 0.3% by mass. The second optical anisotropic layer A thus prepared had a width of 1,340 mm and a thickness of 88 μm.

(Measurement of Optical Properties)

The second optical anisotropic layer A thus prepared was then measured for Re and Rth at various wavelength ranges using a Type M-150 ellipsometer (produced by JASCO). As a result, $Re_2$ (450), $Re_2$ (550), $Re_2$ (650), $Re_2$ (450)/$Re_2$ (650), $Rth_2$ (450), $Rth_2$ (550), $Rth_2$ (650) and $Rth_2$ (450)/$Rth_2$ (650) were 31 nm, 45 nm, 59 nm, 0.53, 171 nm, 160 nm, 155 nm and 1.10, respectively.

(Saponification of Second Optical Anisotropic Layer A)

A 1.5 mol/l isopropyl alcohol solution of potassium hydroxide was spread over one side of the second optical anisotropic layer A thus prepared at a rate of 25 ml/m². The coated optical anisotropic layer was allowed to stand at 25° C. for 5 seconds, washed with flowing water for 10 seconds, and then blown with 25° C. air so that the surface of the film was dried. In this manner, the second optical anisotropic layer A was saponified only on one side thereof.

(Formation of Alignment Layer)

An alignment layer coating solution having the following formulation was then spread over the second optical anisotropic layer A on the saponified surface thereof at a rate of 24 ml/m² using a #14 wire bar coater. The coated optical anisotropic layer was dried with 60° C. hot air for 60 seconds and then with 90° C. hot air for 150 seconds. Subsequently, the film thus formed was subjected to rubbing in the direction of 45° with respect to the stretching direction of the second optical anisotropic layer (substantially the same as the slow axis).

| (Formulation of alignment film coating solution) | |
|---|---|
| Modified polyvinyl alcohol shown below | 10 parts by mass |
| Water | 371 parts by mass |
| Methanol | 119 parts by mass |
| Glutaraldehyde (crosslinking agent) | 0.5 parts by mass |

Modified polyvinyl alcohol

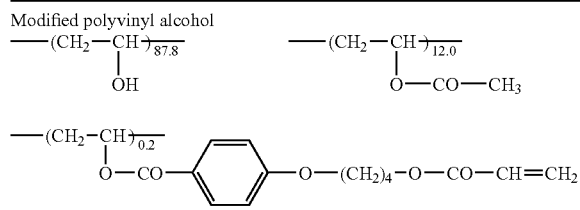

(Preparation of First Optical Anisotropic Layer a)

In 400.0 parts by mass of methyl ethyl ketone were dissolved 100 parts by mass of a discotic compound shown as D-89, 0.4 parts by mass of the following air interface alignment controller V-(1), 3 parts by mass of a photopolymerization initiator (Irgacure 907, produced by Ciba-Geigy Inc.) and 1 part by mass of a sensitizer (Kayacure DETX, produced by Nippon Kayaku Corporation) to prepare a coating solution.

The coating solution thus prepared was then spread over the alignment film using a #3.0 wire bar. The alignment film was attached to a metallic frame which was then heated in a 95° C. constant temperature tank for 2 minutes so that the discotic compound was aligned. Subsequently, the coated material was irradiated with ultraviolet rays from a 120 W/cm high pressure mercury vapor lamp at 80° C. for 1 minute so that the discotic compound was polymerized. Thereafter, the material was allowed to cool to room temperature. In this manner, a first optical anisotropic layer A was formed to prepare an optical compensation film A.

Air interface alignment controller V-(1)

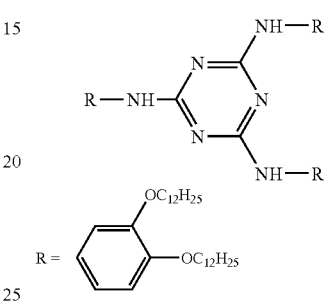

In the same manner as mentioned above, an alignment film was formed on a glass sheet. The first optical anisotropic layer was then formed on the alignment film. The first optical anisotropic layer thus formed was then measured for Re at various wavelength ranges using a Type M-150 ellipsometer. As a result, $Re_1$ (450), $Re_1$ (550), $Re_1$ (650) and $Re_1$ (450)/$Re_1$ (650) were 32 nm, 30 nm, 28 nm and 1.14, respectively.

(Preparation of Elliptical Polarizing Plate)

A stretched polyvinyl alcohol film was allowed to adsorb iodine to prepare a polarizing film. Subsequently, the optical compensation film A thus prepared was stuck to one side of the polarizing film with a polyvinyl alcohol-based adhesive on the second optical anisotropic layer A side thereof. The two components were disposed such that the slow axis of the second optical anisotropic layer A and the transmission axis of the polarizing film were parallel to each other. A commercially available cellulose acetate film (FUJITAC TD 80UF, produced by Fuji Photo Film Co., Ltd.) was saponified in the same manner as mentioned above, and then stuck to the other side (side opposite the optical compensation film) of the polarizing film with a polyvinyl alcohol-based adhesive. In this manner, an elliptical polarizing plate was prepared.

(Preparation of Bend-Aligned Liquid Crystal Cell)

A polyimide film was provided on a glass substrate with ITO electrode as an alignment film. The alignment film thus prepared was then subjected to rubbing. Two sheets of glass substrates thus obtained were stacked in such an arrangement that the rubbing direction thereof were parallel to each other. The cell gap was then predetermined to 4.1 μm. The cell gap was then filled with a liquid crystal compound having $\Delta_n$ of 0.1396 (ZLI1132, produced by Merck Ltd.) to prepare a bend-aligned liquid crystal cell.

(Preparation and Evaluation of Liquid Crystal Display)

The liquid crystal cell and two sheets of polarizing plates were combined to prepare a liquid crystal display as shown in FIG. 3.

The liquid crystal display thus prepared was disposed above a back light. A 55 Hz rectangular wave voltage was then applied to the bend-aligned liquid crystal cell in the liquid crystal display. Using a type BM-5 brightness meter (produced by TOPCON Co., Ltd.), the liquid crystal display was then measured for voltage at which the black brightness (front brightness) reaches minimum while adjusting the voltage. Subsequently, using the same brightness meter (BM-5, produced by TOPCON Co., Ltd.), the liquid crystal display was measured for black brightness and white brightness (front brightness) at the center of the screen. From the measurements was then calculated contrast. Using a Type EZ-CONTRAST measuring instrument, the liquid crystal display was then measured for viewing angle. Using a Type SR-3 spectral brightness meter (produced by TOPCON Co., Ltd.), the liquid crystal display was then measured for tint in black state. The results are set forth in Table 1-4. Using SR-3, two sheets of commercially available linear polarizing plates disposed above a back light and arranged such that the transmission axis thereof were perpendicular to each other were measured for tint in black state. As a result, v' was 0.45.

Example 1-2

Preparation of Second Optical Anisotropic Layer B

The components set forth in Table 1-3 were charged in a mixing tank where they were then heated with stirring to prepare a cellulose acetate solution.

solvent content of 0.3% by mass. The second optical anisotropic layer B thus prepared had a width of 1,340 mm and a thickness of 88 μm.

(Measurement of Optical Properties)

The second optical anisotropic layer B thus prepared was then measured for Re and Rth at various wavelength ranges using a Type M-150 ellipsometer (produced by JASCO). As a result, $Re_2$ (450), $Re_2$ (550), $Re_2$ (650), $Re_2$ (450)/$Re_2$ (650), $Rth_2$ (450), $Rth_2$ (550), $Rth_2$ (650) and $Rth_2$ (450)/$Rth_2$ (650) were 35 nm, 40 nm, 58 nm, 0.60, 225 nm, 200 nm, 191 nm and 1.18, respectively (Preparation of First Optical Anisotropic Layer B)

In 400.0 parts by mass of methyl ethyl ketone were dissolved 100 parts by mass of a discotic compound shown as D-109, 0.4 parts by mass of the aforementioned air interface alignment controller V-(1), 3 parts by mass of a photopolymerization initiator (Irgacure 907, produced by Ciba-Geigy Inc.) and 1 part by mass of a sensitizer (Kayacure DETX, produced by Nippon Kayaku Corporation) to prepare a coating solution. The coating solution thus prepared was then spread over the alignment film using a #3.4 wire bar. The alignment film was attached to a metallic frame which was then heated in a 120° C. constant temperature tank for 2 minutes so that the discotic compound was aligned. Subsequently, the coated material was irradiated with ultraviolet

TABLE 1-3

| Formulation of materials and solvents | Outer layer side | Inner layer side |
|---|---|---|
| Cellulose acetate | Substitution degree: 2.87<br>Percent acetylation: 60.9%<br>100 parts by mass | Substitution degree: 2.75<br>Percent acetylation: 59.5%<br>100 parts by mass |
| Triphenyl phosphate (plasticizer) | 7.8 parts by mass | 5.3 parts by mass |
| Biphenyl diphenyl phosphate (plasticizer) | 3.9 parts by mass | 2.7 parts by mass |
| Methylene chloride (first solvent) | 300 parts by mass | 300 parts by mass |
| Methanol (second solvent) | 45 parts by mass | 45 parts by mass |
| Dye (360FP, produced by Fine-chem Co., Ltd.) | 0.0009 parts by mass | 0.0009 parts by mass |
| Retardation raising agent (41-trans) | 1.32 parts by mass | — |
| Retardation raising agent (shown below) | — | 4.45 parts by mass |

Retardation raising agent

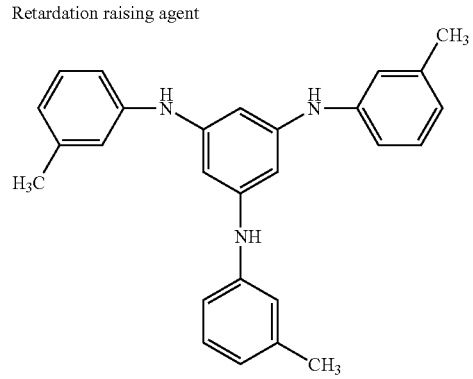

The dope thus obtained was then casted using a casting machine having a band having a width of 2 m and a length of 65 m. When the temperature of the film on the band reached 40° C., the film was then dried for 1 minute. The film was peeled off the band, and then stretched crosswise at a draw ratio of 16% with 140° C. drying air using a tenter. Thereafter, the film was dried with 135° C. drying air for 20 minutes to prepare a second optical anisotropic layer B having a residual rays from a 120 W/cm high pressure mercury vapor lamp at 100° C. for 1 minute so that the discotic compound was polymerized. Thereafter, the material was allowed to cool to room temperature. In this manner, a first optical anisotropic layer B was formed to prepare an optical compensation film B.

In the same manner as mentioned above, an alignment film was formed on a glass sheet. The first optical anisotropic layer was then formed on the alignment film. The first optical anisotropic layer thus formed was then measured for Re at various wavelength ranges using a Type M-150 ellipsometer. As a result, $Re_1$ (450), $Re_1$ (550), $Re_1$ (650) and $Re_1$ (450)/$Re_1$ (650) were 42 nm, 38 nm, 36 nm and 1.17, respectively.

(Preparation of Bend-Aligned Liquid Crystal Cell)

A bend-aligned liquid crystal cell and a liquid crystal display were prepared in the same manner as in Example 1-1 except that the cell gap was 5.3 μm. The bend-aligned liquid crystal cell and liquid crystal display thus prepared were then evaluated. The results are set forth in Table 1-4 below.

Comparative Example 1-1

Preparation of Optically Anisotropic Support 100 parts by mass of a cellulose acetate having a percent acetylation of from 60.7% to 61.1%, 2.35 parts by mass of the following retardation raising agent, 2.75 parts by mass of triphenyl phosphate and 2.20 parts by mass of biphenyl diphenyl phosphate were dissolved in a mixture of 232.75 parts by mass of methylene chloride, 42.57 parts by mass of methanol and 8.50 parts by mass of n-butanol.

Retardation raising agent

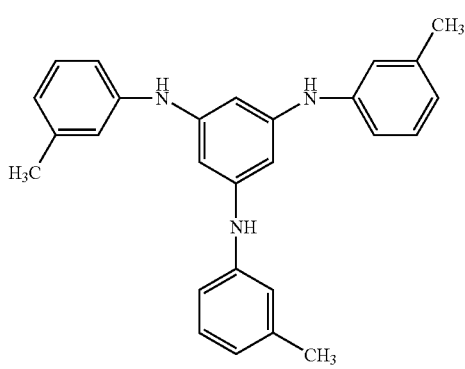

The dope thus obtained was then casted using a casting machine having a band having a width of 2 m and a length of 65 m. When the temperature of the film on the band reached 40° C., the film was then dried for 1 minute. The film was peeled off the band, and then stretched crosswise at a draw ratio of 26% with 140° C. drying air using a tenter. Thereafter, the film was dried with 135° C. drying air for 20 minutes to prepare a second optical anisotropic layer C having a residual solvent content of 0.3% by mass. The second optical anisotropic layer C thus prepared had a width of 1,340 mm and a thickness of 88 μm.

The second optical anisotropic layer C thus prepared was then measured for Re and Rth at various wavelength ranges using a Type M-150 ellipsometer (produced by JASCO). As a result, $Re_2$ (450), $Re_2$ (550), $Re_2$ (650), $Re_2$ (450)/$Re_2$ (650), $Rth_2$ (450), $Rth_2$ (550), $Rth_2$ (650) and $Rth_2$ (450)/$Rth_2$ (650) were 45 nm, 44 nm, 43 nm, 1.05, 163 nm, 161 nm, 160 nm and 1.02, respectively. Saponification and preparation of alignment film were effected in the same manner as in Example 1-1.

(Preparation of First Optical Anisotropic Layer C)

In 204.0 parts by mass of methyl ethyl ketone were dissolved 91 parts by mass of a discotic compound shown below, 9 parts by mass of an ethylene oxide-modified trimethylol propane triacrylate (V#360, produced by OSAKA ORGANIC CHEMICAL INDUSTRY LTD.), 1 part by mass of a cellulose acetate butyrate (CAB531-1, produced by Eastman Chemical Co., Ltd.), 3 parts by mass of a photopolymerization initiator (Irgacure 907, produced by Ciba-Geigy Inc.) and 1 part by mass of a sensitizer (Kayacure DETX, produced by Nippon Kayaku Corporation) to prepare a coating solution. The coating solution thus prepared was then spread over the alignment film using a #3.4 wire bar. The alignment film was attached to a metallic frame which was then heated in a 130° C. constant temperature tank for 2 minutes so that the discotic compound was aligned. Subsequently, the coated material was irradiated with ultraviolet rays from a 120 W/cm high pressure mercury vapor lamp at 110° C. for 1 minute so that the discotic compound was polymerized. Thereafter, the material was allowed to cool to room temperature. In this manner, a first optical anisotropic layer C was formed to prepare an optical compensation film C.

Discotic liquid crystal compound

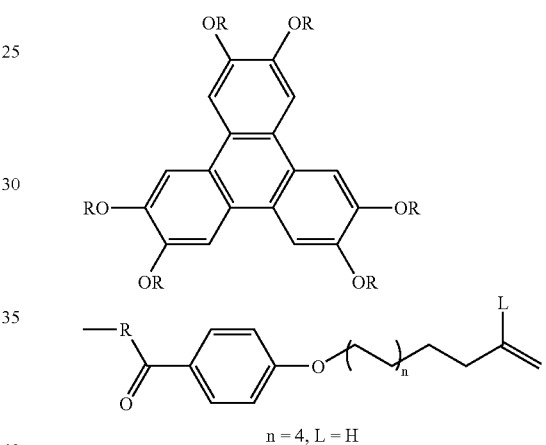

In the same manner as mentioned above, an alignment film was formed on a glass sheet. The first optical anisotropic layer was then formed on the alignment film. The first optical anisotropic layer thus formed was then measured for Re at various wavelength ranges using a Type M-150 ellipsometer. As a result, $Re_1$ (450), $Re_1$ (550), $Re_1$ (650) and $Re_1$ (450)/$Re_1$ (650) were 34 nm, 30 nm, 27 nm and 1.26, respectively. An elliptical polarizing plate was prepared in the same manner as in Example 1-1.

(Preparation of Bend-Aligned Liquid Crystal Cell)

A bend-aligned liquid crystal cell and a liquid crystal display were prepared in the same manner as in Example 1-1. The bend-aligned liquid crystal cell and liquid crystal display thus prepared were then each evaluated in the same manner as in Example 1. The results are set forth in Table 1-4.

Comparative Example 1-2

An elliptical polarizing plate was prepared in the same manner as in Comparative Example 1-1 except that the second optical anisotropic layer C of Comparative Example 1-1 was replaced by the second optical anisotropic layer A of Example 1-1. From the elliptical polarizing plate were then prepared a bend-aligned liquid crystal cell and a liquid crystal display in the same manner as in Example 1-1. The bend-aligned liquid crystal cell and liquid crystal display were then each evaluated in the same manner as in Example 1-1. The results are set forth in Table 1-4.

Comparative Example 1-3

An elliptical polarizing plate was prepared in the same manner as in Comparative Example 1-1 except that the first optical anisotropic layer C of Comparative Example 1-1 was replaced by the first optical anisotropic layer A of Example 1-1. From the elliptical polarizing plate were then prepared a bend-aligned liquid crystal cell and a liquid crystal display in the same manner as in Example 1-1. The bend-aligned liquid crystal cell and liquid crystal display were then each evaluated in the same manner as in Example 1-1. The results are set forth in Table 1-4.

Retardation raising agent

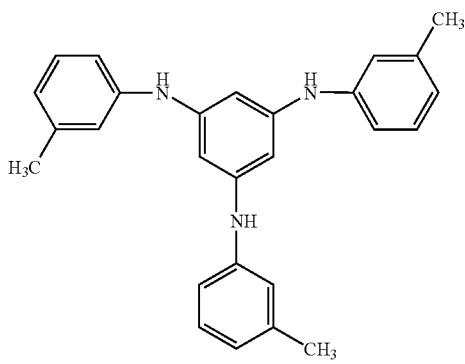

TABLE 1-4

|  | Example 1-1 | Example 1-2 | Comparative Example 1-1 | Comparative Example 1-2 | Comparative Example 1-3 |
| --- | --- | --- | --- | --- | --- |
| $Re_1(450)/Re_1(650)$ | 1.14 | 1.17 | 1.26 | 1.26 | 1.14 |
| $Re_2(450)/Re_2(650)$ | 0.53 | 0.60 | 1.05 | 0.53 | 1.05 |
| $Rth_2(450)/Rth_2(650)$ | 1.10 | 1.18 | 1.02 | 1.10 | 1.02 |
| Front CR | 450 | 440 | 430 | 430 | 450 |
| Vertical viewing angle contrast | 160 | 155 | 155 | 155 | 155 |
| Horizontal viewing angle contrast | 160 | 160 | 160 | 160 | 160 |
| Front tint (u', v') during black display | (0.22, 0.44) | (0.20, 0.42) | (0.19, 0.34) | (0.19, 0.34) | (0.20, 0.42) |
| Vertical tint change Δu'v' during black display | 0.02 | 0.03 | 0.14 | 0.03 | 0.12 |
| Horizontal tint change Δu'v' during black display | 0.02 | 0.02 | 0.04 | 0.03 | 0.03 |

As can be seen in the results of Table 4, when the following expressions (1) to (3) are satisfied, the resulting black display has so high fidelity that the front tint is close to neutral and the horizontal and vertical tint change is small.

$$Re_1(450)/Re_1(650) \leq 1.25 \quad (1)$$

$$Re_2(450)/Re_2(650) \leq 0.8 \quad (2)$$

$$Rth_2(450)/Rth_2(650) \geq 1 \quad (3)$$

<Second Aspect>

Example 2-1

Preparation of Cellulose Acetate Solution

The following components were charged in a mixing tank where they were then heated with stirring to prepare a cellulose acetate solution.

| Formulation of cellulose acetate solution | |
| --- | --- |
| Cellulose acetate having a percent acetylation of 60.9% | 100 parts by mass |
| Triphenyl phosphate | 7.8 parts by mass |
| Biphenyl diphenyl phosphate | 3.9 parts by mass |
| Methylene chloride | 300 parts by mass |
| Methanol | 45 parts by mass |

Into a separate mixing tank were charged 4 parts by mass of a cellulose acetate (linter) having a percent acetylation of 60.9%, 25 parts by mass of the following retardation raising agent, 0.5 parts by mass of a particulate silica (average particle diameter: 20 nm), 80 parts by mass of methylene chloride and 20 parts by mass of methanol which were then heated with stirring to prepare a retardation raising agent solution.

(Preparation of Optical Anisotropic Layer 2)

470 parts by mass of a cellulose acetate solution were mixed with 18.5 parts by mass of the retardation raising agent solution. The mixture was then thoroughly stirred to prepare a dope. The weight ratio of the retardation raising agent to cellulose acetate was 3.5%. The film having a residual solvent content of 35% by mass was peeled off the band, crosswise stretched at a temperature of 140° C. and a draw ratio of 38% using a film tenter, and then dried at 130° C. with the clip detached therefrom for 45 seconds to prepare a cellulose acetate film as optical anisotropic layer 2. The optical anisotropic layer 2 thus produced had a residual solvent content of 0.2% by mass and a thickness of 88 µm.

(Measurement of Optical Properties)

The optical anisotropic layer 2 thus prepared was then measured for $Re_2$ (550) at a wavelength of 550 nm using a Type M-150 ellipsometer (produced by JASCO). The result was 45 nm. The optical anisotropic layer 2 was also measured for retardation values $Re_2$ (40°) and $Re_2$ (−40°) developed when swing of ±40° was made with the in-plane slow axis as a swing axis. From these measurements was then calculated $Rth_2$ (550) by the ellipsometer. The result was 150 nm.

(Saponification of Second Optical Anisotropic Layer 2)

A 1.5 N isopropyl alcohol solution of potassium hydroxide was spread over one side of the optical anisotropic layer 2 thus prepared at a rate of 25 ml/m². The coated optical anisotropic layer was allowed to stand at 25° C. for 5 seconds, washed with flowing water for 10 seconds, and then blown with 25° C. air so that the surface of the film was dried. In this manner, the optical anisotropic layer 2 was saponified only on one side thereof (Formation of Alignment Film)

An alignment film coating solution having the following formulation was then spread over the optical anisotropic layer 2 on the saponified surface thereof at a rate of 24 ml/m² using a #14 wire bar coater. The coated optical anisotropic layer was dried with 60° C. hot air for 60 seconds and then with 90° C. hot air for 150 seconds.

Subsequently, the film thus formed was subjected to rubbing in the direction of 45° with respect to the stretching direction of the optical anisotropic layer 2 (substantially the same as the slow axis).

| (Formulation of alignment film coating solution) | |
|---|---|
| Modified polyvinyl alcohol shown below | 10 parts by mass |
| Water | 371 parts by mass |
| Methanol | 119 parts by mass |
| Glutaraldehyde (crosslinking agent) | 0.5 parts by mass |

Modified polyvinyl alcohol

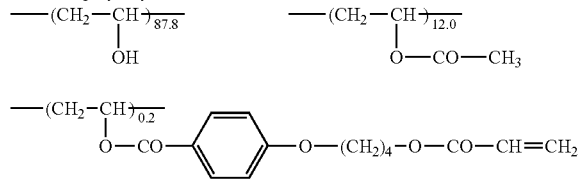

(Preparation of Optical Anisotropic Layer 1)

In 400.0 parts by mass of methyl ethyl ketone were dissolved 100 parts by mass of a discotic compound shown in D-89, 0.4 parts by mass of the following air interface alignment controller, 3 parts by mass of a photopolymerization initiator (Irgacure 907, produced by Ciba-Geigy Inc.) and 1 part by mass of a sensitizer (Kayacure DETX, produced by Nippon Kayaku Corporation) to prepare a coating solution. The coating solution thus prepared was then spread over the alignment film using a #3.0 wire bar. The alignment film was attached to a metallic frame which was then heated in a 95° C. constant temperature tank for 2 minutes so that the discotic compound was aligned. Subsequently, the coated material was irradiated with ultraviolet rays from a 120 W/cm high pressure mercury vapor lamp at 80° C. for 1 minute so that the discotic compound was polymerized. Thereafter, the material was allowed to cool to room temperature. In this manner, a optical anisotropic layer 1 was formed to prepare an optical compensation film 1.

Air interface alignment controller V-(1)

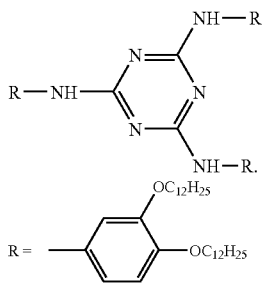

In the same manner as mentioned above, an alignment film was formed on a glass sheet. The optical anisotropic layer 1 was then formed on the alignment film. The optical anisotropic layer 1 thus formed was then measured for $Re_1$ (550) at a wavelength of 550 nm using a Type M-150 ellipsometer. The result was 30 nm. The optical anisotropic layer 1 was also measured for retardation values $Re_1$ (40°) and $Re_1$ (−40°) developed when swing of ±40° was made with the in-plane slow axis as a swing axis. As a result, $Re_1$ (40°)/$Re_1$ (−40°) was 10.5. The optical anisotropic layer 1 was also measured for retardation at a wavelength of 450 nm and 650 nm using a Type M-150 ellipsometer. As a result, $Re_1$ (450°)/$Re_1$ (650°) was 1.15.

(Preparation of Elliptical Polarizing Plate)

A stretched polyvinyl alcohol film was allowed to adsorb iodine to prepare a polarizing film. Subsequently, the optical compensation film thus prepared was stuck to one side of the polarizing film with a polyvinyl alcohol-based adhesive on the optical anisotropic layer 2 side thereof. The two components were disposed such that the slow axis of the optical anisotropic layer 2 and the transmission axis of the polarizing film were parallel to each other.

A commercially available cellulose acetate film (FUJITAC 80UF, produced by Fuji Photo Film Co., Ltd.) was saponified in the same manner as mentioned above, and then stuck to the other side (side opposite the optical compensation film) of the polarizing film with a polyvinyl alcohol-based adhesive. In this manner, an elliptical polarizing plate was prepared.

(Preparation of Bend-Aligned Liquid Crystal Cell)

A polyimide film was provided on a glass substrate with ITO electrode as an alignment film. The alignment film thus prepared was then subjected to rubbing. Two sheets of glass substrates thus obtained were stacked in such an arrangement that the rubbing direction thereof were parallel to each other. The cell gap was then predetermined to 4.1 µm. The cell gap was then filled with a liquid crystal compound having Δn (550) of 0.1396 (ZLI1132, produced by Merck Ltd.) to prepare a bend-aligned liquid crystal cell.

(Preparation and Evaluation of Liquid Crystal Display)

The liquid crystal cell and two sheets of polarizing plates were combined to prepare a liquid crystal display of Example 2-1. The liquid crystal cell and the two sheets of polarizing plates were disposed such that the polarizing plates were opposed to the optical anisotropic layer and the substrate of the liquid crystal cell and the rubbing direction of the liquid crystal cell and the rubbing direction of the optical anisotropic layer opposed to the liquid crystal cell were not parallel to each other.

The liquid crystal display thus prepared was disposed above a back light. A 55 Hz rectangular wave voltage was then applied to the bend-aligned liquid crystal cell in the liquid crystal display. Using a type BM-5 brightness meter (produced by TOPCON Co., Ltd.), the liquid crystal display was then measured for voltage at which the black brightness (front brightness) reaches minimum while adjusting the voltage. Subsequently, using the same brightness meter (BM-5, produced by TOPCON Co., Ltd.), the liquid crystal display was measured for black brightness and white brightness (front brightness) at the center of the screen. From the measurements was then calculated contrast. Using a type BM-5 brightness meter (produced by TOPCON Co., Ltd.), the liquid crystal display was then measured for brightness in the upper, lower, right and left directions with the applied voltage varied. From the measurements, it was then judged to see if gradation inversion occurred. Using a Type SR-3 spectral brightness meter (produced by TOPCON Co., Ltd.), the liquid crystal display was then measured for tint in black state. Using a Type EZ-CONTRAST measuring instrument, the liquid crystal display was then measured for viewing angle. The results are set forth in Table 2-1.

Using SR-3, two sheets of commercially available linear polarizing plates disposed above a back light and arranged such that the transmission axis thereof were perpendicular to each other were measured for tint in black state. As a result, v' was 0.45.

Example 2-2

Preparation of optical anisotropic layer 2

470 parts by mass of the cellulose acetate solution prepared in Example 2-1 which had been filtered were mixed with 33.0 parts by mass of the retardation raising agent solution which had been filtered. The mixture was then casted using a band casting machine. The weight ratio of the retardation raising agent to cellulose acetate was 6.2%. The film having a residual solvent content of 30% by mass was peeled off the band, crosswise stretched at a temperature of 140° C. and a draw ratio of 30% using a film tenter, and then dried at 130° C. with the clip detached therefrom for 45 seconds to prepare a cellulose acetate film as optical anisotropic layer 2. The optical anisotropic layer 2 thus produced had a residual solvent content of 0.2% by mass and a thickness of 88 μm.

(Measurement of Optical Properties)

The optical anisotropic layer 2 thus prepared was then measured for $Re_2$ (550) at a wavelength of 550 nm using a Type M-150 ellipsometer (produced by JASCO). The result was 38 nm. The optical anisotropic layer 2 was also measured for retardation values $Re_2$ (40°) and $Re_2$ (−40°) developed when swing of ±40° was made with the in-plane slow axis as a swing axis. From these measurements was then calculated $Rth_2$ (550) by the ellipsometer. The result was 200 nm.

Saponification and preparation of alignment film were effected in the same manner as in Example 2-1.

(Preparation of Optical Anisotropic Layer 1)

In 400.0 parts by mass of methyl ethyl ketone were dissolved 100 parts by mass of a discotic compound shown in D-109, 0.4 parts by mass of the aforementioned air interface alignment controller V-(1), 3 parts by mass of a photopolymerization initiator (Irgacure 907, produced by Ciba-Geigy Inc.) and 1 part by mass of a sensitizer (Kayacure DETX, produced by Nippon Kayaku Corporation) to prepare a coating solution. The coating solution thus prepared was then spread over the alignment film using a #3.0 wire bar. The alignment film was attached to a metallic frame which was then heated in a 120° C. constant temperature tank for 2 minutes so that the discotic compound was aligned. Subsequently, the coated material was irradiated with ultraviolet rays from a 120 W/cm high pressure mercury vapor lamp at 100° C. for 1 minute so that the discotic compound was polymerized. Thereafter, the material was allowed to cool to room temperature. In this manner, a optical anisotropic layer 1 was formed to prepare an optical compensation film.

In the same manner as mentioned above, an alignment film was formed on a glass sheet. The optical anisotropic layer 1 was then formed on the alignment film. The optical anisotropic layer 1 thus formed was then measured for $Re_1$ (550) at a wavelength of 550 nm using a Type M-150 ellipsometer. The result was 30.5 nm. The optical anisotropic layer 1 was also measured for retardation values $Re_1$ (40°) and $Re_1$ (−40°) developed when swing of +40° was made with the in-plane slow axis as a swing axis. As a result, $Re_1$ (40°)/$Re_1$ (−40°) was 11.2. The optical anisotropic layer 1 was also measured for retardation at a wavelength of 450 nm and 650 nm using a Type M-150 ellipsometer. As a result, $Re_1$ (450°)/$Re_1$ (650°) was 1.19.

An elliptical polarizing plate was then prepared in the same manner as in Example 2-1.

(Preparation of Bend-Aligned Liquid Crystal Cell)

A bend-aligned liquid crystal cell and a liquid crystal display were prepared in the same manner as in Example 1 except that the cell gap was 5.3 μm. Thus, a liquid crystal display of Example 2-2 was prepared. The bend-aligned liquid crystal cell and liquid crystal display thus prepared were then evaluated. The results are set forth in Table 2-1 below.

Comparative Example 2-1

An optical anisotropic layer 2 and an alignment film were prepared in the same manner as in Example 2-1.

(Preparation of Optical Anisotropic Layer 1)

(Preparation of First Optical Anisotropic Layer C)

In 204.0 parts by mass of methyl ethyl ketone were dissolved 91 parts by mass of a discotic compound shown below, 9 parts by mass of an ethylene oxide-modified trimethylol propane triacrylate (V#360, produced by OSAKA ORGANIC CHEMICAL INDUSTRY LTD.), 1 part by mass of a cellulose acetate butyrate (CAB531-1, produced by Eastman Chemical Co., Ltd.), 3 parts by mass of a photopolymerization initiator (Irgacure 907, produced by Ciba-Geigy Inc.) and 1 part by mass of a sensitizer (Kayacure DETX, produced by Nippon Kayaku Corporation) to prepare a coating solution. The coating solution thus prepared was then spread over the alignment film using a #3.4 wire bar. The alignment film was attached to a metallic frame which was then heated in a 130° C. constant temperature tank for 2 minutes so that the discotic compound was aligned. Subsequently, the coated material was irradiated with ultraviolet rays from a 120 W/cm high pressure mercury vapor lamp at 110° C. for 1 minute so that the discotic compound was polymerized. Thereafter, the material was allowed to cool to room temperature. In this manner, an optical anisotropic layer 1 was formed to prepare an optical compensation film.

Discotic liquid crystal compound

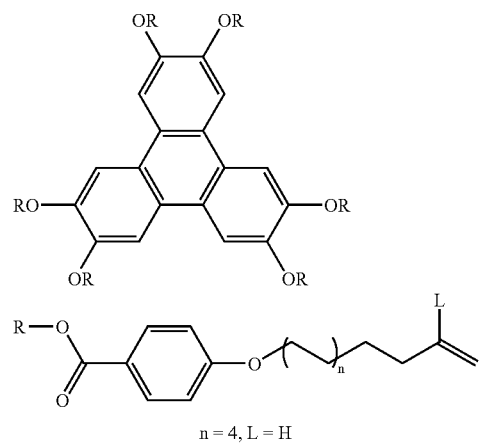

n = 4, L = H

In the same manner as mentioned above, an alignment film was formed on a glass sheet. The optical anisotropic layer 1 was then formed on the alignment film. The optical anisotropic layer 1 thus formed was then measured for $Re_1$ (550) at a wavelength of 550 nm using a Type M-150 ellipsometer. The result was 30.2 nm. The optical anisotropic layer 1 was also measured for retardation values $Re_1$ (40°) and $Re_1$ (−40°)

developed when swing of ±40° was made with the in-plane slow axis as a swing axis. As a result, $Re_1$ (40°)/$Re_1$ (−40°) was 10.4. The optical anisotropic layer 1 was also measured for retardation at a wavelength of 450 nm and 650 nm using a Type M-150 ellipsometer. As a result, $Re_1$ (450°)/$Re_1$ (650°) was 1.27.

An elliptical polarizing plate was then prepared in the same manner as in Example 2-1.

(Preparation of Bend-Aligned Liquid Crystal Cell)

A bend-aligned liquid crystal cell and a liquid crystal display were prepared in the same manner as in Example 1 except that the cell gap was 5.3 µm. Thus, a liquid crystal display of Comparative Example 2-1 was prepared. The bend-aligned liquid crystal cell and liquid crystal display thus prepared were then evaluated. The results are set forth in Table 2-1 below.

Comparative Example 2-2

An optical anisotropic layer 2 and an alignment film were prepared in the same manner as in Example 2-2. An optical anisotropic layer 1 was prepared in the same manner as in Example 2-1. Thus, an elliptical polarizing plate was prepared.

(Preparation of Bend-Aligned Liquid Crystal Cell)

A bend-aligned liquid crystal cell and a liquid crystal display were prepared in the same manner as in Example 2-1 except that the cell gap was 2.6 µm. Thus, a liquid crystal display of Comparative Example 2 was prepared. The bend-aligned liquid crystal cell and liquid crystal display thus prepared were then evaluated. The results are set forth in Table 2-1 below.

Comparative Example 3

An optical anisotropic layer 2, an alignment film, an optical anisotropic layer 1 and an elliptical polarizing plate were prepared in the same manner as in Example 2-1.

(Preparation of Bend-Aligned Liquid Crystal Cell)

A bend-aligned liquid crystal cell and a liquid crystal display were prepared in the same manner as in Example 1 except that the cell gap was 5.8 µm. Thus, a liquid crystal display of Comparative Example 2-3 was prepared. The bend-aligned liquid crystal cell and liquid crystal display thus prepared were then evaluated. The results are set forth in Table 2-1 below.

Conclusion

As can be seen in the results of Table 2-1, the liquid crystal display of the invention exhibits a high front contrast, wide vertical and horizontal contrast viewing angles and vertical and horizontal inversion viewing angles and little bluish tint during black display.

On the contrary, Comparative Example 2-1, which doesn't satisfies the requirement $R_1$ (450)/$Re_1$ (650)<1.25, exhibits a low front contrast and a high bluish tint during black display. Further, Comparative Examples 2-2 and 2-3, which doesn't satisfy the requirement $2 \leq (\Delta n\ (550) \times d)/Rth_2\ (550) \leq 5$, exhibit lowered contrast viewing angles and inversion viewing angles.

<Third Aspect>

(Example 3-1)

Preparation of Second Optical Anisotropic Layer-1

A bisphenol A type polycarbonate (C1400, produced by TEIJIN CHEMICALS LTD.) was dissolved in methylene chloride to prepare a dope solution having a solid content concentration of 18% by mass. The dope solution thus prepared was then subjected to solution casting to prepare a film fluid on a support. The film fluid was peeled off the support, and then gradually heated to (Tg −20° C.) so that it was dried to obtain a film. Subsequently, the film was monoaxially stretched by a factor of 1.6 at 230° C. Referring to the properties of the film thus obtained, the thickness was 35 µm, Re was 32 nm, and Rth was 16 nm. Re (450)/Re (550) was 0.82 and Re (650)/Re (550) was 1.07.

(First Optical Anisotropic Layer)

20 parts by mass of the following modified polyvinyl alcohol and 1 parts by mass of glutaraldehyde (crosslinking agent) were dissolved in a mixture of 360 parts by mass of water and 120 parts by mass of methanol to prepare a coating solution. The coating solution was spread using a #16 wire bar coater, and then dried with 60° C. hot air for 60 seconds and then with 90° C. hot air for 150 seconds to prepare an alignment film. Subsequently, the alignment film thus prepared was subjected to rubbing in the direction of 45° with respect to the in-plane slow axis of the second optical anisotropic layer 1 (parallel to casting direction).

TABLE 2-1

|  | Example 2-1 | Example 2-2 | Comparative Example 2-1 | Comparative Example 2-2 | Comparative Example 2-3 |
| --- | --- | --- | --- | --- | --- |
| Re(450)/Re(650) of optical anisotropic layer | 1.15 | 1.19 | 1.27 | 1.15 | 1.15 |
| Δnd/Rth of optical anisotropic layer 2 | 3.82 | 3.70 | 3.82 | 1.81 | 5.40 |
| Front contrast | 450 | 440 | 300 | 440 | 440 |
| v' | 0.44 | 0.42 | 0.37 | 0.44 | 0.44 |
| Vertical contrast viewing angle | 160 | 140 | 155 | 45 | 45 |
| Horizontal contrast viewing angle | 160 | 160 | 160 | 45 | 50 |
| Vertical inversion viewing angle | 160 | 150 | 155 | 40 | 140 |
| Horizontal inversion viewing angle | 140 | 135 | 140 | 140 | 40 |

Modified polyvinyl alcohol

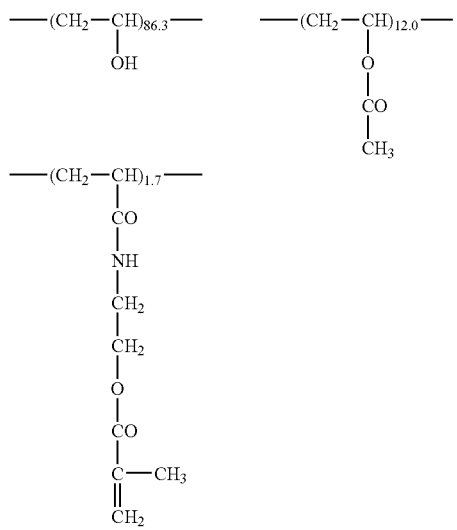

90 parts by mass of the following discotic liquid crystal compound, 10 parts by mass of an ethylene oxide-modified trimethylolpropane triacrylate (V#360, produced by OSAKA ORGANIC CHEMICAL INDUSTRY LTD.), 0.6 parts by mass of a melamine formaldehyde/acrylic acid copolymer (Aldrich reagent), 3.0 parts by mass of a photopolymerization initiator (Irgacure 907, produced by Nihon Ciba-Geigy K.K.) and 1.0 parts by mass of a photosensitizer (Kayacure DETX, produced by Nippon Kayaku Corporation) were dissolved in methyl ethyl ketone to prepare a coating solution having a solid content concentration of 38% by mass.

Discotic liquid crystal compound

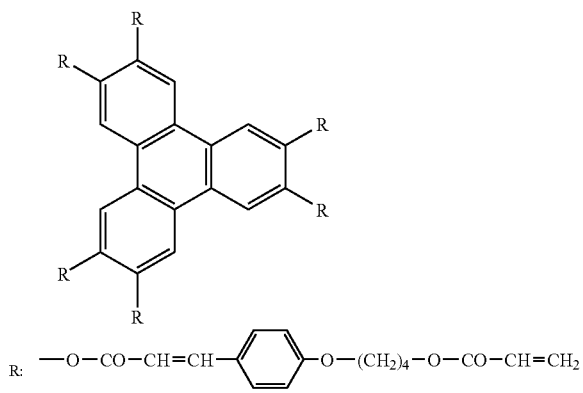

The coating solution thus prepared was then spread over the alignment layer using a #3 wire bar. The coated material was heated in a 120° C. constant temperature tank for 3 minutes, subjected to alignment of discotic liquid crystal compound, irradiated with ultraviolet rays so that the discotic liquid crystal compound was polymerized, and then fixed aligned. The first optical anisotropic layer thus prepared had a thickness of 1.5 μm and Re (550) of 30 nm. Thus, a first optical anisotropic layer was prepared.

(Preparation of Third Optical Anisotropic Layer)

A solution having the following formulation was spread over FUJITAC (produced by Fuji Photo Film Co., Ltd.) at a rate of 24 ml/m² using a #14 wire bar coater. The coated material was dried with 60° C. hot air for 60 seconds and then with 90° C. hot air for 150 seconds to prepare an alignment layer.

| Formulation of alignment layer coating solution | |
|---|---|
| Modified polyvinyl alcohol shown below | 40 parts by mass |
| Water | 728 parts by mass |
| Methanol | 228 parts by mass |
| Glutaraldehyde (crosslinking agent) | 2 parts by mass |
| Citric acid | 0.08 parts by mass |
| Monoethylester citrate | 0.29 parts by mass |
| Diethylester citrate | 0.27 parts by mass |
| Triethylester citrate | 0.05 parts by mass |

Modified polyvinyl alcohol

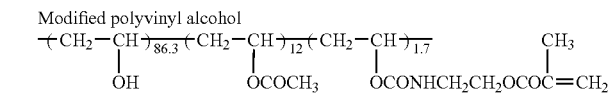

(Formation of Optical Anisotropic Layer Composed of Discotic Liquid Crystal Compound)

A coating solution containing a discotic liquid crystal having the following formulation was continuously spread over the alignment film formed on the support of continuous length using a #3 wire bar.

| (Formulation of coating solution of discotic liquid crystal layer) | |
|---|---|
| Discotic liquid crystal compound (1) shown above | 32.6% by mass |
| Horizontal aligning agent I-6 shown above | 0.15% by mass |
| Ethylene oxide-modified trimethylolpropane triacrylate (V#360, produced by OSAKA ORGANIC CHEMICAL INDUSTRY LTD.) | 3.2 parts by mass |
| Sensitizer (Kayacure DETX, produced by Nippon Kayaku Corporation) | 0.4 parts by mass |
| Photopolymerization initiator (Irgacure 907, produced by Ciba-Geigy Inc.) | 1.1 parts by mass |
| Methyl ethyl ketone | 62.0 parts by mass |

The coated material was then heated and dried in a 130° C. drying zone for 2 minutes so that the discotic liquid crystal compound was aligned. Subsequently, the coated material was irradiated with ultraviolet rays from a 120 W/cm high pressure mercury vapor lamp at 80° C. in a UV emission zone for 4 seconds to cause the polymerization of the discotic liquid crystal compound. Thereafter, the coated material was allowed to cool to room temperature, and then wound up. The optical anisotropic layer thus prepared showed an optically negative refractive index anisotropy and had a thickness of 2.38 μm and Re and Rth of 0 nm and 150 nm at a wavelength of 550 nm, respectively. Rth (450)/Rth (550) was 1.21 and Re (650)/Re (550) was 0.92. The discotic liquid crystal was observed aligned horizontally at an error of ±1° in the optical anisotropic layer.

The third optical anisotropic layer thus prepared was then transferred in such an arrangement that the third optical anisotropic layer, the second optical anisotropic layer-1 and the first optical anisotropic layer were stacked in this order.

(Preparation of Polarizing Plate A)

A saponified protective film (FUJITAC, cellulose triacetate produced by Fuji Photo Film Co., Ltd.) was stuck to one side of a polarizing film with a polyvinyl alcohol-based adhesive. The third optical anisotropic layer, the second optical anisotropic layer-1 and the first optical anisotropic layer were stuck to the other side of the polarizing film in this order with a polyvinyl alcohol-based adhesive. In this manner, a polarizing plate A was prepared.

The polarizing plate A was then stuck to the both sides of an OCB mode liquid crystal cell (VT23XD1, produced by EIZO NANAO CORPORATION) to attain the configuration shown in FIG. 1. The laminate was then incorporated in a liquid crystal display device. The liquid crystal display device thus completed was then measured for brightness and color shift (Δu'v') at a clockwise angle of 45° and a counterclockwise angle of 45° during black display using a Type EZ-Contrast160D brightness meter (produced by ELDIM SA.). The results are set forth in Table 3-1 below.

(Example 3-2)

(Preparation of Second Optical Anisotropic Layer-2)

At room temperature, 120 parts by mass of a cellulose acetate having an average acetylation degree of 59.7%, 9.36 parts by mass of a triphenyl phosphate, 4.68 parts by mass of a biphenyl diphenyl phosphate, 1.20 parts by mass of the following retardation raising agent, 704 parts by mass of methylene chloride and 61.2 parts by mass of methanol were mixed to prepare a solution (dope).

Retardation raising agent

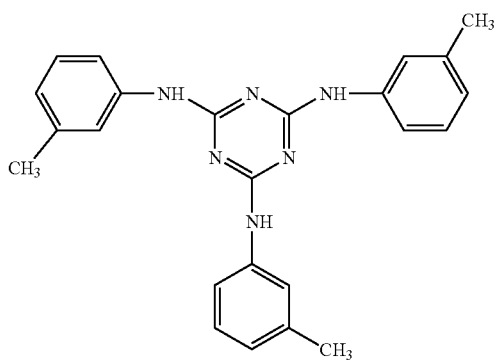

The dope thus obtained was casted over a glass sheet, dried at room temperature for 1 minute, and then dried at 45° C. for 5 minutes. The dope thus dried showed a residual solvent content of 30% by mass. The cellulose acetate film thus formed was peeled off the glass sheet, and then dried at 100° C. for 20 minutes and then at 130° C. for 10 minutes. The film was cut into a proper size, and then stretched at 130° C. by a factor of 1.45 in the direction parallel to the casting direction. During this procedure, the film was allowed to shrink freely in the direction perpendicular to the stretching direction. The film thus stretched was allowed to cool to room temperature, and then withdrawn. The film thus stretched showed a residual solvent content of 0.2% by mass. The film thus obtained had a thickness of 60 μm. Referring to the properties of the cellulose acetate film thus obtained, Re and Rth were 82 nm and 88 nm, respectively. Re (450)/Re (550) was 0.8 and Re (650)/Re (550) was 1.06.

A third optical anisotropic layer having Re and Rth of 0 nm and 85 nm, respectively, was formed on the second optical anisotropic layer-2 to a thickness of 1.35 μm in the same manner as in Example 3-1. A first optical anisotropic layer was then formed on the third optical anisotropic layer in the same manner as in Example 3-1.

A saponified protective film (FUJITAC, cellulose triacetate produced by Fuji Photo Film Co., Ltd.) was stuck to one side of a polarizing film with a polyvinyl alcohol-based adhesive. The third optical anisotropic layer, the second optical anisotropic layer-2 and the first optical anisotropic layer were stuck to the other side of the polarizing film in this order with a polyvinyl alcohol-based adhesive. In this manner, a polarizing plate B was prepared.

Figure 6:
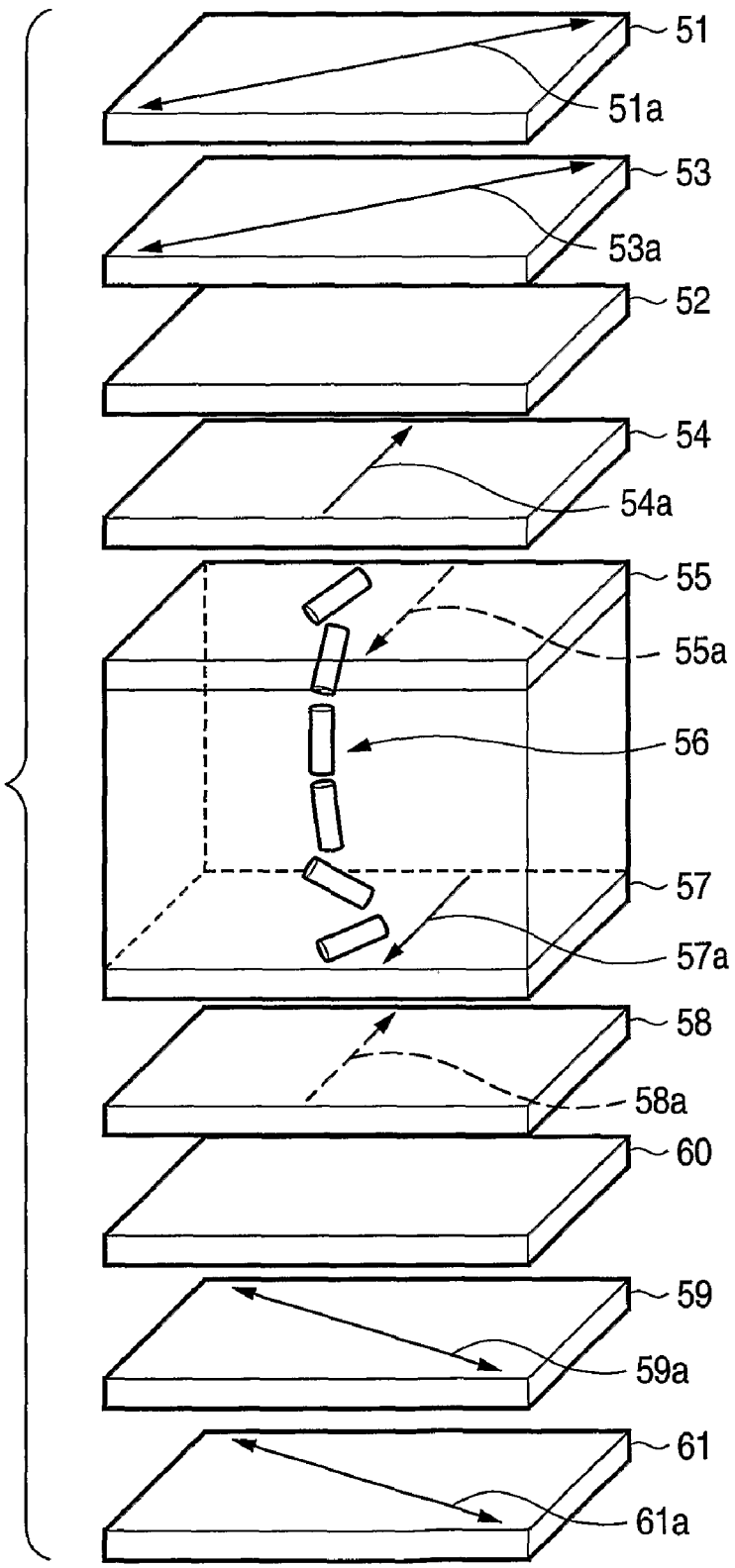
FIG. 6 is a schematic diagram of the liquid crystal display prepared in Example 3-2 of the present application.

The polarizing plate B was then stuck to the both sides of an OCB mode liquid crystal cell (VT23XD1, produced by EIZO NANAO CORPORATION) to attain the configuration shown in FIG. 6. The laminate was then incorporated in a liquid crystal display device. The liquid crystal display device thus completed was then measured for brightness and color shift (Δu'v') at a clockwise angle of 45° and a counterclockwise angle of 45° during black display using a Type EZ-Contrast160D brightness meter (produced by ELDIM SA.). The results are set forth in Table 3-1 below. Like numerals are used for like components in FIGS. 5 and 6.

(Comparative Example 3-1)

(Preparation of Optically Anisotropic Support)

100 parts by mass of a cellulose acetate having an acetylation degree of from 60.7% to 61.1%, 2.35 parts by mass of the following retardation raising agent, 2.75 parts by mass of triphenyl phosphate and 2.20 parts by mass of biphenyl diphenyl phosphate were dissolved in a mixture of 232.75 parts by mass of methylene chloride, 42.5 parts by mass of methanol and 8.50 parts by mass of n-butanol. The solution thus obtained was then casted using a drum casting machine to prepare a cellulose acetate film having a dried thickness of 92 μm.

(Retardation Raising Agent)

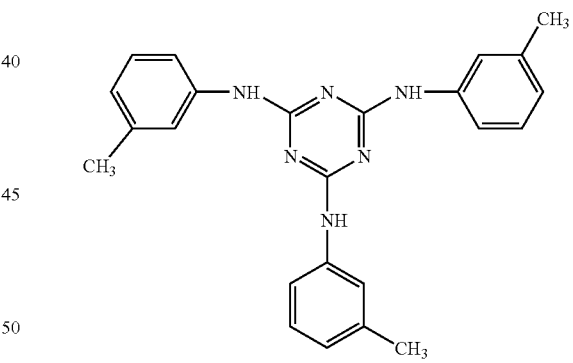

The cellulose acetate film thus prepared was then stretched at a substantial draw ratio of 25% to prepare an optically biaxial transparent support.

Referring to the properties of the cellulose acetate film thus obtained, Re (550) was 35 nm, Rth (550) was 175 nm, Re (450)/Re (550) was 1.01, Re (650)/Re (550) was 0.98, Rth (450)/Rth (550) was 1.01, and Rth (650)/Rth (550) was 0.99.

A first optical anisotropic layer was formed on the optical anisotropic layer in the same manner as in Example 3-1.

A saponified protective film (FUJITAC, cellulose triacetate produced by Fuji Photo Film Co., Ltd.) was stuck to one side of a polarizing film with a polyvinyl alcohol-based adhesive. The optically anisotropic support and the first optical anisotropic layer were stuck to the other side of the polarizing film in this order with a polyvinyl alcohol-based adhesive. In this manner, a polarizing plate C was prepared.

Figure 7:
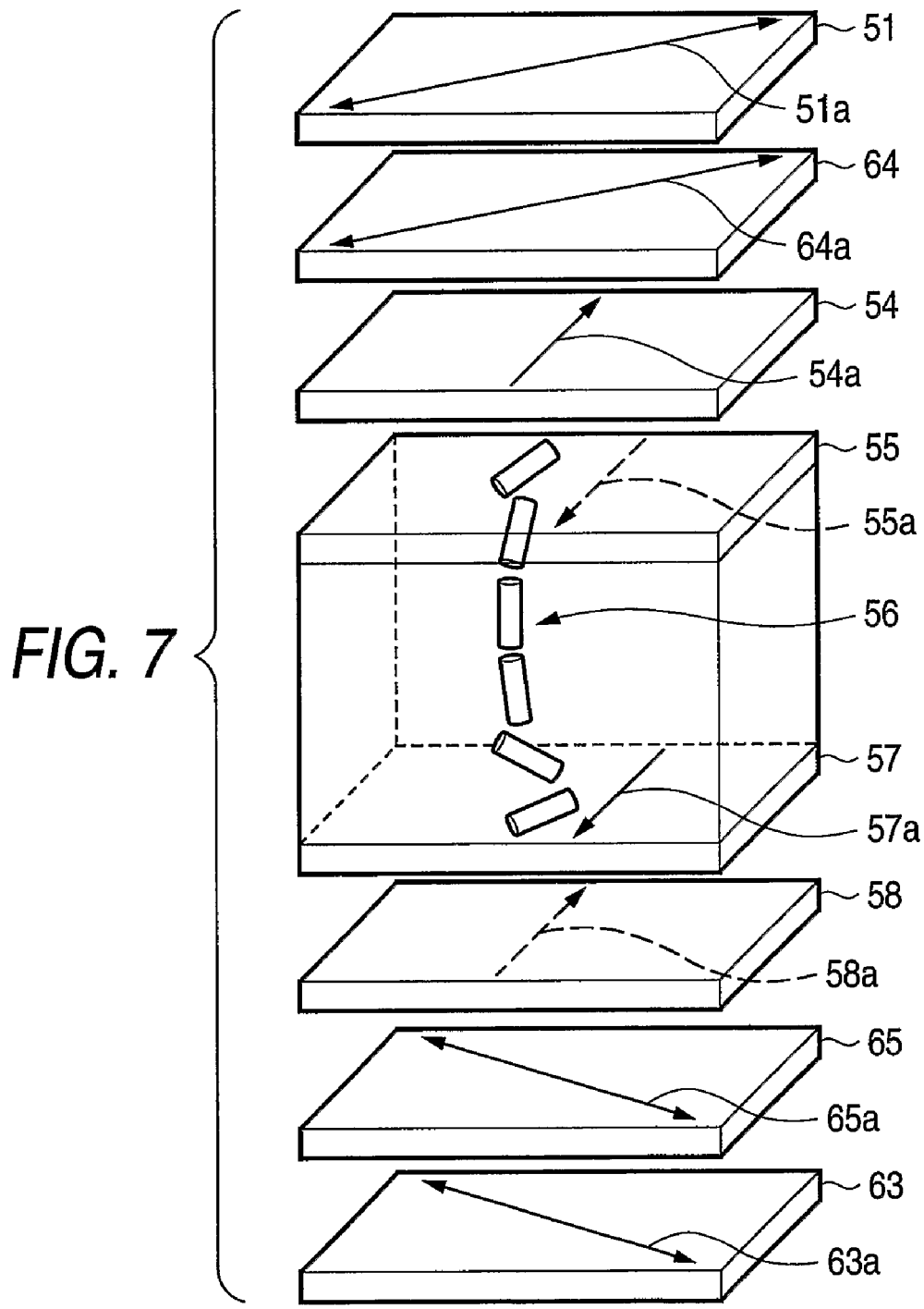
FIG. 7 is a schematic diagram of the liquid crystal display prepared in Comparative Example 3-1 of the present application.

The polarizing plate C was then stuck to the both sides of an OCB mode liquid crystal cell (VT23XD1, produced by EIZO NANAO CORPORATION) to attain the configuration shown in FIG. 7. The laminate was then incorporated in a liquid crystal display device. The liquid crystal display device thus completed was then measured for brightness and color shift (Δu'v') at a clockwise angle of 45° and a counterclockwise angle of 45° during black display using a Type EZ-Contrast160D brightness meter (produced by ELDIM SA.). The results are set forth in Table 3-1 below. In FIG. 7, the reference numeral 63 indicates a lower polarizing film, the reference numeral 63a indicates a lower polarizing film transmission axis, the reference numeral 64 indicates an upper optical anisotropic layer support, the reference numeral 64a indicates an upper optical anisotropic layer support slow axis, the reference numeral 65 indicates a lower optical anisotropic layer support and the reference numeral 65a indicates a lower optical anisotropic layer support slow axis. The other reference numerals are the same as those in FIG. 5.

TABLE 3-1

|  | Counterclockwise 45° brightness (cd) | Clockwise 45° brightness (cd) | Color shift at clockwise and counter-clockwise 45° (Δu'v') |
|---|---|---|---|
| Example 3-1 | 1.30 | 1.31 | 0.04 |
| Example 3-2 | 1.34 | 1.32 | 0.04 |
| Comparative Example 3-1 | 1.32 | 1.42 | 0.13 |

As can be seen in the results of Table 3-1, the liquid crystal display devices of Examples 3-1 and 3-2 of the invention exhibit a low transmission as well as a small color shit from the front as viewed at clockwise and counterclockwise 45° during black display as compared with the liquid crystal display device of Comparative Example 3-1.

In accordance with the third aspect of the invention, an optical compensation film can be provided which allows viewing angle compensation for black state of liquid crystal cell, particularly of OCB mode, over substantially all the wavelength ranges. As a result, in accordance with the invention, a liquid crystal display device, particularly of OCB mode, can be provided having little light leakage in the oblique direction during black display and an enhanced viewing angle contrast.

<Fourth Aspect>

Synthesis of (Fluoroaliphatic group-containing polymer (P-33))

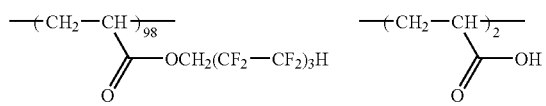

To a reactor equipped with a stirrer and a reflux condenser, 39.13 g of 1H,1H,7H-dodecafluoroheptyl acrylate, 0.80 g of acrylic acid, 1.1 g of dimethyl 2,2'-azobisisobutyrate, and 30 g of 2-butanone were added. The resulting mixture was heated at 78° C. for 6 hours under a nitrogen atmosphere to complete the reaction. The mass average molecular weight was $1.0 \times 10^4$.

With the same kind of method as the method for synthesizing the fluoroaliphatic group-containing polymer (P-33), fluorine-based polymers (P-34), (P-136), and (P-138) were synthesized.

The discotic compound represented by the general formula (1) can be synthesized according to the following synthesis example.

(Synthesis Example 1)

The exemplified compound (3) was synthesized through the following route. Incidentally, the phase transfer temperature is a measured value by a polarizing microscope (below, the same goes for Synthesis Example 2, or later).

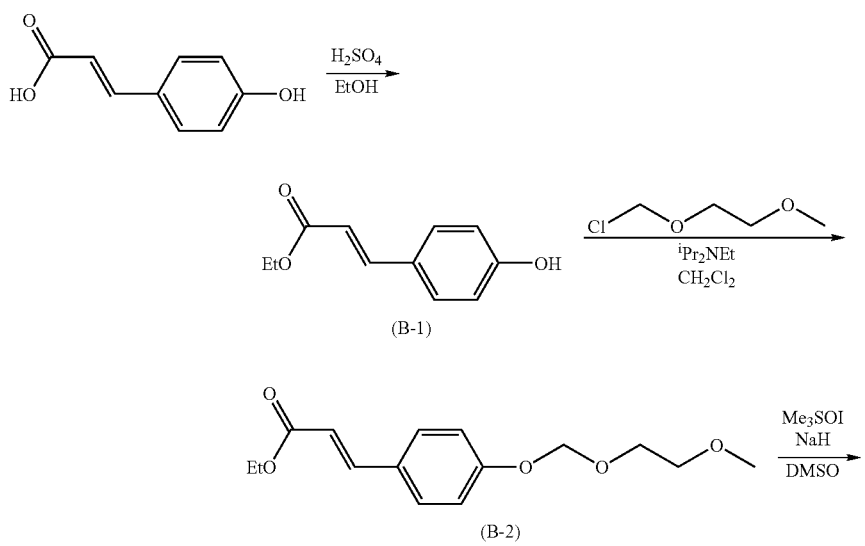

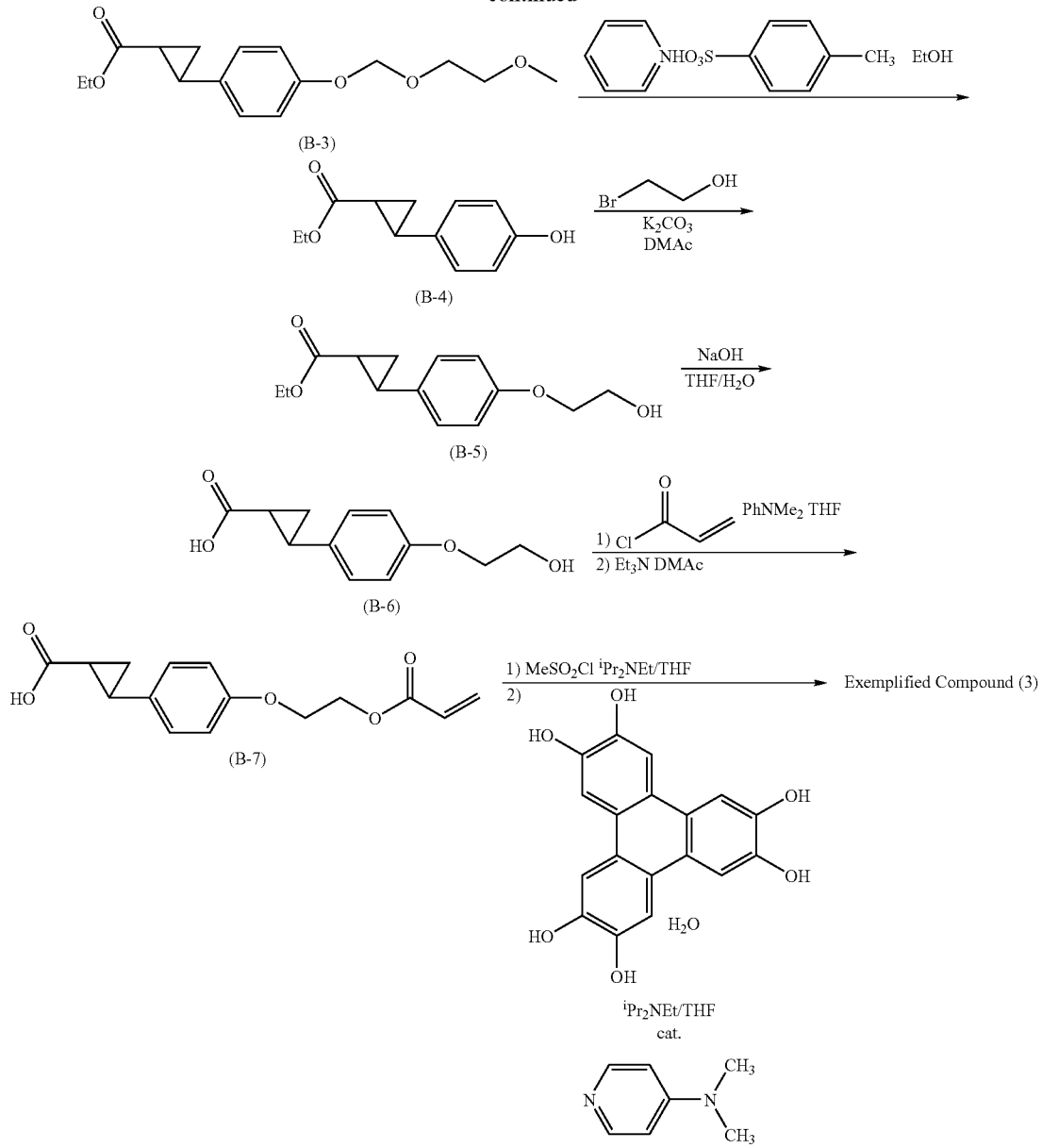

To 1.5 L of an ethyl alcohol solution of parahydroxycinnamic acid (200 g, 1.22 mol), 20 ml of concentrated sulfuric acid was added, and the resulting solution was refluxed for 6 hours. The solution was allowed to cool, and then, 1 L of ethyl alcohol was distilled off under reduced pressure, and ethyl acetate and saturated salt water were added thereto for liquid separation. The organic phase was neutralized with soda water. The organic phase was washed with saturated salt water, and then, dried with anhydrous magnesium sulfate. Then, the solvent was distilled off under reduced pressure, resulting in 226 g of (B-1)(yield 97%).

(B-1) To 600 ml of a methylene chloride solution (57.6 g, 0.3 mol), methoxyethoxy methyl chloride (MEMCl)(51.4 ml) was added, and diethylisopropylamine (78.4 ml, 0.45 mmol) was slowly added dropwise while keeping the temperature of the reaction system at 30° C. or less. The solution was stirred as it was for 3 hours, and then, saturated salt water was added thereto for liquid separation, and the organic phase was washed with dilute hydrochloric acid water and saturated salt water, and then, dried with anhydrous magnesium sulfate. Then, the solvent was distilled off under reduced pressure, resulting in 77.4 g of (B-2)(yield 92%).

To sodium hydride (9.2 g, 228 mmol) and trimethylsulfonium iodide (50.2 g, 228 mmol), dimethyl sulfoxide (160 ml) was added dropwise under a nitrogen atmosphere. It was verified that hydrogen ceased to be formed, and the solution was stirred for another 30 minutes. 600 ml of a dimethyl sulfoxide solution of (B-2)(49.2 g, 175 mmol) was added thereto, and stirred at 50° C. for 3 hours. The solution was allowed to cool, and then, ethyl acetate and saturated salt water were added thereto for liquid separation, and the organic phase was washed with dilute hydrochloric acid water, and saturated salt water. The organic phase was dried with anhydrous magnesium sulfate, and then, the solvent was distilled off under reduced pressure, resulting in 33.6 g of a crude product (B-3)(crude yield 65%).

To 200 ml of an ethanol solution of (B-3)(20.4 g, 69.3 mmol), pyridinium p-toluenesulfonic acid (17.4 g, 69.3 mmol) was added, and the solution was refluxed. The solution was stirred for 6 hours, and then allowed to cool. Then, ethyl acetate and saturated salt water were added thereto for liquid separation, and the organic phase was washed with dilute hydrochloric acid water and saturated salt water. The organic phase was dried with anhydrous magnesium sulfate, and then, the solvent was distilled off under reduced pressure. The residue was purified by silica gel column chromatography using an ethyl acetate and hexane mixed solvent as an eluent. This resulted in 13.0 g (yield 91%) of (B-4).

Under a nitrogen atmosphere, to 150 ml of a N,N'-dimethylacetamide solution of (B-4)(12.4 g, 60 mmol), bromoethanol (11.2 g, 90 mmol) and potassium carbonate (12.4 g, 90 mmol) were added, and the solution was stirred at an internal temperature of 110° C. for 5 hours. The solution was allowed to cool. Then, ethyl acetate and saturated salt water were added thereto for liquid separation, and the organic phase was washed with dilute hydrochloric acid water and saturated salt water. The organic phase was dried with anhydrous magnesium sulfate, and then, the solvent was distilled off under reduced pressure. The residue was purified by silica gel column chromatography using an ethyl acetate and hexane mixed solvent as an eluent. This resulted in 14.0 g (yield 93%) of (B-5).

To 100 ml of a tetrahydrofuran solution of (B-5)(14.0 g, 55.5 mmol), an aqueous solution of lithium hydroxide monohydrate (4.2 g, 100 mmol) dissolved in 100 ml of water was added, and the mixture was stirred under reflux for 6 hours. The solution was allowed to cool, and then, ethyl acetate and saturated salt water were added thereto for liquid separation. The organic phase was washed dilute hydrochloric acid water and saturated salt water. The organic phase was dried with anhydrous magnesium sulfate, and then, the solvent was distilled off under reduced pressure. The residue was purified by silica gel column chromatography using an ethyl acetate and hexane mixed solvent as an eluent. This resulted in 11.7 g (yield 95%) of (B-6).

To 100 ml of a tetrahydrofuran solution of (B-6)(7.4 g, 33.2 mmol), acrylic acid chloride (3.24 ml, 40 mmol), dimethylaniline (5.06 ml, 40 mmol), and nitrobenzene (0.3 ml) were added, and the solution was stirred at an internal temperature of 60° C. for 3 hours. The solution was allowed to cool. Then, ethyl acetate and saturated salt water were added thereto for liquid separation, and the organic phase was washed with dilute hydrochloric acid water and saturated salt water. The organic phase was dried with anhydrous magnesium sulfate, and then, the solvent was distilled off under reduced pressure. To the residue, N,N'-dimethylacetamide (100 ml) and triethylamine (5.6 ml, 40 mmol) were added, and the solution was stirred at an internal temperature of 60° C. for 2 hours. The solution was allowed to cool, and then, ethyl acetate and saturated salt water were added thereto for liquid separation, and the organic phase was washed with dilute hydrochloric acid water and saturated salt water. The organic phase was dried by anhydrous magnesium sulfate, and then, the solvent was distilled off under reduced pressure. Crystallization was carried out from the ethyl acetate and hexane mixed solvent, resulting in 7.2 g (yield 78%) of (B-7).

Under a nitrogen atmosphere, to 100 ml of a tetrahydrofuran solution of (B-7)(4.1 g, 14.8 mmol), methanesulfonyl chloride (1.15 ml, 14.8 mmol) was added under ice cooling, and diethylisopropylamine (2.58 ml, 14.8 mmol) was slowly added dropwise thereto. After dropwise addition, the temperature was raised to room temperature, and stirring was carried out for 30 minutes. The reaction was checked by TLC, followed by ice cooling. 50 ml of a tetrahydrofuran solution of monohydrate of 2,3,6,7,10,11-hexahydroxytriphenylene (0.63 g, 1.85 mmol) was added thereto. Further, diethylisopropylamine (2.13 ml, 12.25 mmol) was slowly added dropwise. After the completion of the dropwise addition, N,N-dimethylaminopyridine was added in a catalytic amount. The solution was heated to room temperature as it was, and stirred for 3 hours. Ethyl acetate and saturated salt water were added thereto for liquid separation, and the organic phase was washed with dilute hydrochloric acid water and saturated salt water. The organic phase was dried by anhydrous magnesium sulfate, and then the solvent was distilled off under reduced pressure. The residue was purified by silica gel column chromatography using a dichloromethane and methanol mixed solvent as an eluent. Crystallization was carried out from ice-cooled methanol, resulting in 2.8 g (yield 82%) of the exemplified compound (3).

$^1$H NMR (400 MHz, CDCl3) δ 1.30-1.45 (6H, m), 1.70-1.85 (6H, m), 2.05-2.20 (6H, m), 2.65-2.80 (6H, m), 4.19 (12H, t, J=6.4 Hz), 4.52 (12H, t, J=6.4 Hz), 5.87 (6H, d, J=10.4 Hz), 6.17 (6H, d, d, J=10.4 Hz, 17.2 Hz), 6.46 (6H, d, J=17.2 Hz), 6.83 (12H, d, J=8.0 Hz), 7.03 (6H, d, J=8.0 Hz), 7.06 (6H, d, J=8.0 Hz), 8.24 (6H, s); mass spectrum (M+Na)/(POSI)=1896.; phase transfer temperature: Cry 70° C. ND 127° C. Iso (Synthesis Examples 2 and 3)

For the exemplified compounds (4) and (5), syntheses were carried out in the same manner as in Synthesis Example 1, except that bromoethanol of Synthesis Example 1 was changed to bromopropanol and bromobutanol, respectively, resulting in the exemplified compound (4) in a yield of 33% (8 Steps) and the exemplified compound (5) in a yield of 24% (8 Steps).

Exemplified compound (4)

$^1$H NMR (400 MHz, CDCl3) δ 1.30-1.45 (6H, m), 1.70-1.85 (6H, m), 2.05-2.20 (18H, m), 2.65-2.80 (6H, m), 4.04 (12H, t, J=7.2 Hz), 4.37 (12H, t, J=6.4 Hz), 5.84 (6H, d, J=10.4 Hz), 6.13 (6H, d, d, J=10.4 Hz, 17.2 Hz), 6.42 (6H, d, J=17.2 Hz), 6.81 (12H, d, J=8.0 Hz), 7.01 (6H, d, J=8.0 Hz), 7.05 (6H; d, J=8.0 Hz), 8.19 (6H, s); mass spectrum (M+Na)/(POSI)=1980.; phase transfer temperature: Cry 65° C. ND 147° C. Iso Exemplified compound (5)

$^1$H NMR (400 MHz, CDCl3) δ 1.30-1.45 (6H, m), 1.70-1.85 (6H, m), 2.05-2.20 (30H, m), 2.65-2.80 (6H, m), 3.98 (12H, t, J=6.8 Hz), 4.25 (12H, t, J=6.4 Hz), 5.83 (6H, d, J=10.4 Hz), 6.13 (6H, d, d, J=10.4 Hz, 17.2 Hz), 6.42 (6H, d, J=17.2 Hz), 6.81 (12H, d, J=8.0 Hz), 7.02 (6H, d, J=8.0 Hz), 7.06 (6H, d, J=8.0 Hz), 8.21 (6H, s); mass spectrum (M+Na)/(POSI)=2064.; phase transfer temperature: Cry 70° C. ND 130° C. Iso (Synthesis Example 4)

The exemplified compound (17) was synthesized through the following route.

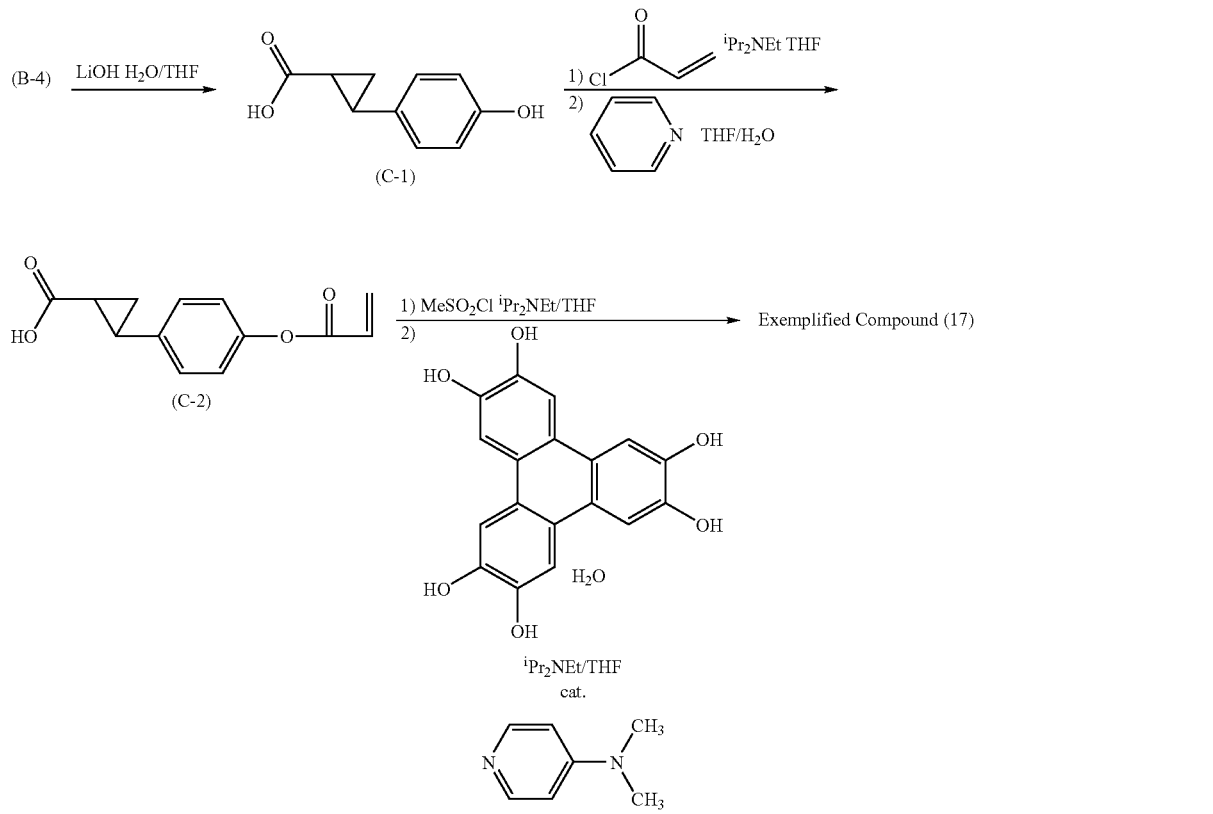

To 200 ml of a tetrahydrofuran solution of (B-4)(20.6 g, 0.1 mol) synthesized with the method of Synthesis Example 1, 200 ml of an aqueous solution of lithium hydroxide monohydrate (21 g, 0.5 mol) was added, and the solution was stirred under reflux for 5 hours. The solution was allowed to cool. Then, ethyl acetate and dilute hydrochloric acid water were added thereto for neutralization. The resulting mixture was subjected to liquid separation, and the organic phase was washed with saturated salt water. The organic phase was dried with anhydrous magnesium sulfate, and then, the solvent was distilled off under reduced pressure. Crystallization was carried out from the ethyl acetate and hexane mixed solvent, resulting in 14.8 g (yield 83%) of (C-1).

To 100 ml of a tetrahydrofuran solution of (C-1)(7.3 g, 41 mmol), acrylic acid chloride (7.1 ml, 87 mmol) was added, and at 0° C., diethylisopropylamine (15.2 ml, 87 mmol) was slowly added dropwise. After completion of dropwise addition, the solution was stirred for 1 hour. Then, pyridine (10 ml) and water (10 ml) were added thereto, and the mixture was stirred at room temperature for 1 hour. Ethyl acetate and dilute hydrochloric acid water were added thereto for liquid separation, and the organic phase was washed with saturated salt water. The organic phase was dried with anhydrous magnesium sulfate, and then, the solvent was distilled off under reduced pressure. Crystallization was carried out from the ethyl acetate and hexane mixed solvent, resulting in 7.0 g (yield 74%) of (C-2).

Under a nitrogen atmosphere, to 40 ml of a tetrahydrofuran solution of (C-2)(2.32 g, 10 mmol), methanesulfonyl chloride (0.77 ml, 10 mmol) was added under ice cooling, and diethylisopropylamine (1.74 ml, 10 mmol) was slowly added dropwise thereto. After dropwise addition, the temperature was raised to room temperature, and stirring was carried out for 30 minutes. The reaction was checked by TLC, followed by ice cooling. 40 ml of a tetrahydrofuran solution of monohydrate of 2,3,6,7,10,11-hexahydroxytriphenylene (0.43 g, 1.25 mmol) was added thereto. Further, ethylisopropylamine (1.52 ml, 8.75 mmol) was slowly added dropwise. After the completion of the dropwise addition, N,N-dimethylaminopyridine was added in a catalytic amount. The solution was heated to room temperature as it was, and stirred for 3 hours. Ethyl acetate and saturated salt water were added thereto for liquid separation, and the organic phase was washed with dilute hydrochloric acid water and saturated salt water. The organic phase was dried by anhydrous magnesium sulfate, and then the solvent was distilled off under reduced pressure. The residue was purified by silica gel column chromatography using a dichloromethane and methanol mixed solvent as an eluent. Crystallization was carried out from ice-cooled methanol, resulting in 1.6 g (yield 81%) of the exemplified compound (17).

$^1$H NMR (400 MHz, CDC13) δ 1.35-1.50 (6H, m), 1.70-1.90 (6H, m), 2.10-2.20 (6H, m), 2.70-2.85 (6H, m), 6.02 (6H, d, J=10.4 Hz), 6.33 (6H, d, d, J=10.4 Hz, 17.2 Hz), 6.61 (6H, d, J=17.2 Hz), 7.00-7.20 (24H, m), 8,21 (6H, s); mass spectrum (M+Na)/(POSI)=1632.; phase transfer temperature: Cry 95° C. Col 114° C. ND 160° C. Iso (Synthesis Example 5)

An exemplified compound (18) was synthesized through the following route.

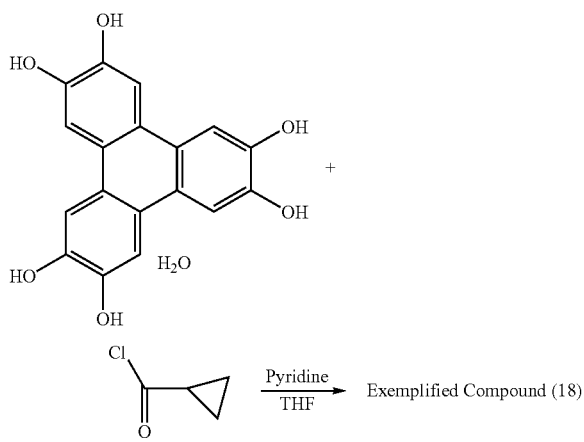

Monohydrate of 2,3,6,7,10,11-hexahydroxytriphenylene (1.7 g, 5.0 mmol) was dissolved in 200 ml of a tetrahydrofuran solution, and cyclopropylcarbonyl chloride (4.5 ml, 50.0 mmol) was added thereto. Under ice cooling, pyridine (15 ml) was slowly added dropwise thereto. After the dropwise addition, the mixture was stirred at room temperature for 2 hours. The reaction solution was poured to methanol (500 ml). The solid content was taken out by filtration, and crystallization was carried out from the ethyl acetate and hexane mixed solvent, resulting in 3.3 g (yield 90%) of the exemplified compound (18).

$^1$H NMR (400 MHz, CDC13) δ 1.00-1.10 (12H, m), 1.20-1.30 (12H, m), 1.90-2.00 (6H, m), 8.14 (6H, s); mass spectrum (M+Na)/(POSI)=755.; melting point: 300° C. or more (Example 4-1)

(Manufacturing of Polymer Base Material)

The following composition was charged into a mixing tank, and stirred with heating to 30° C. Thus, respective components were dissolved to prepare a cellulose acetate solution.

| {Cellulose acetate solution composition (parts by mass) | Inner layer | Outer layer} |
|---|---|---|
| Cellulose acetate with an oxidation degree of 60.9% | 100 | 100 |
| Triphenyl phosphate (plasticizer) | 7.8 | 7.8 |
| Biphenyl diphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Silica fine particles (AEROSIL R972, manufactured by NIPPON AEROSIL Co., Ltd.) | 0 | 0.8 |
| The following retardation raising agent | 1.7 | 0 |

-continued

| {Cellulose acetate solution composition (parts by mass) | Inner layer | Outer layer} |
|---|---|---|
| Retardation raising agent | | |

The dope for the inner layer and the dope for the outer layer obtained were cooled to 0° C. by the use of a three-layer co-casting die, and cast on a drum. The film with a residual solvent content of 70 mass % was peeled off from the drum, and the opposite ends thereof were fixed by means of a pin tenter. Thus, the film was dried at 80° C. while being transferred with a draw ratio in the direction of transfer set at 110%. When the residual solvent content became 10%, drying was carried out at 110° C. Thereafter, the film was dried at a temperature of 140° C. for 30 minutes to manufacture a cellulose acetate film (outer layer: 3 μm, inner layer: 74 μm, outer layer: 3 μm) with a residual solvent content of 0.3 mass %. The manufactured cellulose acetate film (PK-1) was measured for the optical characteristics.

The resulting polymer base material (PK-1) was found to have a width of 1340 mm and a thickness of 80 μm. The retardation value (Re) at a wavelength of 500 nm was measured by means of an ellipsometer (M-150, manufactured by JASCO Corp.), and found to be 6 nm. Whereas, the retardation value (Rth) in the direction of thickness at a wavelength of 500 nm was measured, and found to be 83 nm.

The manufactured polymer base material (PK-1) was immersed in a 2.0 N potassium hydroxide solution (25° C.) for 2 minutes, and then, neutralized with sulfuric acid, water washed with pure water, and dried. The surface energy of the PK-1 was determined by the contact angle method, and found to be 63 N/m.

For manufacturing of an optical compensation film, the slot coater shown in FIG. 8 was mounted in the slot die shown in FIG. 9A to effect the operation. As shown in FIG. 8, the web 82 is fed by a feeder, and transfers to a coating step through a rubbing treatment roll while being supported by a roll. Thereafter, it passes through a drying zone, a heating zone, and an ultraviolet lamp, and it is wound by a winder. Incidentally, the decompression chamber was set at a position in contact with, and on the opposite side from the direction of advance of the web 82 so as to enable sufficient decompression control on a bead 84a.

The upstream lip land length $1_{UP}$ of the slot die 83 was set at 1 mm, and the downstream lip land length $1_{LO}$ was set at 50 μm. Thus, a coating solution 84 was coated in an amount of 5 ml/m$^2$ on the web 82 so that the wet film thickness became 5 μm. The coating speed was set at 60 m/min. For the web 82, a cellulose triacetate base material with a thickness of 80 μm described above was used. The length of the gap between the downstream lip land 89 and the cellulose triacetate base material which was the web 82 was set at 40 μm. Before coating the coating solution 84, an alignment film was coated with the following composition on the coating side of the web 82, and dried by 60° C. warm air for 60 seconds, and further by 90° C. warm air for 150 seconds to form a resin layer for an alignment film. The web 82 on which the resin layer for an alignment film had been previously formed was fed, and the surface of the resin layer for an alignment film was subjected to a rubbing treatment to form an alignment film. Then, the film was transferred as it was to a coating step to carry out coating. Incidentally, for the rubbing treatment, the alignment film was subjected to the rubbing treatment in the direction parallel to the slow axis (measured at a wavelength 632.8 nm) of the polymer base material (PK-1). The circumferential speed of the rubbing roller in the rubbing treatment was set at 5.0 m/sec, and the pressing pressure on the resin layer for an alignment film was set at $9.8 \times 10^{-3}$ Pa.

| (Alignment film coating solution composition) | |
|---|---|
| The following modified polyvinyl alcohol | 10 parts by mass |
| Water | 371 parts by mass |
| Methanol | 119 parts by mass |
| Glutaraldehyde (crosslinking agent) | 0.5 part by mass |

Modified polyvinyl alcohol

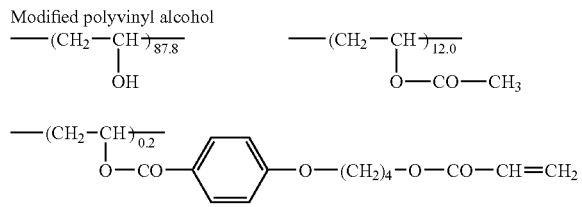

For the coating solution 84, the following composition of the optical anisotropic layer was used. The coating speed was set at 60 m/min. The web 82 on which the coating solution 84 had been coated was passed through the heating zone set at a temperature lower than the Iso point temperature (the temperature at which transition is caused from the discotic nematic phase to the isotropic liquid) by 5° C. Thus, the liquid crystal layer surface was irradiated with an ultraviolet ray by a 120 W/cm ultraviolet lamp under a 60° C. atmosphere to manufacture an optical compensation film (KH-1). The coatability was judged by visual observation of the bead state, and judged as uncoatable at the stage where the bead 84a was broken. As a result, in this Example 4-1, the coating was possible, and the decompression degree was 1000 Pa.

(Formation of Optical Anisotropic Layer)

The following composition was dissolved in 102 kg of methyl ethyl ketone to prepare a coating solution.

| | |
|---|---|
| Liquid crystalline compound (exemplified compound (3)) | 41.01 parts by mass |
| Ethylene oxide-modified trimethylolpropane triacrylate (V#360, manufactured by Osaka Organic Chemistry Co., Ltd.) | 4.06 parts by mass |
| Cellulose acetate butyrate (CAB551-0.2, manufactured by Eastman Chemical Company) | 0.34 part by mass |
| Cellulose acetate butyrate (CAB531-1, manufactured by Eastman Chemical Company) | 0.11 part by mass |
| Fluoroaliphatic group-containing polymer exemplified compound (P-33) | 0.018 part by mass |
| Fluoroaliphatic group-containing polymer exemplified compound (P-136) | 0.23 part by mass |

-continued

| | |
|---|---|
| Photopolymerization initiator (IRGACURE-907, manufactured by Ciba-Geigy Corp.) | 1.35 parts by mass |
| Sensitizer (KAYACURE DETX, manufactured by NIPPON KAYAKU Co., Ltd.) | 0.45 part by mass |

The retardation value Re of the optical anisotropic layer measured at a wavelength of 546 nm was 50 nm. Whereas, the polarizing plate was disposed in a crossed Nicols arrangement. Thus, the nonuniformity of the obtained optical compensation film was observed. As a result, even when it was observed from the front, and the direction tilted to 60 degrees from the normal, no nonuniformity was detected.

(Evaluation of Tilt Angle of Liquid Crystalline Compound)

For the optical anisotropic layer including the discotic compound or the rod-like compound oriented therein, the tilt angle at one side of the optical anisotropic layer (the angle formed between the physical symmetry axis of the discotic compound or the rod-like compound and the interface of the optical anisotropic layer is taken as the tilt angle) θ1, and the tilt angle θ2 at the other side are difficult to measure directly and with precision. Under such circumstances, in this specification, θ1 and θ2 are calculated by the following technique. This technique does not express the actual oriented state of the invention with precision, but is effective as a means for expressing the relative relation of a part of the optical characteristics which the optical film has.

With this technique, assuming for ease of calculation that the following two points are supposed for the tilt angles at the two interfaces of the optical anisotropic layer.

1. The optical anisotropic layer is assumed to be a multilayered form including a layer containing a discotic compound or a rod-like compound. Further, the layer of the smallest unit forming it (assuming that the tilt angle of the discotic compound or the rod-like compound is uniform in the layer) is assumed to be optically uniaxial.

2. The tilt angle of each layer is assumed to monotonously change in a linear function along the direction of width of the optical anisotropic layer.

The specific calculation method is as follows.

(1) Within the plane in which the tilt angle of each layer monotonously changes in a linear function along the direction of width of the optical anisotropic layer, the angle of incidence of a test light on the optical anisotropic layer is changed, and the retardation values are measured at 3 or more test angles. For simplification of the measurement and the calculation, preferably, the normal direction to the optical anisotropic layer is set at 0°, and the retardation values are measured at 3 test angles of −40°, 0°, and +40°. Such measurements can be carried out by means of KOBRA-21ADH and KOBRA-WR (manufactured by Oji Scientific Instruments, Co., Ltd.), and transmission type ellipsometers AEP-100 (manufactured by SHIMADZU CORPORATION), M150 and M520 F(manufactured by JASCO corp.), and ABR10A (manufactured by UNIOPT Co., Ltd.)

(2) In the model, the refractive index of an ordinary ray of each layer is represented by no; the refractive index of an extraordinary ray, ne (ne is the same value for all the respective layers, and the same goes for no), and the thickness of the whole multilayered form is represented by d. Further, on the assumption that the tilt direction at each layer is in agreement with the uniaxial optical axis of the layer, fitting is carried out with the tilt angle θ1 at one side of the optical anisotropic layer and the tilt angle θ2 at the other side thereof as variables so that the calculation of the angle dependency of the retardation value of the optical anisotropic layer is in agreement with the measured value. Thus, θ1 and θ2 are calculated. The results are shown in Table 4-1.

Herein, for no and ne, known values such as bibliographic values and catalogue values may be used. When the value is unknown, it can also be measured by means of an Abbe refractometer. The thickness of the optical anisotropic layer can be measured by means of an optical interference thickness meter, the cross sectional photograph of a scanning electron microscope, or the like.

(Manufacturing of Polarizing Plate)

By the use of a polyvinyl alcohol type adhesive, the KH-1 (optical compensation film) was bonded onto the one side surface of the polarizer (HF-1). Whereas, a 80 μm-thick triacetyl cellulose film (TD-80U: manufactured by Fuji Photo Film Co., Ltd.) was subjected to a saponification treatment, and bonded to the opposite side of the polarizer (HF-1) by the use of a polyvinyl alcohol type adhesive. The alignment was set so that the transmission axis of the polarizer (HF-1) and the slow axis of the polymer film (PK-1) serving as the support for the optical compensation film were in parallel to each other. The alignment was set so that the transmission axis of the polarizer (HF-1) and the slow axis of the triacetyl cellulose film were orthogonal to each other. A polarizing plate (HB-1) was manufactured in this manner.

(Evaluation with Tn Liquid Crystal Cell)

A pair of polarizing plates provided in a liquid crystal display (AQUOS LC20C1S, manufactured by Sharp Co., Ltd.) using a TN liquid crystal cell were peeled off. Then, in place of it, the polarizing plates (HB-1) manufactured were bonded one on the observer side, and another on the backlight side via an adhesive so that the optical compensation film (KH-1) was on the liquid crystal cell side. The alignment was set so that the transmission axis of the polarizing plate on the observer side and the transmission axis of the polarizing plate on the backlight side were in the O mode.

For the manufactured liquid crystal display, the viewing angles were measured from at black display (L1) to at white display (L8) by means of a measuring device (BM-5A, manufactured by TOPCON Co.). Vertically and horizontally, the range with a contrast ratio (white transmittance/black transmittance) of 10 or more, and free from black-side gradation inversion (inversion at L1 and L2) was determined as the viewing angle. The measurement results are shown in Table 4-1.

(Evaluation of Nonuniformity on Liquid Crystal Display Panel and Evaluation of Top Viewing Angle Color Taste)

The entire surface of the display panel of the liquid crystal display was adjusted to halftone, and the nonuniformity was evaluated. Whereas, the changes between the color taste seen from the front direction and the color taste seen from the upper direction of 60° for black display were evaluated (Δu'v' of equal to or less than 0.045 is judged as AA, and Δu'v' of more than 0.045 is judged as CC). Evaluations were carried out for Examples 4-2 to 4-5, and Comparative Examples 4-1 to 4-3 shown below in the same manner. For Δu'v', the color difference according to the CIE 1976 UCS chromaticity diagram is used as an index.

(Examples 4-2 to 4-5, and Comparative Examples 4-1 to 4-3)

Each optical compensation film was manufactured in the same manner as in Example 4-1, except that the kind and the addition amount of the fluoroaliphatic group-containing polymer, and the kind of the liquid crystalline compound were changed as shown in Table 4-1. Then, evaluations of the tilt angle, the viewing angle, the nonuniformity, and the color taste were carried out in the same manner. The results are shown in Table 1.

Discotic liquid crystalline compound (DLC-1)

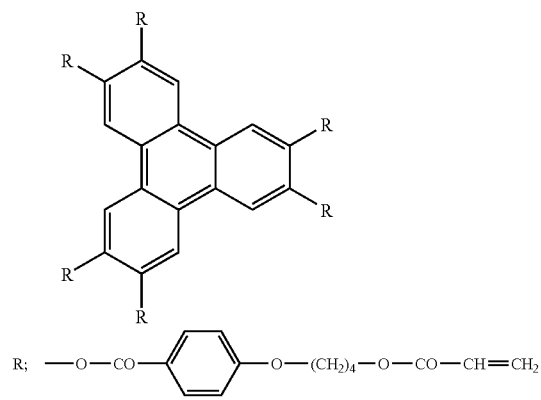

As indicated from the results of Table 4-1, use of a fluoroaliphatic group-containing polymer, and the discotic liquid crystalline compound having a cyclopropylcarbonyl group can implement the surface conditions free from nonuniformity. Further, use of two or more thereof in combination can provide a liquid crystal display good in display characteristics of the viewing angle and the color taste.

TABLE 4-1

| Optical compensation film | Fluoroaliphatic group-containing polymer (1) | | Fluoroaliphatic group-containing polymer (2) | | Liquid crystalline compound | Tilt angle [°] | | Viewing angle [°] | | Top viewing angle color taste | Nonuniformity |
|---|---|---|---|---|---|---|---|---|---|---|---|
| | Kind | Part by mass | Kind | Part by mass | | Alignment film | Air interface | Top down | Right left | | |
| Example 4-1 | P-136 | 0.23 | P-33 | 0.018 | Exemplified Compound (3) | 12 | 75 | 160 | 160 | AA | AA |
| Example 4-2 | P-138 | 0.28 | P-34 | 0.018 | Exemplified Compound (4) | 12 | 78 | 160 | 160 | AA | AA |
| Example 4-3 | P-138 | 0.30 | — | — | Exemplified Compound (5) | 12 | 58 | 120 | 150 | AA | AA |
| Example 4-4 | P-81 | 0.30 | — | — | Exemplified Compound (17) | 12 | 58 | 120 | 150 | AA | BB to AA |

TABLE 4-1-continued

| Optical compensation film | Fluoroaliphatic group-containing polymer (1) | | Fluoroaliphatic group-containing polymer (2) | | Liquid crystalline compound | Tilt angle [°] | | Viewing angle [°] | | Top viewing angle color taste | Nonuniformity |
|---|---|---|---|---|---|---|---|---|---|---|---|
| | Kind | Part by mass | Kind | Part by mass | | Alignment film | Air interface | Top down | Right left | | |
| Example 4-5 | P-88 | 0.35 | P-127 | 0.030 | Exemplified Compound (18) | 12 | 65 | 140 | 160 | AA | BB to AA |
| Comp. Ex. 4-1 | — | — | — | — | Exemplified Compound (3) | 12 | 58 | 120 | 150 | AA | CC |
| Comp. Ex. 4-2 | P-138 | 0.28 | P-33 | 0.02 | DLC-1 | 12 | 78 | 160 | 160 | CC | AA |
| Comp. Ex. 4-3 | P-81 | 0.30 | — | — | DLC-1 | 12 | 58 | 120 | 150 | CC | BB to AA |

(Example 4-5)

An optical compensation film, and further, a polarizing plate with an optical compensation film were manufactured in the same manner as in Example 4-1, except that the amount of the retardation raising agent used in Example 4-1 to be added was changed, and that a polymer base material with retardations along the direction of thickness set at 76, 83, 100, and 110 nm was manufactured. It was shown that the nonuniformity-free surface conditions were obtained, and the display characteristics of the viewing angle and the color taste were favorable even when the retardations along the direction of thickness of the polymer base material was changed to 76, 83, 100, and 110 nm.

(Example 4-6)

An optical compensation film, and further, a polarizing plate with an optical compensation film were manufactured in the same manner as in Example 1, except that the retardation raising agent used in Example 1 was changed to the following retardation raising agent, and the amount thereof to be added to the inner layer was set at 1.2 parts by mass, and that a polymer base material with a retardation along the direction of thickness set at 90 nm was manufactured. It was shown that the nonuniformity-free surface conditions were obtained, and the display characteristics of the viewing angle and the color taste were favorable.

Retardation raising agent

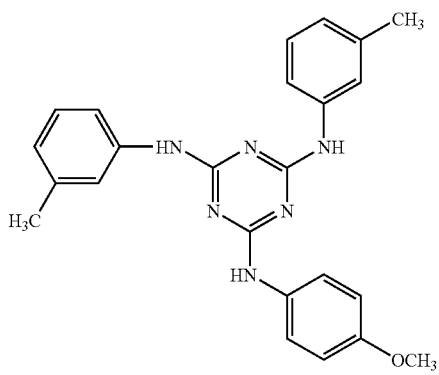

(Example 4-7)

An optical compensation film, and further, a polarizing plate with an optical compensation film were manufactured in the same manner as in Example 4-1, except that the amount of the retardation raising agent used in Example 6 to be added was changed, and that a polymer base material with retardations along the direction of thickness set at 76, 83, 100, and 110 nm was manufactured. It was shown that the nonuniformity-free surface conditions were obtained, and the display characteristics of the viewing angle and the color taste were favorable even when the retardations along the direction of thickness of the polymer base material was changed to 76, 83, 100, and 110 nm.

(Example 4-8)

An optical compensation film, and further, a polarizing plate with an optical compensation film were manufactured in the same manner as in Example 4-1, except that in Example 4-1, the drying method was changed to the drying method of Test 1 and Test 2 described in [0058] to [0070] of JP-A-2003-93953. It was shown that the nonuniformity-free surface conditions were obtained, and the display characteristics of the viewing angle and the color taste were favorable even when the drying method was changed.

(Example 4-9)

An optical compensation film, and further, a polarizing plate with an optical compensation film were manufactured in the same manner as in Example 4-1, except that P-33 used as the fluoroaliphatic group-containing polymer (2) in Example 4-1 was changed to P-28. It was shown that the nonuniformity-free surface conditions were obtained, and the display characteristics of the viewing angle and the color taste were favorable even when the fluoroaliphatic group-containing polymer (2) was changed to a polymer species having a repeating unit derived from a monomer represented by the formula (2).

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-66747, JP2005-70005, JP2005-73051 and JP2005-76993, filed Mar. 10, 11, 15 and 17 of 2005, respectively, the contents of which are incorporated herein by reference.

The invention claimed is:

1. A liquid crystal display comprising:
a pair of polarizing films,
a liquid crystal cell between the pair of polarizing films; and
an optical film between one of the polarizing films and the liquid crystal cell, the optical film comprising a first optical anisotropic layer and a second optical anisotropic layer,
wherein the first optical anisotropic layer has an optical property satisfying expression (7), and the second optical anisotropic layer has an optical property satisfying expression (8):

$$Re_1(450)/Re_1(650) < 1.25 \quad (7)$$

$$2 \leq (\Delta(550) \times d)/Rth_2(550) \leq 5 \quad (8)$$

wherein $Re_1(450)$ and $Re_1(650)$ represent in-plane retardation values of the first optical anisotropic layer 1 at a wavelength of 450 nm and 650 nm, respectively,
$\Delta n(550)$ represents a birefringence of a liquid crystal molecule in the liquid crystal cell at a wavelength of 550 nm;
d represents a thickness of the liquid crystal cell; and
$Rth_2(550)$ represents a thickness-direction retardation value of the second optical anisotropic layer at a wavelength of 550 nm, and
the first optical anisotropic layer has one of a ratio of $Re_1(40°)$ to $Re_1(-40°)$ of from 3 to 20 and a ratio of $Re_1(40°)$ to $Re_1(-40°)$ of from 1/20 to 1/3, wherein $Re_1(40°)$ is an in-plane retardation measured at a wavelength of 550 nm and a swing angle of +40° with a slow axis of the first optical anisotropic layer as a swing axis, and $Re_1(-40°)$ is an in-plane retardation measured at a wavelength of 550 nm and a swing angle of −40° with a slow axis of the first optical anisotropic layer as a swing axis.

2. The liquid crystal display according to claim 1, wherein the in-plane retardation value $Re_1(550)$ is from 0 nm to 40 nm.

3. The liquid crystal display according to claim 1, wherein the in-plane retardation value $Re_2(550)$ is from 30 nm to 60 nm, and the thickness-direction retardation value $Rth_2(550)$ is from 100 nm to 300 nm.

4. The liquid crystal display according to claim 1, wherein the first optical anisotropic layer is formed from a liquid crystal compound.

5. The liquid crystal display according to claim 1, wherein the second optical anisotropic layer is a cellulose acylate film.

* * * * *